(12) United States Patent
Widmer et al.

(10) Patent No.: US 12,501,864 B2
(45) Date of Patent: Dec. 23, 2025

(54) INJECTION SYSTEMS, INJECTION TOOLS AND METHODS FOR SAME

(71) Applicant: Invaio Sciences International GmbH, Basel (CH)

(72) Inventors: Urs Widmer, Dornach (CH); Michael Christian Oehl, Reinach (CH); Lukas Rudolf Schüpbach, Basel (CH); Antony Mathai Chettoor, Apex, NC (US); Dimitri Verweire, Zurich (CH)

(73) Assignee: Invaio Sciences International GmbH, Basel (CH)

( * ) Notice: Subject to any disclaimer, the term of this patent is extended or adjusted under 35 U.S.C. 154(b) by 120 days.

(21) Appl. No.: 17/796,225

(22) PCT Filed: Jan. 29, 2021

(86) PCT No.: PCT/EP2021/052111
§ 371 (c)(1),
(2) Date: Jul. 28, 2022

(87) PCT Pub. No.: WO2021/152093
PCT Pub. Date: Aug. 5, 2021

(65) Prior Publication Data
US 2023/0084693 A1    Mar. 16, 2023

Related U.S. Application Data

(60) Provisional application No. 63/073,688, filed on Sep. 2, 2020, provisional application No. 63/073,797, filed on
(Continued)

(51) Int. Cl.
A01G 7/06    (2006.01)
(52) U.S. Cl.
CPC ..................................... A01G 7/06 (2013.01)

(58) Field of Classification Search
CPC .... A01G 7/06; A16M 5/204; A61M 2005/005
See application file for complete search history.

(56) References Cited

U.S. PATENT DOCUMENTS

| 523,977 A | 8/1894 | Donaldson |
|---|---|---|
| 2,927,401 A | 3/1960 | Winfred |
| (Continued) | | |

FOREIGN PATENT DOCUMENTS

| CL | 200601468 | 11/2006 |
|---|---|---|
| CL | 201700510 | 12/2017 |
| (Continued) | | |

OTHER PUBLICATIONS

Chinese Search Report and Opinion received for Chinese Patent Application No. 201980061741.1 issued on Feb. 11, 2022, 3 pages.
(Continued)

*Primary Examiner* — Joshua D Huson
*Assistant Examiner* — Katherine Anne Kloecker
(74) *Attorney, Agent, or Firm* — Harness, Dickey & Pierce, P.L.C.

(57) ABSTRACT

A plant injection system includes an injection tool configured to penetrate a plant and distribute a liquid formulation to the plant. The injection tool includes a base having a plurality of inlet ports and a penetrating distribution body extending along a longitudinal body axis. The penetrating distribution body includes a penetrating element to penetrate the plant, and one or more distribution ports in communication with the inlet ports to distribute the liquid formulation to the plant. The injection tools is configured to precisely inject liquid formulation into the vascular system of the plant.

16 Claims, 64 Drawing Sheets

Related U.S. Application Data on Sep. 2, 2020, provisional application No. 63/073,690, filed on Sep. 2, 2020, provisional application No. 62/967,555, filed on Jan. 29, 2020.

(56) References Cited

U.S. PATENT DOCUMENTS

| | | | |
|---|---|---|---|
| 3,992,813 A | 11/1976 | Freshsel | |
| 4,848,028 A | 7/1989 | Johnson et al. | |
| 5,046,281 A | 9/1991 | Murphy | |
| 5,239,773 A * | 8/1993 | Doolittle, Jr. | A01G 29/00 47/57.5 |
| 5,355,620 A | 10/1994 | Newbanks | |
| 5,797,215 A * | 8/1998 | Doolittle | A01G 7/06 47/57.5 |
| 5,956,894 A * | 9/1999 | Eldridge | A01G 7/06 47/57.5 |
| 6,607,508 B2 * | 8/2003 | Knauer | A61M 5/204 604/137 |
| 7,462,695 B2 | 12/2008 | Dunse et al. | |
| 8,677,684 B1 | 3/2014 | Doolittle | |
| 9,775,697 B2 | 10/2017 | Buckley et al. | |
| 10,681,874 B1 * | 6/2020 | Scarlata | A01G 7/06 |
| 11,297,776 B2 | 4/2022 | Hughes et al. | |
| 11,533,857 B1 * | 12/2022 | Bird | A01G 7/06 |
| 11,548,019 B2 * | 1/2023 | Binner | A61M 35/003 |
| 11,844,318 B2 | 12/2023 | Schupbach et al. | |
| 11,883,260 B2 * | 1/2024 | Edwards | A61D 7/00 |
| 11,918,542 B2 * | 3/2024 | Yedgar | A61J 1/2096 |
| 2002/0169426 A1 | 11/2002 | Takagi | |
| 2004/0079169 A1 * | 4/2004 | Wild | A01G 7/06 73/861 |
| 2004/0255512 A1 | 12/2004 | Burgess | |
| 2005/0166450 A1 | 8/2005 | Wild et al. | |
| 2005/0224137 A1 | 10/2005 | Tribble et al. | |
| 2006/0200095 A1 | 9/2006 | Steube | |
| 2007/0266628 A1 | 11/2007 | Doolittle | |
| 2009/0260283 A1 | 10/2009 | Blake | |
| 2010/0312261 A1 | 12/2010 | Suzuki et al. | |
| 2011/0252511 A1 | 10/2011 | Van den Berghen | |
| 2014/0345194 A1 | 11/2014 | Vue et al. | |
| 2015/0296801 A1 | 10/2015 | Brahm et al. | |
| 2015/0351327 A1 | 12/2015 | Davis, Jr. | |
| 2016/0081308 A1 * | 3/2016 | Cary | A61M 5/162 222/80 |
| 2016/0360709 A1 | 12/2016 | Shang et al. | |
| 2020/0015429 A1 | 1/2020 | Fabry | |
| 2021/0092907 A1 * | 4/2021 | Simmons | A01G 7/06 |
| 2021/0228806 A1 * | 7/2021 | Streeter | A61M 5/19 |
| 2021/0337739 A1 | 11/2021 | Schupbach et al. | |
| 2022/0201940 A1 | 6/2022 | Schupbach et al. | |
| 2023/0240199 A1 * | 8/2023 | Widmer | A01G 7/06 47/57.5 |

FOREIGN PATENT DOCUMENTS

| | | |
|---|---|---|
| CN | 2572757 Y | 9/2003 |
| CN | 201444781 U | 5/2010 |
| CN | 202713995 U | 2/2013 |
| CN | 202958264 U | 6/2013 |
| CN | 104221784 A | 12/2014 |
| CN | 105009969 A | 11/2015 |
| CN | 105325106 A | 2/2016 |
| CN | 105613073 A | 6/2016 |
| CN | 205727231 U | 11/2016 |
| EP | 111254 A1 | 6/1984 |
| EP | 187124 A1 | 7/1986 |
| EP | 1698318 A1 * | 9/2006 ........... A61J 1/2096 |
| FR | 2509123 A1 | 1/1983 |
| JP | S4847774 U | 6/1973 |
| JP | H06169643 A | 6/1994 |
| JP | H1156137 A | 3/1999 |
| JP | 2000041486 A | 2/2000 |
| JP | 2017131249 A | 8/2017 |
| WO | WO-1996038033 A1 | 12/1996 |
| WO | WO-2009124707 A1 | 10/2009 |
| WO | WO-2009126473 A1 | 10/2009 |
| WO | WO-2012114197 A1 | 8/2012 |
| WO | WO-2013010909 A1 | 1/2013 |
| WO | WO-2013149993 A1 | 10/2013 |
| WO | WO-2015110535 A1 | 7/2015 |
| WO | WO-2016034756 A1 | 3/2016 |
| WO | WO-2020021041 A1 | 1/2020 |
| WO | WO-2022023436 A1 | 2/2022 |
| WO | WO-2022189386 A1 | 9/2022 |

OTHER PUBLICATIONS

Girelli et al., (2019). "1 H-NMR Metabolite Fingerprinting Analysis Reveals a Disease Biomarker and a Field Treatment Response in *Xylella fastidiosa* subsp. *pauca*-Infected Olive Trees," Plants, 8(5):115, 17 pages.

International Search Report and Written Opinion received for International Patent Application No. PCT/EP2019/070119 mailed on Oct. 18, 2019, 18 pages.

International Search Report and Written Opinion received for International Patent Application No. PCT/EP2020/060928 mailed on Jun. 30, 2020, 9 pages.

Scortichini et al., (2018). "A zinc, copper and citric acid biocomplex shows promise for control of *Xylella fastidiosa* subsp. *pauca* in olive trees in Apulia region (southern Italy)," Phytopathologia Mediterranea, 57(1):48-72.

Switzerland Search Report mailed on Jan. 21, 2020, for Swiss Patent Application No. CH000526/2019 filed on Oct. 25, 2019, 8 pages.

Switzerland Search Report mailed on Nov. 26, 2018, for Swiss Patent Application No. CH000917/2018 filed on Jul. 25, 2018, 8 pages.

Youtube, (2021). "Protect your palms with Syngenta micro tree-injection. Watch the video to find out how," available online at <https://www.youtube.com/watch?v=UwYiblhq7m8>, 1 page.

* cited by examiner

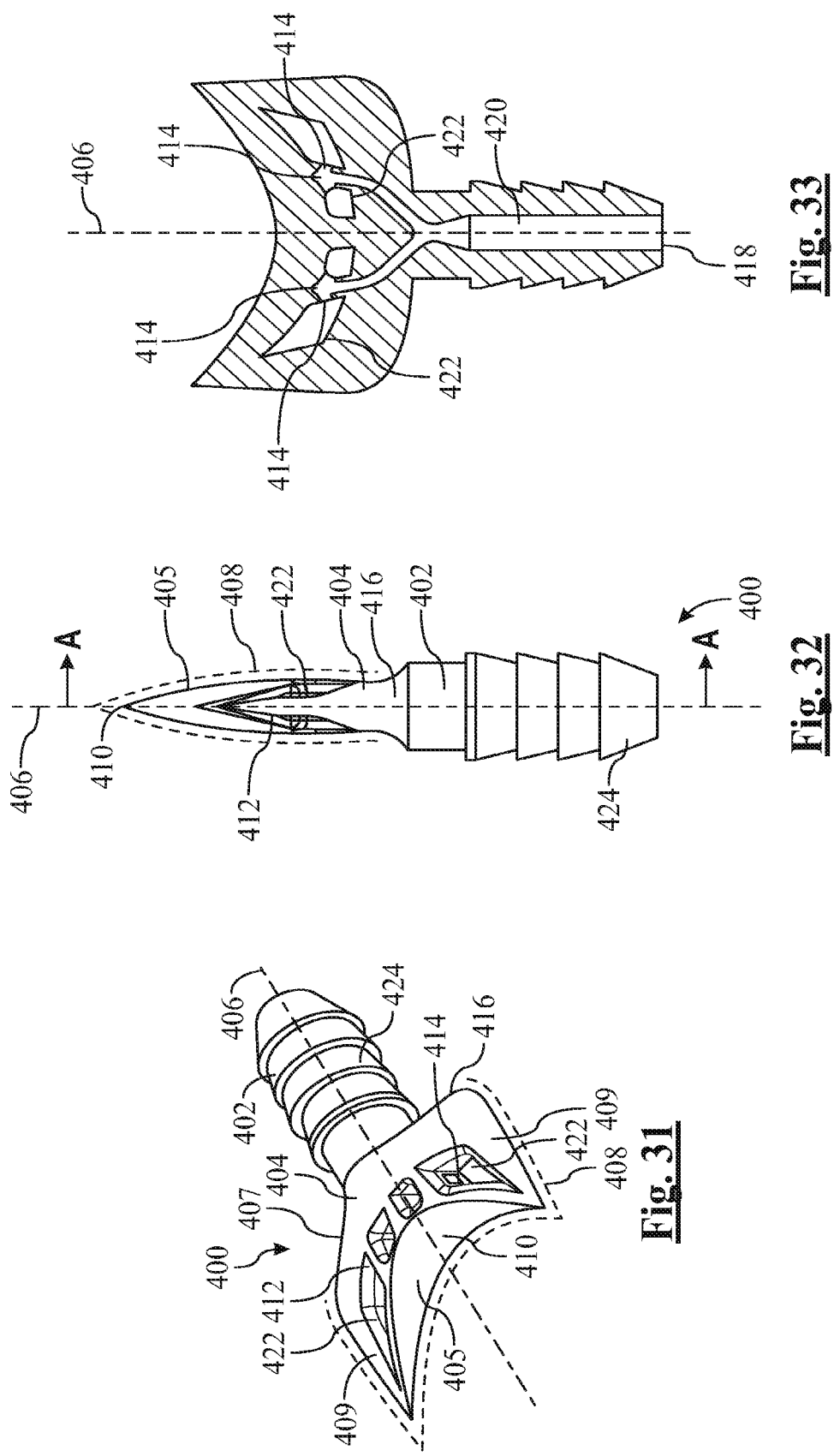

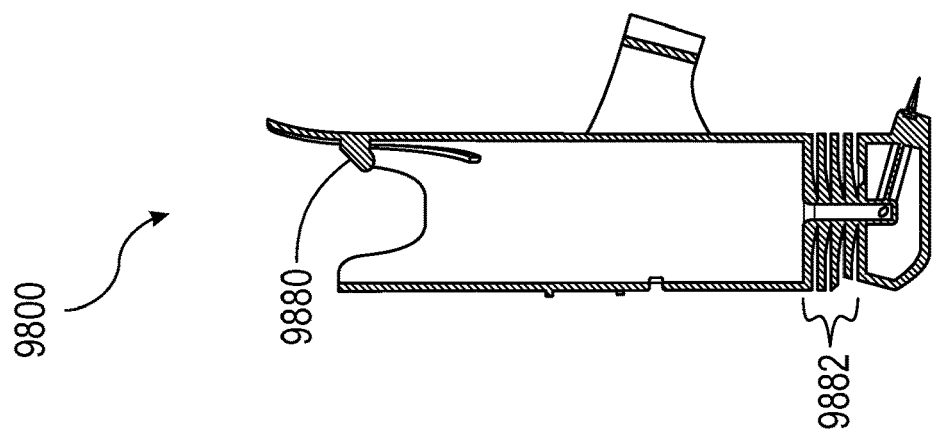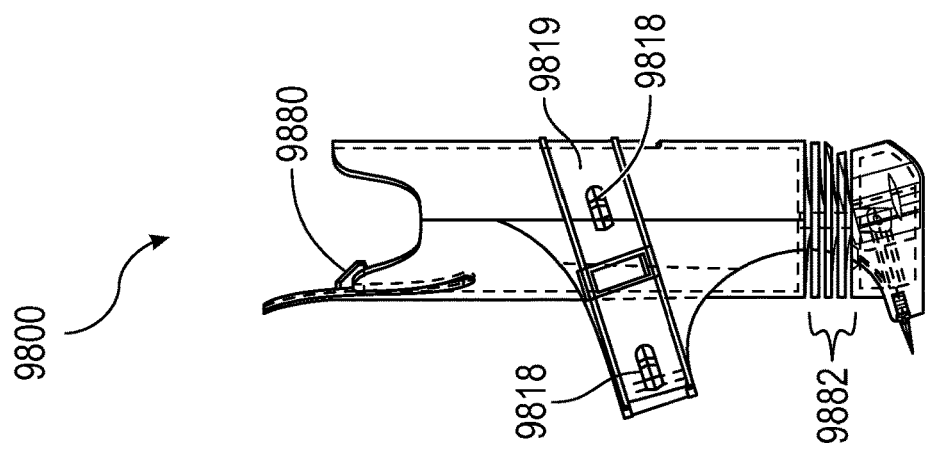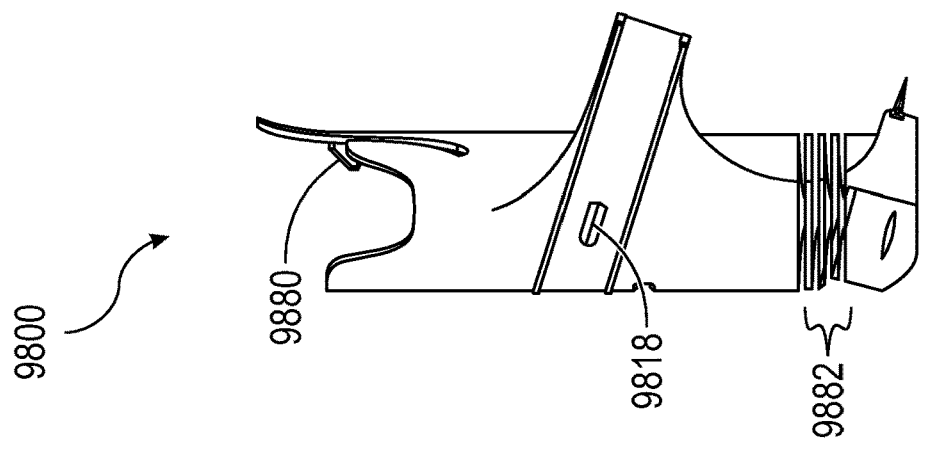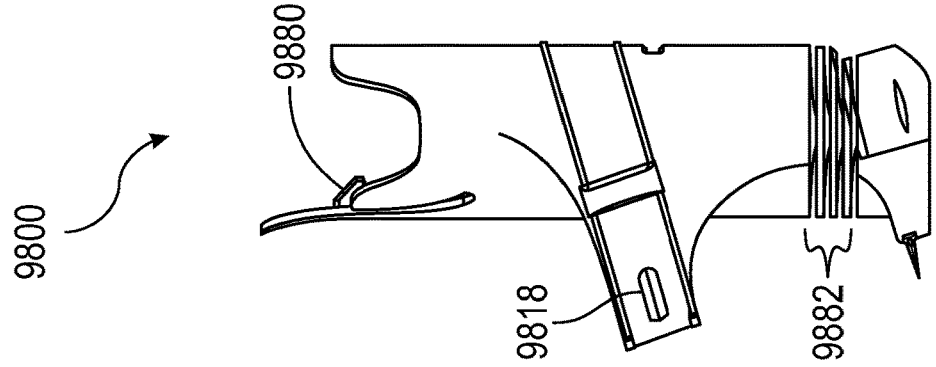

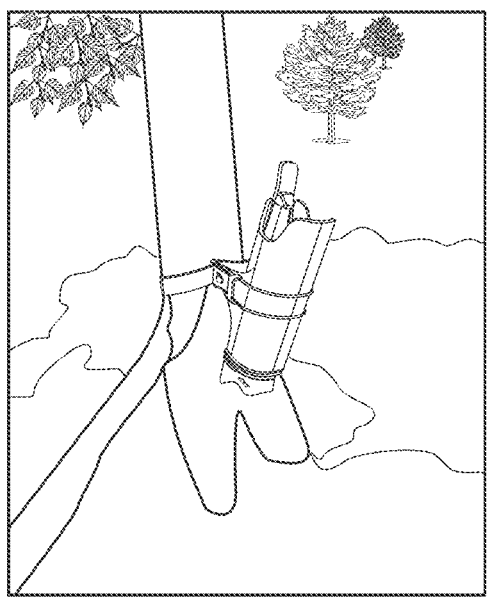 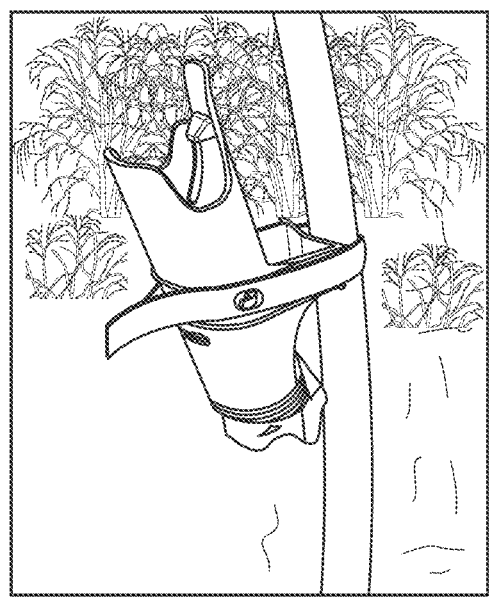
Fig. 64A  Fig. 64B
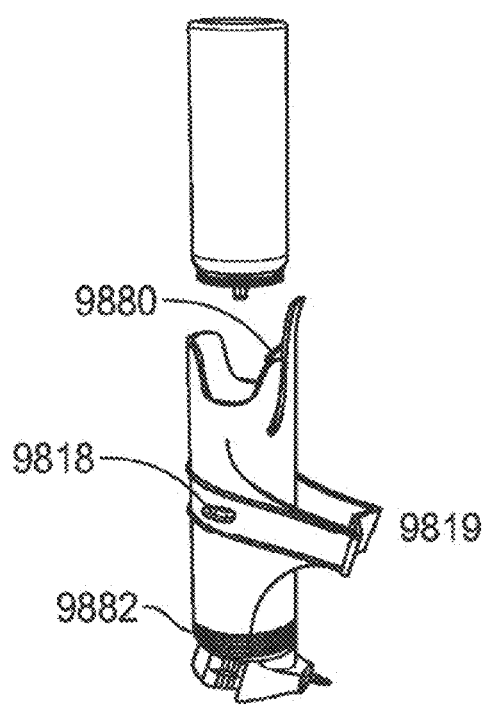 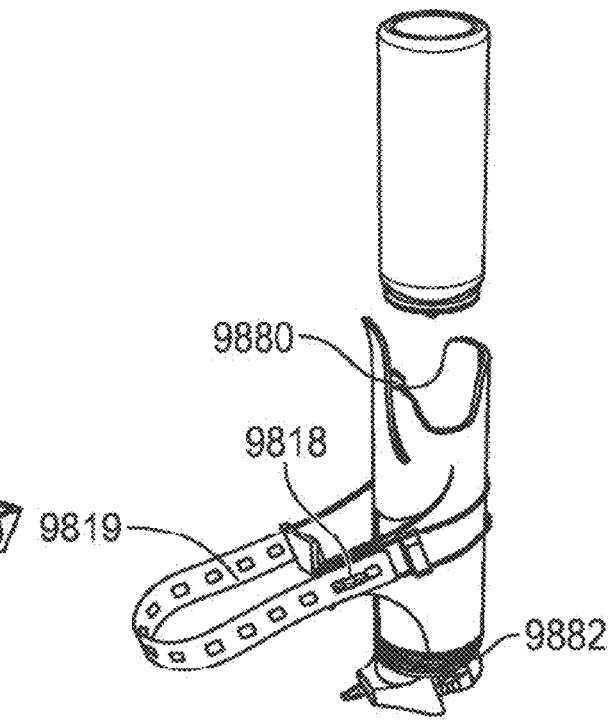
Fig. 65  Fig. 66

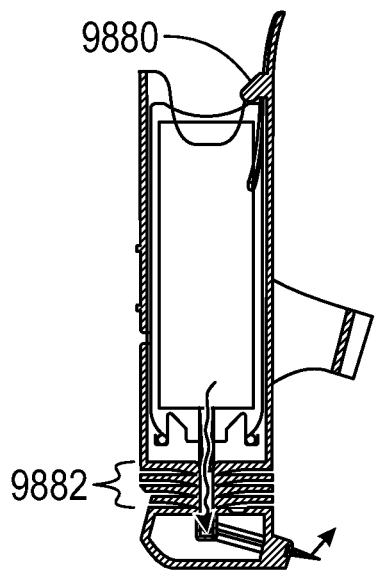
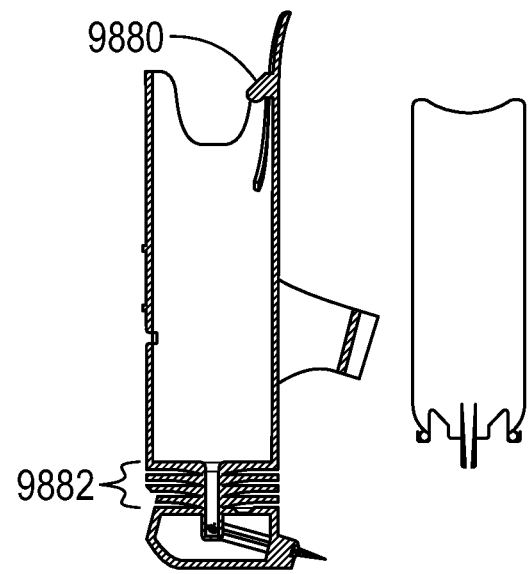
Fig. 67A
Fig. 67B
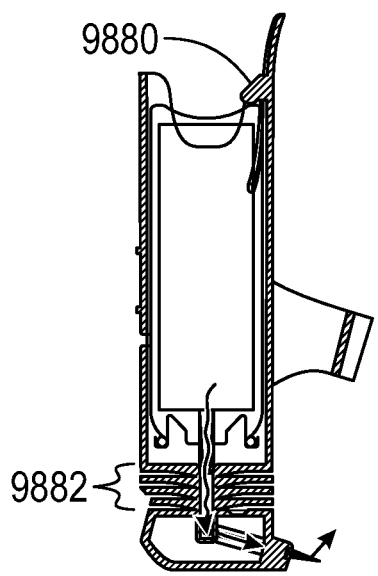
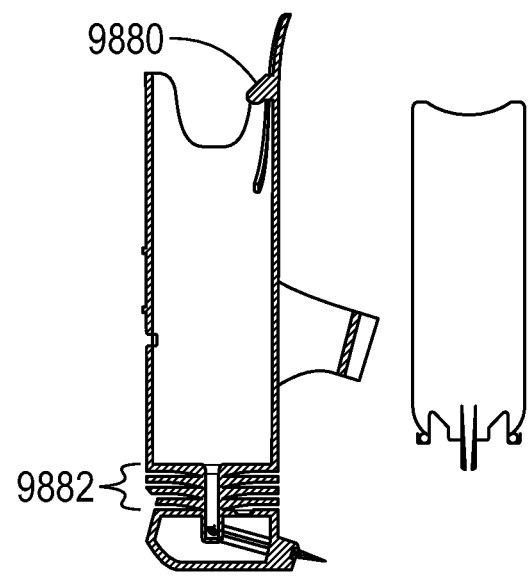
Fig. 67C
Fig. 67D

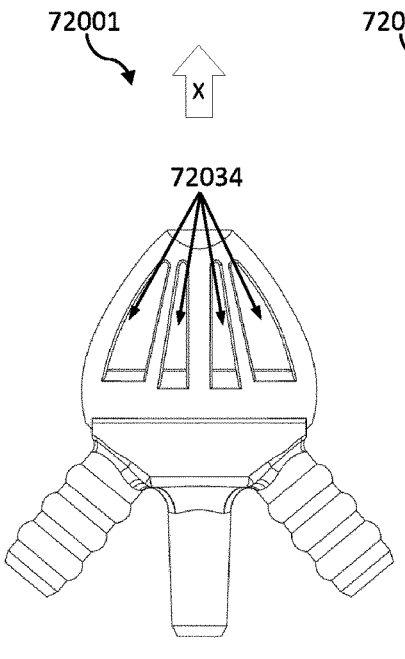
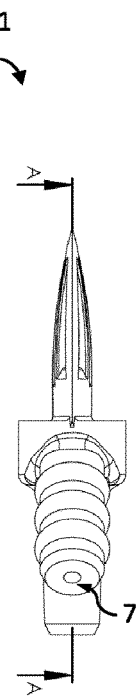
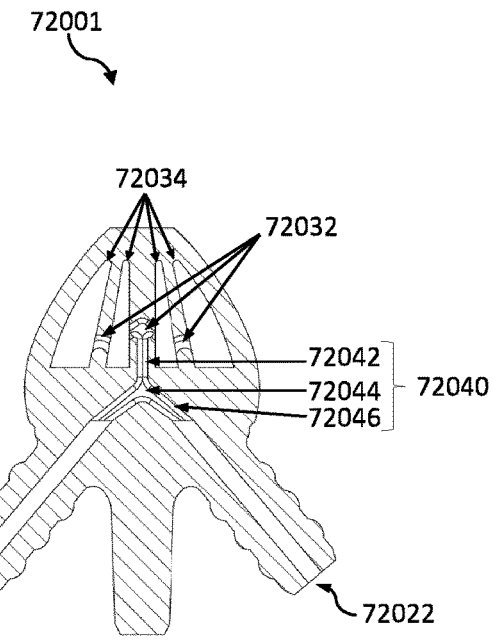
Fig. 72A    Fig. 72B    Fig. 72C
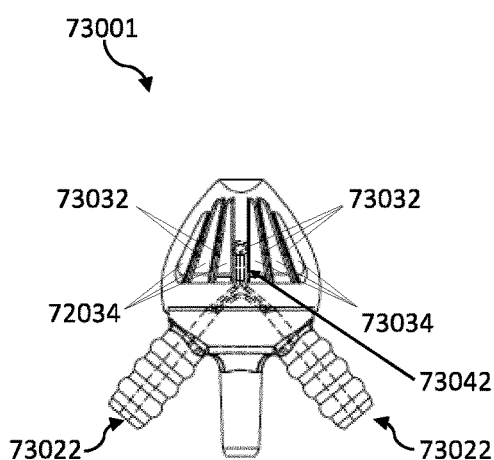
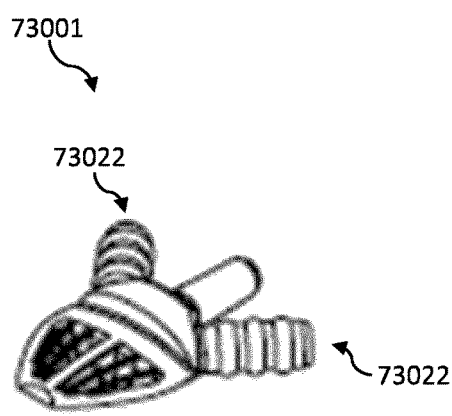
Fig. 73A    Fig. 73B

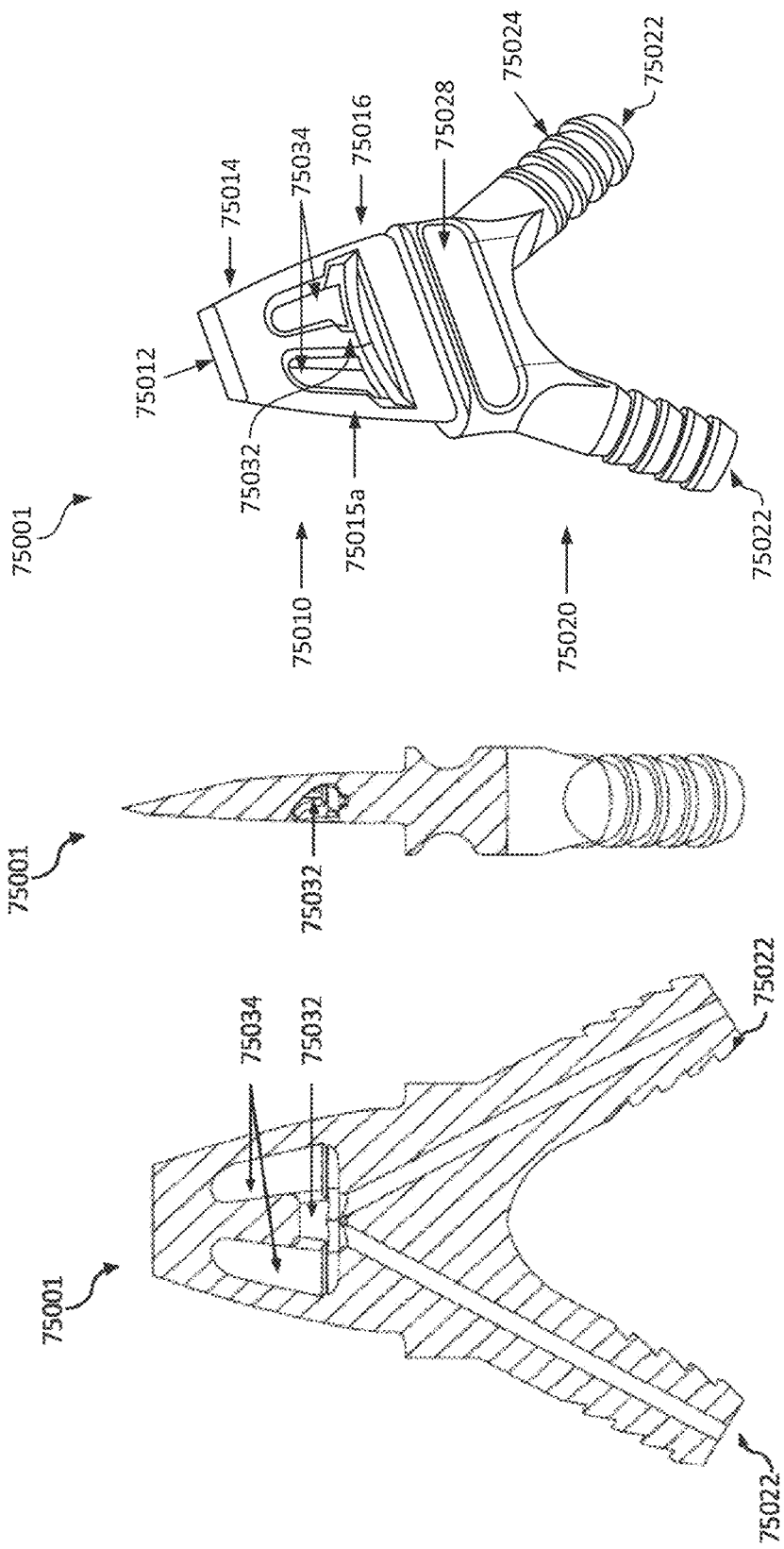

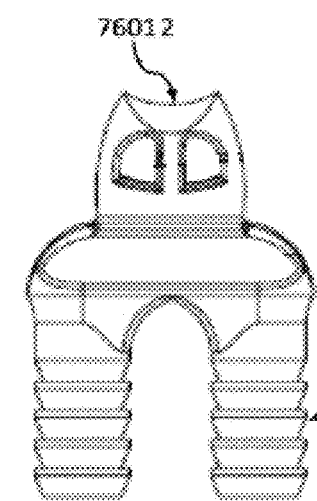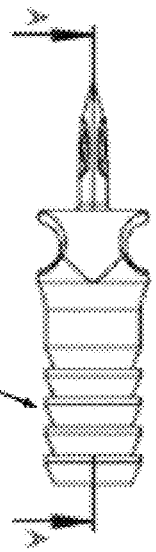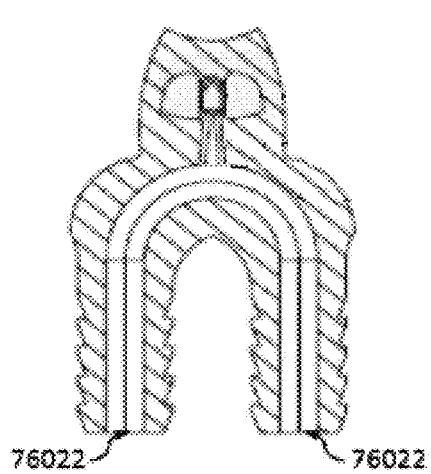
Fig. 76A    Fig. 76B    Fig. 76C
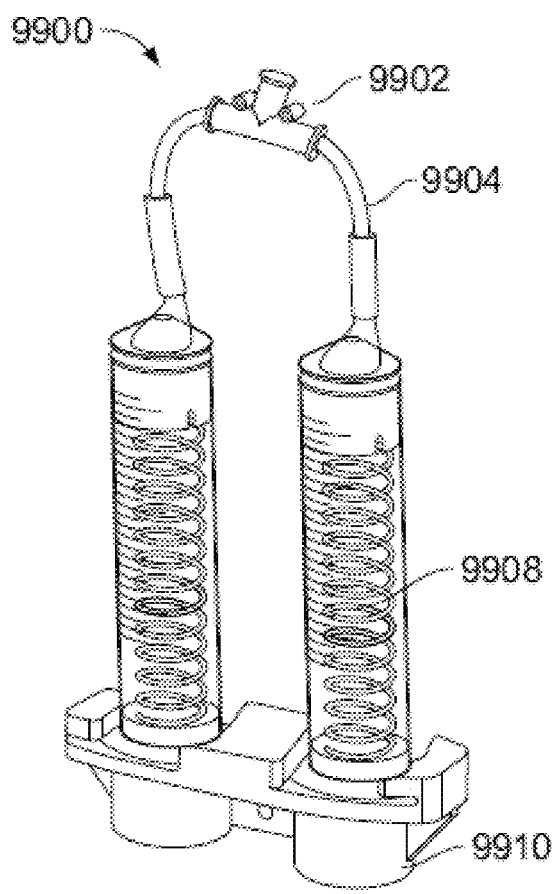
Fig. 77

INJECTION SYSTEMS, INJECTION TOOLS AND METHODS FOR SAME

CROSS-REFERENCE TO RELATED APPLICATIONS

This application is a national stage application under 35 U.S.C. § 371 of International Application No. PCT/EP2021/052111, filed internationally on Jan. 29, 2021, which claims priority to and the benefit of U.S. Provisional Patent Applications Nos. 62/967,555, filed Jan. 29, 2020; 63/073,688, filed Sep. 2, 2020; 63/073,690, filed Sep. 2, 2020; and 63/073,797, filed Sep. 2, 2020, each of which is herein incorporated by reference in its entirety.

TECHNICAL FIELD

This document relates to systems and methods for administering formulations to plants, including systems and methods for injecting liquid formulations into plants.

BACKGROUND

Tree injection has been used for administration of liquids to trees. Conventional tree injection approaches can involve drilling a borehole in a tree trunk and stoppering the borehole with a peg. A needle is inserted through the peg to discharge liquid into the borehole. However, the practicality of such method is difficult to execute on a commercial scale and has a high risk of trunk damage, which may lead to rot and other negative effects associated with severely wounding the tree.

For example, *Xylella fastidiosa* is a plant pathogenic bacterium. *Xylella fastidiosa* can be divided into various subspecies that affect different plants. For example, *Xylella fastidiosa* subsp. *pauca* has been found to cause "olive quick decline syndrome" (OQDS) in southern Italy, and is spreading to central and North Italy as well as Spain, Portugal, France and possibly Greece. OQDS is a severe disease that can cause extensive leaf, twig and branch wilting, and is frequently accompanied by plant death. See M. Scortichini et al., *Phytopathologia Mediterranea* (2018), 57, 1, 48-72. *Xylella fastidiosa* is a xylem-limited pathogen that is spread through the feeding activity of certain insect vectors. Infection by this pathogen causes blockage of the xylem vessels. See C. R. Girelli et al., *Plants* (2019), 8, 115, 1-17. Current methods to control this pathogen are generally not effective, in part because of the inability of bactericides to penetrate host xylem vessels where the pathogen is located. Current methods to control *Xylella fastidiosa* include, for instance, pruning and/or uprooting trees. However, this method can lead to huge cost and lost income, particularly since it can takes up to 10-20 years before a good level of production is obtained after replanting new trees. In addition the trees may contribute to the cultural heritage of a region, as well as touristic attractiveness and economy of the region. Pruning has generally been found to be an ineffective solution because, within the same year, the symptoms typically spread to other areas in the tree. Current methods may also involve replanting with varieties that show resistance and/or tolerance to *Xylella fastidiosa*. However, this method can take decades to develop these varieties, plant them, and obtain yields comparable to the trees that need to be replaced without any certainty of success in the first instance. In addition, these new varieties are unlikely the same as those currently certified as Protected Designation of Origin or Protected Geographical Indication (also known as Indicazione Geografica Protetta in Italian), which may hinder the ability to sell at a certain premium by olive oil producers. Furthermore, mutations in the *Xylella* bacterium might break the resistance and/or tolerance overtime. Other methods may involve foliar spraying of Dentamet®. However, a large volume of the formulation is typically needed to cover tree canopy. This method has generally been found to be ineffective because only an estimated 10-30% of product actually land on the tree's foliage. Such methods also have been observed to be less effective in older trees (for example, trees older than 100 years), and when symptoms are in advanced stages (for example, when more than 50% of the tree is affected or when 50% or less of the canopy foliage left).

Thus, what is needed in the art are alternative systems and methods to deliver active ingredients to a plant that can be executed on a commercial scale and minimizes risk of trunk damage and wounding the tree.

Overview

The present disclosure provides systems for administering fluids, for example liquid formulations including one or more active ingredients ("AI fluid"), directly into the interior of a plant ("plant injection systems"). In some embodiments, the injection systems include an injection tool and a fluid delivery system. The fluid delivery system may include a source of liquid supply. The injection systems may also include a fluid receiving device. In use when the injection tool is installed in the trunk of a plant and the fluid delivery system is activated, fluid flows from the fluid delivery system through the injection tool and into the trunk of a plant.

The present disclosure also provides components for use in such plant injection systems, for example housings for integrating components of the plant injection systems, injection tools and fluid delivery devices.

In some embodiments, the disclosure provides housings for integrating one or more of the system's components. For example, one such housing may be configured to receive a pressurized canister (the fluid delivery system), which delivers AI fluid when activated, while also integrating the injection tool and componentry for operatively connecting the injection tool to the pressurized canister. In another example, the housing is configured: to integrate the injection tool and componentry for fluidly connecting the injection tool to the fluid delivery system; and, to install the injection tool and maintain it in position in the trunk of a plant. In some such embodiments, the housing has a clothespin shape.

In some embodiments, the disclosure provides injection tools including a tool body, at least a portion of which is designed to be lodged into a plant, for example the trunk of a plant. The tool body has a channel system (having one or more channels) through which fluid can flow, terminating in an entry port through which fluid enters the injection tool and one or more distribution ports through which fluid is delivered to the interior of the plant. In some embodiments, the lodged portion of the tool is sized and shaped to minimize damage to the target plant when inserted into the plant, while maintaining efficient functionality of the injection tool in delivering the desired dosing of AI fluid over the desired time period directly to the sapwood and not the heartwood of the trunk of the plant.

In some embodiments, the injection tool is a multiport injection tool including a first access port, a second access port, the one or more distribution ports, and the channel system, which establishes fluid communication between the first and second access ports and the one or more distribution ports. In use, when the multiport injection tool is used in a plant injection system having a fluid receiving device, the multiport injection tool is positioned in the trunk of a plant in fluid communication with the fluid delivery system, and the fluid delivery system is activated, fluid flows from the fluid delivery device through the multiport tool from the first access port to the distribution ports for delivery into the trunk of a plant and to the second access port.

In some embodiments, the fluid delivery system is a single unit formulation cartridge that stores, pressurizes and delivers the fluid. In some such embodiments, the unit is a canister containing the liquid and a piston that pressurizes the liquid. The piston is loaded by a spring that is held in a compressed position by a plunger. When, for example, a pin is removed to release the plunger, the piston pressurizes the fluid and when the canister is in the open position providing fluid communication between the canister and injection tool, fluid flows from the canister to the injection tool.

In other embodiments, the fluid delivery system comprises a formulation cartridge which delivers formulation into a plant without active operation by the installer or technician (e.g. operating a plunger, syringe, injection device or the like). Instead the plant injection systems comprising the formulation cartridge provide a quantity of active ingredient formulation and a mechanism for delivery the quantity of formulation to an injection tool for distribution to a plant. In some embodiments, the injection tool has a distribution shaft and a tool adapter configured to couple with a complementary cartridge adapter of the formulation cartridge. The distribution shaft of the injection tool has one or more distribution ports and a delivery channel (including one or more component channels) extending between the tool adapter and the one or more distribution ports. The tool adapter is accessible from the plant exterior while the one or more distribution ports and the associated portion of the distribution shaft are installed within the plant.

In some embodiments, the formulation cartridge includes a formulation reservoir including a quantity of an active ingredient (AI) formulation. The formulation cartridge includes a cartridge adapter complementary to the tool adapter of the injection tool. A seal port is proximate to the cartridge adapter, and coupling of the formulation cartridge with the injection tool (e.g., including direct or indirect coupling) opens the formulation reservoir through the seal port. The AI formulation is communicated through the seal port and the cartridge adapter through the delivery channel of the injection tool to the one or more distribution ports for delivery to plant. In one example, the seal port automatically reseals when not coupled with the injection tool to minimize leaking or distribution of the AI formulation to the environment exterior to the cartridge when not coupled with the tool. Accordingly, AI formulations that are rated, certified or labelled for internal (as opposed to external, sprayed or topical formulations) are readily administered with the plant injection system including the formulation cartridges and injection tools described herein while leaking and corresponding external distribution are minimized (e.g., reduced or eliminated).

In some embodiments, the formulation cartridge stores the AI formulation and drives the formulation into the injection tool when coupled with the injection tool. For instance, a bias membrane is provided with the formulation cartridge that applies a delivery pressure to the AI formulation for delivery to the injection tool. The delivery pressure is optionally generated through one or more mechanisms including, but not limited to, elastic deformation of an elastic bias membrane, a pressurized driving fluid in an opposed cavity to the formulation reservoir, combinations of the same or the like. The bias membrane thereby drives the AI formulation to the injection tool upon coupling and with minimal interaction (e.g., reduced or none) from the installer or technician. In one example, the formulation cartridge provides the AI formulation and the delivery mechanism for the AI formulation in a consolidated package that is readily coupled with the installed injection tool. Further, formulation cartridges are readily coupled, decoupled and replaced with fresh cartridges through the complementary cartridge and tool adapters to ensure AI formulations are delivered from the formulation cartridges to the plant interior (e.g., vasculature) with minimized leaking or external distribution.

In the context of coupling between the formulation cartridge and the injection tool the interconnection between the cartridge and the injection tool includes direct and indirect coupling. Accordingly, the formulation cartridge may still be used as the fluid delivery device even if the injection tool does not include a tool adaptor and/or the formulation cartridge is not fitted with a complimentary cartridge adaptor. For instance, the adapters described herein are optionally provided with the respective formulation cartridge or injection tool in one example. In another example, the adapters (which may simply be ports) are provided with one or more intermediate components to facilitate indirect coupling between the formulation cartridge and the injection tool (e.g., with intervening tubing, manifolds or the like). The connection between the cartridge and tool adapters includes various mechanisms. For example, the adapter arrangements include, but are not limited to, clips, clamps, complementary threading, interference fittings, bayonet fittings, detents or the like. Optionally, the adaptors are configured to interfit with a robust coupling (e.g., with a detent, bayonet fitting or the like) to minimize incidental decoupling between the cartridge and the injection tool.

In certain aspects, the present disclosure provides injection systems or components thereof as depicted in the figures herein. In some embodiments, the systems are configured to administer liquid formulation comprising one or more active ingredients to a plant or a part thereof. In certain embodiments, such systems are mounted onto a post portion of a plant, for example to a stem or trunk of a tree.

The present disclosure also provides methods of administering fluid to plants using the systems and components of the disclosure. In some embodiments, the method includes installing an injection tool in the trunk, stem, root or limb of a plant, operatively connecting the injection tool to a fluid delivery device, and activating the fluid delivery device to initiate the flow of fluid from the fluid delivery device through the injection tool and into the plant. In some embodiments, the injection tools described herein are installed in plants having relatively small and large sizes or diameters (e.g., trunk or stem diameters). In one example, the portions of the injection tools installed in plants have dimensions of around 5 mm or less (e.g., width) and 1 mm or less (e.g., height) and accordingly the tools are configured for installation in plants with stems, trunks, roots, limbs or the like of 5 mm or more in size, such as diameter. In other embodiments, two or more injection tools are installed into one or more of the stem, trunk, roots, limbs or the like of a plant to minimize trauma to the plant (e.g., by minimizing the size of a unitary hole in the plant or spacing the tools apart along the plant). In some such embodiments, the two or more injection tools are operatively connected to the same fluid delivery system. In other such embodiments the two or more injection tools are operatively connected to independent fluid delivery systems.

The present disclosure also provides methods for validating fluid flow through the installed injection tool. In some embodiments, the method includes installing a multiport injection tool in the trunk of a plant, connecting a first access port of the injection tool to a fluid delivery device, connecting a second access port of the multiport injection tool to a fluid receiving device having an on position allowing fluid to flow through the device and off position in which fluid is retained in the device, activating the fluid delivery system with the fluid receiving device in the off position to prime the injection tool, placing the fluid receiving device in the on position and verifying that fluid is flowing through the fluid receiving device, thereafter placing the fluid receiving device in the off position so that fluid is not drained from the injection tool into the fluid receiving device.

Example injection tools described herein include a penetrating distribution body configured to penetrate a plant and administer liquid formulations. In some embodiments, the injection tools distribute the formulations to the plant tissue while at the same time minimizing damage to the plant. In some embodiments, the injection tools include a penetrating element that penetrates the plant, for instance, along a longitudinal body axis of the penetrating distribution body. The penetrating distribution body includes a distribution element, such as one or more distribution ports, along the body. The one or more distribution ports open laterally along the penetrating distribution body, in one example, relative to the longitudinal body axis. As the plant moves around the penetrating element, for instance during insertion in a reversed direction along the longitudinal body axis and toward the proximal portion of the body, the one or more distribution ports are recessed from the distal portion and remain open for delivery of the liquid formulation. Without being bound by theory, it is believed that because the one or more distribution ports administer liquid formulations along a different vector relative to the longitudinal body axis of the penetrating distribution body, the ports remain open (e.g. clear of plant tissue) and minimal pressure (relative to pressure applied with a driven plunger and cylinder) administers the liquid formulation. For example, the one or more distribution ports open, extend laterally, distribute the liquid formulation or the like in a misaligned orientation (e.g., transverse, along an offset angle, orthogonal, greater than 5 degrees, greater than 10 degrees or more) relative to the longitudinal body axis to thereby minimize clogging from plant tissue.

In other examples, the one or more distribution ports are recessed from an exterior of a body profile of the penetrating distribution body, and accordingly remain clear of plant tissue. For example, the one or more distribution ports are provided along the troughs of anchor elements (e.g., threading, flutes, serrations, cleats, scalloped surfaces or the like), within distribution reservoirs within the body profile of the penetrating distribution body or the like. The one or more distribution ports are within the body profile and with penetration of the plant tissue the ports are not engaged with plant tissue in a manner that promotes clogging. Instead, the one or more distribution ports are recessed from the penetrating element and, at least in some examples, the plant tissue itself. Accordingly, liquid formulations delivered to the injection tool are readily received in the plant and delivered with minimal pressure or effort. Further, in examples including cavities as described herein the proximate walls, surfaces or the like of the injection tool in combination with the surrounding plant tissue provide reservoirs within the plant, and the liquid formulations reside in these reservoirs for gradual uptake by the plant.

The injection tools, injection systems having the injection tools, and methods described herein facilitate the continuous application of liquid formulations including active ingredients to a large variety of plants, including, but not limited to, perennial plants with any kind of trunk or stem size. In some embodiments, the systems, components and methods of this disclosure enable administering active ingredients to plants at a reduced dosage rate as compared to foliar application. Reduced dosage rate is attractive because it may reduce the negative environmental impact of foliar application in which a high amount of the employed chemicals is not reaching the target plant or pest but is release into the environmental where it may effect beneficial organism (e.g., bees) and or causes environmental pollution (e.g., ground water). And lower dosage rates may enable replacing chemical pesticides with biological control agents which are approved for human consumption but have high costs of goods which make a foliar use by spray applications in plantations of trees and other plants like banana, coffee, or cocoa punitively expensive.

In some embodiments, the present disclosure provides a process for modulating the phenotype of a plant or a multitude of plants by installing a plant injection system according to the disclosure in the plant or multitude of plants and administering a liquid formulation of an active ingredient to modulate the phenotype of the plant. In other embodiments, the present disclosure provides a method to modulate phenotypes of plants, for instance to treat, prevent, protect and immunize, which means induce local and systemic resistance to plants from pathogenic attacks and pest attacks. The injection tools described herein distribute liquid formulations directly to the interior of the plant without spraying and the commensurate loss of errantly applied sprayed formulations. The subject matter described herein places the formulations in direct contact with plant tissues and in some embodiments, the formulations are selectively administered at appropriate times to minimize (e.g., eliminate or minimize) the accumulation of chemical residues in fruits or crops as mandated. For example, the present disclosure includes injection methods, devices and systems for treating plants whose xylem and/or phloem may be subject to invasion by bacteria, fungi, virus and/or other pathogens; and/or for controlling bacteria, fungi, virus and/ or other pathogens which invade the xylem and/or phloem of plants. In some examples, the present disclosure relates more specifically to methods, devices, and systems for injecting nutrients (including, for example, micronutrients) into olive trees which have been or may be subject to invasion by *Xylella fastidiosa*.

BRIEF DESCRIPTION OF THE DRAWINGS

The disclosure is explained in more detail below on the basis of illustrative embodiments depicted in the drawings.

FIG. 31 shows a perspective view of a tenth embodiment of an injection tool according to the disclosure;

FIG. 32 shows a side view of the injection tool of FIG. 31.

FIG. 33 shows a cross-sectional view along the line A-A of FIG. 32.

FIGS. 61A-D are side views of the composite plant injection system in FIG. 60A.

FIGS. 64A-B are photographs showing one example of a composite plant injection system in an installed configuration.

FIGS. 65 and 66 are exploded views of another example of a composite plant injection system including a formulation cartridge.

FIG. 67A is a side view of one example of a composite plant injection system holding a formulation cartridge.

FIG. 67B is a side view of the composite plant injection system in FIG. 67A before the formulation cartridge is loaded therein.

FIG. 67C is another side view of one example of a composite plant injection system holding a formulation cartridge.

FIG. 67D is another side view of the composite plant injection system in FIG. 67C before the formulation cartridge is loaded therein.

FIGS. 72A-B are front and side views of another example of a multiport injection tool.

FIG. 72C is a cross-sectional view of the multiport injection tool depicted in FIGS. 72A-B, taken along line A-A of FIG. 72B.

FIGS. 73A-B are front and perspective views of another example of a multiport injection tool.

FIGS. 75C-D are cross-sectional views of the multiport injection tool depicted in FIGS. 75A-B.

FIG. 75E is a three-dimensional perspective view of the multiport injection tool depicted in FIGS. 75A-D.

FIGS. 76A-B are front and side views of another example of a multiport injection tool.

FIG. 76C is a cross-sectional view of the multiport injection tool depicted in FIGS. 76A-B, taken along line A-A of FIG. 76B.

FIG. 77 depicts an exemplary spring-loaded fluid delivery unit used in certain embodiments of the injection systems described herein.

Figure 1:
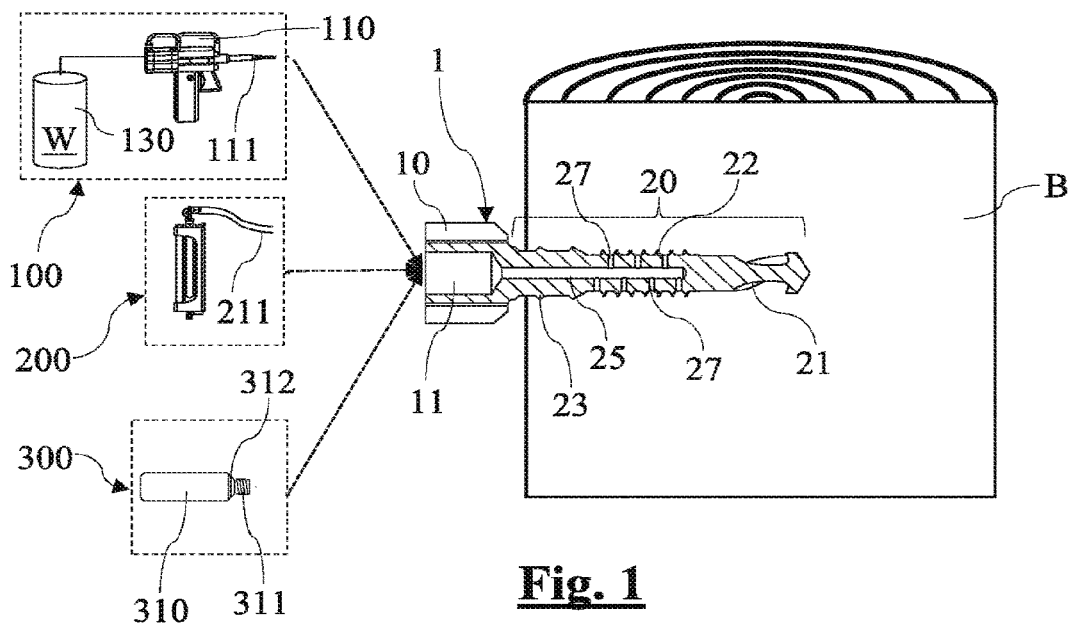
FIG. 1 shows a schematic view of an embodiment of an injection system with a first embodiment of an injection tool in axial cross-section and inserted into a tree trunk, as well as first, second and third embodiments of delivery devices.

The disclosure provides an injection tool for a plant injection system configured to introduce an active ingredient formulation (e.g., a fluid including one or more of a liquid, gas, gel, vapor, aerosol, colloids, micro/nanoparticles, biological organisms or the like) into a plant. The injection tool is configured to be inserted into the plant. It has a penetrating structure configured to generate a hole into the plant to insert the injection tool into the plant.

This disclosure also provides a process for modulating the phenotype of a plant or a multitude of plants by installing a plant injection system according to the disclosure in the plant or multitude of plants and applying a liquid formulation of an active ingredient to modulate the phenotype of the plant.

The term "penetrating structure" or "penetrating element" as used herein relates to any arrangement being suitable or appropriate for generating the hole while advancing the insertion tool into the plant. Some embodiments include a self-penetrating feature, such as cutting elements, that automatically form the penetrating hole insertion of the injection tool into the plant. The penetrating structure or penetrating element includes the examples described herein as well as their equivalents.

The term "hole" in this connection relates to a cavity, channel or similar structure provided into the plant, which is suitable for receiving the insertion tool or a portion, particularly a front or distal portion, thereof.

By "plants" is meant all plants and plant populations such as desirable and undesirable wild plants, cultivars and plant varieties (whether or not protectable by plant variety or plant breeder's rights). Cultivars and plant varieties can be plants obtained by conventional propagation and breeding methods which can be assisted or supplemented by one or more biotechnological methods such as by use of double haploids, protoplast fusion, random and directed mutagenesis, molecular or genetic markers or by bioengineering and genetic engineering methods.

"Plant" includes whole plants and parts thereof, including, but not limited to, shoot vegetative organs/structures (e.g. leaves, stems and tubers), roots, flowers and floral organs/structures (e.g. bracts, sepals, petals, stamens, carpels, anthers and ovules), seed (including embryo, endosperm, and seed coat) and fruit (the mature ovary), plant tissue (e.g. vascular tissue, ground tissue, and the like) and cells (e.g. guard cells, egg cells, and the like), and progeny of same. "Fruit" and "plant produce" are to be understood as any plant product which is further utilized after harvesting, e.g. fruits in the proper sense, nuts, wood etc., that is anything of economic value that is produced by the plant.

As used herein, "trunk" also refers to "stem" and "stem" also refers to "trunk". Thus, for example, the phrase "trunk of a plant" also is interpreted to mean "stem of a plant," "trunk of a tree" is also interpreted to mean "stem of a tree," and "stem of a tree" also refers to "trunk of a tree."

As used herein, "plant pathogen" refers to an agent capable of infecting and/or invading a plant, whole or in part, and causing infection or disease or symptoms thereof therein.

As used herein, "activity" means a component or components of fermented products that can be extracted therefrom in an aqueous solvent and exerts an effect of mitigating, ameliorating, treating, preventing and inhibiting growth of a plant pathogen when applied to a plant part and/or soil.

The term "bactericidal", as used herein, refers to the ability of a substance to increase mortality or decrease health (e.g., decrease growth rate, viability, proliferation, metabolism, longevity, etc.) of bacteria.

Biological control: As used herein, "biological control" is defined as control of a pathogen or insect or any other undesirable organism by the use of a second organism. An example of a known mechanism of biological control is the use of enteric bacteria that control root rot by out-competing fungi for space on the surface of the root. Bacterial toxins, such as antibiotics, have been used to control pathogens. The toxin can be isolated and applied directly to the plant or the bacterial species may be administered so it produces the toxin in situ.

"Fungicides" as well as the terms "fungicidal" and "acting in a fungicidal fashion" refer to the ability of a substance to increase mortality or decrease health (e.g., decrease growth rate, viability, proliferation, metabolism, longevity, etc.) of phytopathogenic fungi. As used herein, the term "phytopathogenic fungi" comprises all organisms of the kingdom of fungi including Oomycetes, which can cause damage of plants and/or damage of plant parts and/or losses in harvested fruits or vegetables.

The term "fungus" or "fungi", as used herein, includes a wide variety of nucleated spore-bearing organisms that are devoid of chlorophyll. Examples of fungi include yeasts, molds, mildews, rusts, and mushrooms. "Fungal pathogen" includes fungi of the following phylums: Myxomycota, Plasmodiophoromycota, Hyphochytriomycota, Labyrinthulomycota, Oomycota, Chytridiomycota, Zygomycota, Ascomycota and Basidiomycota. "Fungal inhibition" includes both fungicidal and fungistatic activity, as measured by reduction of fungal health (e.g., decrease growth rate, viability, proliferation, metabolism, longevity, etc.) compared to a control. A "susceptible fungus" is a fungal strain that demonstrates a beneficial or desired response separately to a component of the system provided herein or by a combination of both components.

"Insecticides" as well as the term "insecticidal" refers to the ability of a substance to increase mortality or decrease health (e.g., decreased growth rate, viability, proliferation, metabolism, longevity, etc.) of insects. As used herein, the term "insects" comprises all organisms in the class "Insecta".

"Nematicide" and "nematicidal" refers to the ability of a substance to increase mortality or decrease health (e.g., decrease growth rate, viability, proliferation, metabolism, longevity, etc.) of nematodes. In general, the term "nematode" comprises eggs, larvae, juvenile and mature forms of said organism.

"Acaricide" and "acaricidal" refers to the ability of a substance to increase mortality or decrease health (e.g., decrease growth rate, viability, proliferation, metabolism, longevity, etc.) of ectoparasites belonging to the class Arachnida, sub-class Acari.

Microbicidal: "Microbicidal", as used herein, refers to the ability of a substance to increase mortality or decrease the health (e.g., decreased growth rate, viability, proliferation, metabolism, longevity, etc.) of microorganism.

The term "health of a plant" or "plant health" is defined as a condition of the plant and/or its products which is determined by several aspects alone or in combination with each other such as yield, plant vigor, quality of harvested plant parts, tolerance to abiotic and/or biotic stress, viability, proliferation, metabolism, longevity, etc.).

"Preventing infection" in the present context, means that the plants treated with the system disclosed herein, avoid infection (e.g., such as pathogen infection) or disease symptoms or all of the above, or exhibit reduced or minimized or less frequent infection or disease symptoms or all of the above, or induce or increase defense/immune responses to stimuli in the plants to avoid or reduce or minimize infection or disease symptoms or all of the above, that are the natural outcome of plant interactions with infectious or disease-causing pathogens when compared to plants not treated by the methods, tools, and system of the disclosure. That is to say, infectious or disease-causing pathogens are prevented or reduced from causing disease and/or the associated disease symptoms. Infection and/or symptoms are reduced at least about 10%, 20%, 30%, 40%, 50, 60%, 70% or 80% or greater as compared to a plant not so treated with the system taught herein.

Pesticidal: The term "pesticidal", as used herein, refers to the ability of a substance to decrease the health (e.g., decrease rate of growth of a pest, i.e., an undesired organism, viability, proliferation, metabolism, longevity, etc.) or to increase the mortality of a pest. In general "pesticidal" means the ability of a substance to increase mortality or decrease the health (e.g., growth rate, viability, proliferation, metabolism, longevity, etc.) of phytopathogenic fungi. The definition also comprises the ability of a substance to increase mortality or decrease the health (e.g., decrease growth rate, viability, proliferation, metabolism, longevity, etc.) of phytopathogenic fungi and/or plant pests. The term is used herein, to describe the property of a substance to exhibit activity against phytopathogenic fungi, insects, mites and/or nematodes. Plants are exposed to many microbes, including bacteria, viruses, fungi, and nematodes. Diseases of ornamental plants, forests, and other plants caused by such plant pathogens, particularly bacterial pathogens, are a worldwide problem with enormous economic impact. The severity of the destructive process of disease depends on the aggressiveness of the phytopathogen and the response of the host.

A receiving recess is to be understood as any kind of cavity that is created in the ligneous region of a plant for the purpose of inserting an injection tool. In particular, a receiving recess includes a drilled hole. The term "self-drilling" in the context of the disclosure is to be understood as a self-penetrating embodiment of the injection tool by which the receiving recess, necessary for the insertion of the injection tool into the plant, can be generated directly during the insertion procedure itself, such that no receiving recess needs to be created prior to the insertion.

Overview of the Injection Systems

Embodiments of the tools, system and methods of the disclosure enable a systemic or directed application of active ingredients into the vascular system of a plant, such as into the stem of a plant. The disclosure can be applied to large variety of plants, included but not limited to those listed below, and may be applicable to any and all other pathogenic diseases and/or complexes that are encountered in agriculture for example in horticulture.

In some embodiments, the present disclosure relates to plant health. Healthier plants are desirable since they result among others in better yields and/or a better quality of the plants or crops, specifically better quality of the harvested plant parts. Healthier plants also better resist to biotic and/or abiotic stress. A high resistance against biotic stresses in turn allows the person skilled in the art to reduce the quantity of pesticides applied and consequently to slow down the development of resistances against the respective pesticides.

Increased yield can be characterized, among others, by the following improved properties of the plant: increased plant weight; and/or increased plant height; and/or increased biomass such as higher overall fresh weight (FW); and/or increased number of flowers per plant; and/or higher grain and/or fruit yield; and/or more tillers or side shoots (branches); and/or larger leaves; and/or increased shoot growth; and/or increased protein content; and/or increased oil content; and/or increased starch content; and/or increased pigment content; and/or increased chlorophyll content (chlorophyll content has a positive correlation with the plant's photosynthesis rate and accordingly, the higher the chlorophyll content the higher the yield of a plant), increased quality of a plant. According to the present disclosure, the yield is increased by at least 4%. In general, the yield increase may even be higher, for example 5 to 10%, for example 10 to 20%, or even 20 to 30%

Another indicator for the condition of the plant is the plant vigor. The plant vigor becomes manifest in several aspects such as the general visual appearance. Another indicator for the condition of the plant is the "quality" of a plant and/or its products and/or the plant's tolerance or resistance to biotic and/or abiotic stress factors. Biotic and abiotic stress, especially over longer terms, can have harmful effects on plants.

According to one embodiment, the injection tool of the disclosure is part of an injection system which can enable a central supply of the active ingredient to one or more plants. All the different components of such system can be provided in form of a kit supplied to the farmer or professional application person. Such kit may comprise the following components: (1) one or more injection tools and/or (2) one or more delivery devices which may be configured to be connected to the injection tool and/or (3) one or more active ingredients. Said kit may comprise components (1) and (2), or said kit may comprise the components (1) and (3) or said kit may comprise the components (2) and (3).

By having the penetrating structure or penetrating element, the injection tool can be inserted, such as screwed, driven or knocked, into the plant without previous formation of a receiving recess. Rather, the injection tool according to the disclosure more or less automatically generates the required hole while being advanced into the plant. It can therefore be inserted into the plant in a single work step. Thus, the injection tool allows for reducing the amount of work involved which can make the complete process considerably more efficient.

In some embodiments, an injection system is used to deliver the liquid formulation to a plant, such as a tree. In some variations, the injection system comprises: an injection tool operatively connected to a fluid delivery unit. In certain variations, the injection tool comprises: a base having at least one inlet; and a body comprising at least one distribution reservoir, and at least one outlet. In some embodiments, the injection system comprises: an injection tool, a fluid delivery unit, and a source of active ingredient (including, for example, nutrients) formulated as a liquid.

In certain embodiments, the injection tool includes a body, at least a portion of which is designed to be lodged into a plant, for example the trunk of a tree. The body has a channel system (e.g., having one or more channels) through which the liquid formulation can flow. In some variations, the liquid formation enters the injection tool through one or more inlets, and exits the injection tool through one or more outlets through which the liquid formulation is delivered to the interior of the plant. In some embodiments, the lodged portion of the body is sized and shaped to reduce or minimize damage to the target plant when inserted into the plant, while maintaining efficient functionality of the injection tool in delivering the desired dosing of the liquid formulation over the desired time period directly to the sapwood and not the heartwood of the trunk of the plant. In other embodiments, the lodged portion of the body is sized and shaped to reduce damage to the target plant when inserted into the plant, as compared to traditional drilling injection system.

In some variations, the body is shaped to pierce the tree, such as the trunk of the tree. In certain variations, the body is in the shape of a blade. In certain variations, the body has a cutting edge at the tip of the body, and the width of the cutting edge is narrower than width of the body in the area connected to the base.

In certain variations, the body comprises: at least one outlet that receives the liquid formulation from the at least one inlet, and at least one distribution reservoir that retains the liquid formulation proximate to adjacent tissue of the tree. In certain variations, the fluid delivery unit is configured to store and deliver the liquid formulation. In certain variations, the fluid delivery unit comprises a pressurized container (e.g., a pressurized canister).

In some embodiments, the method comprises: piercing a post portion of a plant (e.g., the trunk or stem of a tree) using the injection tool of the injection system; and delivering at least a portion of the liquid formulation from the fluid delivery unit through the injection tool to the vasculature of the plant. In some variations, the liquid formulation is delivered pneumatically or hydraulically.

In some embodiments, the liquid formulation is precisely delivered. In some variations, the liquid formulation is delivered into and no further than the active vasculature of the plant when the injection tool is inserted into the post portion of the plant. In some variations, the liquid formulation is delivered into and no further than the active vasculature of the plant when the injection tool is inserted into the trunk of the tree. In certain variation, the liquid formulation is delivered into and no further than the xylem, or the phloem or both of the plant when the injection tool is inserted into the post portion of the plant. In one variation, the liquid formulation is delivered into and no further than the xylem, or the phloem or both of the plant when the injection tool is inserted into the trunk or stem of the plant.

In other embodiments, precisely delivering the liquid formulation comprises inserting the injection tool into and no further than the active vasculature of the plant. In certain variations, precisely delivering the liquid formulation comprises inserting the penetration distribution body of the injection tool into and no further than the active vasculature of the plant. In one variation, precisely delivering the liquid formulation comprises inserting the injection tool such that the distribution reservoir is positioned in and no further than the active vasculature of the plant. In some variations, the methods deliver at least 50%, at least 60%, at least 70%, at least 80%, at least 90%, at least 95%, at least 96%, at least 97%, at least 98% or at least 99% of the liquid formulation into to the active vasculature of the plant. In one variation, the methods deliver at least 50%, at least 60%, at least 70%, at least 80%, at least 90%, at least 95%, at least 96%, at least 97%, at least 98% or at least 99% of the liquid formulation into the xylem and/or phloem of the plant.

In certain embodiments, the method comprises injecting liquid formulation into the vasculature through one or more sites on post portion of the plant. In certain embodiments, the method comprises injecting liquid formulation into the vasculature through one or more sites on the trunk of the tree. In embodiments where the formulation is injected through multiple injection sites, a plurality of the injection systems described herein may be used. In some embodiments where the formulation is injected through multiple injection sites, the system comprises multiple injection tools operatively connected to a single fluid delivery unit.

In embodiments, the injection systems comprise an injection tool, a fluid delivery unit, and a liquid formulation source. In operation, the injection tool is operatively connected to the fluid delivery unit such that liquid formulation flows from the source through the injection tool into the plant. In some embodiments, the source of liquid formulation is independent of the fluid delivery unit. In other embodiments, the source of liquid formulation is integral with the fluid delivery unit. Certain embodiment of injection systems suitable for use in the methods described herein are described in further detail below.

Injection Tools

The injection tool is configured to be inserted into a ligneous region of the plant, particularly into a tree trunk, or configured to be inserted into a non-ligneous region of the plant, particularly into a pseudo-stem.

In embodiments of the injection tool the penetrating structure or penetrating element includes a cutting edge configured to cut the hole into the plant when inserting the injection tool into the plant. In this context, the term cutting is to be widely understood as any structure facilitating carving, cutting, or opening of the plant at the position where the injection tool is inserted. It includes, but is not limited to, cover puncturing, drilling, sawing, slicing, milling, wedging or any similar arrangements. Such a cutting edge allows for efficiently generating the hole into the plant for generating a cavity into which the injection tool is placed. In particular, such cutting edge allows the inserting tool to efficiently self-generate the hole to be accommodated in.

In an embodiment, the cutting edge of the penetrating structure includes one or more cutting elements, similar in some regards to a drill bit, wound along a longitudinal axis of the injection tool. Such a drill bit portion allows for efficiently driving the injection tool into the plant. Thereby, the drill bit portion of the cutting edge of the penetrating structure includes a chip groove extending along and limited by the cutting edge. Such chip groove allows for eliminating chips of the plant tissue generated when driving the injection tool into the plant such that a proper advancing of the injection tool is achieved.

The cutting elements of the penetrating structure optionally include threading wound along a longitudinal axis of the injection tool. Threading or other anchor elements described herein (collectively as anchor elements) facilitate coupling and retention of the injection tool in the plant. In one example, in combination with the cutting elements the injection tool consolidates penetration of the plant, positioning of the injection tool and retaining of the injection tool in the plant.

The injection tool includes a base or head and a shaft (or generally a penetrating distribution body including, but not limited to, a shaft body profile, wedge body profile or the like). Optionally, the penetrating element of the penetrating distribution body includes the cutting element, such as a drill bit portion, and the screw portion, and the screw portion is closer to the head than the drill bit portion. An external diameter (or more generally, profile) of the threading or other anchor element is optionally larger than an external diameter (or profile) of the cutting element. The shaft optionally includes a bead portion (e.g., one or more closure beads) located between the cutting element and the base, and on which at least one closure bead is formed. An external profile of the peripheral bead is larger than the external diameter of the threading or remainder of the penetrating distribution body. The closure bead forms a seal between the injection tool and the plant to the interior of the plant, and in some examples facilitates the visual assessment of the depth of penetration of the injection tool.

In another embodiment, the penetrating element includes a wedge body profile (e.g., tapering from a proximal portion to a distal portion, such as a spike, nail, wedge or the like). A wedge body profile allows for efficiently advancing the injection tool into the plant, for instance with a hammering or driving action. In this example, the injection tool includes a penetrating distribution body including one or more of a wedge or shaft profile have a tapered shape. For instance, the penetrating distribution body is conical and includes with external longitudinal furrows or flutes (e.g., examples of distribution reservoirs). The injection tool includes a strike head (optionally as a feature of the base). Optionally, a conical portion of the penetrating distribution body is closer to the base than the nail tip portion (or cutting element). In another example, the penetrating distribution body includes one or more a closure beads located between the conical portion and the strike head having at least one peripheral bead. The profile of the peripheral bead is, in an example, larger than a profile of the conical portion of the penetrating distribution body.

In still another embodiment, the injection tool has a wedge portion (wedge body profile) in a lance tip shape equipped with the penetrating element including a leading end or cutting edge at its front end or distal portion. In this convention the term "front end" can relate to a distal portion of the penetrating distribution body directed toward the plant and engaging with the plant at penetration. This example wedge body profile is an alternative wedge profile allowing efficient advancing of the injection tool into the plant. In particular, the wedge body profile opens the plant by spreading apart cut plant tissue. In some examples, the wedge body profiles accesses interior of the plant with minimal impairment (e.g., little or no damage) of the plant interior structure. For instance, spreading with a wedge body profile leaves the liquid transport structure of the plant, such as capillaries or the like, minimally impaired (including unimpaired or minimally impaired).

In one example, the wedge body profile includes a flat lance tip or leading edge having two or more lateral wing-like portions. Optionally, the wedge body profile, is chosen based on the plant for treatment. For instance, the robustness of the wedge body profile is adapted to the intended application or plant. Depending on the plant, the cutting element is selected with a nail tip type wedge (e.g., a circular or conical type wedge) or wedge body profile having two or more wings extending from a leading edge of the penetrating distribution body.

The injection tool optionally includes a strike head, for instance as part of the base. A strike head allows for efficiently advancing of the injection tool into the plant, e.g., by hammering on the strike head.

Optionally, the penetrating distribution body including one or more of the profiles described herein includes one or more openings, such as distribution reservoirs. The distribution reservoirs provide one or more spaces, cavities, recesses, pockets or the like inside the plant when the injection tool is inserted. The distribution reservoirs facilitate the distribution of liquid formulations, for instance by retaining the formulations in the cavities of the reservoirs and at the same time engaging the formulations with the plant tissue. In other examples, the distribution reservoirs include distribution channels that facilitate delivery of the liquid formulations within the channels and along the body profile of the penetrating distribution body. The injection tools described herein include one or more inlet passages and associated distribution ports. Optionally, the injection tools include plural inlet passages that provide liquid formulations to a plurality of distribution ports. For example, the injection tools include at least one inlet passage or passages each ending in at least one distribution port. Optionally, the injection tools include one or more of the previously described distribution reservoirs (sometimes referred to as openings), and the distribution ports open into the distribution reservoirs.

The injection tools described herein include a channel (e.g., an inlet passage) and at least one distribution port connected to the channel. The inlet passages (or channels) provide a distributed network of outlets or distribution ports for the injection tool for efficient distribution of the liquid active ingredient formulation at one or more locations within the plant.

The at least one distribution port extends from the main channel. The at least one distribution port (also referred to as an outlet channel) facilitates the delivery of the liquid active ingredient formulation to one or more locations relative to the injection tool.

In some examples, when inserting an injection tool into a plant, the material of the plant such as plant tissues including, but not limited to, wood, fibres or the like advance into the distal opening or distally-located orifices. The plant tissue in these examples plugs the distal opening or orifice thereby preventing or frustrating delivery of the active ingredient formulation into the plant. In some examples, significant pressure is applied to the formulation (e.g., through a piston, plunger or the like) to unclog the distal opening or orifice. The pressure in some instances causes trauma to the plant tissue.

In some embodiments, distribution ports according to the disclosure (alternatively, outlet channels) are oriented transversely relative to the penetrating direction of the injection tools (e.g., corresponding to a longitudinal body axis of the tools). For instance, the transverse distribution ports are oriented at angle relative to the penetrating direction. In one example, the distribution ports are oriented to open at 90 degrees relative to the penetrating movement direction. In another example, the distribution ports are oriented at angles between around 100 to 180 degrees relative to the penetrating movement direction (e.g., the longitudinal body axis of the injection tools).

In connection with the orientation of the distribution ports one or more of the following three directions are considered, an insertion direction, a penetrating movement direction and an outlet (or distribution) direction. In an example, the insertion direction is the general direction the injection tool is inserted or advanced into the plant (e.g., from the exterior of the plant toward the interior). The insertion direction generally conforms with an axis of the injection tool, for instance the longitudinal body axis described herein. Accordingly, the longitudinal body axis is used as a reference location corresponding to the insertion direction when discussing the orientation of the distribution ports.

The penetrating movement direction is the direction the injection tool is to be moved (e.g., rotated) in order to penetrate the plant for insertion. In embodiments of injection tools having cutting elements in the manner of a drill bit portion or threading, the penetrating movement direction lies along the thread of the drill bit portion or the screw portion (and in some examples is indicated with a circle and dot in the figures indicating the penetrating movement direction into and out of the page). The distribution ports, for instance provided between threads, extend in a transverse orientation relative to the penetration movement direction in addition to the insertion direction. With the injection tool embodiments herein having wedge body profiles that are tapped or struck for penetration of the plant, such as injection tools with a nail tip portion or a wedge portion (e.g., example wedge profiles), the penetrating movement direction corresponds with the insertion direction. In each of the embodiments described herein (e.g., shaft or wedge profiles) the one or more distribution ports are transverse (include an outlet or opening direction at a different angle) to the longitudinal body axis and the corresponding insertion direction. Additionally, in the example embodiments including a shaft profile, for instance having threading or drill bit type cutting elements, the one or more distribution ports (e.g., the outlet direction or opening direction of the ports) are transverse (at a different angle) to the penetrating movement direction. Accordingly, each of the insertion direction and the penetrating movement direction are referred to collectively as penetrating directions, and the outlet or opening directions of the distribution ports of the injection tools are transverse to the respective penetrating directions of the embodiments.

In some examples, the opening direction or outlet direction of the one or more distribution ports extends backward relative to the penetrating direction including the penetrating movement direction described herein. The term "backwardly extending" or the like in this context relates to an extension of the at least one distribution port in a converse or opposed orientation relative to the penetrating movement direction. Backwardly extending is not limited to an extension opposite to the penetrating movement direction, i.e. a rearward direction in the narrow sense, but rather to an extension at an angle to the penetrating movement direction different from a right or larger angle. For example, in some examples the distribution ports are oriented 105 degrees relative to the penetrating movement direction.

In embodiments including linear distribution ports, an open end of a distribution port (the opening facing to the exterior of the tool) is remote relative to the leading end of the injection tool (e.g., the penetrating element) than the connection of the distribution port to the inlet passage. Stated another way, the distribution port at least proximate to its open end is backward facing relative to the leading end of the tool. In other examples including distribution ports, the one or more of the distribution ports include the opening directed backward (e.g., another example of transverse orientation) to prevent plugging during penetration (e.g., one or more insertion direction or penetrating movement direction, collectively penetrating directions). For example such outlet channel can have a curve backwardly turning the outlet channel towards its outlet opening.

In another example, by orienting the one or more distribution ports more than 90 degrees relative to the penetrating movement direction clogging of the distribution ports with plant tissue is minimized (e.g., eliminated or minimized). Accordingly, plugging is minimized and the liquid active ingredient formulations are effectively and efficiently provided through one or more distribution ports.

Additionally, the injection tools described herein include distal portions, for instance having a front end (leading end) or tip for the penetrating element. The one or more distribution ports are spaced from the front end. Because the distribution ports are spaced from the leading end the liquid active ingredient formulation is distributed remotely relative to the leading end, and in some examples is distribution peripherally around the injection tool without centralizing distribution of the fluid to the distal portion, such as a tip. The liquid formulation is thereby optimally distributions to the plant with minimal risk of clogging of the distribution ports.

The injection tool has an inlet port (e.g., a socket opening or the like) connected to the inlet passage or the at least one distribution port. The inlet port is configured for connection to a delivery device of the plant injection system. Such socket opening allows for efficiently connecting a source of the liquid active ingredient formulation.

The socket opening of the injection tool is arranged in the head of the injection tool or in the strike head of the injection tool. This allows for efficiently connecting the injection tool since such head typically projects out of the plant when the injection tool is inserted.

The injection tools described herein are in various examples constructed with or include metal or an alloy of metals. The injection tools described herein may be constructed with or include polymers or polymer alloys that may be used with any of the manufacturing methods described herein. In production methods, the method of milling, casting, or other similar methods may be used. The injection tools described herein may be constructed with or include polymers or polymer alloys that may be used with any of the manufacturing methods described herein. In production methods, the method of milling, casting, or other similar methods may be used. In an example production method, the injection tools are produced by a 3D printing method or 3D printed. This allows, on the one hand, sufficient stability and, on the other hand, cost-effective production of the injection tool. Also, 3D printing allows for manufacturing the injection tool with comparably complex shapes at comparably small dimensions. For example, 3D printing facilitates the constructions of one or more passages, ports, reservoirs or the like of the distribution channel system in the injection tool at comparably small dimensions. More specifically, 3D printing allows for efficiently generating backwardly extending outlet channels as described above.

The injection tool is equipped with an abutting face configured to contact the plant at the end of inserting the injection tool into the plant. Such abutting face can be embodied by a step, flange, bracket arms or a similar structure provided to the injection tool, for instance as a component of the injection tool base. The abutting face can be flat or even. It can also have a corresponding shape (e.g., arcuate, flat or the like) to a portion of the plant where the insertion tool is intended for insertion. For example it can be curved in accordance with a stem of a plant. The abutting face limits advancing of the injection tool into the plant. Particularly, when the plant is comparably soft such as is the case in comparably small or non-woody plants, the abutting face constrains penetration to prevent penetration through the opposed side of the plant while facilitating precise position of the distribution element within a specified plant tissue. Additionally, the abutting face enhances the connection between the injection tool and the plant. For instance, the surface to surface contact between the abutting face of the base and the plant further closes the interior of the plant from the exterior environment and allows for generating an elevated pressure inside the plant, e.g. by a plant injection system as described below, in order to provide the liquid active ingredient formulation into the plant. Additionally, the abutting face of the base restricts escape of the active ingredient formulation through the slot or opening generated by the injection tool.

Various exemplary embodiments of injection tools are described in further detail below.

a) Screw Tips

Figure 2:
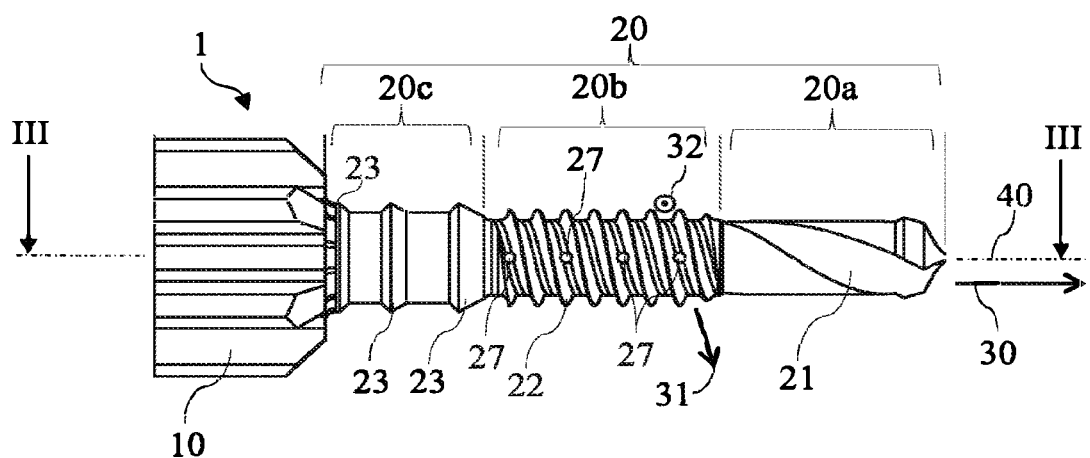
FIG. 2 shows a side view of the injection tool of the injection system of FIG. 1.
Figure 3:
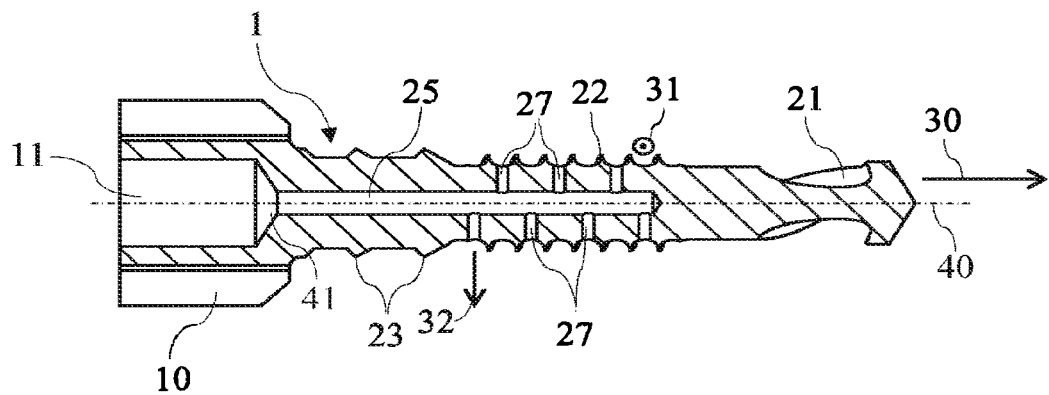
FIG. 3 shows an axial cross-section of the injection tool of the injection system of FIG. 1 along the line of FIG. 2.

According to the views in FIGS. 1-3, an embodiment of an injection system according to the disclosure comprises a first embodiment of an injection tool 1 according to the disclosure, having a shaft body profile that is self-drilling. It additionally comprises a delivery device which is attachable to the injection tool 1 and by means of which an active ingredient formulation W is delivered, in a dosed quantity, to the injection tool 1. The active ingredient formulation W can then be provided to the plant that is to be treated, for example a tree, via the injection tool 1. The delivery device can be variously configured. For example, FIG. 1 shows three embodiments 100, 200 and 300 of delivery devices. When the injection system is actually in use, only one of these variants is attached at any one time to the injection tool 1. The design and function of the different variants of the delivery device are discussed in more detail below.

FIG. 2 shows a side view of the injection tool 1. In one example, the injection tool 1 (and other injection tools described herein) is a single component, for instance molded or 3D printed. In other examples the injection tools described herein are multiple components, molded or 3D printed, and then assembled. The injection tool 1 substantially has a penetrating distribution body having a body profile, in this example a shaft body profile. The injection tool includes an exterior of the body profile shaped as a screw with a head 10 (e.g., base 10) and a shaft 20 (e.g., penetrating distribution body 20). The penetrating distribution body 20 is optionally divided into three portions, i.e. a distal drill bit portion 20a (a penetrating element 20a), an intermediate screw portion 20b (a distribution element 20b) and a rear bead portion 20c (a closure element 20c). The penetrating element 20a directed away from the base 10 is designed as a (wood) drill. It comprises winded cutting elements 21 and adjoining chip grooves as components of the penetrating element 20a. The distribution element 20b (e.g., intermediate screw portion in this example) includes threading 22 as a winded cutting edge and anchor element of the penetrating structure of the injection tool 1. An external diameter of the middle portion 20b is in one example larger than that of the front portion 20a. Closure beads 23 (of which there are three in this example) are formed on the closure element (or rear portion 20c) directly adjoining the base 10. The external profile (e.g., diameter, projection relative to the remainder of the body or the like) of these peripheral beads 23 is larger than the corresponding external profile (e.g., diameter or the like) of the middle portion 20b.

As can best be seen in FIG. 3, an outwardly open, cylindrical attachment or socket opening 11 (a socket fitting) is provided in the base 10 and is connected, for communication therewith, to longitudinal channel 25 (e.g., an inlet passage 25) provided as a main channel in the penetrating distribution body 20. The longitudinal channel 25 is optionally configured as a blind hole and extends through at least the rear portion 20c and the middle portion 20b of the shaft 20 (an example of a penetrating distribution body). In the region of the middle portion 20b of the shaft 20 (the distribution element of the penetrating distribution body), laterally extending radial outlet channels 27 (e.g., one or more distribution ports) are provided which are connected to the longitudinal channel 25 for communication therewith. The radial outlet channels 27 (distribution ports) open out laterally in the region of the middle portion 20b of the shaft 20 between the thread turns 22 thereof. In an example, the thread turns provide one or more distribution reservoirs between the thread turns, and the distribution ports are within the turns. The distribution ports are accordingly recessed from an exterior of the body profile including the peripheral ends of the thread turns.

The head 10 (an example of a base) has, for example, a hexagonal outer contour, such that a screwdriver with a hexagonal socket can be plugged onto it. The injection tool 1 is, in one example, made of metal (including metal alloys) and is produced by 3D printing.

In use, the injection tool 1 is inserted into a ligneous region B of a plant that is to be treated, such as a tree trunk, as shown in FIG. 1. More specifically, the injection tool 1 penetrates the plant along an insertion direction 30 (e.g., an example of a penetration direction) into which it is forwarded into the tree trunk. The insertion direction 30 extends along the axis of the insertion tool 1, the longitudinal body axis 40. This embodiment of the injection tool 1 includes a self-drilling design with the cutting elements 21 of the injection tool 1, and insertion conducted in a single work step by screwing in (e.g. by means of an electric or manual screwdriver), without drilling a pilot hole. The drill portion 20a (an example of the penetration element) of the shaft 20 drills a hole, the screw portion 20b of the shaft (in this embodiment the distribution element and the anchor element) causes the further advancing and secure retention of the injection tool 1. The peripheral beads 23 of the third portion 20c (the closure element) additionally mate the injection tool 1 to the outside and enclose the penetration to the plant. Additionally, the depth of penetration of the injection tool 1 is visually monitored with the peripheral beads 23. For instance, as each of the peripheral beads 23 reaches the plant exterior the operator recognizes the penetrating element 20a (also referred to as the drill portion) is at a corresponding penetration depth.

While advancing the injection tool 1 by means of the screw portion 20b, the insertion tool 1 is rotated and thereby moved along the threading 22 a penetrating movement direction 31 shown in FIG. 2 with an arrow parallel relative to the threading. A pitch or angle of the thread 22 in one example defines the penetrating movement direction 31 (another example of a penetration direction). The screwing of the injection tool 1 (e.g., rotation of the tool) and movement of the threading 22 along the penetrating movement direction 31 axially moves the injection tool 1 along the insertion direction 30.

Referring now to FIG. 3 and FIG. 2, the outlet channels 27 (examples of distribution ports) are linear and extend in an outlet direction 32 transverse (at a relative angle) to the penetrating movement direction 31. For instance, the outlet channels 27 extending in the outlet direction 32 are at an angle of 90 degrees or less relative to the penetrating movement direction 31 (e.g., the outlet channels are perpendicular to or open in a reversed direction relative to the penetrating movement direction 31). In FIG. 3, the outlet direction 32 is along the plane of the page and transverse to each of the penetrating movement direction 31, the insertion direction 30 (collectively the penetration directions) and the longitudinal body axis 40 corresponding to at least the insertion direction. In FIG. 2, the outlet direction is shown extending into and out of the page with the circle and point symbol, and is again transverse to the penetrating movement direction 31, the insertion direction 30 and the longitudinal body axis 40. For example, the outlet channels 27 extending in the outlet direction 32 are at an angle of 90 degrees or less relative to the insertion direction 30 (e.g., the outlet channels are perpendicular to or open in a reversed direction relative to the insertion direction 30). The transverse orientation of the outlet channels 27 isolates the outlet channels 27 from plant tissues during insertion and accordingly minimizes engagement with the tissues and potential clogging of the outlet channels.

With the injection tool 1 inserted into the plant (as part of a penetrating configuration), one of the delivery devices 100, 200, 300 (or a delivery device of another configuration) is attached sealingly to the injection tool 1 at an inlet port, in this example the attachment opening 11. A dosed quantity of active ingredient formulation W (a fluid including one or more of a liquid, gas, gel, vapor, aerosol, colloid, micro/nanoparticles, biological organism or the like) is delivered for a predefined period of time. The active ingredient formulation W passes through the attachment opening 11, the longitudinal channel 25 (an example of an inlet passage) and the outlet channels 27 (example distribution ports) into the plant tissue surrounding the injection tool 1. The formulation W is gradually taken up and transported by the nutrient pathways of the plant. The thread turns 22 and transverse distribution ports (outlet channels 27) relative to the penetration directions promote the dispensing of the active ingredient formulation to the surrounding plant tissue. For example, the distribution ports are recessed within the threading acting as the walls of a distribution reservoir and accordingly within the body profile of the penetrating distribution body (in this example, the shaft 20). Further, the distribution ports open and are accordingly oriented transverse relative to the penetration directions (including the insertion direction and the penetrating movement direction) and correspondingly transverse relative to the longitudinal body axis 40. The transverse orientation of the outlet channels 27 in combination with the distribution reservoirs isolates the outlet channels 27 from plant tissues during insertion.

To facilitate the communication of the delivery device with the injection tool 1, the delivery devices 100, 200, 300 are provided with an attachment part 111, 211, 311 corresponding to the attachment opening 11 (a socket fitting) of the head 10 of the injection tool 1. The attachment parts permit sealed communication with the injection tool 1. The attachment part includes, but is not limited to, a tip 111, a hose 211, an attachment nipple 311 or the like each of which is sealingly coupled with the injection tool 1 at the attachment opening 11 (an example of a socket fitting) having an inlet port 41 in communication with the outlet channels 27 (example distribution ports).

b) Nail Tips

Figure 9:
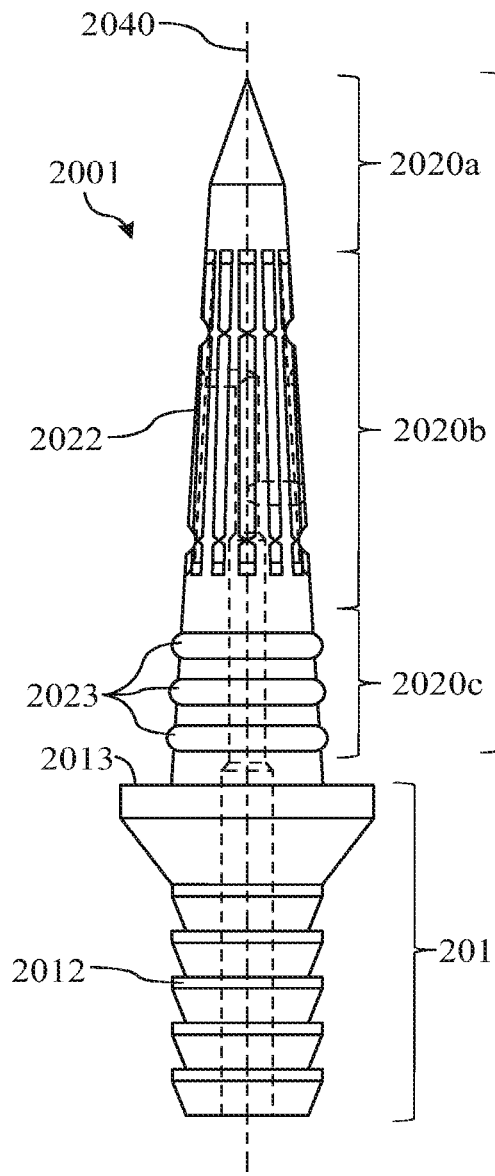
FIG. 9 shows a view of a second embodiment of the injection tool according to the disclosure.
Figure 10:
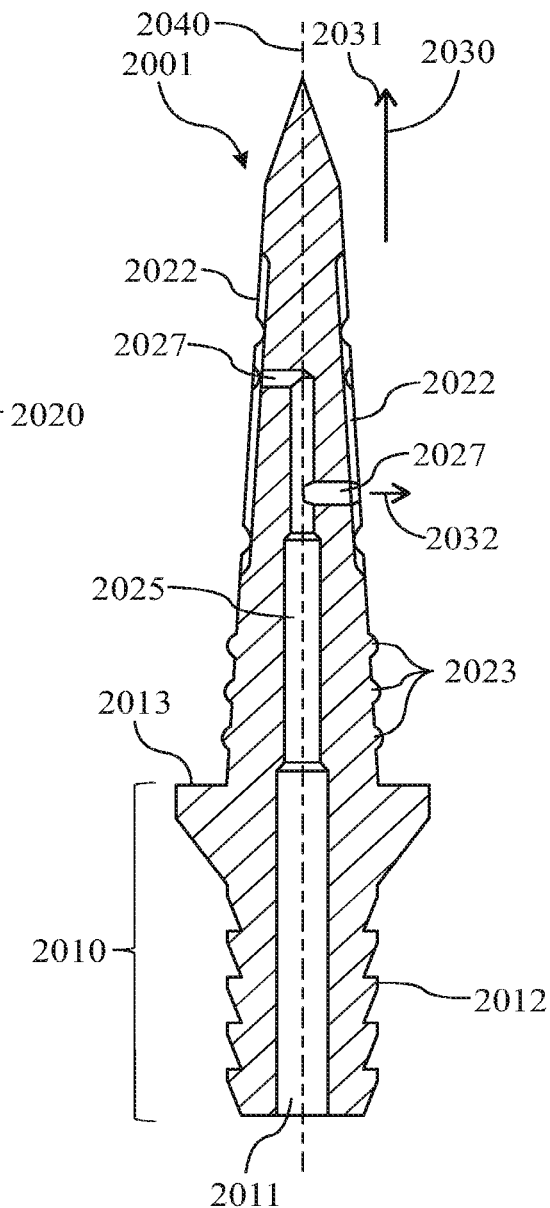
FIG. 10 shows a longitudinal cross-sectional view of the injection tool of FIG. 9.

Alternative embodiments of injection tools according are included herein. In the embodiment shown in FIGS. 9 and 10, the injection tool 2001 has a wedge body profile similar to a nail having a tapered tip. The injection tool embodiment shown in FIGS. 11-13 includes another example of a wedge body profile (e.g., a lance tip or wedge). A common for the injection tools are the self-penetrating capability corresponding to the variations in body profiles. For instance, each of the injection tools described herein is penetrates or is inserted (e.g. hammered, pressed or pushed) into the plant, such as a tree trunk or a stem, without previously provided drilled hole or other recess.

Figure 26:
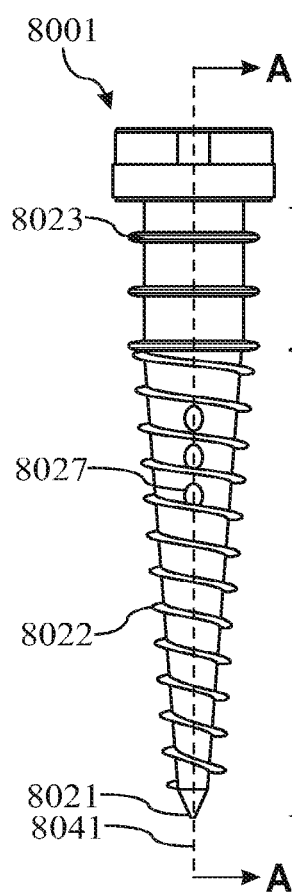
FIG. 26 shows a side view of an eighth embodiment of the injection tool according to the disclosure.
Figure 27:
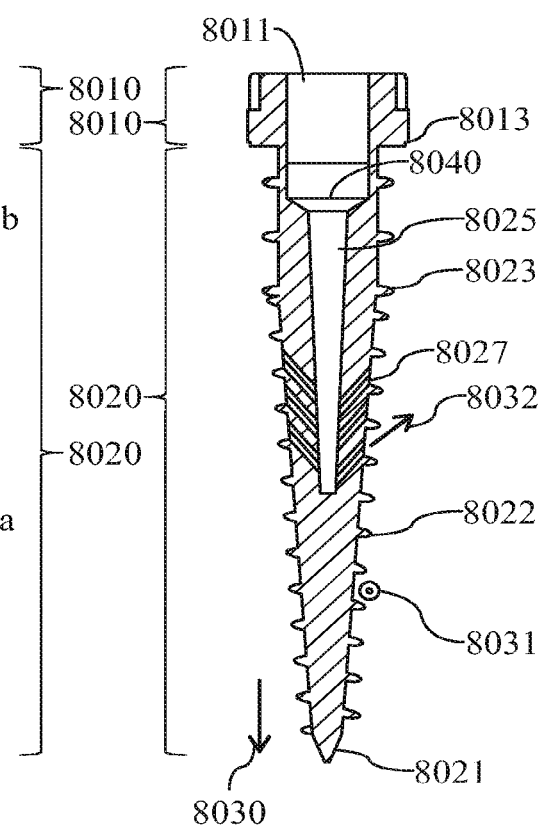
FIG. 27 shows a cross-sectional view along the line A-A of FIG. 26.

FIGS. 26 and 27 show another embodiment of an injection tool 8001 having a shaft type body profile, for instance with a threaded feature. The injection tool has a head 8010 (an example of base) and a shaft 8020 (an example of a penetrating distribution body) having a front screw/drill portion 8020a (a penetrating element) and a rear bead portion 8020b. The front portion 8020a of the shaft 8020 is a penetrating element tapering from the head 8010 (base) toward a distal portion of the tool 8001. The penetrating distribution body includes features of a self-cutting screw. The penetrating element of the injection tool 8001 includes a sharp tip 8021 and threading with a winded or spiral cutting edge 8022. Peripheral beads 8023 (examples of closure beads) are formed on the rear portion 8020b (an example closure element) adjoining the head 8010 (the base). The external profile of these peripheral beads 8023 is larger than the external profile of the thread cutting edges 8022 of the front portion 8020a to enhance sealing between the tool 8001 and the plant.

As shown in FIG. 27, an outwardly open, cylindrical attachment or socket opening 8011 (e.g., an example of a socket fitting including one or more of an opening or a plug for an opening) is in the head 8010 and is connected by way of an inlet port 8040 with a longitudinal main channel 8025 (an example of an inlet passage). In this example, the main channel 8025 is tapered hole extend toward the tip 8021. Towards its bottom end the main channel 8025 is connected to a plurality of axially and circumferentially spaced outlet channels 8027 (examples of distribution ports). Each of the outlet channels opens between two neighbouring sections of the spiral cutting edge 8022. As previously described the outlet channels 8027 open (e.g., extend, are oriented or the like) transversely relative to a longitudinal body axis of the tool 8001 corresponding to a penetration direction, such as an insertion direction, and are also transverse to the penetrating movement direction (another example of the penetration direction) as the tool 8001 is rotated. Distribution reservoirs are included between the reading 8022 to space the outlet channels 8027 from the body profile of the tool 8001 corresponding to the tapered and threaded profile shown in FIGS. 26, 27. The transverse orientation of the outlet channels 8027 in combination with the distribution reservoirs isolates the outlet channels 8027 from plant tissues during insertion.

The head 8010 (an example of a base) is equipped with a slit, opening or the like for receiving a driver tool. For example, a screw driver is used for rotating the injection tool 8001 for insertion it into a plant along the insertion direction 8030. The insertion direction 8030 extends along a longitudinal body axis 8041 of the injection tool 8001. The injection tool 8001 is made of metal or metal alloy and is optionally produced by a 3D printing method. A lower portion of the head 8010 forms a flange or step including an abutting face 8013, as shown in FIG. 27. In one example, the abutting face 8013 acts as a depth stop and limits insertion of the injection tool 8001 into the plant. Additionally, the abutting face 8013 encloses the penetration of the plant in a similar manner to the peripheral beads 8023 (examples of closure beads) if the tool 8001 is fully inserted into the plant.

While advancing the injection tool 8001 by means of the driver tool, the insertion tool 8001 is rotated and moved along its thread or spiral cutting edge 8022 in another example of a penetrating movement direction 8031. In this example a pitch or angle of the thread 8022 defines the penetrating movement direction 8031. The screwing of the injection tool 8001 also axially moves the injection tool 8001 in the insertion direction 8030.

The outlet channels 8027 are straight and extend in an outlet direction 8032 shown in FIG. 27. The outlet direction 8032 is transverse to the longitudinal body axis 8041 (corresponding to the insertion direction) as well as the penetrating movement direction 8031. For example the outlet direction 8032 of the outlet channels is around 135 degrees relative to the penetrating movement direction 8031 (and the insertion direction 8030). The transverse orientation of the outlet channels 8027 relative to one or both of the penetration directions (e.g., the insertion direction or the penetrating movement direction) isolates the outlet channels from plant matter and accordingly minimizes plugging or clogging of the channels. Accordingly, the outlet channels 8027 (example distribution ports) remain open and ready to distribute formulations after the injection tool transitions from a penetrating configuration (during insertion) to a distribution configuration for treatment of the plant.

Figure 13:
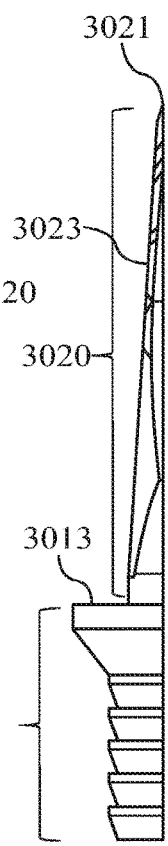
FIG. 13 shows a left hand half of a side view of the injection tool of FIG. 11.

Another injection tool 2001 having a wedge type body profile (e.g., in this example a tapered nail) is shown in FIGS. 9-10. The injection tool 2001 includes a strike head 2010, for instance a base, and a shaft 2020 or penetrating distribution body divided into three portions. In the example shown in FIGS. 9 and 10, the penetrating distribution body includes a front nail tip portion 2020*a* (an example penetration element), a middle conical portion 2020*b* (an example of a distribution element), and a rear bead portion 2020*c* (an example of a closure element).

The front portion 2020*a* is remote relative to the strike head 2010 with the intervening elements therebetween. The front portion 2020*a*, or penetrating element of the penetrating distribution body tapers from a proximal portion proximate to the strike head 2010 toward a distal portion of the body. In the injection tool 2001 the front portion 2020*a*, or penetrating element, includes a tapered tip (in the manner of a nail) as a cutting element of the penetrating element.

The middle portion 2020*b*, or distribution element in this example tool, is tapered and has one or more furrows or flutes 2022. As described herein, distribution ports are recessed relative to the body profile (e.g., extending along the distal edges of the flutes) to minimize clogging of the ports.

Peripheral beads 2023 (there are three in this example) are formed on the rear portion 2020*c*, or closure element. The rear portion 2020*c* adjoins the strike head 2010. The peripheral profile of the peripheral beads 2023 is, in one example, larger than the corresponding profile of the distal elements, such as the distribution element and penetration element (2020*b*, 2020*a*). The peripheral beads 2023 with the larger profile close the penetration through a plant through engagement of the peripheral beads with the surrounding plant material.

As shown in each of FIGS. 9 and 10, at a transition between the rear portion 2020*c* of the shaft 2020 (e.g., an example penetrating distribution body) and the strike head 2010 (or base) a flange-like step or abutting face 2013 is provided with the strike head 2010. The abutting face 2013 circumferentially extends around the shaft 2020. When the shaft or penetrating distribution body of the injection tool 2001 is inserted into the plant, the abutting face 2013 contacts the plant (with sufficient penetration of the shaft) and limits further advancement of the injection tool 2001 into the plant. Further, the abutting face 2013 provides a larger profile feature than the distribution element 2020*b* and in some examples encloses the interface between the plant and the injection tool 2001 thereby minimizing the ingress of contaminants, pests or the like, while also minimizing leaking of formulation.

As can best be seen in FIG. 10, an outwardly open, cylindrical attachment opening 2011 (an example of an inlet port) is provided in the strike head 2010 and is in communication with a longitudinal main channel 2025 (or inlet passage) of the shaft 2020. Optionally, the strike head 2010 includes a ribbed outer structure 2012 (e.g., attachment cleats) or other example attachment cleats as an alternative to insertion of a corresponding socket fitting into the attachment opening 2011 (e.g., in this example a socket fitting or socket opening). For instance, a hose, tube or the like is coupled with the strike head 2010 and the attachment cleats, such as the ribbed structure 2012, provide a firm hold of the hose.

The longitudinal channel 2025 is, in one example, configured as a blind hole and extends through the rear portion 2020*c* and the middle portion 2020*b* of the shaft 2020. In the region of the middle portion 2020*b* (an example distribution element) of the shaft 2020, radial outlet channels 2027 (an example of distribution ports) extend from the longitudinal channel 2025 and open out laterally in the region of the middle portion 2020*b* of the shaft 2020 between the furrows 2022 thereof. In one example, the outlet channels 2027 are within a body profile of the injection tool 2001, such as the wedge or tapered shaped of the tool 2001. For instance, the furrows 2022 corresponding to an exterior of the body profile proximate to the outlet channels 2027, and the channels are accordingly recessed relative to the exterior. Optionally, the furrows or flutes 2022 extend around distribution reservoirs (the spaces between flutes) with the outlet channels 2027 therein. The distribution reservoirs promote the distribution of the emerging active ingredient formulation into the surrounding plant tissue, for instance by isolating the outlet channels 2027 from plant material during penetration. In another example, the distribution reservoirs along with proximate plant tissue form cavities, pockets or the like for reception of formulations and to enhance residence of the formulations proximate to the plant tissue (e.g., for enhanced uptake).

The operation of the injection tool 2001 shown in FIGS. 9-10 is similar in some regards to the operation of injection tool 1. In contrast to injection tool 1 (rotated along the threading 22), the injection tool 2001 is driven into the plant such as a tree trunk, for instance with a hammer, pneumatic hammer, by hand or the like. An insertion direction 2030 of the tool 2001 is shown along the longitudinal body axis 2040. While advancing or hammering the injection tool 2001 into the plant, the striking causes a motion along a penetrating movement direction 2031 (an example of a penetration direction) corresponding to the longitudinal body axis 2040. The penetration movement direction 2031, in this example injection tool 2001, also corresponds to the insertion direction 2030 (in contrast to the tool 1 having different directions shown in FIGS. 2 and 3).

As shown in FIG. 10, the outlet channels 2027 (examples of distribution ports) extend laterally or radially from the main channel 2025. For example, the outlet channels 2027 extend or open in a transverse direction relative to the longitudinal body axis 2040 (and the penetration direction or insertion direction 2030). In the example shown in FIG. 10, the outlet channels 2027 open transversely at an angle of approximately 90 degrees relative to the longitudinal body axis 2040. Accordingly, in the example shown in FIG. 10 the outlet channels 2027 extend in an outlet direction 2032 orthogonal (as well as transverse) to the penetrating movement direction 2031 and the insertion direction 2030. In other examples, outlet channels (as shown and described herein) are transverse to one or more penetration directions and a corresponding longitudinal body axis, for instance extending at an angle relative to the longitudinal body axis to isolate the outlet channels and thereby enhance distribution of formulations to the plant.

c) Wedge Tips

Another injection tool 3001 is shown in FIGS. 11-13. The injection tool 3001 includes another example body profile corresponding to a wedge. In this example, the wedge body profile includes planar surfaces that taper from a proximal portion 3043 (proximate to the base) of a penetrating distribution body toward a distal portion 3041 (proximate to a penetrating element). The injection tool 3001 includes a strike head 3010 (an example of a base) and a wedge portion 3020 (another example of a penetrating distribution body) configured as a lance tip or blade. The wedge portion 3020 includes a penetrating element, such as a cutting element penetrating structure at its front tip 3021. The cutting element includes a cutting edge extending along a leading end of the of the penetrating distribution body (e.g., the wedge portion 3020). As shown in FIG. 13, the cutting element of the penetrating distribution body (the wedge portion 3020) tapers from the proximate the strike head 3010 and accordingly includes the wedge portion having a distribution element (e.g., the portion of the body proximate to the outlet channel 3027 and distribution channels) and a profile similar to a prism. Optionally, the penetrating distribution body includes one or more anchor elements configured to retain the body in a plant after insertion. With a wedge body profile, the anchor elements include the proximal tapered (e.g., tapering toward the base) surfaces, edges or faces of the body.

An attachment opening 3011 (e.g., an example of an inlet port) is provided in the strike head 3010. The attachment opening is in communication with a longitudinal main channel 3025 (an example of an inlet passage) provided in the wedge portion 3020. The strike head 3010 optionally includes a ribbed outer structure 3012 (an example of attachment cleats), to facilitate coupling of a hose onto the strike head 3010.

Figure 11:
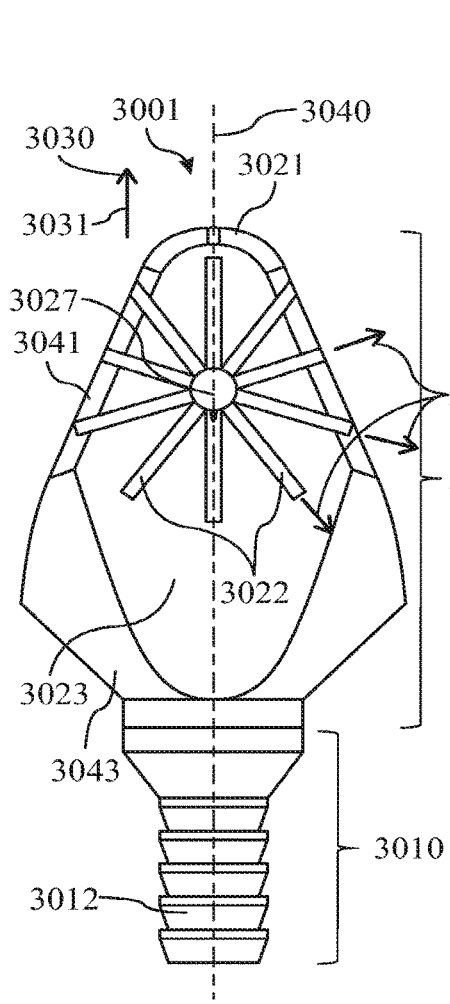
FIG. 11 shows a front view of a third embodiment of the injection tool according to the disclosure.
Figure 12:
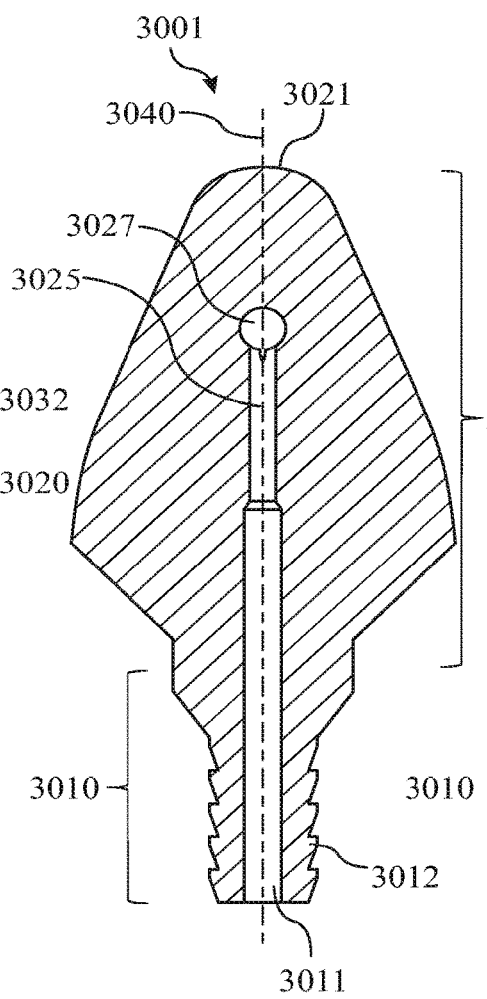
FIG. 12 shows a longitudinal cross-sectional view of the injection tool of FIG. 11.

Referring again to the distribution features of the injection tool 3001, the longitudinal channel 3025 is, in this example, a blind hole and extends approximately into a distal portion 3041 of the wedge portion 3020 (e.g., the penetrating distribution body). An outlet channel 3027 (an example of a distribution port) communicates with the longitudinal channel 3025. The outlet channel 3027 opens on a bevelled facet 3023 of the wedge portion 3020. A star-shaped arrangement of flutes 3022 or channels (e.g., another example of distribution reservoirs) extends along the bevelled flat side 3023 of the wedge portion 3020. As shown in FIG. 11, the outlet channel 3027 opens at a medial location relative to these flutes 3022 and the flutes spread away from the outlet channel. The flutes 3022 extend in various directions across the wedge portion 3020 (e.g. the penetrating distribution body). For instance, some of the flutes 3022 extend rearward toward the strike head 3010 while others extend peripherally (to the sides) and still others extend forward toward the leading end of the wedge portion 3020. The flutes 3022 promote the distribution of the emerging active ingredient formulation into the surrounding plant tissue. For instance, the flutes 3022, example distribution reservoirs, promote the distribution of the emerging active ingredient formulation into the surrounding plant tissue, for instance by isolating the outlet channel 3027 from plant material during penetration. The outlet channel 3027 is recessed within the flutes 3022 and the flutes are proximate an exterior of the wedge body profile. In another example, the flutes 3022 (e.g., distribution reservoirs) along with proximate plant tissue after penetration form cavities, pockets or the like for reception of formulations and to enhance residence of the formulations proximate to the plant tissue (e.g., for enhanced uptake).

As shown in FIG. 13, at a transition between the wedge portion 3020 and the strike head 3010 a step or flange is included. The step or flange is described in some examples as an abutting face 3013. The abutting face 3013 extends laterally relative to the wedge portion 3020. As the injection tool 3001 is inserted into the plant, the abutting face 3013 (with sufficient penetration of the wedge portion) engages the plant and arrests further advancement of the injection tool 3001 into the plant. In one example, the abutting face 3013 engages with the plant and establishes a closed connection between the injection tool 3001 and the plant, for instance to enclose or cover the penetration to the plant.

The third injection tool 3001 functions similarly to the injection tools described herein. In operation, the injection tool 3001 is driven into a plant, for instance with a hammer, pneumatic hammer, manually by hand or the like. The strike head 3010 (e.g., the base) is in one example struck with a hammer into the plant, such as a tree trunk.

The injection tool 3001 is driven in an insertion direction 3030 (an example of a penetration direction) extending along a longitudinal body axis 3040 of the insertion tool 3001. While advancing or hammering the injection tool 3001 into the plant, the striking moves the injection tool 3001 along a penetrating movement direction 3031 (another example of a penetration direction) identical, in this example, to the insertion direction 3030. The wedge body profile of the of the wedge portion 3020 spreads the plant tissue apart with movement of the injection tool. The spreading of the plant tissue, in some examples, minimizes damage to the plant tissue (e.g., removal), and instead biases the plant tissue aside while otherwise maintaining the tissue with the plant. For instance, the capillary system of the plant is maintained with minimal (e.g., no or minimal) trauma to facilitate enhanced update of the active ingredient formulation into the plant.

Referring again to FIG. 11 (and FIG. 12), the outlet channel 3027, a distribution port, is transverse relative to the longitudinal body axis 3040 corresponding to the insertion direction 3030 (and the penetrating movement direction 3031). The transverse orientation of the outlet channel 3027 minimizes the engagement of plant material with the outlet channel 3027 during penetration, and accordingly maintains the channel in an open configuration. As shown in FIG. 11, the flutes 3022 (e.g., elongate distribution reservoirs) of the outlet channels 3027 are linear and extend peripherally in this example from the outlet channel 3027. The flutes 3022 provide various outlet directions 3032 as shown in FIG. 11. For instance, the outlet directions 3032 extend at different angles transverse to each of the penetrating movement direction 3031 and the insertion direction 3030 as well as the longitudinal body axis 3040. Some of the angles are less than 90 degrees, equal to 90 degrees, or larger than 90 degrees (for instance 100 degrees or more). Further, the flutes 3022 that appear parallel to the longitudinal body axis 3040 and the insertion direction 3030 in FIG. 11, are in fact at a transverse angle relative to these features because of the taper of the wedge portion 3020.

Figure 14:
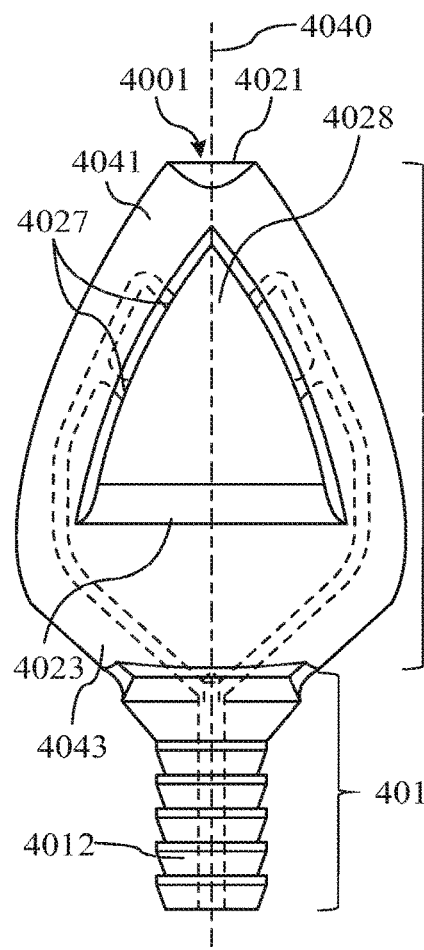
FIG. 14 shows a front view of a fourth embodiment of the injection tool according to the disclosure.
Figure 15:
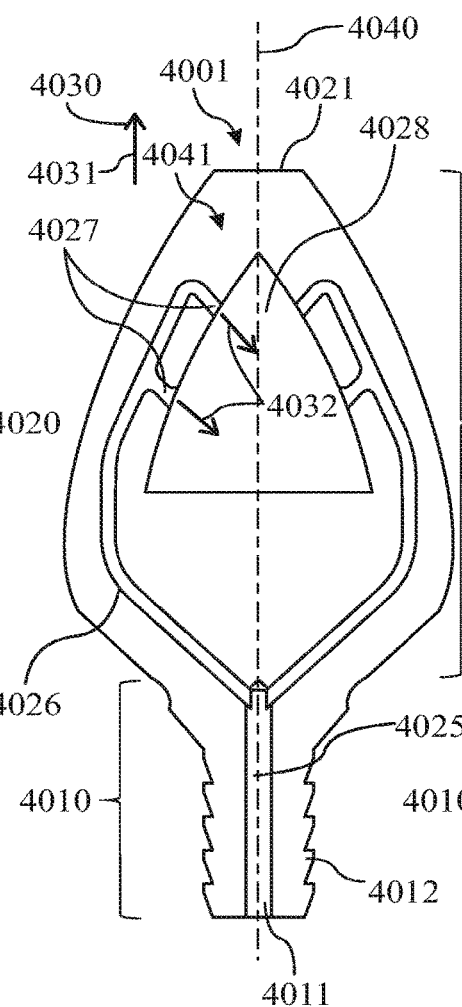
FIG. 15 shows a longitudinal cross-sectional view of the injection tool of FIG. 14.
Figure 16:
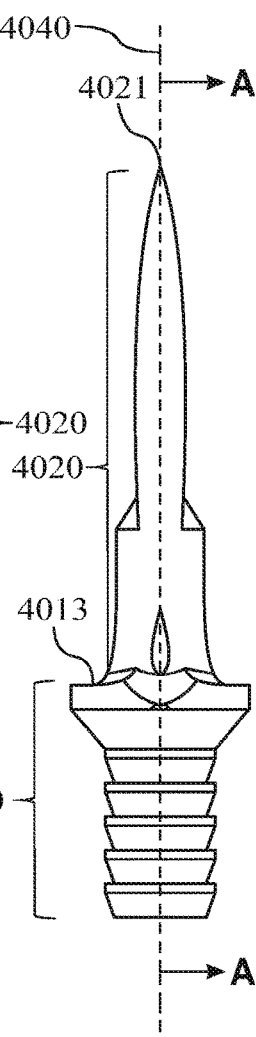
FIG. 16 shows a side view of the injection tool of FIG. 14.

FIGS. 14-16 show another injection tool 4001. The injection tool 4001 includes a wedge type body profile and outlet channels (e.g., distribution ports) transverse to one or more penetrating directions, such as an insertion direction 4030 corresponding to the longitudinal body axis 4040. It has a strike head 4010 (an example of a base) and a wedge portion 4020 (an example of a penetrating distribution body) having a wedge body profile, for instance of a lace tip. The wedge portion 4020 is formed with a sharp edge as cutting edge of a penetrating structure at its front face 4021 or leading end. The wedge portion tapers from a proximal portion 4043 toward a distal portion 4041 of the penetrating distribution body (e.g., toward the front face 4021). The wedge portion 4020 (penetrating distribution body) increases in thickness toward the strike head 4010. The wedge portion 4020 accordingly has a penetrating element corresponding to a tapering part of the wedge between the distal and proximal portions 4041, 4043.

As shown in FIGS. 14, 15, the wedge portion 4020 includes a distribution opening 4028 (an example of a distribution reservoir) having a triangular or tapered shape. The distribution opening 4028 is in communication with a plurality of distribution ports (e.g., outlet channels), and the distribution ports are transverse relative to the longitudinal body axis 4040 (and one or more of the penetration directions). In the example tool 4001 shown in FIGS. 14-16 the wedge portion 4020 includes two wing-like portions or legs proximate to the distribution opening 4028 (e.g., connecting the proximal and distal portions 4043, 4041), in other embodiments the wedge portion 4020 includes three, four or more wing-like portions proximate to the opening 4028.

An attachment opening 4011 (an example of an inlet port) is provided in the strike head 4010 and communicates with a main channel 4025 (an inlet passage). The strike head 4010 has a ribbed outer structure 4012, for instance including one or more attachment cleats, configured for coupling a holes with the strike head 4010 (e.g., the base of the tool 4001).

At a transition from the strike head 4010 to the wedge portion 4020 the main channel 4025 splits into intermediate channels 4026. Each intermediate channel 4026 extends along one of the wing-like portions proximate to the opening 4028 toward outlet channels 4027.

As shown in FIG. 14 and the sectional view in FIG. 15, the outlet channels 4027 are provided along the intermediate channels 4026 and open transversely into the distribution opening 4028 (e.g., transverse relative to the longitudinal body axis 4040 and the corresponding penetration direction). For instance, the outlet channels 4027 and the distribution opening 4028 are provided in a portion of the wedge portion (e.g., the penetrating distribution body) referred to as the distribution element. In this example tool 4001 and others herein, the distribution element is at least partially coextensive with the penetration element, such as the wedge body profile of the wedge portion 4020.

The outlet channels 4027 are a distribution element or section for the tool 4001 and extend toward the opening 4028. The outlet channels 4027 extend transversely, and as shown in this example extend backward relative to a forward or insertion direction 4030 of the injection tool 4001. The main channel 4025, intermediate channels 4026 and the outlet channels 4027 form a channel system of the injection tool 4001.

At the transition between the strike head 4010 (e.g., the base of the tool 4001) and the wedge portion 4020 (e.g., the penetrating distribution body of the tool 4001) an abutting face 4013 is included. The abutting face 4013 extends relative to the wedge portion 4020. AS the injection tool 4001 is inserted into the plant the abutting face 4013 engages the plant and arrests further insertion into the plant. As previously described, the abutting face 4013 encloses (at least partially) the opening made in the plant with the wedge portion 4020.

The operation of the injection tool 4001 of FIGS. 14-16 is similar to the other injection tool examples described herein. For instance, the injection tool 4001 is optionally driven into the plant (e.g., is struck with a hammer, manually pushed into the plant or the like), such as a tree trunk. The injection tool penetrates and moves into the plant along the insertion direction 4030 corresponding to the longitudinal body axis 4040 of the tool 4001. Movement of the injection tool 4001 into the plant, for instance with striking, causes motion along a penetrating movement direction 4031, that is in this example, parallel to the insertion direction 4030.

Because of the wedge body profile of the wedge portion 4020, the plant material is spread with insertion of the injection tool 4001 into the plant. Spreading of the plant material minimizes (e.g., eliminates or minimizes) trauma to the interior of the plant. For instance, the capillary system of the plant is preserved or protected to enhance the distribution and update of the active ingredient formulation to the plant.

As shown in FIG. 15, the outlet channels 4027 (e.g., distribution ports) open in an outlet direction 4032 toward the central opening 4028 (e.g., a distribution reservoir). The outlet direction 4032 is transverse to the penetration directions and the longitudinal body axis 4040 corresponding to at least the insertion direction of the penetration directions. For example, as shown in FIG. 15, the outlet channels 4027 are angled approximately 135 degrees relative to the penetrating movement direction 4031. The orientation of the outlet channels 4027 minimizes the engagement of the channels with plant material by isolating the channels from the (relatively) oncoming plant material during insertion thereby maintaining the outlet channels 4027 in an open configuration. Accordingly, plant tissues or material, such as fibers or the like are diverted from the outlet channels 4027 by the wedge portion 4020 during insertion of the injection tool 4001 (e.g., a penetration configuration) into the plant to maintain the channels 4027 in an open configuration during a distribution configuration.

Additionally, the distribution reservoir (e.g., distribution opening 4028) enhances the isolation of the outlet channels from plant material by opening the body profile to facilitate positioning of the openings in a recessed location relative to the exterior of the body profile. Further, the distribution reservoir (e.g., distribution opening 4028) provides a cavity for reception of the formulations. In combination with surrounding plant tissue the distribution reservoir maintains the formulation in close proximity or engagement with the plant tissue surrounding the reservoir.

Figures 17, 18, 19:
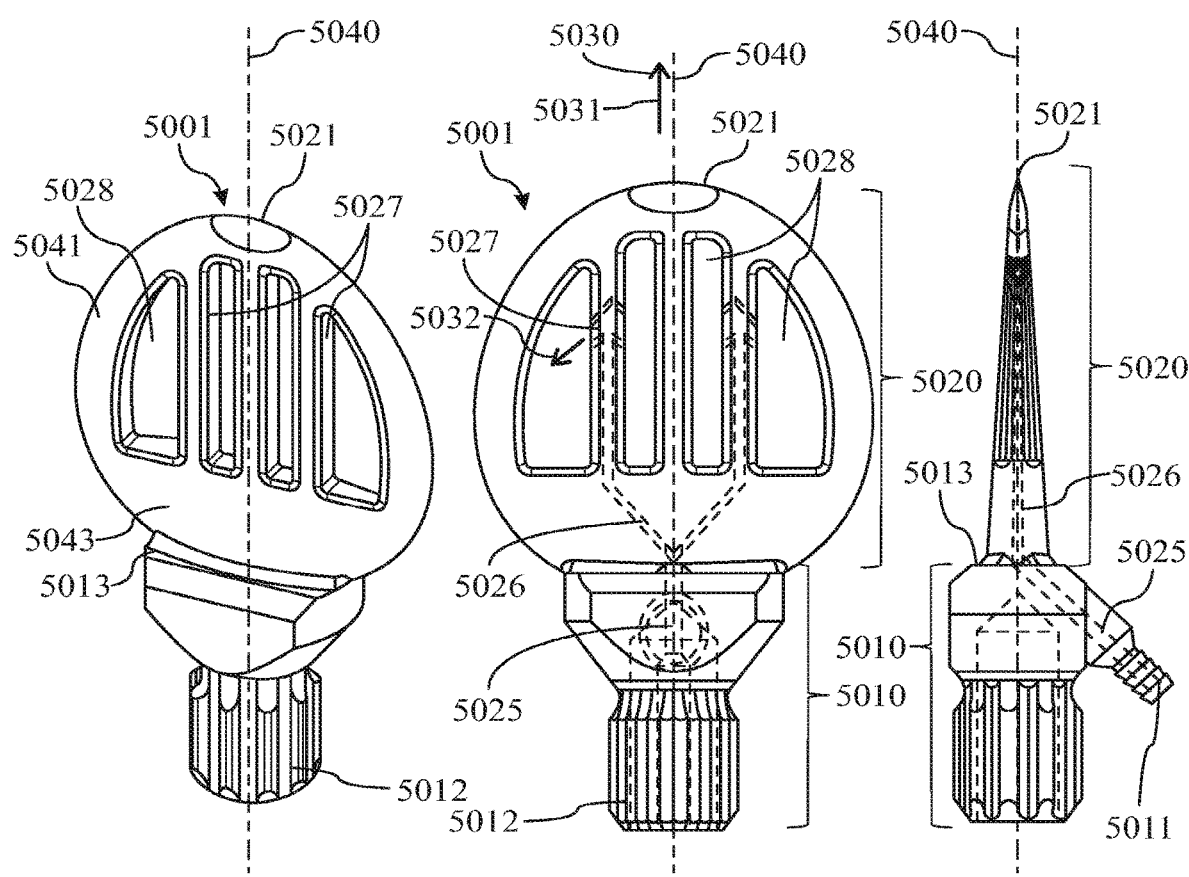
FIG. 17 shows a perspective view of a fifth embodiment of the injection tool according to the disclosure.
FIG. 18 shows a front view of the injection tool of FIG. 17.
FIG. 19 shows a side view of the injection tool of FIG. 17.

FIGS. 17-19 show an injection tool 5001 having another example of a wedge body profile. The injection tool 5001 has a strike head 5010 (an example of a base) and a wedge portion 5020 (an example of a penetrating distribution body) configured, in this example, as a lance tip. As shown in FIG. 17, The wedge portion 5020 includes a penetrating element having a sharp edge as a cutting element. The cutting element is provided along the front face 5021 (e.g., a leading edge) and the penetrating element in this examples extends from the distal portion 5041 to the proximal portion 5043. For instance, the wedge body profile of the wedge portion increases, increases in thickness toward the strike head 5010, as shown in FIG. 19.

The strike head 5010 has an axially ribbed outer structure 5012 to facilitate grasping of the strike head 5010, and optionally coupling with a corresponding fitting (e.g., of a hose, dispensing device or the like). At the transition between the strike head 5010 (the base) and the wedge portion 5020 (the penetrating distribution body) a step or flange is provided, an abutting face 5013. The abutting face 5013 extends relative to the wedge portion 5020, and limits insertion of the tool and engages with the plant material to facilitate covering of the penetration of the plant.

Referring again to FIG. 19, the strike head 5010 in this example includes an inlet port, such as the attachment opening 5011. The attachment opening 5011 in this example is a separate component relative to the remainder of the base (e.g., the strike head 5010). For example, the attachment opening 5011 is provided as a port for the base. As shown in FIG. 19, the attachment opening 5011 communicates with distribution ports, such as the outlet channels 5027 through a main channel 5025 (e.g., an inlet passage). The main channel 5025 extends from the attachment opening 5011 diagonally in an upward direction to intermediate channels 5026 provided in the wedge portion 5020. Each intermediate channel 5026 vertically extends between two adjacent distribution reservoirs (e.g., openings 5028). The left intermediate channel 5026 is between the left-hand openings 5028 and the right intermediate channel 5026 is between the right-hand openings 5028.

Plural outlet channels 5027 (in this example two) are provided with each of the intermediate channels 5026. The outlet channels 5027 open (e.g., extend, direct formulations or the like) in a transverse direction relative to an insertion direction of the tool 5001, for instance corresponding to the longitudinal body axis 5040. Like this, liquid active ingredient formulation are delivered from the openings 5028 into the plant. For instance, the openings 5028 (examples of distribution reservoirs) are in communication with respective outlet channels 5027. Formulations delivered from the outlet channels 5027 fill the openings 5028. The openings 5028 are surrounded by plant tissue in a distribution configuration (after penetration) and the injection tool 5001, including the openings 5028, accordingly retains the formulation in engagement with the surrounding plant tissue for uptake. The injection tool 5001, including those portions of the penetrating distribution body (the wedge portion 5020) surrounding the openings 5028 and the surrounding plant tissue thereby retain the formulation in pockets or cavities to facilitate update of the formulation.

As further shown in FIG. 18, the outlet channels 5027 extend transverse relative to the a forward or insertion direction 5030 of the injection tool 5001 corresponding to the longitudinal body axis 5040 (and the intermediate channels 5026). For instance, the outlet channels 5027 are directed toward the strike head 5010 (also referred to as the base of the tool 5001). The main channel 5025, the intermediate channels 5026 (collectively inlet passages) and the outlet channels 5027 (e.g., distribution ports) form a channel system of the injection tool 5001.

The operation of the injection tool 5001 shown in FIGS. 17-19 is similar to the operation of the other injection tools described herein. In a penetrating configuration, the injection tool 5001 is driven into the plant, such as a tree trunk, with striking from a hammer, manual insertion, an introducer configured to install the tool 5001 or the like. As shown in FIG. 19, with separate connection nozzle (e.g., the attachment opening 5011) provided, the strike head 5020 is isolated from the opening and is suitable (e.g., is mechanically robust) for receiving comparably strong strikes, for instance for penetration of plants having organized or robust materials, tissues or the like.

An insertion direction 5030 is shown in FIG. 18 and is an example of a penetration direction. The insertion direction 5030 extends along (e.g., is parallel to, or within a few degrees) of the longitudinal body axis 5040 of the insertion tool 5001. Driving of the injection tool 5001 into the plant moves the injection tool 5001 along a penetrating movement direction 5031, and in this example, the penetrating movement direction 5031 corresponds to the insertion direction 5030. Because of the wedge body profile of the tool 5001 the plant material is spread apart by the injection tool 5001. As mentioned above, by spreading the plant material trauma to the interior structure of the plant is minimized.

In the distribution configuration (e.g., after penetration and installation of the tool 5001) the outlet channels 5027 receive and distribution the formulation transversely relative to the longitudinal body axis 5040 and relative to the insertion direction (e.g., corresponding to the axis). As shown in FIG. 18, the outlet channels 5027 open into and correspondingly direct the formulation into the distribution openings 5028 (e.g., distribution reservoirs). As shown in FIG. 18, the outlet channels 5027 extend in an outlet direction 5032 toward the openings 5028. In this example injection tool 5001, the outlet direction 5032 is transverse, for instance at an angle of approximately 125 degrees relative to the penetrating movement direction 5031, the insertion direction 5030 (collectively penetration directions) and the corresponding longitudinal body axis 5040. The transverse configuration of the outlet channels 5027 in addition to the position of the channels within the distribution openings 5028 isolates the channels 5027 from engagement with the plant material during insertion, and accordingly minimizes plant material, such as fibres or the like, from plugging the outlet channels 5027, for instance during insertion of the injection tool 5001 into the plant.

The injection tools 6001, 7001 shown in FIGS. 20-25 are, in various examples, configured for use with less robust plants (e.g., softer trees, vines, stems or the like) typically having a softer shell. For instance, the previously described injection tools may have length of 50 mm or greater. In one example, these injection tools include penetrating distribution bodies (e.g., wedge or shaft body profiles) with a length of 35 mm or greater and a width of 30 mm or greater. In contrast, the example injection tools 6001, 7001 shown in FIGS. 20-25 in some examples have total lengths of between around 6 mm and 16 mm.

Figures 20, 21, 22:
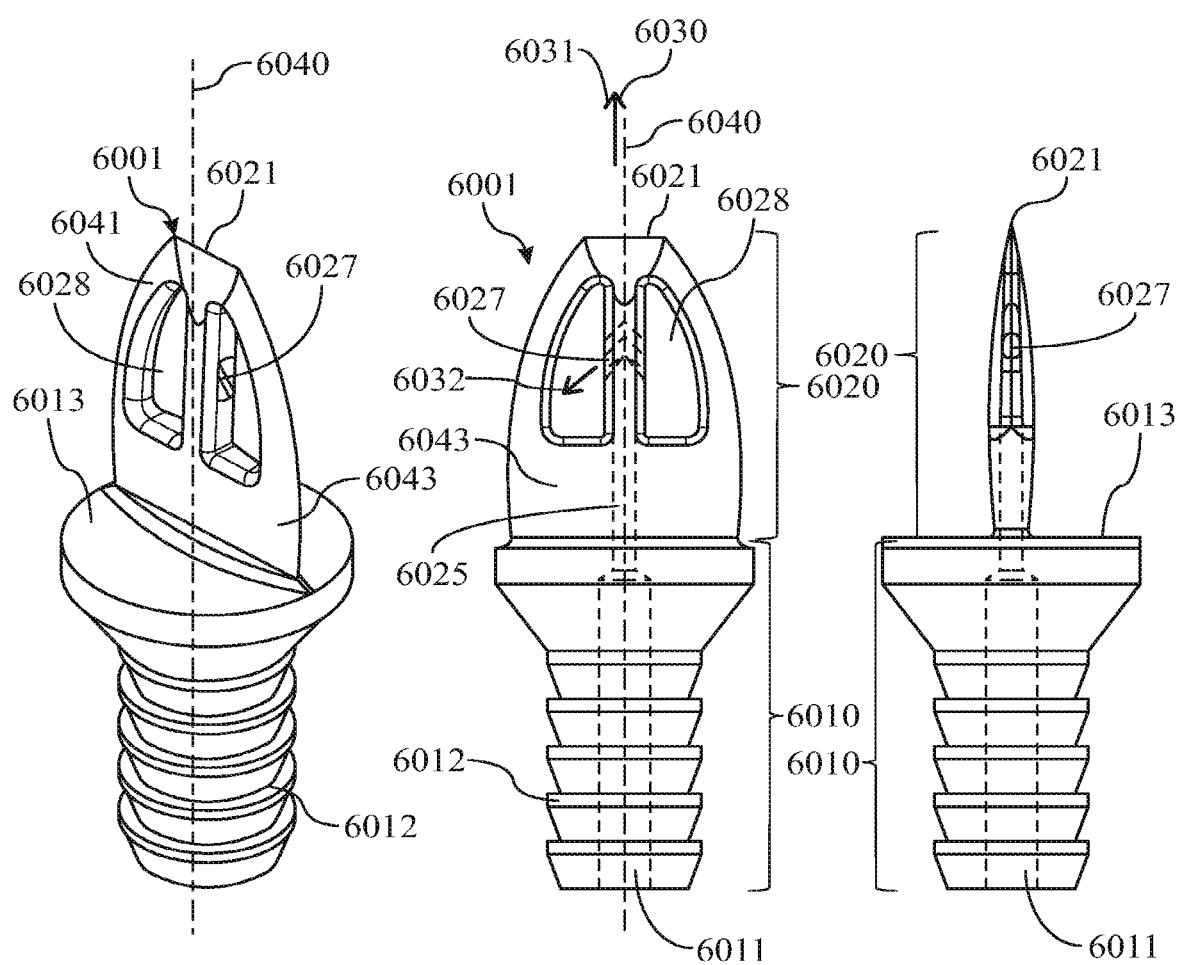
FIG. 20 shows a perspective view of a sixth embodiment of the injection tool according to the disclosure.
FIG. 21 shows a front view of the injection tool of FIG. 20.
FIG. 22 shows a side view of the injection tool of FIG. 20.

FIGS. 20-22 show an injection tool 6001 having a wedge portion 6020, such as a penetrating distribution body having a wedge type body profile. The injection tool 6001 includes a strike head 6010 (an example of a base) and the wedge portion 6020 (an example of a penetrating distribution body). The wedge portion 6020 includes a cutting element. For example the wedge portion 6020 includes a cutting edge along the front face 6021 directed distally away from the strike head 6010. The wedge portion 6020 includes at least partially coextensive penetration and distribution elements. For example, the penetrating element extends from the cutting edge along the front face 6021 and proximate to a distal portion 6041 to a proximal portion 6043 of the wedge portion 6020. Similarly, the distribution element 6012 (including the outlet channels 6027 and distribution openings 6028) are within the penetrating element of the wedge portion 6020. As shown in the side view of FIG. 22, the penetrating element of the wedge portion 6020 increases in thickness from the distal portion 6041 toward the proximal portion 6043 and the strike head 6010.

The strike head 6010 optionally includes a ribbed outer structure 6012, such as attachment cleats, to facilitate grasping of the strike head 6010 and to securely connect the injection tool 6001 with a delivery device. At the transition between the strike head 6010 and the wedge portion 6020 a step is provided. The step forms an abutting face 6013. The abutting face 6013 extends relative to (e.g., away from) the wedge portion 6020. During insertion of the injection tool 6001 the abutting face 6013 contacts the plant and arrests further advancement of the injection tool 6001 into the plant. In comparison to the abutting faces of other injection tools described herein the abutting face 6013 is relatively large in comparison to the associated wedge portion 6020 (e.g., they have a similar size). The larger abutting face 6013 facilitates use with smaller and less robust plants having a comparably soft shell or boundary. The relatively large abutting face distributes forces from insertion over the correspondingly large face 6013 and thereby minimizes trauma to the plant. The abutting face 60313 further provides an enclosing face for the injection tool 6001 for establishing a robust coupling with the plant.

As shown in FIGS. 21 and 22, the strike head 6010 is includes an attachment opening 6011 (e.g., an example of an inlet port). The attachment opening 6011 is in communication with the outlet channels 6027 and the distribution openings 6028, for instance with a main channel 6025 (e.g., an inlet passage). As shown in FIGS. 20 and 21, outlet channels 6027 (e.g., distribution ports) are in communication with the main channel 6025 and open transversely into the respective distribution openings 6028 (e.g., distribution reservoirs).

Fluid active ingredient formulation is delivered from the outlet channels 6027 transversely, for instance relative to the longitudinal body axis 6040 and the corresponding insertion direction 6030, into the distribution openings 6028. The distribution openings 6028 retain the formulation in residence proximate to adjacent plant tissues. In the example shown in FIG. 21, the outlet channels 6027 extend proximally toward the strike head 6010 and transverse relative to the insertion direction 6030 of the injection tool 6001. The main channel 6025 and the outlet channels 6027 form a channel system of the injection tool 6001.

The operation of the injection 6001 is similar in at least some regard to other injection tools described herein. Because of the relatively small profile of the injection tool 6001 (or contracted forms of the other tools) the injection tool 6001 is readily inserted and installed in comparably small plants or less robust plants having a softer plant material (e.g., tissues or the like). For instance, the injection tool 6001 is configured for softened striking or manual pressing of the tool 6001 into the plant, for instance into a stem.

As shown in FIG. 21, the injection tool 6001 is inserted along an insertion direction 6030 corresponding to the longitudinal body axis 6040 of the insertion tool 6001. While advancing the injection tool 6001 into the plant the tool moves along a penetrating movement direction 6031, and in the example shown the insertion direction 6030 corresponds with the penetrating movement direction 6031. In a similar manner to the other injection tools having a wedge type body profile and described herein the wedge portion 6020 of the injection tool 6001 spreads the plant material aside as the tool 6001 is inserted into the plant. Spreading of the planter material minimizes trauma to the plant material, and in some examples facilitates enhanced uptake of formulations.

As further shown in FIG. 21, the outlet channels 6027 (e.g., distribution ports) extend in an outlet direction 6032 toward the distribution openings 6028 (e.g., distribution reservoirs). The outlet direction 6032 is transverse to the to the penetrating movement direction 6031 (and the longitudinal body axis 6040). For example, the outlet direction 6032 is misaligned with the penetrating movement direction 6031, the insertion direction 6030 (collectively penetration directions) and the longitudinal body axis 6040 with an angle of 125 degrees or the like. The transverse orientation of the outlet channels 6027 isolates the outlet channels 6027 from plant material otherwise introduced into the outlet channels with insertion. Further, the distribution openings 6028 (e.g., distribution reservoirs) facilitate positioning of the outlet channels 6027 within the body profile, for instance recessing the channels 6027 from an exterior of the body profile.

Figures 23, 24, 25:
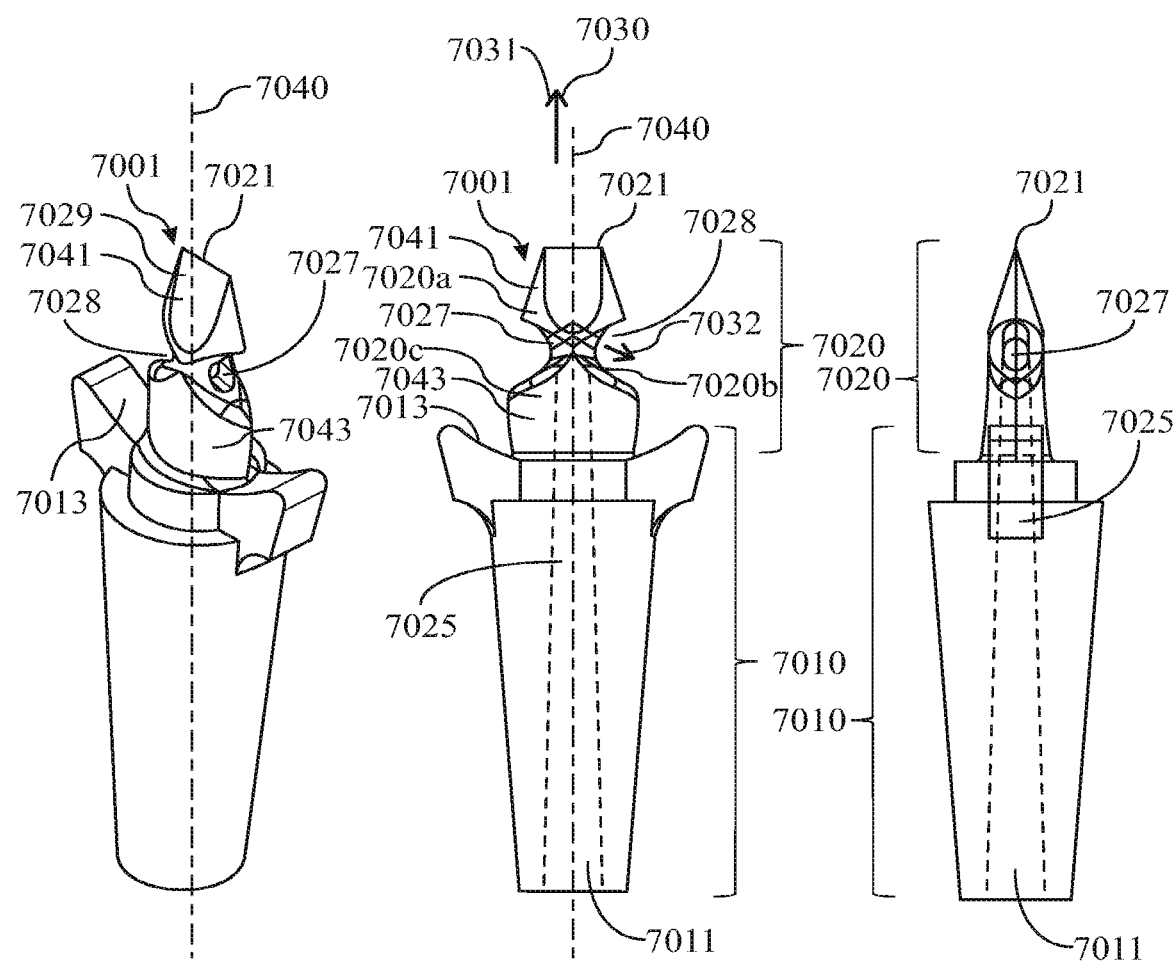
FIG. 23 shows a perspective view of a seventh embodiment of the injection tool according to the disclosure.
FIG. 24 shows a front view of the injection tool of FIG. 23.
FIG. 25 shows a side view of the injection tool of FIG. 23.

FIGS. 23-25 another embodiment of an injection tool 7001 having a wedge type body profile. In a similar manner to other injection tools described herein the injection tool 7001 includes a strike head or body 7010 (e.g., a base) and a head with a wedge portion 7020 (e.g., a penetrating distribution body). The body 7010 or base of the injection tool 7001 is conical in this example and tapers toward the attachment opening 7011. The wedge portion 7020 is formed with a sharp edge as a cutting element of a penetrating structure at its distal front face 7021 or leading end. The wedge portion 7020, as seen in FIG. 25, increases in thickness toward the body 7010. The penetrating element of the wedge portion 7020 in this example extends between the distal and proximal portions 7041, 7043, and corresponds with a distribution element of the wedge portion including the outlet channels 7027 and the lateral recesses 7028.

As shown in FIGS. 23 and 24, the wedge portion 7020 includes a distribution element having lateral recesses 7028 (examples of distribution reservoirs) forming a neck section 7020b. The neck section 7020b separates the wedge portion 7020 into an upper cutting section 7020a and a lower spreading section 7020c. The cutting section 7020a (an example of a penetrating element) includes one or more cutting elements such as the leading edge of the wedge body profile configured to cut or open the plant with insertion of the injection tool 7001 into the plant. The spreading section 7020c of the wedge portion 7020 widens the penetration provided by the cutting section 7020a to generate a cavity inside the plant for the remainder of the wedge portion 7020. In another example, the spreading section 7020c cooperates with the lateral recesses 7028 to spread the plant material and facilitate residence of the fluid formulations in the lateral recesses 7028 proximate to plant tissues in a similar manner to the distribution reservoirs described with other injections tools herein.

As seen in FIGS. 24 and 25, the body 7010 includes an attachment opening 7011 (an example of an inlet port) that opens into a central main channel 7025 (e.g., an inlet passage). The main channel 7025 extends from the attachment opening 7011 through the neck section 7020b of the wedge portion 7020. Outlet channels 7027 extend from the main channel 7025 transversely. As shown in FIGS. 23 and 24, the outlet channels 7027 open transversely into the lateral recesses 7028. The fluid active ingredient formulation is delivered transversely from the outlet channels 7027 into the lateral recesses 7028.

As shown in FIG. 24, the outlet channels 7027 transversely extend relative to an insertion direction 7030 of the injection tool 7001 corresponding to a longitudinal body axis 7040. For instance, the outlet channels 7027 extend toward the body 7010 (e.g., the base). The main channel 7025 and the outlet channels 7027 form a channel system of the injection tool 7001.

At the transition between the body 7010 and the spreading section 7020c of the wedge portion 7020 a step is formed. The step is a curved abutting face 7013 in this example. The abutting face 7013 is curved in a manner corresponding with the profile of the plant, for instance a rounded stem, that receives the injection tool 7001. As the injection tool 7001 is inserted into the plant the curved abutting face 7013 couples in surface to surface contact with the stem and arrests further advancement of the injection tool 7001 into the plant. The advancement of the injection tool 7001 is arrested in a relatively gentle manner with the curved configuration of the abutting face 7013 to minimize trauma to the plant. Additionally, as with other embodiments described herein, the abutting face 7013 establishing a robust coupling between the injection tool 7001 and the plant, and encloses the penetration formed with the wedge portion 7020.

The operation of the injection tool 7001 shown in FIGS. 23-25 is similar in some regards to the other example injection tools described herein. For example, the injection tool 7001 is inserted (e.g., struck, pressed or the like) into the plant, such as a stem. The injection tool 7001 is inserted along the insertion direction 7030 generally corresponding with a longitudinal body axis 7040 of the insertion tool 7001. The injection tool 7001 moves along a penetrating movement direction 7031, and in this example, the penetrating moving direction 7031 corresponds to the insertion direction 7030.

The penetration of the plant with the wedge portion 7020 spreads the plant material in a similar manner to other wedge type injection tools described herein. With the wedge portion 7020 (e.g., the penetrating distribution body) installed in a penetrating configuration the injection tool 7001 assumes a distribution configuration.

In the distribution configuration, the fluid formulation is distributed from the outlet channels 7027 (e.g., the distribution ports) transversely to the openings or lateral recesses 7028 (e.g., distribution reservoirs). The liquid formulation is supplied to the lateral recesses 7028 and resides within the recesses in proximity to and engagement with adjacent plant material. With the fluid formulation residing in the lateral recesses 7028, the plant may gradually update the formulation for instance without or with minimal applied delivery pressure to the formulation.

Figure 30:
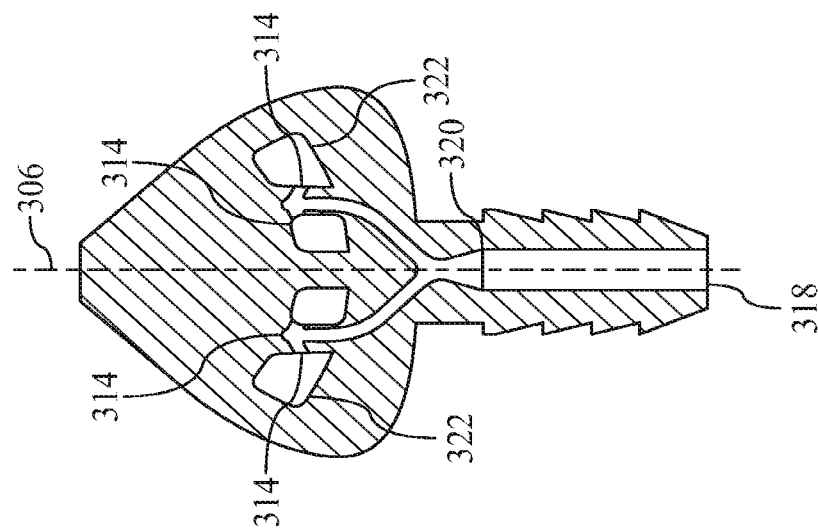
FIG. 30 shows a cross-sectional view along the line A-A of FIG. 29.
Figure 29:
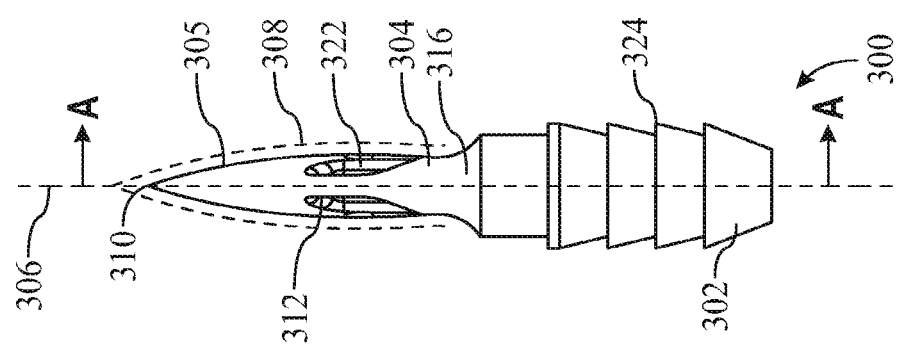
FIG. 29 shows a side view of the injection tool of FIG. 28.
Figure 28:
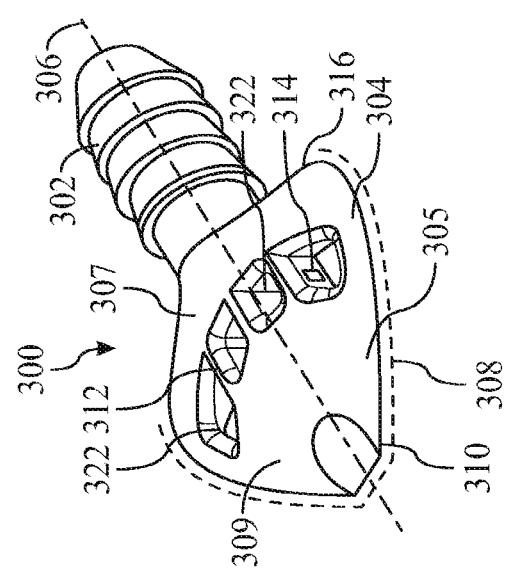
FIG. 28 shows a perspective view of a ninth embodiment of an injection tool according to the disclosure.

FIGS. 28, 29 and 30 show another example of an injection tool 300. As in previous examples, the injection tool 300 includes a base 302 and a penetrating distribution body 304 extending from the base. As shown in FIG. 28, the penetrating distribution body 304 includes a body profile 308 including, in this example, a wedge profile. The body profile 308 in FIG. 28 and FIG. 29 is shown in dashed lines and includes, but is not limited to, one or more of, the shape, contour, size, texture or the like of the penetrating distribution body 304. As shown, the penetrating distribution body 304 additionally includes a distribution element 312. The distribution element 312 includes one or more distribution ports 314 spaced from a penetrating element, such as the penetrating element 310 including the leading edge of body profile 308. As previously described, the one or more distribution ports 314 distribute liquid formulation transversely (e.g., in a different direction) relative to a longitudinal body axis 306 corresponding to the direction of insertion of the injection tool 300 into a plant.

Referring again to FIG. 28, the injection tool 300, as previously described, includes a body profile 308, such as the wedge profile in this example. As shown, the wedge body profile 308 tapers from the proximal portion 307 of the penetrating distribution body 304 to the distal portion 305 of the distribution body 304. The wedge profile 308 facilitates the penetration and delivery of the injection tool 300 into the plant tissue of the plant. Additionally, the penetrating distribution body 304 optionally includes one or more anchor elements 316. In this example, the body profile 308 includes one or more flanges, surfaces, corners or the like to couple the penetrating distribution body 304 with corresponding tissues of the plant and optionally retain the penetrating distribution body 304 in the plant in an ongoing manner, for instance, for distribution of liquid formulations over a plurality of hours, such as one hour, two hours or more.

As further shown in FIGS. 28 and 30, the distribution element 312, in an example, includes one or more distribution reservoirs 322 in communication with the distribution ports 314. As previously described with regard to other embodiments, the distribution reservoirs 322 are configured to receive liquid formulations administered through the distribution ports 314. The distribution reservoirs 322, in another example, facilitate the residence of the liquid formulation in the distribution reservoirs while the penetrating distribution body 304 is retained within the plant. For instance, the surfaces of the penetrating distribution body 304 surrounding the distribution reservoirs 322 as well as the adjacent plant tissue form pockets, cavities or the like within the plant and the body 304 configured to hold and retain liquid formulations therein for gradual uptake into the plant tissue. The distribution reservoirs 322 are provided in a distributed pattern across the penetrating distribution body 304, and are optionally larger than the distribution ports 314, to enhance the amount (area) of plant tissue contacted with the liquid formulations.

As shown in FIG. 28 and further shown in FIG. 29, the distribution reservoirs 322 and the distribution ports 314 are, in one example, within the body profile 308 and accordingly substantially isolated (e.g., concealed, shielded, sheltered, separated, shrouded or the like) from plant tissues during insertion of the injection tool 300 into a plant. In another example, the distribution reservoir 322, distribution ports 314 or the like are recessed from a body profile exterior 309 of the body profile 308. By recessing the distribution element 312 including, for instance, the distribution ports 314 and the distribution reservoirs 322 relative to the body profile exterior 309 during delivery or penetration of the injection tool 300 into the plant tissue, the plant tissue does not otherwise engage or infiltrate the distribution reservoirs 322 or the distribution ports 314 in a meaningful manner that would otherwise clog the distribution ports 314 or fill the distribution reservoirs 322 to prevent residence of the liquid formulation therein.

As shown in FIG. 29, the distribution reservoirs 322 are within the body profile 308 of the penetrating distribution body 304. For instance, as shown in FIG. 29, the dashed line of the body profile 308 extends around the distribution reservoirs 322 with the reservoirs 322 therein. Accordingly, the distribution reservoirs 322 are isolated from plant tissues during penetration. For instance, one or more of the penetrating element 310 or the remainder of the penetrating distribution body 304 conceals or shrouds the distribution element 312 (e.g., including one or more of the ports 314 and the reservoirs 322) from plant tissue during penetration. In one example, the penetrating element 312 provides a penetrating element profile or penetration profile. The distribution element 312 including one or more of the ports 314 or reservoirs 322 is within the penetration profile during penetration in a direction along longitudinal body axis 306. The penetration profile (e.g., shape, dimensions such as cross sectional area or the like) is larger than and axially aligned with at least one of the distribution ports 314 or distribution reservoirs 322. Accordingly, the ports 314 and reservoirs 322 within the penetration profile are isolated from the plant tissues engaged by the penetration element 310 during penetration. For example, the distribution element 312 including one or more of the distribution ports 314 and the distribution reservoirs 322 are concealed behind the penetration profile (e.g., corresponding to the cross sectional profile of the penetrating distribution body 304). Accordingly, the distribution element 312 including one or more of distribution ports 314 or distribution reservoirs 322, are isolated from engagement with plant tissues, for instance, during insertion of the injection tool 300 into the plant. Accordingly, the ports 314 and distribution reservoirs 322 remain open and are less prone to clogging and thereby facilitate administration of the liquid formulations while in a distribution configuration, for instance, with the penetrating distribution body 304 placed and retained within the plant.

Referring again to the side view of the injection tool 300 in FIG. 29, the base 302 of the tool 300 includes, in one example, one or more attachment cleats 324 including flanges, barbs or the like. The attachment cleats 324 couple with one or more features of the distribution devices described herein including, but not limited to, hoses of the distribution devices, fittings or the like. In one example, the attachment cleats 324 retain features such as fittings, hoses or the like in an ongoing manner to facilitate the ongoing administration of liquid formulations through the injection tool 300.

FIG. 30 is a cross sectional view of the injection tool 300 taken along the sectional line A-A in FIG. 29. As shown in FIG. 30, the injection tool 300 includes the distribution reservoirs 322 arranged in a distributed pattern across the penetrating distribution body 304. For instance, in the example shown, a plurality of distribution reservoirs 322 are interspersed between the distribution ports 314. The distribution ports 314 each open into respective distribution reservoirs 322. In one example, an inlet passage 320 provides the liquid formulation from an inlet port 318 of the injection tool 300 to the distribution ports 314 for distribution into the distribution reservoirs 322.

As further shown in FIG. 30, the distribution ports 314, in this example, have a transverse orientation (e.g., a different angular orientation) relative to the longitudinal body axis 306. For instance, as shown in FIG. 30, the example distribution ports 314 open or extend at an angle of approximately 105 degrees relative to the longitudinal body axis 306. Accordingly, in this example, the distribution ports 314 are turned or directed in a reverse manner, for instance, toward the base 302 of the injection tool 300 and away from the penetrating element 310 of the penetrating distribution body 304. In other examples, as described and shown herein, the distribution ports are arranged in a variety of configurations with the ports 314 opening in transverse directions different relative to the longitudinal body axis 306. The distribution ports shown in FIG. 30 and in other embodiments herein open, extend or are directed relative to the longitudinal body axis 306 (e.g., corresponding to a penetration direction) to facilitate the distribution of fluids in a direction different than the orientation of the longitudinal body axis 306. For instance, and as described previously herein, the liquid formulations are distributed from the distribution ports 314 along angles varying by 5 or more degrees relative to the longitudinal body axis 306. In other examples, the distribution ports 314 are spaced or recessed from the longitudinal body axis 306. In the example shown in FIG. 30, the distribution ports 314 are each spaced from the longitudinal body axis 306 (and spaced from the penetration element 310) and also directed in a transverse orientation (e.g., a different angle relative to the axis 306). In a distribution configuration, the liquid formulations are accordingly distributed in a different direction from the distribution ports 314 relative to the direction of insertion of the penetrating element 310 and the penetrating distribution body 304 in a penetrating configuration (e.g., generally along the longitudinal axis 306).

FIGS. 31, 32 and 33 show another example of an injection tool 400. The injection tool 400 includes one or more features similar to features of other injection tools described herein. For instance, the injection tool 400 includes a base 402 and a penetrating distribution body 404 extending from the base 402. In the example shown in FIG. 31, the penetrating distribution body 404 includes a body profile 408 having, in this example, a wedge shape or wedge profile. In this example, the wedge body profile 408 includes a curved or concave configuration including a corresponding curved (forked or concave) penetrating element 410. The penetrating distribution body 404 tapers from the proximal portion 407 of the body 404 to the distal portion 405. As described herein, the curved penetrating element 410 and corresponding curved or arcuate penetrating distributing body 404 facilitates the positioning of one or more of the distribution element 412 including one or more of distribution ports 414 or distribution reservoirs 322 adjacent to a common ring or plant tissue of the plant penetrated with the tool 400. Accordingly, the distribution of fluids from the distribution ports 414 is, in one example, localized to the corresponding ring or plant tissue extending circumferentially around the plant.

Referring to FIGS. 31 and 32, the wedge body profile 408 (shown in dashed lines) tapers from the proximal portion 407 to the distal portion 405. In FIG. 32, the penetrating distribution body 404 also tapers relative to the thickness of the tool (in contrast to the width shown in FIGS. 31 and 32). The body profile 408, shown in FIGS. 31 and 32 as a dashed line, extends around the penetrating element 410 as well as the penetrating distribution body 404. As shown in FIG. 32, the distribution ports 414 and distribution reservoirs 422 are, in this example, within the body profile 408. For instance, the distribution ports 414 are recessed from a body profile exterior 409 of the body profile 408. In a similar manner, the distribution reservoirs 422 are recessed from the body profile exterior 409 of the profile 408.

As previously described with regard to other embodiments, positioning of the distribution element 412 including (e.g., one or more of the distribution ports 414 or distribution reservoirs 422) within the body profile 408, such as within the body profile exterior 409 minimizes (e.g., eliminates or minimizes) engagement to plant tissue with the distribution element 412 and accordingly facilitates the maintenance of the ports 414, distribution reservoirs 422 or the like in an unclogged and open fashion to facilitate the distribution of liquid formulations from the ports, for instance, into the distribution reservoirs 422 for uptake into the plant tissue.

As further shown in FIG. 31 and FIG. 32, in another example the penetrating distribution body 404 includes one or more anchor elements 416. In this example, the anchor elements 416 correspond to a proximally directed surface of the penetrating distribution body 404, for instance, a flange, edge or the like of the penetrating distribution body 404. The anchor element 416, in one example, is received fully or partially within the plant tissue, for instance, immediately adjacent to the bark, exterior surface or the like of the plant and, in one example, is optionally grown over or covered by the plant tissue to retain the penetrating distribution body 404 within the plant.

As further shown in FIGS. 31 and 32, the base 402, in an example, includes one or more attachment cleats 424 including, for instance, rings, flanges, barbs or the like configured to grasp and retain one or more fittings, hoses or the like of an injection device, distribution device or the like coupled with the injection tool 400. In one example, the attachment cleats 424 facilitate the retention of the coupling of the injection tool 400 to one or more corresponding features of the distribution or injection devices including, but not limited to, containers, dosing devices or the like previously described and shown herein.

FIG. 33 is a cross sectional view of the injection tool 400 taken along section line A-A of FIG. 32. As shown in FIG. 33, the injection tool 400 includes a plurality of distribution ports 414 opening or directed in a direction different than the longitudinal body axis 406, for instance the ports 414 are transverse relative to the longitudinal body axis 406 that is generally the direction of penetration for the tool 400. For instance, as shown, the distribution ports 414, in this example, are directed in a sideways or angled direction relative to the longitudinal body axis 406. Accordingly, in a distribution configuration relative to a penetrating configuration the distribution ports 404 are configured to provide liquid formulations in a transverse or angled vector or along an angled vector relative to the longitudinal body axis 406.

In the example shown in FIG. 33, the distribution ports 414 are directed in a reversed or opposed direction relative to the penetrating direction (e.g., generally aligned with the longitudinal body axis 406). For instance, the distribution ports 414 are turned toward the base 402 of the injection tool 400 and conversely turned away from the longitudinal body axis 406. In other examples, the distribution ports 414 are arranged at differing angles relative to those shown in FIG. 33 while also at a different angle relative to the longitudinal body axis 406 and thereby turned away from the longitudinal body axis 406.

As further shown in FIG. 33, one or more distribution reservoirs 422 are in communication with the distribution ports 414. The distribution reservoirs 422 receive the liquid formulation from the ports 414 by way of an inlet passage 420 in communication with the inlet port 418. As previously described, the distribution reservoirs 422 provide a cavity, pocket or the like within the injection tool 400 and within the plant tissue that accordingly holds the liquid formulation in close proximity and adjacent to the plant tissue of the plant. Accordingly, while the liquid formulation is held within the distribution reservoir 422, the plant tissue readily absorbs the liquid formulation. Absorption or uptake is further enhanced with the arcuate configuration of the distribution reservoirs 422. The arcuate configuration of the reservoirs 422 corresponds with the profile of the most active plant tissue, such as the youngest growth ring of a tree or other perennial, and thereby provides the liquid formulation to the plant tissue most ready to absorb and transport the formulation.

d) Multiport Tips

The present disclosure also provides multiport injection tools for use with plant injection systems. In some embodiments, the multiport injection tools comprise a tool body, at least a portion of which is designed to be lodged in the trunk of a plant. The tool body has a channel system (having one or more channels), through which fluid can flow, terminating in one or more distribution ports and two or more access ports; the channel system provides fluid communication between the distribution ports and access ports. While the specification primarily describes a specific multiport injection tool embodiment, a person of skill, based upon this disclosure can envision a variety of injection tools that may be modified as multiport injection tools consistent with this disclosure. For example, other injection tools described herein can be modified to include two access ports in fluid communication with a channel system providing fluid communication between the access ports and distribution ports. Accordingly, the specific multiport injection tool examples herein are non-limiting.

The present disclosure also provides plant injection systems for administering fluids, for example liquid formulations including one or more active ingredients ("AI fluid"), to a plant comprising the multiport injection tool. The plant injection systems comprise a fluid delivery system, a fluid receiving system, and a multiport injection tool wherein the fluid delivery system is operatively connected to a first port of the multiport injection tool and the fluid receiving system is in fluid communication with a second port of the multiport injection tool. The fluid delivery system facilitates flow of fluid (as previously described in connection with other embodiments above) from a source of fluid supply through a channel system in the multiport injection tip from a first access port to a second access port and to distribution port(s) and consequently to the interior of the plant. The fluid receiving system may have an open position in which fluid may flow through or be evacuated from the fluid receiving system and a closed position in which fluid is retained in the fluid receiving system.

The present disclosure also provides methods of using the multiport injection tools and plant injection systems. In some embodiments, the methods involve validating operation of the plant injections system and delivering AI fluid to the interior of a plant. In some such embodiments, the methods include: installing a multiport injection tool into the trunk of a plant (for example by driving the tool into the plant using pressure for example as described in connection with embodiments illustrated in FIGS. 9-22); delivering AI fluid to a first port of the multiport injection tip with the fluid receiving system in the closed position to prime the injection tip; thereafter setting the fluid receiving system to the open position and confirming fluid flow into the fluid receiving system from the first port to and through the second port; and thereafter setting the fluid receiving system to the closed position to maintain system pressure and facilitate delivery of fluid through the channel system to the distribution ports and interior of the plant. In further or alternative embodiments, the methods involve one or more of initializing the injection tip (including bleeding of intervening fluids, such as air), delivery of multiple AI formulations together, extraction of fluids for testing or flushing of the tool, and refilling of formulation reservoirs in communication with the tool.

Figure 34:
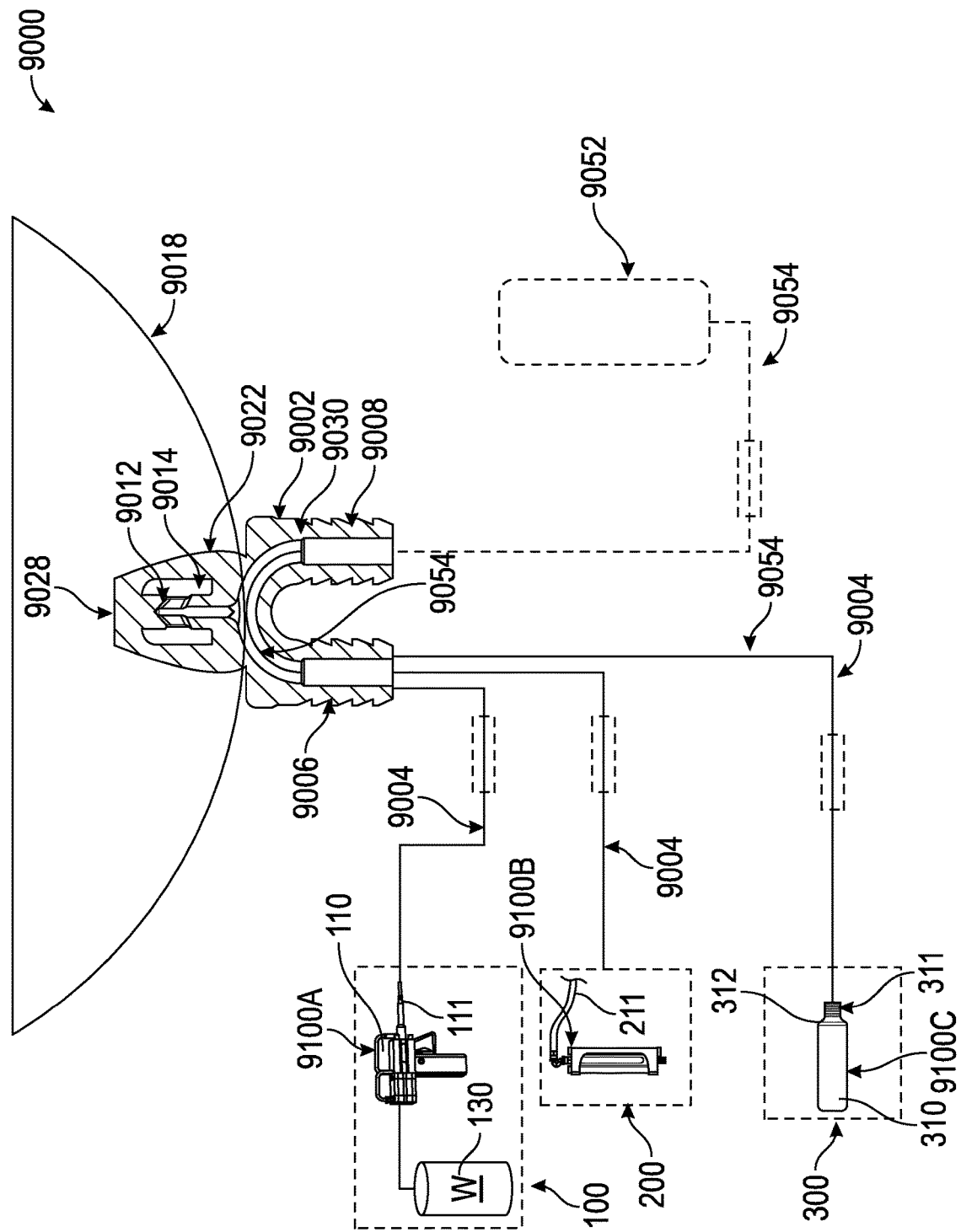
FIG. 34 is a schematic view of one example of a plant injection system including a multiport injection tool.

Referring now to the figures, FIG. 34 provides a schematic view of an Embodiment of a plant injection system 9000 including an example multiport injection tool 9002 in accordance with this disclosure, a fluid delivery system illustrated in varying configurations 100, 200 and 300, and a fluid receiving system 9004. Fluid delivery system 100, 200, 300 is operatively connected to multiport injection tool 9002 at the first access port 9006. Fluid receiving system 9004 is in selective fluid communication with multiport injection tool 9002 by way of the second access port 9008. In some Embodiments, fluid receiving system 9004 includes a tube and a shut-off valve. In other Embodiments, fluid receiving system 9004 may also include a drain reservoir 9010 fluidly coupled to the multiport injection tool 9002 by the tube at the second access port 9008.

"Selective fluid communication" means that the fluid receiving system 9004 has an open position (for example when the shut-off valve is open) in which fluid is evacuated from the fluid injection system 9000 (i.e. flows through the fluid receiving system 9004 and into drain reservoir 9010, if present), and alternatively fluid receiving system 9004 also has a closed position (for example when the shut-off valve is closed), in which fluid is retained in the fluid injection system 9000 (i.e. not evacuated from the injection system 9002 or into the drain reservoir 9010 if present).

"Evacuated from the fluid injection system" means that the fluid is no longer available to be delivered to the distribution ports 9012. In other words, even if the injection system 9000 includes a drain reservoir 9010, fluid in the drain reservoir 9010 is not available for delivery to the distribution ports 9012 particularly when the shut-off valve is in the closed position and the drain reservoir 9010 is no longer in fluid communication with the fluid pathway in the multiport injection tool 9002. "Retained in the fluid injection system" means that the fluid is within the liquid pathway in fluid communication with the first access port 9006 and multiport injector tool 9002.

In yet further Embodiments, fluid receiving system 9004 may also include fluid connectivity to an extraction device and may also include an extraction device 9016. The extraction device 9016 may be, for example, a vacuum pump, a syringe or the like and depending on configuration may be used to facilitate extraction of fluid from the injection tool and/or injection system or introduce fluid into the system.

In use, multiport injection tool 9002 is at least partially inserted into a plant 9018, for example the trunk of a plant 9018, and when the fluid delivery system 100, 200, 300 is activated, fluid flows from fluid delivery system 100, 200 or 300 through multiport injection tool 9002 into the plant 9018 through distribution ports 9012. When fluid receiving system 9004 is in the open position, at least a portion of the fluid also flows through the fluid receiving system 9004 and into drain reservoir 9010, if present and is evacuated from the fluid injection system 9000. When fluid receiving system 9004 is in the closed position, fluid is retained in the fluid injection system 9004 and the injection system 9002 operates similarly to systems described herein with injection tools having a single port. In certain Embodiments, the alternative configurations of fluid receiving system 9004 can be exploited to confirm fluid flow through plant injection system 9020 as further described below in connection with methods of use below.

Figure 35B:
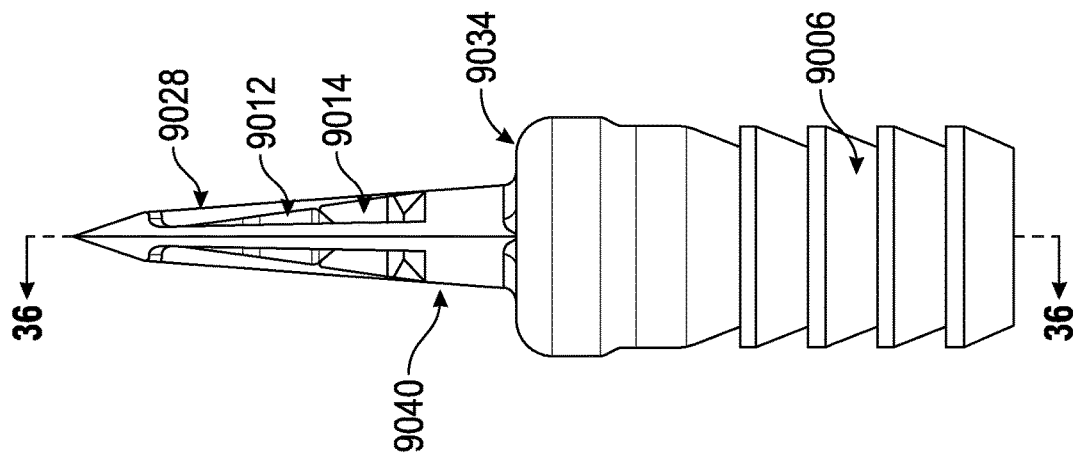
FIG. 35B is a profile view of the multiport injection tool of FIG. 35A.
Figure 35A:
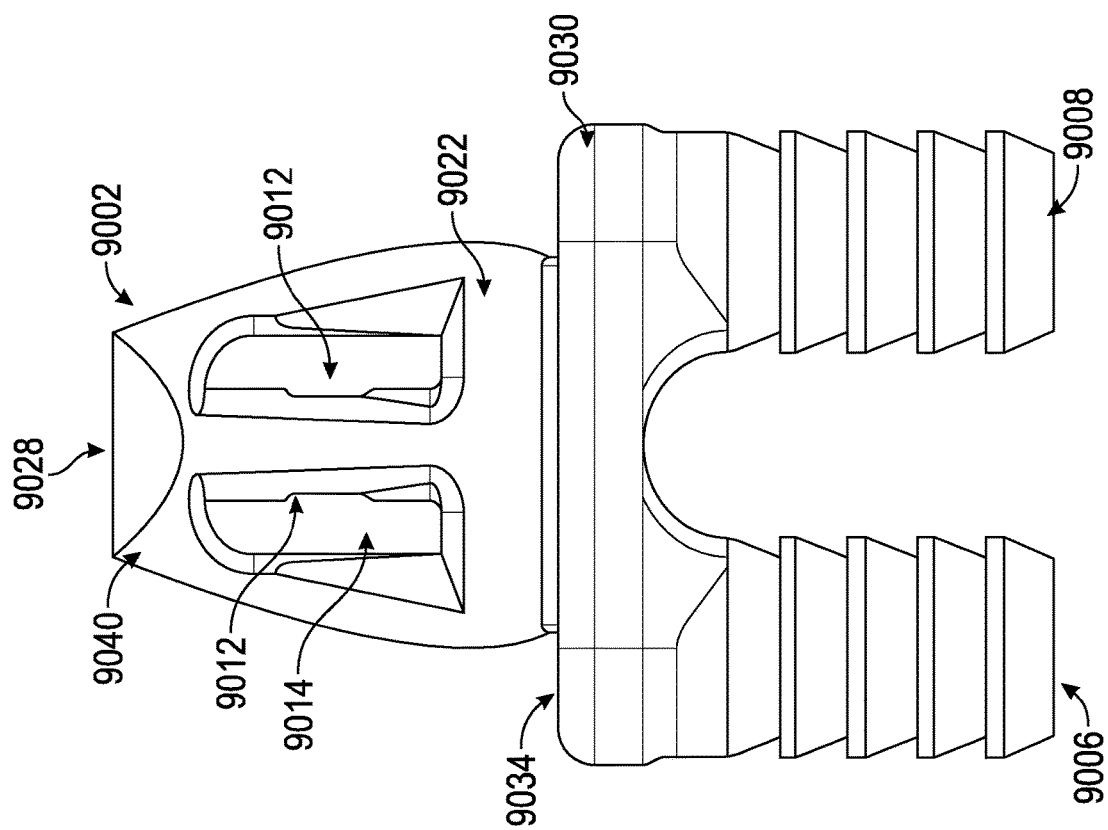
FIG. 35A is a side view of the multiport injection tool of FIG. 34.
Figure 36:
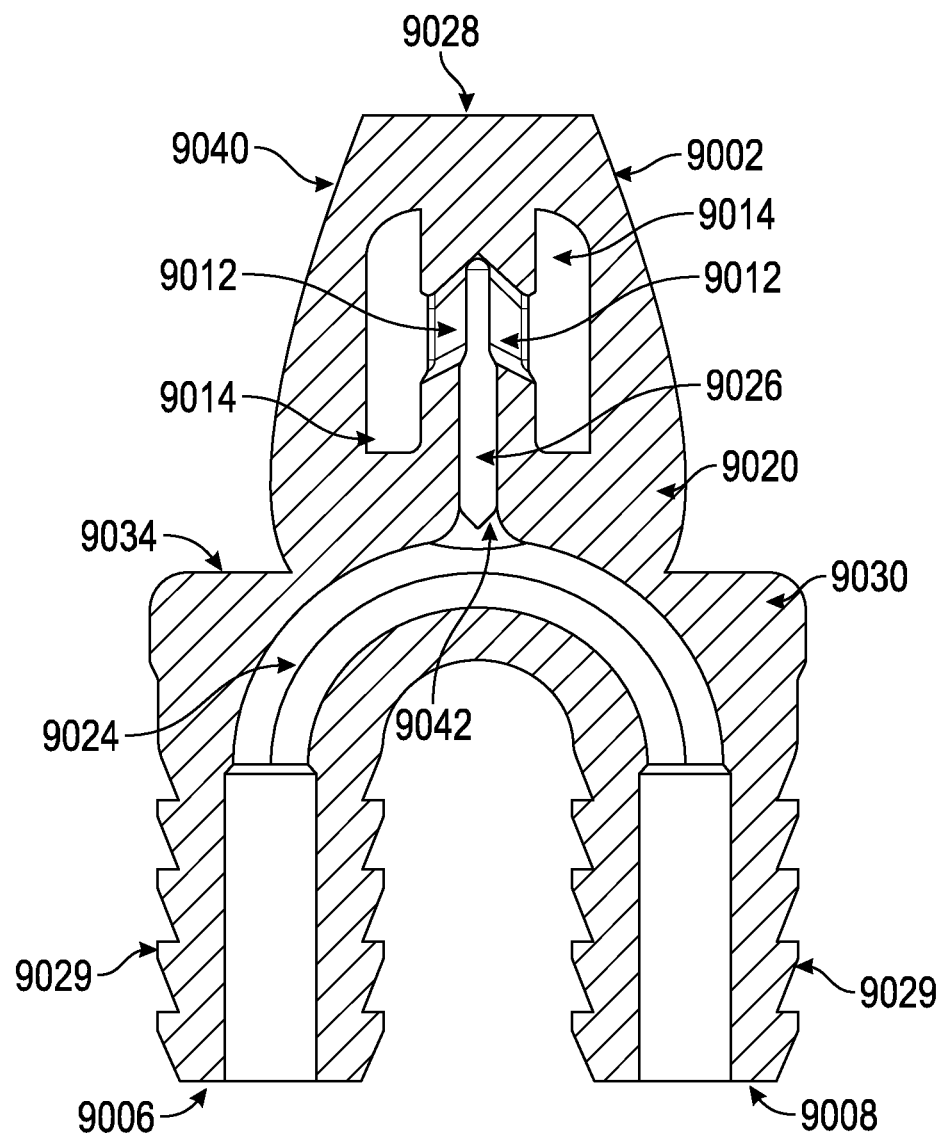
FIG. 36 is a cross sectional view taken along line 36-36 in FIG. 35B.

FIGS. 35A, 35B and 36 show a side view, a profile view, and a cross-sectional view taken along line A-A of FIG. 35B, respectively, of an example multiport injunction tool 9002. As shown, multiport injection tool 9002 comprises tool body 9022 having penetrating element 9028 and tool base 9030. Penetrating element 9028 defines cavities (e.g., distribution reservoirs 9014). As shown in FIG. 36, tool body 9022 has an internal channel system 9026 terminating in a first port 9006, a second port 9008, first distribution port 9012, and second distribution port 9012. Channel system 9026 also includes port manifold 9024 between first port 9006 and second port 9008. And, as also shown in FIG. 36, first distribution port 9012 is located in a wall of first cavity 1116, second distribution port 9012 is located in a wall of a second cavity 1117, and first access port 9006, second access port 9008, and port manifold 9024 are each located in tool base 9030. As FIGS. 34-36 illustrate, multiport injection tool 9002 shares many similarities with injection tool Embodiments of FIGS. 20-25, such as similar size, shape, configuration of distribution ports recessed from the profile and misaligned with the direction of penetration, and will therefore not be repeated in detail here. In use, channel system 9026 provides a pathway for fluid to flow through the injection tool 9002 from first port 9006 to second port 9008 and to distribution ports 9012. Although the disclosure details a specific Embodiment wherein a first access port 9006 is coupled to a fluid delivery system and the second access port is coupled to fluid receiving system 9004, access ports 9006, 9008 can generally provide fluid interconnections between one or more components of the plant injection system 9000 including formulation reservoirs 9032A-C, delivery devices 9100A-C, supplemental formulation reservoirs (not shown), drain reservoirs 9010, and refilling reservoirs (not shown).

As further illustrated in FIG. 36, multiport injection tool 9002 has an insertion end which is inserted into a plant and an exposed end which remains outside of the plant to facilitate coupling and decoupling of multiport injection tool 9002 to fluid delivery system 100, 200, or 300 and fluid receiving system 9004. In the illustrated Embodiment, the insertion end comprises penetrating element 9028, and the exposed end comprises tool base 9030. However, in alternative Embodiments, penetrating element 9028 may not be fully inserted into the plant 9018, or tool body 9030 may not be external or fully external to the plant 9018. Tool base 9030 is configured with first fitting 9029 concentric with first access port 9006 for operatively coupling multiport injection tool 9002 to fluid delivery system 100, 200, 300. Tool base 9030 is also configured with second fitting 9029 concentric with second access port 9008 for coupling multiport injection tip 9002 to fluid receiving system 9004.

In some Embodiments, multiport injection tip 9002 is sized and shaped to minimize damage to the target plant when inserted into the plant, while maintaining efficient functionality of the tip 9002 in delivering the desired dosing of AI fluid over the desired time period directly to the sapwood and not the heartwood of the trunk. For example, as shown in FIGS. 35A and 35B, In some such Embodiments, such as the Embodiment of FIGS. 34-36, penetrating element 9028 and tool base 9030 are cooperatively sized and shaped to work together to minimize damage to the target plant while maintaining efficient functionality of the tip. For example, the length of penetrating element 9028 may be chosen to be less than the depth of the sapwood in the trunk of the tree and tool base 9030 is configured with a flange 9034 abutting the bottom end of penetrating element 9028. The flange 9034 is sized and shaped to mitigate the risk of inserting the injection tool 9002 beyond the end of penetrating element 9028 abutting flange 9034 and therefore beyond the inner circumference of the sapwood and into the heartwood. In the illustrated Embodiment, flange 9034 is shown to have a width that is wider than the widest part of penetrating element 9028. In one example, the multiport injection tip 9002 includes one or more dimensions configured to minimize trauma to the plant caused during installation. For example, the multiport injection tip 9002 includes an edge to edge (e.g., side to side) dimension of around 13 millimeters (mm), and in one example is 12.91 mm. In another example, the portion of the tip 9002 within the plant is around 5 mm (e.g., between around 4 and 5 mm or 0.15 and 0.20 inches), and in one example is 4.47 mm. Optionally, the thickness of the tip 9002 within the plant is around 1 mm (e.g., between around 0.5 and 1.5 mm or 0.2 and 0.4 inches) and in one example is 0.80 mm, while the width of the tip 9002 is around 4.5 mm (e.g., between around 4 and 5 mm or 0.15 and 0.20 inches), and in an example 4.68 mm. The port formed in the plant for installation of the tip 9002 (if not self-cutting with the cutting elements described herein) has a similar dimension to accommodate the tip 9002, for instance around 4.5 mm in one example. The minimal profile of the tip 9002 (as well as other tip embodiments described herein) minimizes trauma to a plant in comparison to larger profile devices including syringes, plug, pegs or the like having dimensions of around 7 mm (7.14 mm in one example) a full 2 mm larger than the example tip 9002. Accordingly, the potential for tree damage is reduced and the potential for fungal, bacterial, and insect ingress is minimized (e.g., reduced or eliminated). In one example, the tip 9002 as well as the other tip examples described herein are readily used with plants having stems, trunks, limbs or the like having diameters larger than 4.68 mm including, but not limited to, fruit trees, nut trees, berry shrubs, flowering plants, as well as arbor and forest trees.

Conversely, the portion of the tip 9002 outside of the plant (e.g., including the tool base) is around 7 mm, and in one example is 7.08 mm. The access ports are optionally provided at a larger scale because of positioning outside of the plant. For instance, the access ports have a diameter of around 3.5 mm, and in one example have diameters of 3.30 mm. Optionally the access ports have an exterior dimension, such as height, length or the like of around 4 mm, and in one example are 4.26 mm and configured for coupling with tubing of approximately 4 mm in diameter. The example dimensions (including the dimensions for the tool body 9022 and tool base 9030) provided here are for one example of a tip, for instance tip 9002. The other injection tools or tips described herein and shown in the Figs. include, in various examples, similar dimensions to minimize trauma to the plant while at the same time facilitating administration to the vascular tissue of the plant.

In multiport injection tool Embodiments including cavities, such as the Embodiment of FIGS. 34-36, penetrating element 9028 may be sized and shaped to be inserted sufficiently deep into the trunk of a plant 9018 such that cavities 1116, 1117 are entirely within the trunk of the plant 9018. In further Embodiments, penetrating element 9028 is also sized to be less than the depth of sapwood in the stem of the plant. With cavities 1114, 1115 fully embedded in the plant, when fluid flows through distribution ports 9012, 1115 into cavities 1116, 1117, the cavities and plant material cooperate to form distribution reservoirs in which fluid can collect for uptake by the plant. In certain such Embodiments, the end of penetrating element 9028 does not extend beyond the sapwood of the plant. In Embodiments including a flange 9028, the base flange 9034 may be sized and shaped to mitigate the risk of inserting penetrating element 9028 beyond a desired depth in the trunk of the plant, for example beyond the inner edge of the sapwood into the heartwood.

In some Embodiments, for example in order to minimize damage to the tree while also maintaining efficient functionality, two or more multiport injection tips 9002 are used with a plant injection system rather than a single multiport injection tip 9002.

As discussed above, the multiport injection tool 9002 can be used in cooperation with a fluid receiving system as the basis for a method to confirm fluid flow from fluid delivery system 100, 200, 300 through the multiport injection tool 9002. With the injection system 9002 installed in a plant, in some Embodiments, the method comprises priming the multiport injection tool 9002 by activating fluid delivery device 100, 200, 300 with fluid receiving system 9004 in the closed position (for example by setting a shut-off valve on a hose connected to access port 9008 to the closed position; shown in FIG. 34 with broken line representations along the system 9004). Thereafter, fluid receiving system 9004 is set to the open position (for example by opening the shut-off valve) allowing fluid to flow through the fluid receiving system 9004. Flow of fluid through the fluid receiving system 9004 is an indicator that plant injection system 9002 is functional at least so far as having an open pathway for fluid to flow from fluid delivery device 100, 200, 300 through the multiport injector tool 9002 to the fluid receiving device 9004. After fluid flow is confirmed, the fluid receiving system 9004 is returned to the closed position and the plant injection system operates similarly to a systems herein having an injection tool with only a single (entry) access port. The initializing sequence involving priming the multiport injector tool 9002 (activating fluid delivery device 100, 200, 300 with fluid receiving device 9004 in a closed position) followed by evacuating fluid through the fluid receiving system (setting fluid receiving device to an open position) may also result in flushing at least a portion of intervening fluid, such as air, which may be present in the system, from the plant injection system and in particular from the multiport injector device 9002.

Figure 37:
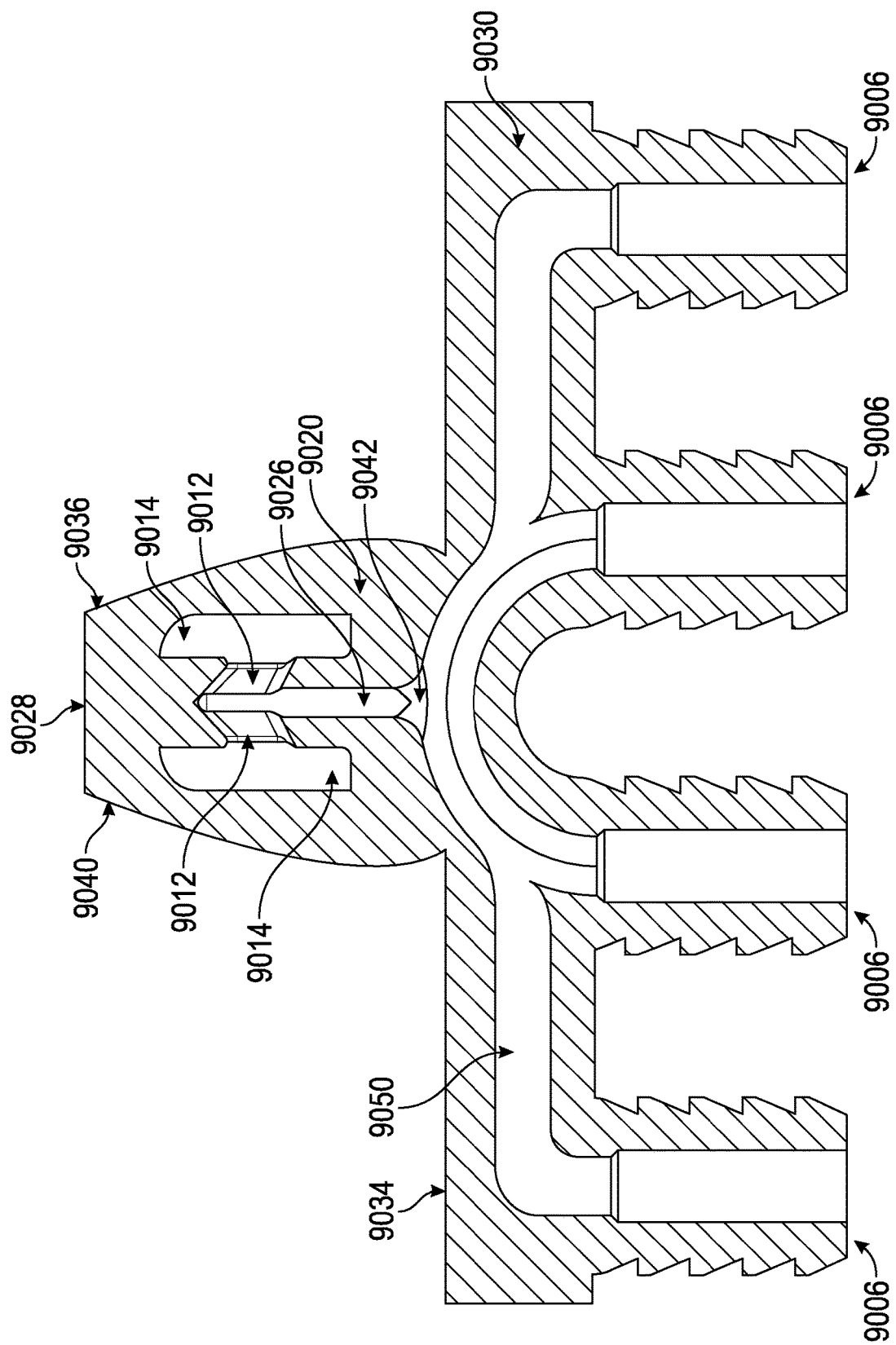
FIG. 37 is a cross sectional view of another example of a multiport injection tool.

FIG. 37 is a cross sectional view showing another example of an injection tool 9036 having a plurality of access ports 9006. The injection tool 9036 includes some features that are similar to those of the injection tool 9002 previously described herein. For example, the injection tool 9036 includes a tool body 9022 extending from a tool base 9030. The tool body 9022 includes a body profile 9040 (e.g., a wedge in this example) that tapers toward a penetrating element. Additionally, the tool body 9022 includes one or more distribution ports 9012 and optionally includes one or more distribution reservoirs 9014.

In the example shown in FIG. 37, the injection tool 9036 includes multiple (four) access ports 9006, and the ports 9006 are in fluid communication with a port manifold 9050. In a similar manner to the port manifold 9044 shown in FIG. 3 the port manifold 9050 interconnects the access ports 9006 with the distribution ports 9012, for instance by way of a delivery channel 9046 extending from the port junction 9042 with the port manifold 9050 to the distribution ports 9012 in the tool body 9022.

The access ports 9006 provide additional flexibility to facilitate the introduction of multiple AI formulations having varied compositions (e.g., fertilizers, herbicides, nutrients or the like) or the same composition to prolong the length of treatment with the plant injection system. Additionally, the access ports 9006 with the injection tool 9036 provide additional capabilities as previously described herein. These capabilities or configurations including initializing/bleed the plant injection system 9000 of intervening fluids, such as air bubbles; refilling of the formulation reservoir while the reservoir remains installed to the system to minimize leaking or exterior exposure to formulations; flushing of the system 9000 in preparation for administering an updated formulation; and extraction of fluids from the system 9000, such as plant fluids proximate to the distribution ports 9012 for testing or observation. Examples of these configurations are shown in FIGS. 37-41 for use with the injection tool 9002 and are similarly applicable to the injection tool 9036 and other injection tools within the scope of this disclosure.

Figure 38:
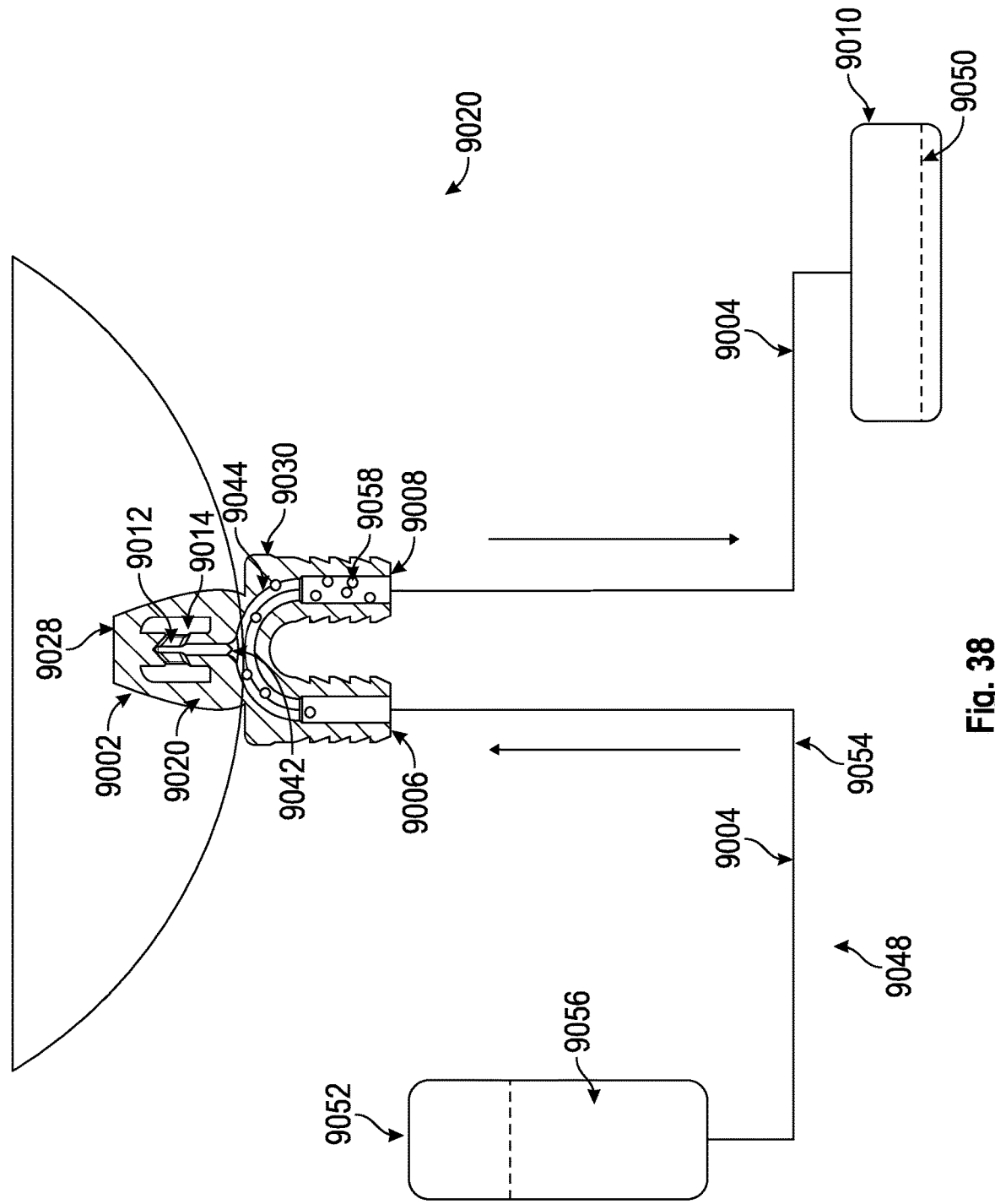
FIG. 38 is a schematic view of one example of an initializing configuration of the plant injection system of FIG. 34.

FIG. 38 shows one example of an initialization configuration 9048 for the plant injection system 9000. In this example, a supplemental access port 9006 (the right port in the Figure) is coupled with a drain reservoir 9060. An example composite solution 9050 such as AI formulation, intervening fluids including air, incidental plant fluids and residue formulations are shown with the broken line. A fluid coupling couples the drain reservoir with the access port 9006. The opposed (left) access port 9006 is coupled by the fluid coupling with an example formulation reservoir 9052 including a quantity of an AI formulation therein. The arrows included in FIG. 38 indicate the flow of the AI formulation during the initialization configuration through a 9054 including these features. As shown, the formulation network 9054 including the components shown delivers the AI formulation 9056 as well as flushed intervening fluids in an isolated manner that is not exposed to an exterior environment.

As further shown in FIG. 38, the AI formulation is delivered from the formulation reservoir and into the port manifold 9044 through the (left) access port 9006. An intervening fluid 9058, such as air bubbles, residual fluids or the like is entrained with the formulation and flushed from the injection tool 9002. For instance the composite solution 9050 of the AI formulation 9056 and the intervening fluid 9058 is delivered from the injection tool 9002 (through the manifold and the right access port 9006) to the drain reservoir 9060. After initializing the system 9000 as shown the AI formulation is primed in the injection tool 9002 and intervening fluids have been bled out to facilitate immediate operation of the plant injection system 9000.

Figure 39:
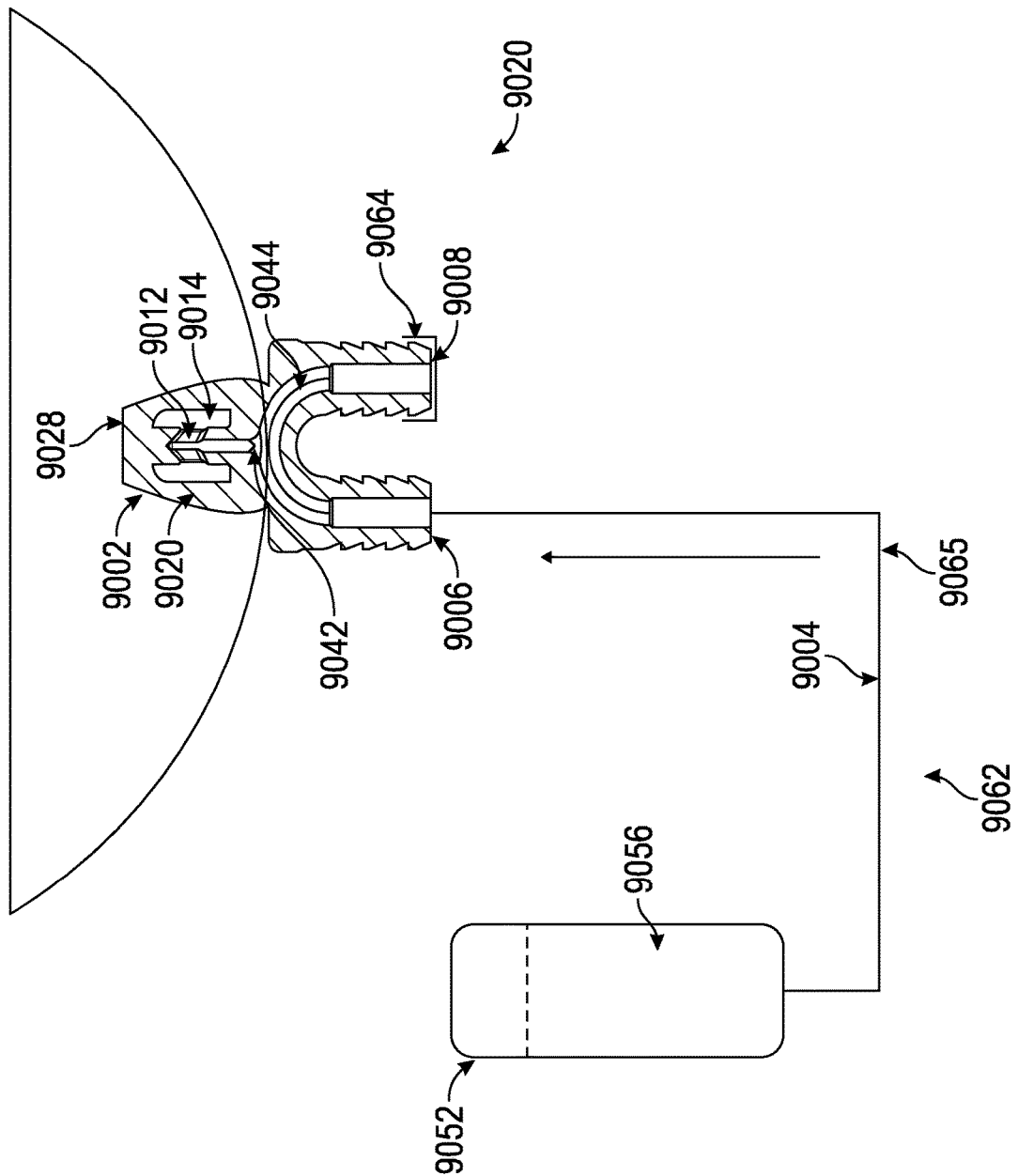
FIG. 39 is a schematic view of one example of an operating configuration of the plant injection system of FIG. 34.
Figure 40:
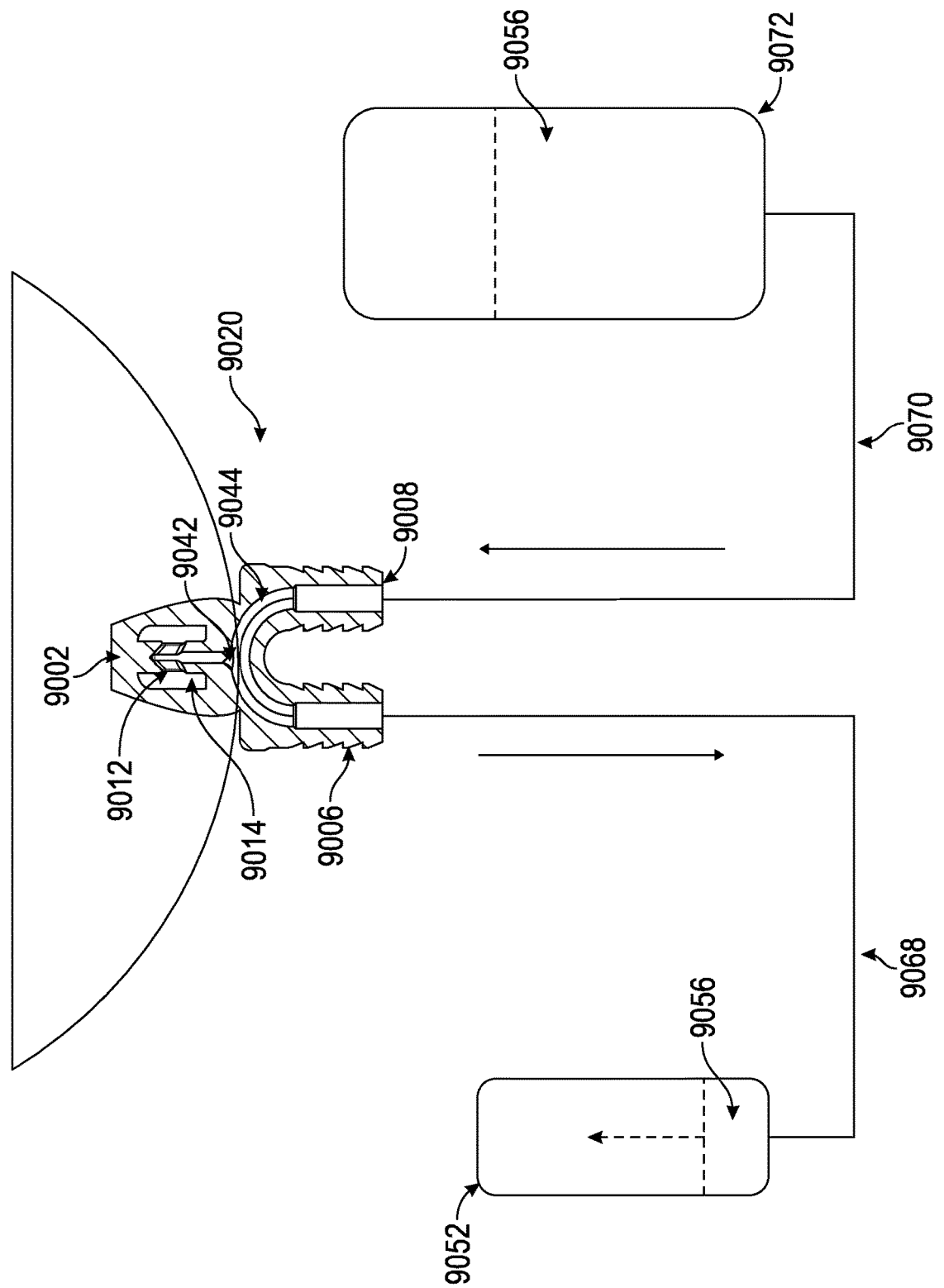
FIG. 40 is a schematic view of one example of a filling configuration of the plant injection system of FIG. 34.
Figure 41:
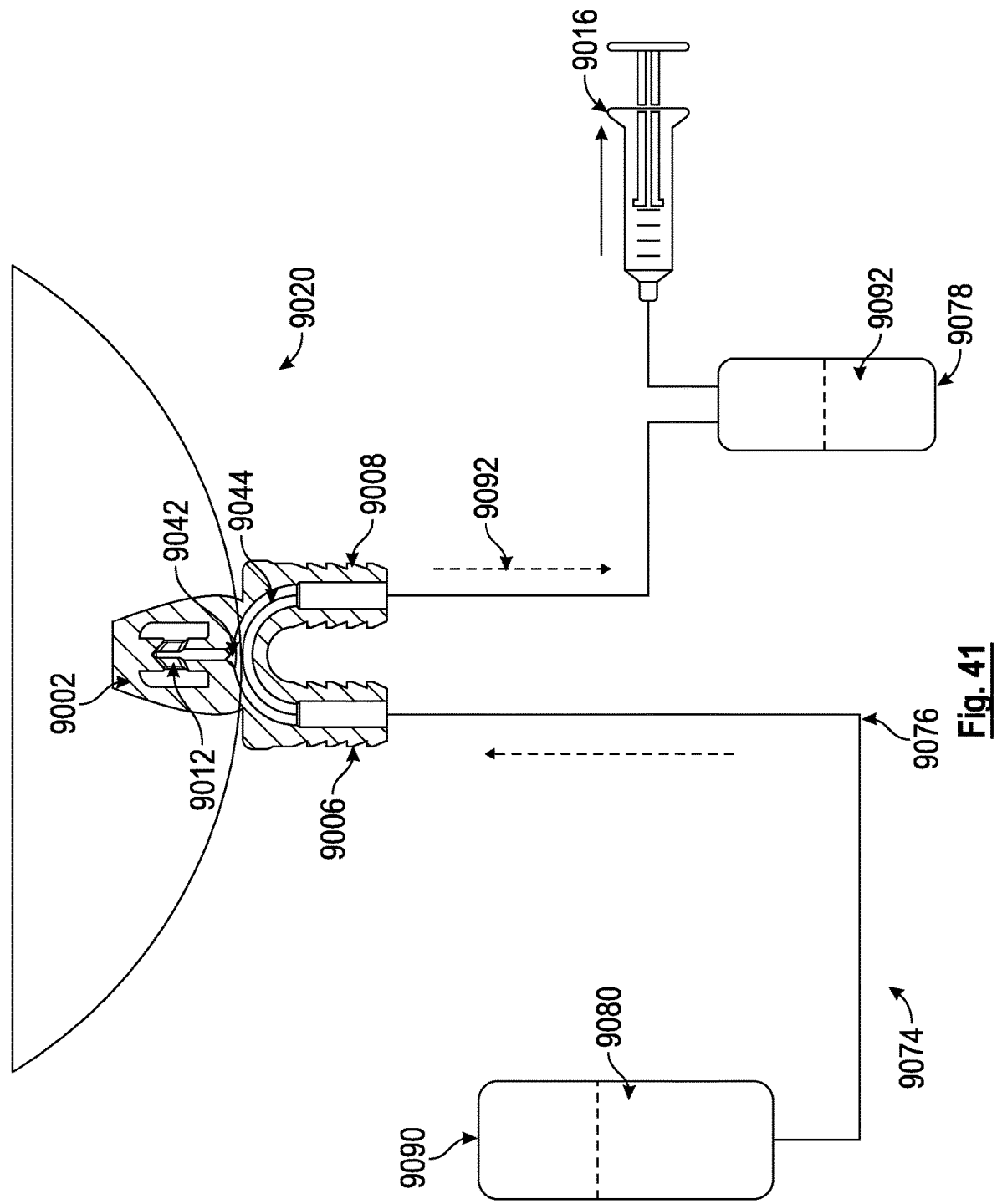
FIG. 41 is a schematic view of one example of an extraction configuration of the plant injection system of FIG. 34.

FIG. 39 shows one example of an operating configuration 9062 for the plant injection system 9000 including the multiport injection tool 9002. In this example, the access port (previously coupled with a drain reservoir) is closed, for instance with a closure 9064 element such as a valve, plug, cap or the like. The formulation reservoir 9052 is coupled with the fluid coupling to the access port 9006. Optionally, the previously described initialization configuration 9048 is completed and intervening fluids 9058 have been removed from the injection tool 9002.

Figure 68A:
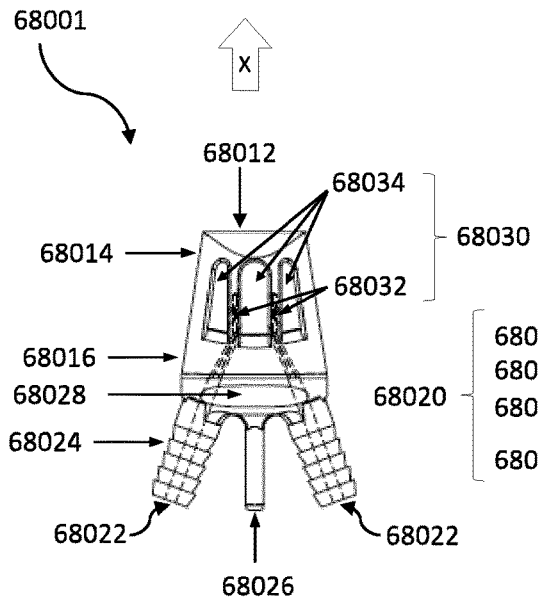
FIGS. 68A-B are front and perspective views of an example of a multiport injection tool.
Figure 68B:
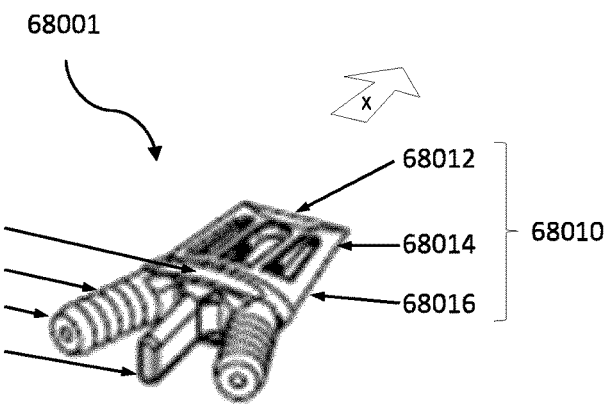

In the operating configuration 9062 the AI formulation 9056 is delivered through a formulation network 9065 that encloses the formulation and accordingly minimizes (e.g., reduces or eliminates) exposure of the formulation to an exterior environment. The AI formulation passes from the formulation reservoir 9052 to the injection tool 9002 through the access port 9006. At the injection tool 9002 the port manifold 9044 delivers the AI formulation 9056 to the delivery channel 9046 and the distribution ports 9012. With the injection tool 9002 installed to the plant 9018, the AI formulation 9056 is distributed to the plant for gradual uptake through the distribution ports 9012. Optionally, the injection tool 9002 includes one or more distribution reservoirs 9014. As previously described the distribution reservoirs receive the AI formulation from the distribution ports 9012 and retain the formulation therein for gradual uptake by the plant. The distribution reservoirs 9014 enhance the area of the plant exposed to the AI formulation 9056 and correspondingly enhance the uptake of the AI formulation.

FIG. 40 is another example of a configuration of the plant injection system 9000 including a refilling configuration 9068 and associated formulation network 9070 that isolates the AI formulation 9056 therein. In this example, a refill reservoir 9072 is coupled with the (right) access port 9006. The refill reservoir 9072 includes a quantity of the AI formulation and delivers the refill AI formulation to the access port 9006 as shown in FIG. 40. The refill AI formulation 9056 passes through the port manifold 9044 and follows the route with the least back pressure (e.g., resistance). The surrounding plant interior effectively closes the injection tool distribution ports 9012. Accordingly the refill AI formulation is delivered through the opposed (left) access port 9006 to the formulation reservoir 9052. The refill AI formulation is pressurized (e.g., with a mechanism associated with the refill reservoir 9072) and overcomes a counterpressure or force associated with the formulation reservoir 9052, for instance a spring bias, counterpressure from a compressed driving fluid in the reservoir 9052 or the like. As shown in FIG. 40, the AI formulation volume in the reservoir 9052 rises as the refill AI formulation is added.

The arrangement shown in FIG. 40 allows for the inline filling of formulation reservoirs 9052 without decoupling components from the plant injection system 9000 that may otherwise initiate leaking or evaporation of a formulation into the surrounding environment. Instead, the refill reservoir 9072 and the formulation reservoir 9052 are part of a closed formulation network 9070 that is routed through the injection tool 9002.

FIG. 41 is a schematic view of one example of an extraction configuration 9074 for the plant injection system 9020. In this example, a formulation network 9076 includes an extraction mechanism 9016 coupled with the injection tool 9002. In one example, the extraction mechanism 9016 includes a vacuum pump, syringe or the like in fluid communication with an extraction reservoir 9078. The extraction mechanism is coupled with one of the access ports 9006 (the right port in FIG. 41). Optionally, a flushing fluid reservoir 9090 including a quantity of a flushing fluid 9080, such as water, saline or other inert fluid is coupled with the opposed access port 9006 of the injection tool 9002.

In operation, the extraction mechanism 9016 generates a negative pressure in the closed formulation network 9076. The negative pressure draws fluid from the injection tool 9002, for instance within the distribution ports 9012, distribution reservoirs 9014 or the like (including plant fluids). The drawn fluid passes through the port manifold 9044 and to the access port 9006 associated with the extraction mechanism 9016. The drawn fluid is received at the extraction reservoir 9078 as the extracted fluid 9092. The optional flushing reservoir 9090 provides the flushing fluid 9080 to optionally enhance the delivery of the extracted fluid to the extraction reservoir 9078. In another example, the (left) access port 9006 is opened and the negative pressure generated with the extraction mechanism 9016 draws air through the open access port 9006 and into the port manifold 9044. The air passing through the manifold generates a negative pressure in the distribution ports 9012 (and optional distribution reservoirs 9014) and accordingly withdraws fluids therein to the port manifold. The fluids, such as plant fluids (extracted fluid 9092), are extracted to the extraction reservoir 9078 for collection. In the example including the opened access port 9006 the negative pressure minimizes (e.g., reduces or eliminates) the potential of leaking of residue formulation. Instead, air is readily drawn into the injection tool 102 and biases any residue formulation toward the access port 9006 fluidly coupled with the extraction mechanism 9016.

In another example, the flushing fluid reservoir 9090 having the flushing fluid 9080 is coupled with the access port 9006 as previously described. In this example, the extraction mechanism 9016 is operated and generates a negative pressure within the formulation network 9076. The flushing fluid 9080 is drawn through the network including intervening fluid couplings and the injection tool 9002. The flushing fluid (water, saline or the like) washes the injection tool 9002 and other components of the formulation network 9076. In one example the extraction configuration 9074, when used for flushing, removes residual formulations, particulate or obstructions from the components of the plant injection system 9020 and thereby readies the system 9020 for use with another AI formulation (e.g., in the manner of the operating configuration 9062).

FIGS. 68A-B, 69A-B, 70A-B, 71A-B, 72A-B, 73A-B, 74A-B, 75A-E, and 76A-C depict various exemplary multiport injection tools.

FIGS. 68A-B show a multiport injection tool 68001 having a wedge type body profile. In this example, multiport injection tool 68001 includes penetrating distribution body 68010 with a wedge type body profile extending along a longitudinal body axis, and base 68020. In this example, the penetrating element of injection tool 68001 has straight edges. Body 68010 includes a cutting element. For example, body 68010 includes cutting edge 68012, directed distally away from base 68010. Injection tool 68001 includes at least partially coextensive penetration and distribution elements. For example, the penetrating element extends from cutting edge 68012 and proximate to a distal portion 68014 of body 68010, to a proximal portion 68016 of body 68010 (proximal to base 68020). Multiport injection tool 68001 includes distribution elements 68030 which includes distribution ports 68032 and distribution reservoirs 68034, which provide cavities in penetrating distribution body 68010 for retaining active ingredient formulation along a plant tissue. Distribution ports 68032 are located the walls of distribution reservoir 68034. Active ingredient formulation flows from access ports 68022 (an example of an inlet port), directly to distribution ports 68032, and flows out of distribution ports 68032 in a direction transverse to penetrating direction "X" into three distribution reservoirs 68034 arranged side by side.

As depicted in FIGS. 68A-B, the width of the proximal portion 68016 of body 68010 lines up with the width of base 68020 in contact with the body. Base 68020 optionally includes ribbed outer structures 68024, such as attachment cleats, to facilitate grasping of the base and to securely connect injection tool 68001 with a delivery device. Base 68020 may optionally further include anchor leg 68026, which may assist with precisely installing the injection tools into the plant. Anchor leg is positioned along the penetration direction "X", between access ports 68022. Base 68020 optionally includes a groove 68028, which helps the injection tool follow the curvature of the plant so that the injection tool will penetrate the plant straight, along the curvature.

Although exemplary multiport injection tool 68001 is depicted as having a wedge type body profile with straight edges, two access ports, two distribution ports, and three distribution reservoirs, it is to be understood that the multiport injection tools of this disclosure may differ from multiport injection tool 68001 in various aspects.

In some embodiments, the penetrating element of the wedge type body profile may have straight edges, as shown in FIGS. 68A-B, 69A-B, and 70A-B. In some embodiments, the penetrating element of the wedge type body profile may have curved edges or tapered edges as shown in FIGS. 71A-B, 72A-C, 73A-B, 74A-D, 75A-E, and 76A-C. In some embodiments, the cutting element such as a cutting edge may be straight. In some embodiments, the cutting element such as a cutting edge may be curved. In some embodiments, the cutting element such as a cutting edge may be concave, for example as shown in FIGS. 76A-C.

In some embodiments, the injection tool may have one, two, three, or five distribution ports. In some variations, each distribution port is directly connected to an access port. In some variations, at least one distribution port is directly connected to an access port. In some variations, at least one distribution port is directly connected to more than one access port. In some variations, the connection between the access port and the distribution port is bent. In some variations, the connection between the access port(s) and the distribution port(s) is straight. In some variations, the connection between the access port(s) and the distribution port(s) occurs through an internal channel system (including a port manifold, a port junction, and a delivery channel, as described below). In some embodiments, the multiport injection tool includes one or multiple access ports that connect directly to one distribution port (e.g. without a port manifold, port junction, and delivery channel).

In other embodiments, the multiport injection tool may have two, three, four, five, or six distribution reservoirs. In some embodiments, distribution reservoirs receive active ingredient formulation from a distribution port connected to another distribution reservoir. In some embodiments, distribution reservoirs receive active ingredient formulation from a distribution port directly connected to an access port. In some embodiments, distribution reservoirs receive active ingredient formulation from a distribution port connected to an access port by an internal channel system.

Figure 69A:
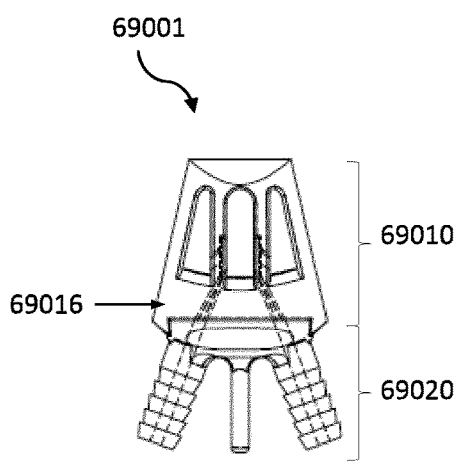
FIGS. 69A-B are front and perspective views of another example of a multiport injection tool.
Figure 69B:
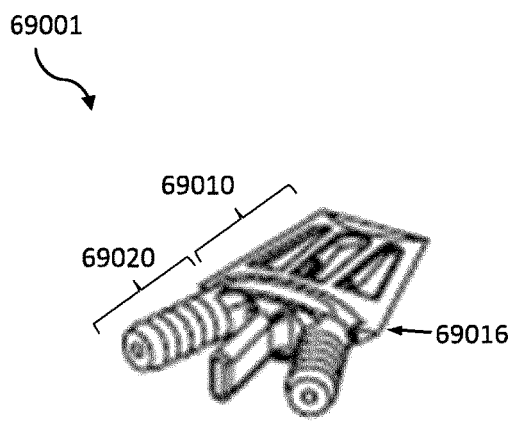

FIGS. 69A-B show a multiport injection tool 69001 having certain similar aspects as injection tool 68001 as illustrated in FIGS. 68A-B. In this example, the width of the proximal portion 69016 of body 69010 is greater than the width of base 69020 in contact with the body.

Figure 70A:
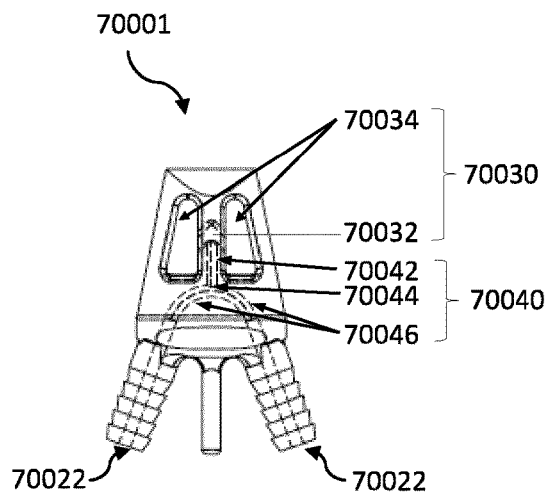
FIGS. 70A-B are front and perspective views of another example of a multiport injection tool.
Figure 70B:
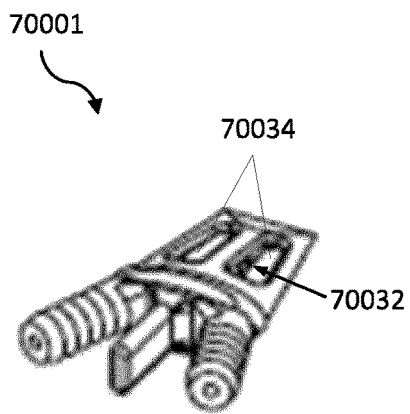

FIGS. 70A-B show a multiport injection tool 70001 having certain similar aspects as injection tool 68001 as illustrated in FIGS. 68A-B. In this example, injection tool 70001 includes internal channel system 70040, which includes delivery channel 70042, port junction 70044, and port manifold 70046. Port manifold 70046 interconnects the two inlet ports. Port junction 70044 is within port manifold 70046, and is connected to delivery channel 70042. Delivery channel 70042 extends from port junction 70044 of port manifold 70046 to distribution port 70032 of the body, which is located in a shared wall of distribution reservoirs 70034. Active ingredient formulation flows from access ports 70022, through port manifold 70046, through port junction 70044 to delivery channel 70042, which connects to distribution port 70032, and empties into two distribution reservoirs 70034 of the distribution element 70030.

Figure 71A:
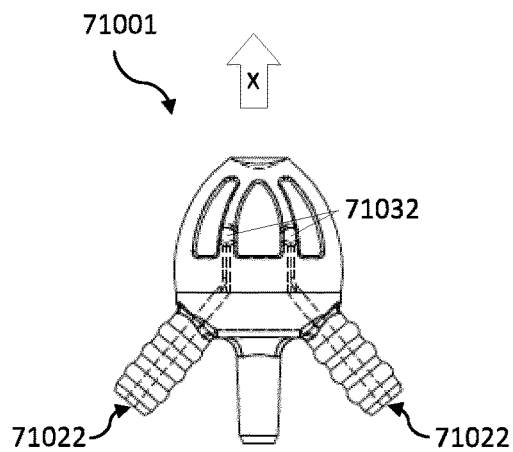
FIGS. 71A-B are front and perspective views of another example of a multiport injection tool.
Figure 71B:
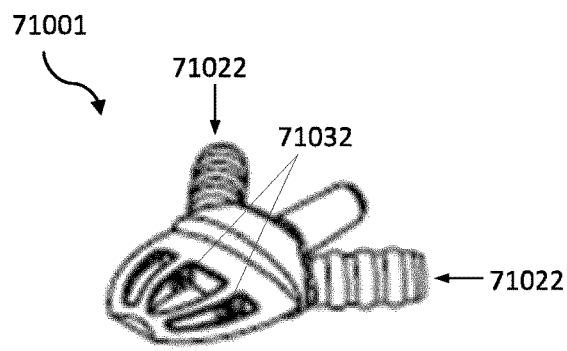

FIGS. 71A-B show a multiport injection tool 71001 having certain similar aspects as injection tool 68001 as illustrated in FIGS. 68A-B. However, this example lacks the groove illustrated in tool 68001. In this example, the penetrating element of injection tool 71001 has curved edges. Distribution ports 71032 of injection tool 71001 are circular in shape. Access ports 71011 are angled more steeply relative to the penetrating direction "X", and the connections between access ports 71022 and distribution ports 71032 are bent to a greater degree than the connections between access ports 68022 and distribution ports 68032 in tool 68001.

FIGS. 72A-C show a multiport injection tool 72001 having certain similar aspects as injection tool 71001 as illustrated in FIGS. 71A-B. In this example, injection tool 72001 includes internal channel system 72040, which includes delivery channel 72042, port junction 72044, and port manifold 72046. Port manifold 72046 interconnects the two access ports. Port junction 72044 is within port manifold 72046, and is connected to delivery channel 72042. Delivery channel 72042 extends from port junction 72044 of port manifold 72046 to central distribution port 72032 of the body. Active ingredient formulation flows from access ports 72022, through port manifold 72046, through port junction 72044 to delivery channel 72042, which connects to one of three distribution ports 72032. In this example, tool 72001 has four distribution reservoirs 72034; two receive active ingredient formulation through a distribution port 72032 connected to an access port 72022 by the internal channel system 72040, and the remaining two receive active ingredient formulation through distribution ports 72032 that are connected to adjacent distribution reservoirs 72034.

FIGS. 73A-B show a multiport injection tool 73001 having certain similar aspects as injection tool 72001 as illustrated in FIGS. 72A-B. In this example, delivery channel 73042 connects to one of five distribution ports 73032. Tool 73001 has six distribution reservoirs 73034; two receive active ingredient formulation through a distribution port 73032 connected to an access port 73022 by the internal channel system 73040, and the remaining four receive active ingredient formulation through distribution ports 73032 that are connected to adjacent distribution reservoirs 73034

Figures 74A, 74B, 74C:
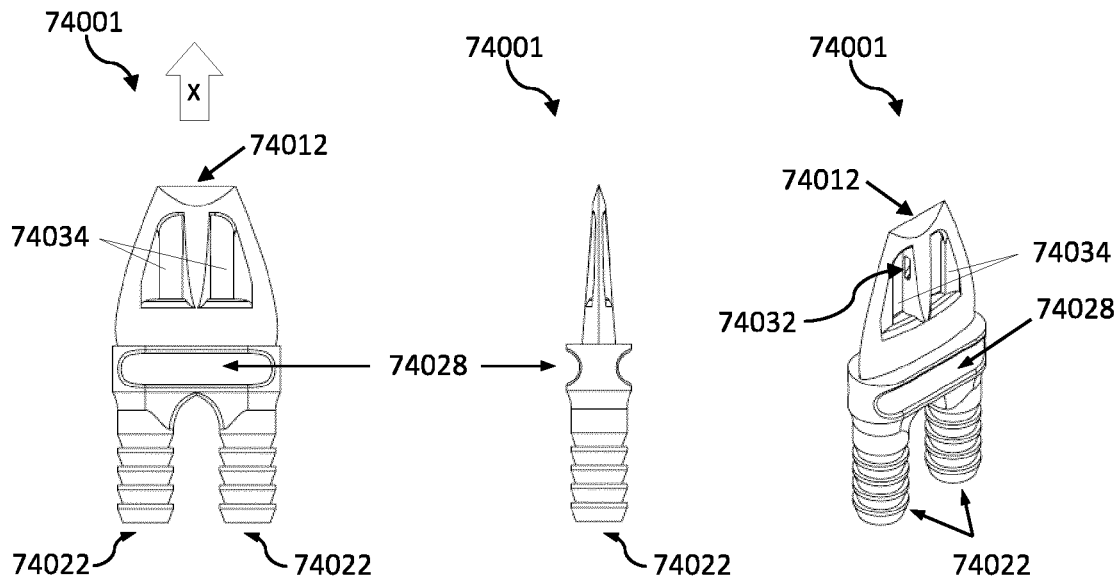
FIGS. 74A-C are front, side, and perspective views of another example of a multiport injection tool.

FIGS. 74A-C show a multiport injection tool 74001 illustrating groove 74028. This groove is present to connect with a tip adapter and/or tip setter, as described herein. Further, in this example, access ports 74032 are aligned with the penetrating direction "X". In this embodiment, no anchor leg is present between access ports 74022. Distribution ports 74032 are positioned in a shared wall of distribution reservoirs 74034, proximal to cutting element 74012.

Figures 75A, 75B:
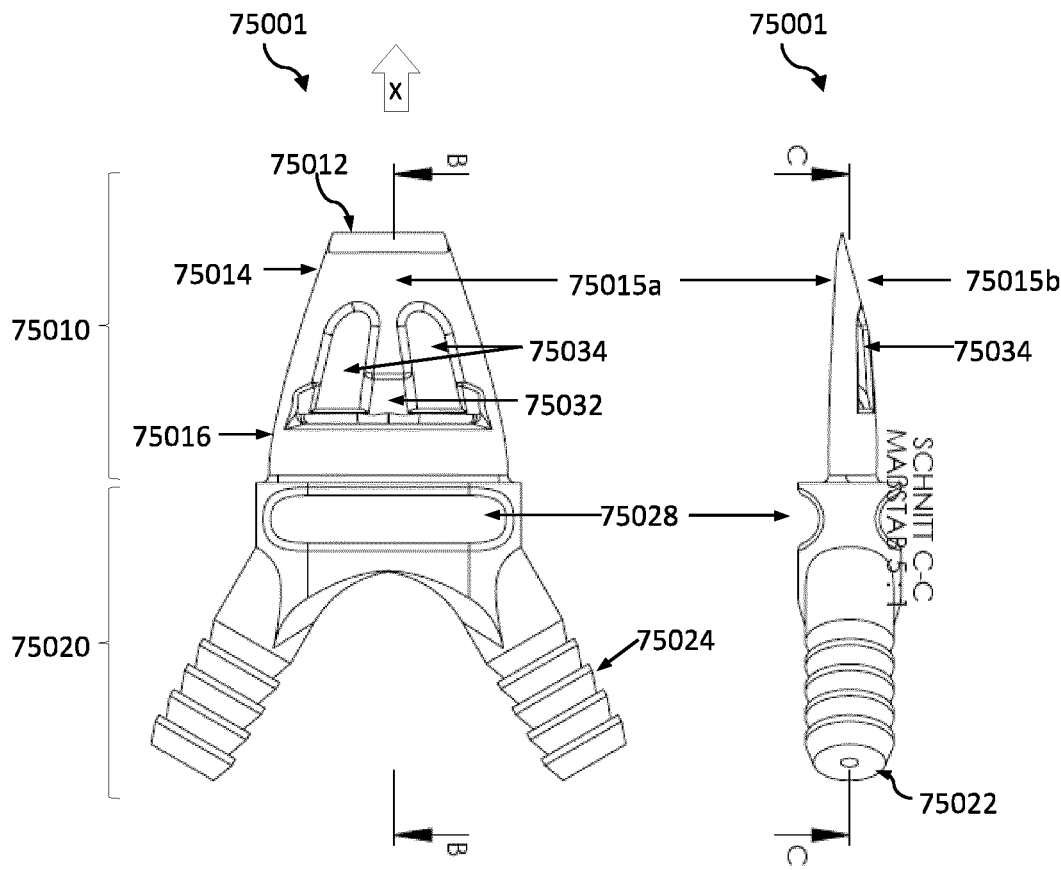
FIGS. 75A-B are front and side views of another example of a multiport injection tool.

FIGS. 75A-E show a multiport injection tool 75001 having a wedge type body profile. FIG. 75A is a front view of tool 75001. FIG. 75B is a side view of tool 75001. FIG. 75C is a cross-section taken along line C-C in FIG. 75B. FIG. 75D is a cross-section view taken along line B-B in FIG. 75A. FIG. 75E is a three-dimensional rendering of tool 75001. In this example, multiport injection tool 75001 includes penetrating distribution body 75010 and base 75020. In this example, the penetrating distribution body 75010 has a curved or concave shape, with flat front face 75015a and curved back face 75015b. Body 75010 includes a cutting element. For example, body 75010 includes cutting edge 75012, directed distally away from base 75010. Injection tool 75001 includes at least partially coextensive penetration and distribution elements. For example, the penetrating element extends from cutting edge 75012, along a distal portion 75014 of body 75010, to a proximal portion 75016 of body 75010 (proximal to base 75020). Multiport injection tool 75001 includes distribution elements 75030 which includes distribution port 75032 and distribution reservoirs 75034, which provide cavities in penetrating distribution body 75010 for retaining active ingredient formulation along a plant tissue. Distribution port 75032 is located in a shared wall of distribution reservoirs 75034, proximal to base 75020. Active ingredient formulation flows from access ports 75022, directly to a single distribution port 75032, and flows out of distribution port 75032 in a direction transverse to penetrating direction "X", and into distribution reservoirs 75034.

As depicted in FIGS. 75A-B, the width of the proximal portion 75016 of body 75010 is smaller than the width of base 75020 in contact with the body. Base 75020 optionally includes ribbed outer structures 75024, such as attachment cleats, to facilitate grasping of the base and to securely connect injection tool 75001 with a delivery device. Base 75020 optionally includes a groove 75028, which helps the injection tool follow the curvature of the plant so that the injection tool will penetrate the plant straight, along the curvature.

FIGS. 76A-C show a multiport injection tool 76001 having certain similar aspects as injection tool 70001 depicted in FIG. 70A-B. In this example, the penetrating element of injection tool 76001 has curved edges. Cutting edge 76012 is concave with respect to the penetrating distribution body. In this example, access ports 76022 are aligned with the penetrating direction X, and no anchor leg is present between access ports 76022. As depicted in FIGS. 76A-C, the width of the proximal portion 76016 of body 76010 is significantly smaller than the width of base 76020 in contact with the body.

A number of multiport injector tool, plant systems including multiport injector tips, and methods of using the multiport injector tool and systems comprising the multiport injector tool Embodiments have been described. However, a person of skill can understand from a reading of this disclosure that still other Embodiments are encompassed by this disclosure. Non-limiting examples of methods and devices within scope of this disclosure include the following Aspects:

Aspect 1. An injection tool adapted for use with a plant injection system, comprising: a tool body having an insertion end and an exposed end, wherein at least a portion of the tool body is sized and shaped for insertion into a trunk of a plant, the tool body comprising a channel system terminating in one or more distribution ports located in the insertion end, and at least a first access port and a second access port both located in the exposed end, the channel system providing fluid communication between the one or more distribution ports and the first and second access ports.

Aspect 2. An injection tool according to Aspect 1, further comprising: a first fitting concentric with the first access port; and, a second fitting concentric with the second access port.

Aspect 3. An injection tool according to Aspect 2, wherein when in use, at least the insertion end of the tool body is located in the trunk of the plant and at least a portion of the first fitting and at least a portion of the second fitting are external to the trunk of the plant.

Aspect 4. An injection tool according to Aspect 3, wherein when in use the insertion end is located in the trunk of the plant and the exposed end is located outside of the trunk of the plant.

Aspect 5. An injection tool according to Aspect 3, wherein when in use the insertion end and the exposed end are located in the trunk of the plant.

Aspect 6. An injection tool according to any of Aspects 1-5, wherein the tool body defines one or more cavities, each of the one or more cavities associated with at least one of the one or more distribution ports thereby providing fluid communication between each of the one or more cavities and the channel system.

Aspect 7. An injection tool according to Aspect 6, wherein the one or more cavities is a first cavity and at least one of the one or more distribution ports is located in a wall of the first cavity providing fluid communication between the first cavity and the channel system.

Aspect 8. An injection tool according to Aspect 6, wherein the one or more cavities is a first cavity and a second cavity and the one or more distribution ports is a first distribution port and a second distribution port and the first distribution port is located in a wall of the first cavity providing fluid communication between the first cavity and the channel system and the second distribution port is located in a wall of the second cavity providing fluid communication between the second cavity and the channel system.

Aspect 9. An injection tool according to any of Aspects 1-8, wherein the tool body comprises a penetrating element at the insertion end and a tool base at the exposed end, and further wherein the penetrating element defines the one or more cavities and the tool base comprises the first fitting and the second fitting.

Aspect 10. An injection tool according to Aspect 9, wherein the tool body comprises a penetrating element at the insertion end and a tool base at the exposed end, the one or more cavities is a first cavity and a second cavity, the one or more distribution ports is a first distribution port located in a wall of the first cavity and a second distribution port located in a wall of the second cavity, the penetrating element defines the first cavity and the second cavity and the tool base comprises the first fitting and the second fitting.

Aspect 11. An injection tool according to any of Aspects 9 and 10, wherein the penetrating element has a profile and the one or more distribution ports are recessed from the penetrating element profile.

Aspect 12. An injection tool according to any of Aspects 1-11, wherein the tool body further comprises a flange delineating the exposed end from the insertion end (and with respect to Aspects 9-11 located at the top of and part of the tool base delineating the tool base from the penetrating element), which flange is configured to mitigate against exposed end (and with respect to Aspects 9-11, the tool base) penetrating the trunk of the plant.

Aspect 13. An injection tool according to any of Aspects 1-12, wherein the injection tip is sized and shaped for insertion into a small diameter plant chosen from saplings, yearlings and vines.

Aspect 14. An injection tool according to any of Aspects 1-12, wherein the diameter of the plant is up to about 0.20 inches.

Aspect 15. An injection tool according to any of Aspects 1-14, wherein the portion of the tool body located in the trunk of a tree in use has a length and the length is less than the expected thickness of sapwood in the plant targeted for injection with the injection tool.

Aspect 16. An injection tool according to Aspect 12, wherein the penetration element has a length measured from the top of the penetration element to the top of the flange, and the length is less than the expected thickness of sapwood in the plant targeted for injection with the injection tool.

Aspect 17. An injection tool according to any one of Aspects 12 or 16, wherein the penetrating element has a width, and the length of the penetrating element ranges from about 0.15 inches to about 0.20 inches and the width of the penetrating element ranges from about 0.15 inches to about 0.20 inches.

Aspect 18. An injection tool according to Aspect 17, wherein the length of the penetrating element is about 0.17 inches and the width of the penetrating element is about 0.18 inches.

Aspect 19. An injection tool according to any of Aspects 1-18, wherein the tool body is formed as a one-piece unit. For example, the tool body can be made using 3D printing.

Aspect 19b. An injection tool according to any of Aspects 1-19, further comprising an anchor leg.

Aspect 19c. An injection tool according to Aspect 19b, wherein the anchor leg is connected to the exposed end of the tool body.

Aspect 19d. An injection tool according to Aspect 19b, wherein the anchor leg is positioned in the middle of the tool base.

Aspect 20. A trunk injection system comprising: an injection tool according to any of Aspects 1-19d; a fluid delivery system attachable to the injection tip by way of the first port; and, a fluid receiving system in fluid communication with the second port Aspect 21. A trunk injection system according to Aspect 20, wherein the fluid receiving system has an open position in which fluid can flow into the fluid receiving system and be evacuated from the plant injection system, and a closed position in which fluid is retained in the fluid receiving system.

Aspect 22. A trunk injection system according to any of Aspects 20-21, wherein the fluid delivery system comprises a source of liquid supply and an actuator for forcing at least a portion of the liquid supply from the source to the injector tool through the first port.

Aspect 23. A trunk injection system according to Aspect 22, wherein the actuator comprises the source of liquid supply.

Aspect 24. A trunk injection system according to any of Aspects 20-23, wherein the fluid receiving system comprises a hose line and a valve at a distal end of the hose line away from the injection tool, wherein in the valve has a closed position and an open position and in the closed position, the valve prevents fluid from flowing out of the distal end of the tube.

Aspect 25. A method of injecting a trunk of a plant with a formulation using a trunk injection system according to any of Aspects 20-24, comprising: installing an injection tip according to any of Aspects 1-19 into a trunk of a plant; initializing the trunk injection system to confirm fluid delivery to the plant through the injection tip, comprising delivering fluid to the injection tip through the first port, wherein the fluid receiving system is in the closed or open position, and confirming fluid flow into the fluid receiving system; and, operating the trunk injection system with the fluid receiving system in the closed position.

Aspect 26. A method of injecting a trunk of a plant with a formulation using a trunk injection system according to any of Aspects 20-24, comprising: installing an injection tip according to any of Aspects 1-19d into a trunk of a plant; delivering fluid to the first port with the fluid receiving system in the closed position to prime the injection tip; setting the fluid receiving system to the open position thereby evacuating at least a portion of intervening fluid, if any, and confirming fluid flow to the second port; thereafter, setting the fluid receiving system to the closed position.

Aspect 27 provides a plant injection system comprising: a formulation reservoir configured to contain an active ingredient (AI) formulation; a multiport injection tool in fluid communication with the formulation reservoir, the multiport injection tool includes: a tool body configured to penetrate a plant, the tool body includes a delivery channel and one or more distribution ports; a plurality of access ports including at least first and second access ports, and at least the first access port is in communication with the formulation reservoir; and a port manifold fluidly interconnecting the delivery channel and the plurality of access ports; and wherein the plant injection system includes initialization and operating configurations: in the initialization configuration the multiport injection tool is filled with the AI formulation through the first access port and the port manifold and intervening fluids are evacuated from the multiport injection tool through the second access port; and in the operating configuration the AI formulation is delivered through the first access port and the port manifold to the one or more distribution ports.

Aspect 28 provides the plant injection system of Aspect 27, wherein the port manifold includes a port junction interconnecting the delivery channel and the one or more distribution ports with the remainder of the port manifold.

Aspect 29 provides the plant injection system of any one Aspects 27 or 28, wherein the multiport injection tool includes a tool base coupled with the tool body, and the tool base includes the plurality of access ports and the port manifold.

Aspect 30 provides the plant injection system of any one of Aspects 27-29, wherein the second access port is closed in the operating configuration with a closure element.

Aspect 31 provides the plant injection system of any one of Aspects 27-30, wherein the tool body includes: a penetrating element configured to penetrate the plant; and a body profile extending form the penetrating element.

Aspect 32 provides the plant injection system of Aspect 31 comprising a tool base having a base flange, and the body profile of the tool body tapers from proximate the base flange toward penetrating element.

Aspect 33 provides the plant injection system of any one of Aspects 31 or 32, wherein the tool body includes one or more distribution reservoirs in communication with the one or more distribution ports, and the one or more distribution reservoirs extend along the body profile of the tool body.

Aspect 34 provides the plant injection system of any one of Aspects 27-33 comprising a formulation network, the formulation network includes the formulation reservoir, the plurality of access ports and the port manifold, and the formulation network is isolated from an exterior environment in each of the initialization and the operating configurations.

Aspect 35 provides the plant injection system of any one of Aspects 27-35 comprising a drain reservoir in communication with the second access port, and the drain reservoir is configured to receive the intervening fluids evacuated from the multiport injection tool through the second access port.

Aspect 36. A multiport injection tool comprising: a tool body configured to penetrate a plant with a penetrating element, the tool body includes: one or more distribution ports configured to distribute an active ingredient (AI) formulation to a plant interior; and a delivery channel extending through the tool body to the one or more distribution ports; a plurality of access ports including at least first and second access ports configured to receive the AI formulation and deliver the AI formulation toward the one or more distribution ports; and a port manifold extending between the plurality of access ports and the delivery channel.

Aspect 37 provides the multiport injection tool of Aspect 36, wherein the port manifold includes a port junction interconnecting the delivery channel and the one or more distribution ports with the remainder of the port manifold.

Aspect 38 provides the multiport injection tool of Aspect 37 comprising a tool base coupled with the tool body, and the tool base includes the plurality of access ports and the port manifold.

Aspect 39 provides the multiport injection tool of Aspect 38, wherein the tool base includes a base flange extending away from the tool body.

Aspect 40 provides the multiport injection tool of any one of Aspects 36-39, wherein the tool body includes: a penetrating element configured to penetrate the plant; and a body profile extending form the penetrating element.

Aspect 41 provides the multiport injection tool of Aspect 40, wherein the body profile tapers toward the penetrating element.

Aspect 42 provides the multiport injection tool of any one of Aspects 36-41, wherein the tool body includes one or more distribution reservoirs in communication with the one or more distribution ports, and the one or more distribution reservoirs extend along a body profile of the tool body.

Aspect 43 provides the multiport injection tool of Aspect 42, wherein the one or more distribution ports are within the tool body and recessed from the body profile.

Aspect 43b provides the multiport injection tool of any one of Aspects 36-43, further comprising an anchor leg.

Aspect 43c provides the multiport injection tool of Aspect 43b, wherein the anchor leg is connected to the exposed end of the tool body.

Aspect 19d provides the multiport injection tool of Aspect 43b, wherein the anchor leg is positioned in the middle of the tool base.

Aspect 44 provides a method for using a plant injection system comprising: installing a multiport injection tool in a plant including penetrating the plant with a tool body having one or more distribution ports, the multiport injection tool including at least first and second access ports; initializing the multiport injection tool in an initialization configuration, initializing includes: delivering an active ingredient (AI) formulation through the first access port; and evacuating intervening fluids from the multiport injection tool through a second access port in fluid communication with the first access port with a port manifold; and operating the plant injection system in an operating configuration, operating includes: closing the second access port; and delivering the AI formulation through the first access port and the port manifold to the one or more distribution ports.

Aspect 45 provides the method of Aspect 44 comprising isolating the AI formulation from an exterior environment of the multiport injection tool in each of the initialization and operating configurations.

Aspect 46 provides the method of any one of Aspects 44-45, wherein evacuating intervening fluids includes evacuating one or more of air, plant fluids or previous formulations from the multiport injection tool.

Aspect 47 provides the method of any one of Aspects 44-46, wherein a formulation reservoir containing the AI formulation is in communication with the first access port, and comprising: refilling the formulation reservoir with the multiport injection tool in a refilling configuration, refilling includes: coupling the second access port with a refill reservoir; delivering AI formulation through the second access port and the port manifold; and refilling the formulation reservoir through the first access port.

Aspect 48 provides the method of any one of Aspects 44-47, comprising extracting a fluid from the multiport injection tool, extracting includes: opening each of the first and second access ports; and drawing a fluid from one of the first or second access ports.

Aspect 49 provides the method of Aspect 48, wherein the fluid includes a plant fluid, and the one or more distribution ports are proximate the plant fluid; and wherein drawing the fluid includes drawing the plant fluid through the one or more distribution ports with a negative pressure applied to the respective first or second access port.

Aspect 50 provides the method of any one of Aspects 48 or 49, wherein the fluid includes a flushing fluid, and one of the first or second access ports are in communication with the flushing fluid; and comprising delivering the flushing fluid through the respective first or second access port to the port manifold; and wherein drawing the fluid from one of the first or second access ports includes drawing the flushing fluid from the other of the first or second access port opposed to the delivered flushing fluid.

Aspect 51 provides the method of any one of Aspects 44-50 comprising operating the plant injection system in a second operating configuration including: opening the second access port; and delivering a second AI formulation through the second access port and the port manifold to the one or more distribution ports.

Each of the injection tools described herein, if not already configured, may be modified to be secured into a plant such that the insert portion is not readily linearly extractable out of the plant when the insert portion is inserted into the plant. Accordingly, injection tools in one example may include one or more anchoring features that retain the injection tool in the installed configuration and resist incidental removal of the tool. Retaining the injection tool in the installed configuration further minimizes (e.g., reduces or eliminates) leaking or exposure of the active ingredient formulation to an exterior environment. Additionally, retention of the injection tool with one or more anchors facilitates implementation of the plant injection system with a long-term set injection tool while allowing for replaceable formulation cartridge(s). In one example, threading or beads are provided along the perimeter of the distribution shaft and provide a firm or non-removable engagement with the plant upon installation with of the injection tool.

In each of the injection tools described herein including, but not limited to, injection tools 300, 400, liquid formulations are delivered under passive or active pressures through the ports 414 for uptake by a plant. As previously described herein, in one example, the liquid formulations are provided by way of an 'active' pressure, for instance, by way of a pump, bladder or the like that pressurizes the liquid formulation to a specified pressure and provides the liquid formulations to one or more injection tools such as the injection tool 400 for distribution through the ports 414 and the reservoirs 422. In another example, the liquid formulations are delivered in a 'passive' manner to the injection tool 400, for instance, by way of hydrostatic pressure, capillary action or the like. The liquid formulations are received in the distribution reservoirs 422 (in FIG. 33) and the plant tissue absorbs the liquid formulation over time. In each of the designs including one or more distribution ports retained within the plant the liquid formulations are, in one example, provided passively to the plant tissue. Accordingly, pressurizing of the fluid and corresponding leaks or the like are minimized (e.g., eliminated or minimized). Instead, the injection tool, in combination with the plant tissue, provides a sealed or closed environment for residence of the liquid formulations within the plant tissue. The residence of the liquid formulations, delivered for example under passive pressure, facilitates the distribution of the liquid formulation to the plant tissue and absorption through the plant tissue without otherwise actively pressurizing the fluid in a manner that may increase the change of damage to the plant, leaking from the plant or the like.

Delivery Devices

In another aspect, the disclosure is a plant injection system for introducing a liquid active ingredient formulation into a plant. The system comprises an injection tool as described above and a delivery device. The delivery device is configured to be connected to the injection tool to deliver the active ingredient formulation to the injection tool. Such system allows for efficiently providing the liquid active ingredient formulation into the plant for treating it.

The delivery device is designed as a pneumatically or hydraulically operated dosing pump configured to administer a fluid formulation (e.g., a fluid including one or more of a liquid, gas, gel, vapor, aerosol or the like). Alternatively, the delivery device is designed as a pneumatic or hydraulic delivery pump configured to provide one or more pressures. In some examples, the pressures provided are proximate to but greater than ambient pressure to provide gradual low pressure delivery of the formulation to a plant. In another example, the delivery device provides the liquid formulation in a passive manner, for instance by way of hydrostatic pressure or capillary action.

The delivery device is, in one example, designed as a two-chamber assembly, wherein two chambers are arranged in a container, of which one chamber contains a pressure medium and the other contains an active ingredient formulation which can be expelled from the two-chamber assembly through a valve by the pressure medium.

In certain embodiments, the delivery device includes a fluid delivery unit, and the source of the liquid formulation are integrated into a formulation cartridge, such as a pressurized container. In certain variations, the formulation cartridge is a pressurized canister. In operation, the liquid formulation flows from the fluid delivery unit through the injection tool into the plant.

In certain embodiments, the injection systems or components thereof used in the methods described herein are as depicted in the figures. In some embodiments, the systems are configured to administer liquid formulation comprising one or more active ingredients (including, for example, nutrients) to a plant or a part thereof. In certain embodiments, such systems are mounted onto a post portion of a plant, for example to a trunk of the tree.

In certain embodiments, the methods provided herein include installing an injection tool in the trunk, stem, root or limb of a plant, operatively connecting the injection tool to a fluid delivery unit, and activating the fluid delivery unit to initiate the flow of fluid from the fluid delivery unit through the injection tool and into the plant. In other embodiments, two or more injection tools are installed into one or more of the stem, trunk, roots, limbs or the like of a plant to minimize trauma to the plant (e.g., by minimizing the size of a unitary hole in the plant or spacing the tools apart along the plant). In some such embodiments, the two or more injection tools are operatively connected to the same fluid delivery unit. In other such embodiments the two or more injection tools are operatively connected to independent fluid delivery unit.

In some variations, the fluid delivery unit comprises a spring-loaded fluid delivery unit. In certain variations of the foregoing, the spring-loaded fluid delivery unit is configured to operate at a pressure between 1.5-3 bar. In other variations, the fluid delivery unit comprises a fluid delivery unit comprising a pressurized container (e.g., a pressurized canister). Examples of suitable fluid delivery unit include the variations depicted in FIGS. 60-67 and 77.

With reference to FIG. 77, depicted is an exemplary spring-loaded fluid delivery unit 9900. Base 9912 holds two springs 9908 within syringes 9910. A piston with a rubber seal divides the liquid formulation from the spring chamber. Attached to each syringe body 9910 is a tube 9904 connected to a t-shaped connector 9902. The injection tip (not depicted in FIG. 77) is connected to the connector 9902. The spring-loaded fluid delivery unit 9900 can be filled through connector 9902.

In other exemplary embodiments, the spring-loaded fluid delivery unit may have a base holding one or multiple springs within one or multiple corresponding syringes. The design of the spring-loaded fluid delivery unity may vary based on the pressure, volume, time or other appropriate parameters to deliver the liquid formulation. For example, in some variations, multiple springs (such as a dual spring) may be employed in the fluid delivery unit to allow for injection of a higher volume of the liquid formulation. In other variations, a single spring with a larger syringe may be used, but may affect pressure range employed to inject the liquid formulation.

Various exemplary embodiments of delivery devices are described in further detail below.

a) Pneumatic Pump Assembly

Figure 4:
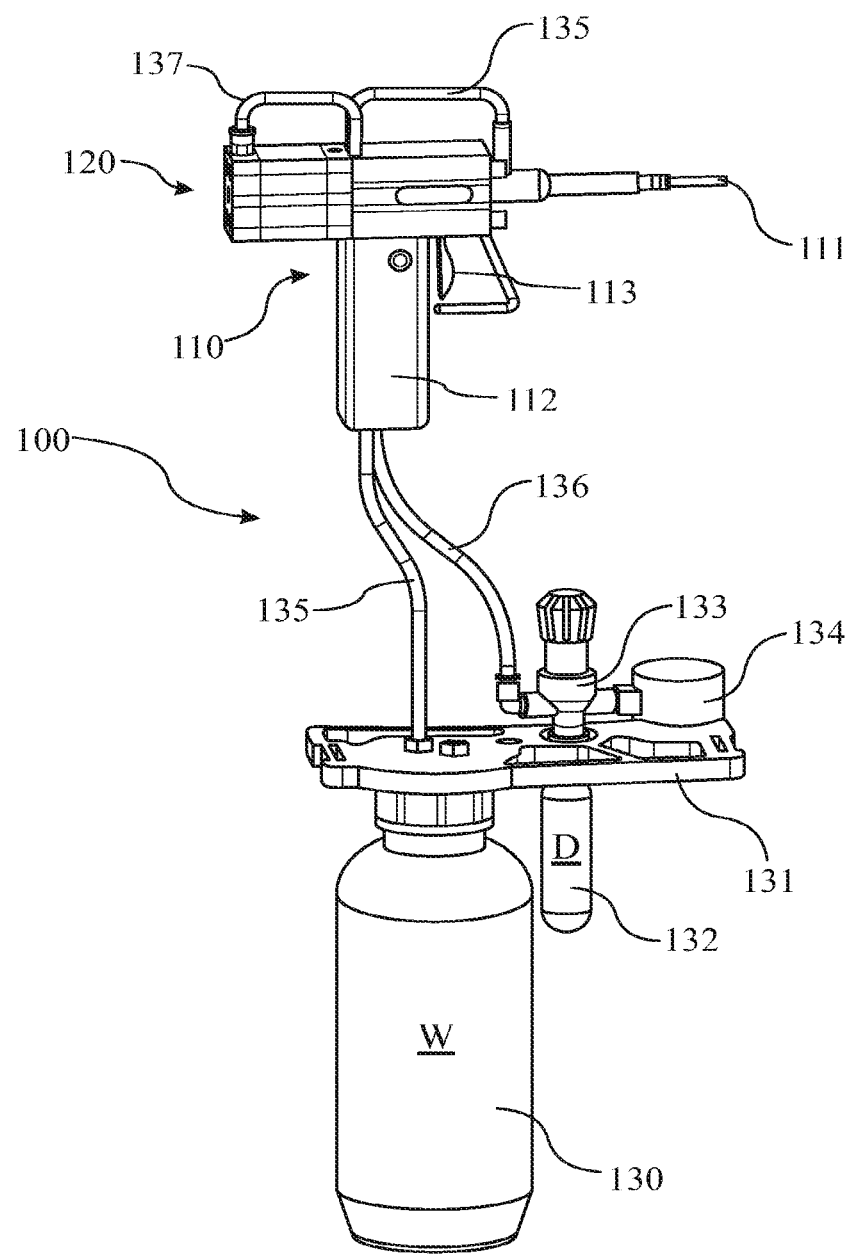
FIG. 4 shows an overall view of the first embodiment of the delivery device of the injection system of FIG. 1.

The first embodiment of a delivery device 100 shown by way of example in FIG. 4 comprises a container 130, in which a liquid active ingredient formulation W is kept stored, and a dosing device 110, shaped in this example in a pistol profile and with which a dosed quantity of active ingredient formulation is dispensed under pressure into the injection tool, for instance one or more of the injection tools described herein.

In the example shown in FIG. 4, a carrier plate 131 is secured on the container 130, on which carrier plate 131 a cartridge 132 with a pressurized gas D, e.g. $CO_2$, is mounted. An adjustable pressure-reducing valve 133 and a manometer 134 are attached to the cartridge 132. The container 130, with the active ingredient formulation, and the pressure-reducing valve 133 are each connected to the dosing device 110 via a respective hose line 135, 136.

Figure 5:
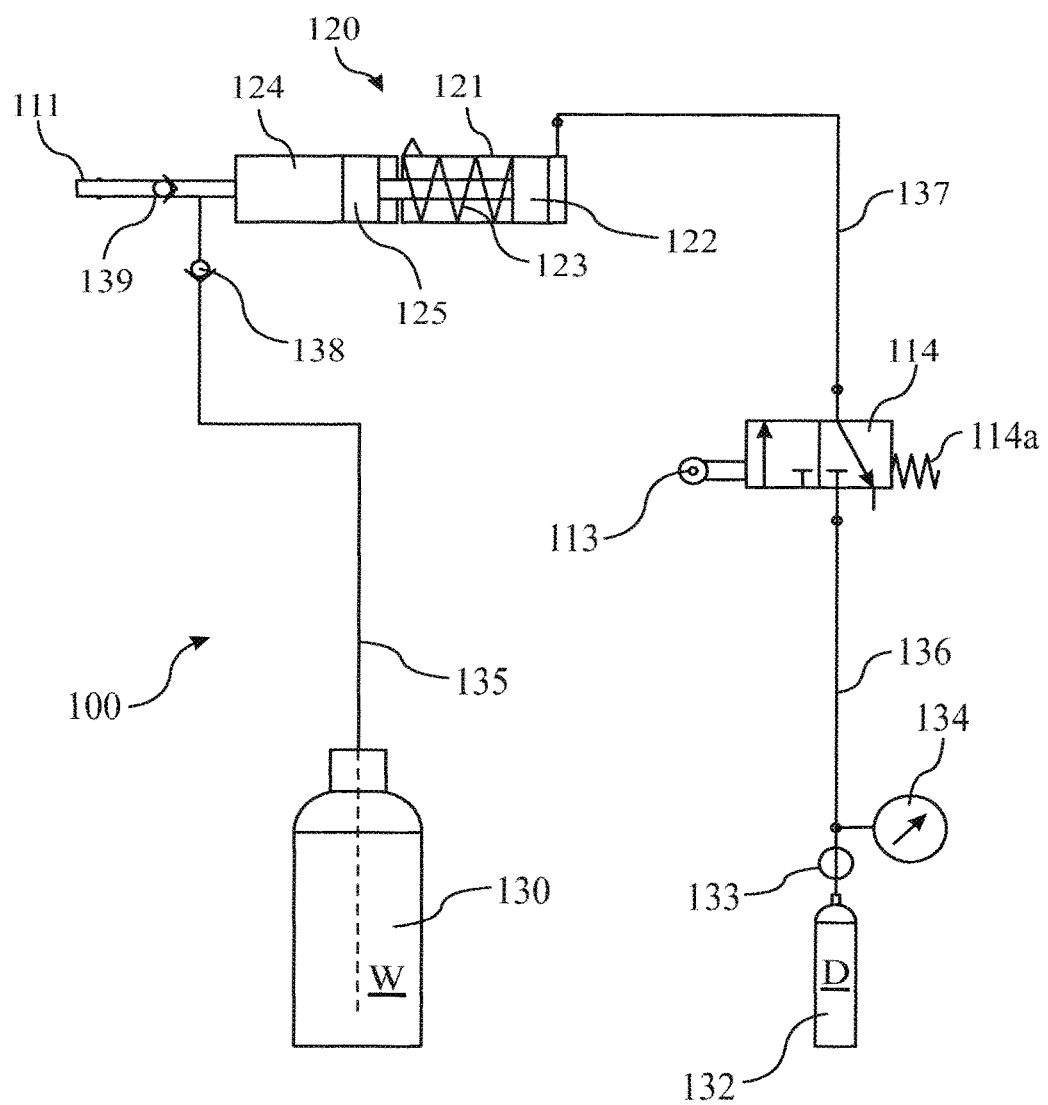
FIG. 5 shows a schematic hydraulics diagram of the delivery device of FIG. 4.

The dosing device 110 comprises a handle 112 having a trigger 113 for toggling a spring-loaded 3/2 valve 114 contained in the handle 112. The valve 114 is attached to a hose line 136 (also shown in FIG. 5) and a pneumatic pump assembly 120 for aspiration of the formulation from the container 130. The formulation is dispensed under pressure through the attachment tip 111 into the injection tool, such as the tool 1 shown in FIGS. 1-3. FIG. 5 shows these components schematically.

As shown in FIG. 5, the pneumatic pump assembly 120 comprises a pressure cylinder 121, with a pressure piston 122 movable therein and a restoring spring 123. The pump assembly 120 further includes in this example a dosing cylinder 124 with a dosing piston 125 movable therein. The delivery device 100 in this example is a pneumatically operated dosing pump. The dosing piston 125 is coupled kinematically to the pressure piston 122. The aforementioned attachment tip 111 is mounted on the dosing cylinder 124 and is connected to the latter for communication therewith. The pressure cylinder 121 is connected to the 3/2 valve 114 via a hose line 137. A non-return valve 138 (e.g., a check valve, unidirectional valve or the like) is in the hose line 135 connecting the dosing cylinder 124 to the container 130 (with the intervening attachment tip 111). Another non-return valve 139 is located in the attachment tip 111.

In the position of the components as shown in FIG. 5, the pressure cylinder 121 is free of pressure; its pressure piston 122 and the dosing piston 125 are located at their rear limit stops (to the right in the figure) based on restoring force from the restoring spring 123. The space of the dosing cylinder located in front of the dosing piston 124 is filled with active ingredient formulation. By actuation of the trigger 113, the 3/2 valve 114 in a rest position with the restoring spring 114a is actuated to connect the hose lines 136 and 137. In this way, pressurized gas D acts on the pressure piston 122 and pushes the latter, together with the dosing piston 125, forward (to the left in the figure). The active ingredient formulation W located in the dosing cylinder 124 is dispensed with movement of the dosing piston 125 through the attachment tip 111 to the injection tool. After the trigger 113 is released the restoring spring 114a resets the 3/2 valve 114 to its rest position and the hose line 137 is open (or closed depending on a vented or unvented configuration relative to the cylinder 121). The pressure cylinder 121 is rendered free of pressure, and its restoring spring 123 moves the pressure piston 122, together with the dosing piston 125, as far as their rear limit stops. In this way, active ingredient formulation W is aspirated out of the container 130 into the dosing cylinder 124 via the hose line 135 and the non-return valve 138.

The delivery device 100 is equipped with an example single-action pressure piston 122 moved back to its starting position by means of the restoring spring 123. In other examples, the delivery device 100 includes a double-action pressure piston and a corresponding control valve. In this example, the pressure piston is moved pneumatically in both directions and accordingly provides dosed quantity of the formulation W with each movement.

Figure 6:
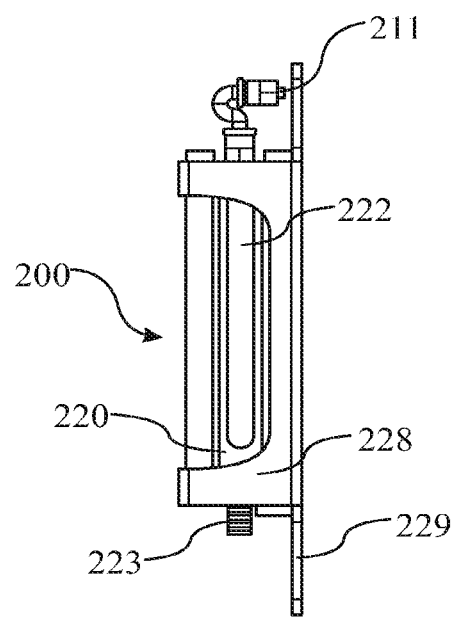
FIG. 6 shows a side view of the second embodiment of the delivery device of the injection system of FIG. 1.
Figure 7:
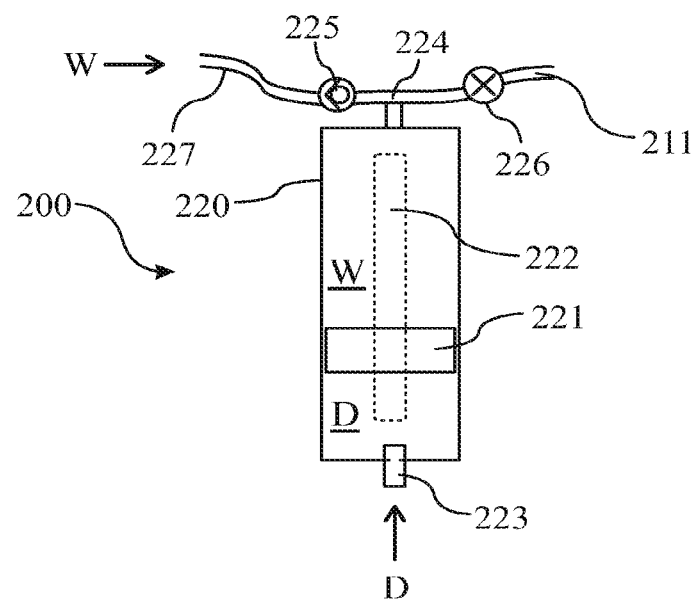
FIG. 7 shows a schematic hydraulics diagram of the delivery device of FIG. 6.

FIGS. 6-7 show a second embodiment of a delivery device 200. The delivery device 200 is configured as a pneumatic feed pump. As shown in the schematic representation in FIG. 7, the delivery device 200 includes a pump cylinder 220 with a pump piston 221 movable therein. A viewing window 222 is optionally included to identify the position of the pump piston 221. A pressurized gas delivery valve 223 (e.g., similar to a bicycle tube valve) is arranged in a lower portion of the pump cylinder 220. Arranged on the lid of the pump cylinder 220 opposite the lower portion there is a T-piece 224 (such as a T-junction), a non-return valve 225 (check valve, unidirectional valve or the like) and, on an opposed side of the T-piece, a shut-off valve 226. Attached to the shut-off valve is a hose line. The hose line in this example, is an attachment part 211 for connection to the injection tool 1 including but not limited to a corresponding socket fitting, pliable hose configured for retention on cleats or the like. A hose line 227 in communication with the active ingredient formulation W is attached to the non-return valve 225.

The pump cylinder 220 is held in a frame 228 shown in FIG. 6. The frame 228 optionally includes a mounting plate 229 to facilitate coupling of the delivery device 200 to a tree trunk, mount or the like.

The pump cylinder 220 is filled with active ingredient formulation W (e.g., a fluid formulation including one or more of a liquid, gas, gel, vapor, aerosol or the like) through the hose line 227 and the non-return valve 225. The pump piston 221 is pressed toward an opposed end (downward in the drawing). A cushion of pressurized gas provided on the opposed side of the pump cylinder 220 through the pressurized gas delivery valve 223. When the shut-off valve 226 is opened the pressurized gas drives the pump piston 221 (upward in the Figure) thereby driving the active ingredient formulation W located in the pump cylinder 220 out of the pump cylinder 220, through the attachment part 211 and into the injection tool 1. The dispensing of the active ingredient formulation W from the delivery device 200 in one example does not take place abruptly, and instead occurs gradually, for instance in an ongoing manner including one or more hours (one hour, two hours or the like). The shut-off valve 226 is optionally omitted if the filling of the pump cylinder 220 with active ingredient formulation W occurs with the attachment part 211 already coupled to the injection tool 1. In another example, the restoring force or bias for the pump piston 221 is provided with a mechanical mechanism including, but not limited to, an actuator motor, biasing element such as a spring or the like.

In another example, a deflectable membrane is provided in the pump cylinder 220. The membrane separates the active ingredient formulation W from the pressurized fluid (e.g., air, hydraulic fluid or the like). In another example, a fluid, such as a hydraulic fluid is included in the pump cylinder 220 for delivery of the formulation, for instance to drive the pump piston 221.

Figure 8A:
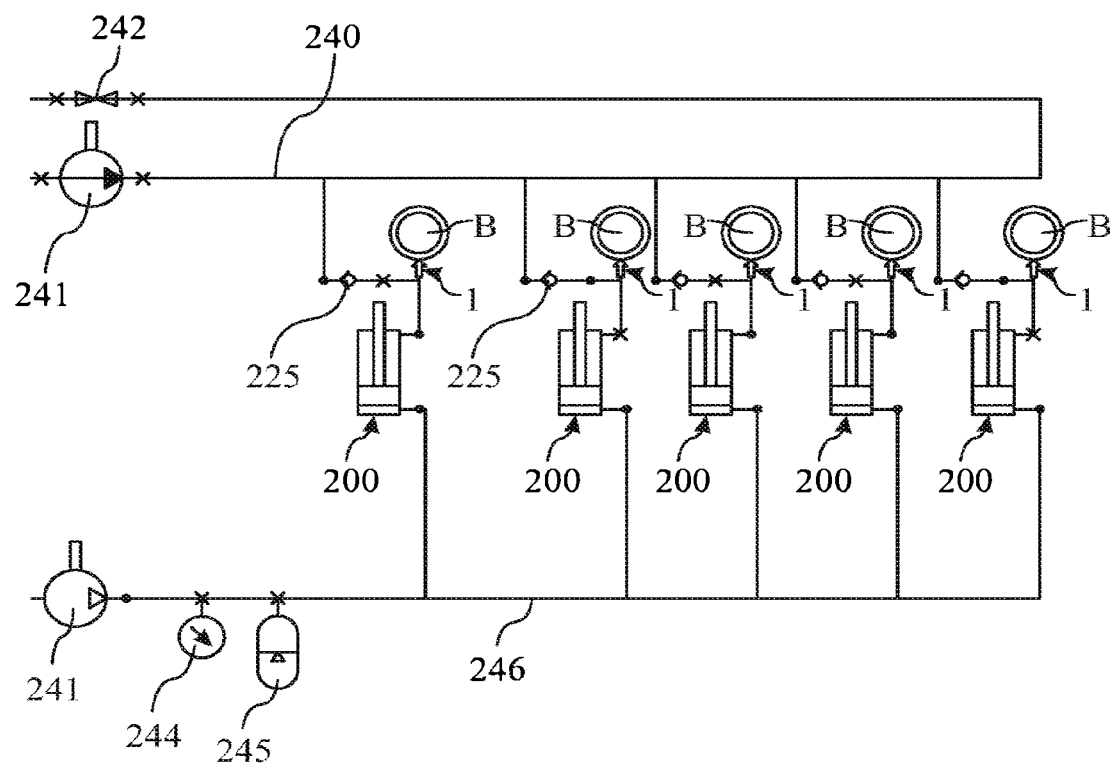
FIG. 8A shows a schematic hydraulics diagram of an assembly of several delivery devices according to FIG. 6.

FIG. 8A is a schematic representation of five delivery devices 200 (of the type shown in FIGS. 6 and 7) are attached to one injection tool 1 inserted into a tree trunk B. The filling of the pump cylinders 220 with active ingredient formulation takes place via an annular line 240 (e.g., a header or main line) including a feed pump 241 connected to a container with active ingredient formulation. A shut-off valve 242 for the line 240 and non-return valves 225 for the five delivery devices 200 are included. A pneumatic pump 243, in combination which a manometer 244 and a pressure reservoir 245, is in communication with the five delivery devices 200 via a hose line 246. The pump 243 provides compressed air or a pressurized fluid (if hydraulic) to the devices 200 to facilitate distribution of the formulation from the respective pump cylinders to the tree trunk B. In another example, the pump 243 is a hydraulic pump that similarly operates the delivery devices 200.

The third embodiment of a delivery device 300 is shown in FIG. 1. The delivery device 300 includes a two-chamber container, or cartridge, having separated chambers. The chambers are arranged in a cartridge-like container 310. One of the separated chambers includes a pressurized medium, such as a pressurized gas. The other separated chamber includes the active ingredient formulation for dispensing through a valve 312. The chambers are optionally separated with a piston or deflectable membrane movable to pump the formulation. The valve 312 is provided with an adapter 311 configured for communication with the attachment opening 11 (e.g., a socket fitting) of the injection tool 1. With coupling of the adapter 311 to the attachment opening 11 the valve 312 is opened, and the pressurized medium in the first chamber of the housing 310 expands and drives the active ingredient formulation in the opposed chamber through the valve 312 and out of the two-chamber package into the injection tool 1. In another example, the valve 312 is a tilt valve such. After coupling of the adapter 311 with the attachment opening 11 the two-chamber container or cartridge tilts downward under its weight and automatically opens the tilt valve.

b) Plunger

Figure 8C:
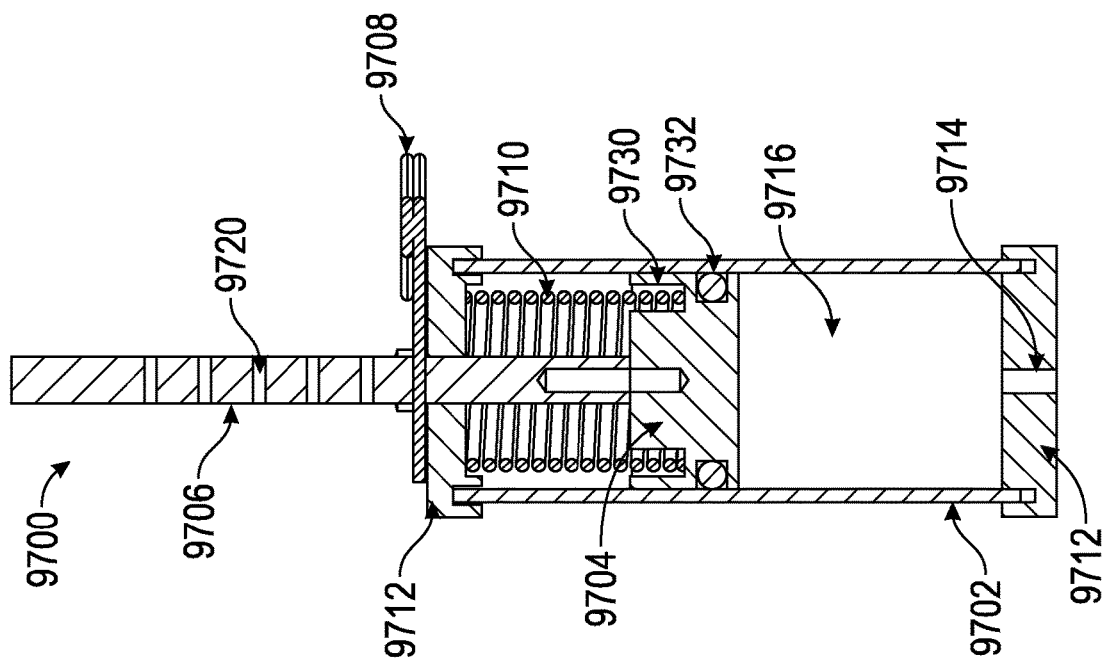
FIG. 8C is cross sectional view of the delivery device of FIG. 8B.
Figure 8B:
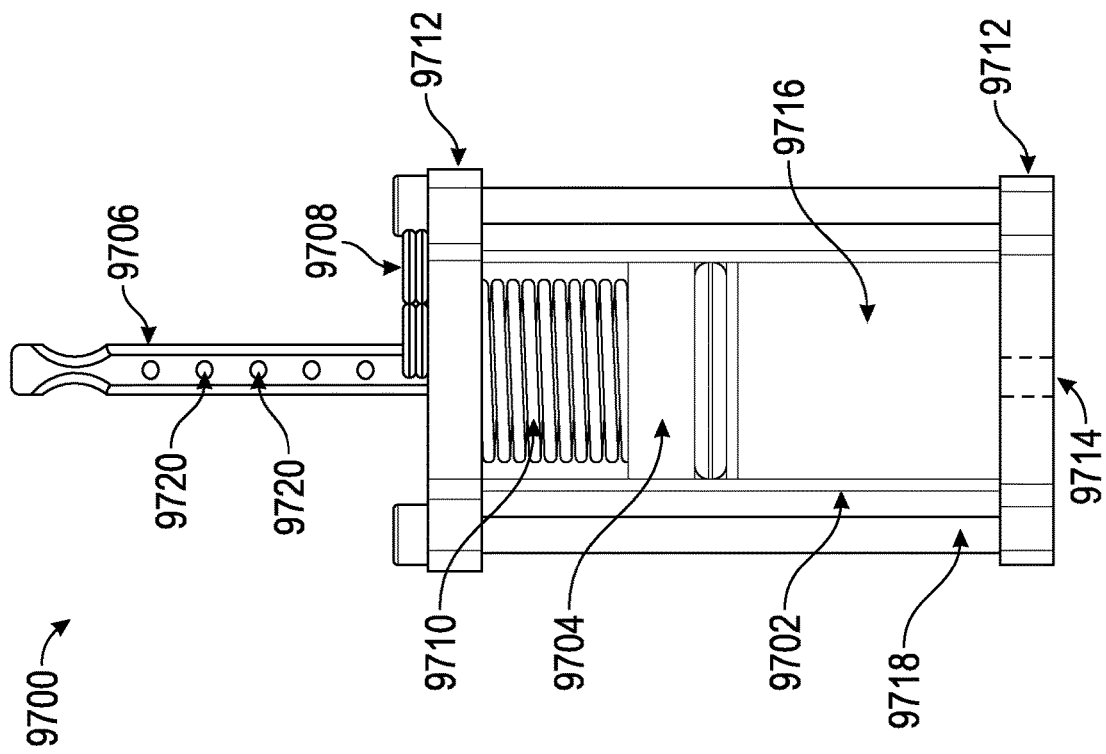
FIG. 8B is front view of another example of a delivery device.

FIGS. 8B and 8C show another example of an alternative fluid delivery device 9700. In this example, the formulation cartridge includes a formulation reservoir 9716 filled with an AI formulation according to a graduated volume based on the position of a plunger 9706. As shown in both FIGS. 8B, C a piston 9704 is within the cylinder 9702 and an interposing piston gasket 9732 seals the interface between the piston 9704 and the cylinder 9702. The piston 9704 is coupled with plunger 9706, and the plunger extends through a closure flange 9712. An opposed closure flange 9712 having a delivery outlet 9714 (e.g., an example of a discharge port) is provided opposite the upper flange 9712. Optionally, one or more flange clamps 9718 (e.g., bolts, pegs or the like) are connected between the closure flanges 9712 and couple the flanges 9712 with the ends of the cylinder 9702. As further shown, a bias element 9710 is coupled between the piston 9704 and the closure flange 9712 proximate to the plunger 9706. The bias element 9710 drives the piston 9704 into the formulation reservoir 9716 and accordingly pressurizes the AI formulation. One example configuration of the bias element 9710 with the piston 9704 is shown in FIG. 8A and includes the bias element 9710 partially received within a bias element seat 9730 of the piston 9704.

The fluid delivery device 9700 shown in FIGS. 8B, C further includes one or more latches configured to maintain a specified volume within the formulation reservoir. For example, the formulation reservoir 9716 is filled through the delivery port. The pressurized formulation biases the piston 9704 and the plunger 9706 upward. As shown in the Figs. as the plunger 9706 elevates graduated recess or plunger locks 9720 are revealed along the plunger. At a specified volume a plunger latch 9708, such as a pin or the like is coupled with a plunger lock 9720 corresponding to the specified volume (e.g., the recess closest to the proximate closure flange 9712). The filling operation is discontinued and the bias of the form the bias element depresses the piston 9704. The plunger latch 9708 engages with the closure flange 9712 and accordingly interrupts further depression. The volume of the AI formulation within the formulation reservoir 9716 is then maintained.

When administering the formulation the fluid delivery device 9700 is coupled with one or more of the injection tools described herein. The plunger latch 9708 is removed and the bias element 9710 resumes application of bias to the piston and the AI formulation is delivered through the delivery outlet 9714, for instance directly or indirectly to one or more injection tools.

c) Formulation Cartridge

FIGS. 42-47 describe an embodiment of a fluid delivery device, also referred to as a formulation cartridge, and an embodiment of an injection tool with which it can be used as a plant injection system. In the illustrated embodiment, the formulation cartridge has a cartridge adaptor that is complementary to a tool adaptor on the injection tool for integrating the components into a plant injection system with fluid communication between them. However, the formulation cartridge does not require a specialized complementary adaptor and can be fitted for use with other injector tools for example using ports for fluid access, and tubing and valves to create selective fluid communication as desired.

With respect to the illustrated embodiment, the injection tool has a distribution shaft (e.g., an insert portion) and a first adapter arrangement. The distribution shaft of the injection tool has one or more distribution ports and an interior duct extending between the first adapter arrangement and the discharge opening. The interior duct can be any internal cavity suitable to connect the discharge opening with the first adapter arrangement. For example, it can comprise a channel system having a single or plural channels for connecting the first adapter arrangement with the at least one discharge opening.

The injection tool is further arranged such that the first adapter arrangement is accessible from outside the plant while the distribution shaft and the distribution ports are inside the plant when the insert portion is inserted into the plant. Consistent with its use generally in this disclosure, the term "inserted" or "penetrated" relates to the distribution shaft partially or fully extending into and thereby penetrating the plant.

The formulation cartridge includes a chamber optionally comprising a dose of the liquid active ingredient formulation, and a second adapter arrangement corresponding to the first adapter arrangement of the injection tool. The first adapter arrangement of the injection tool and the second adapter arrangement of the formulation cartridge are configured for coupling such that the interior duct of the injection tool and the chamber of the formulation cartridge are in fluid communication.

Again consistent with uses elsewhere in this disclosure, the term "in fluid connection" relates to a direct or indirect connection enabling a transfer of fluid, particularly from the formulation cartridge to the injection tool. For this, the formulation cartridge and the injection tool can either be directly or indirectly arranged at or mounted to each other. The connection between the formulation cartridge and the injection tool is, in one example, sealed or leak tight and formulation leaks are minimized (e.g., reduced or eliminated) with the coupled components when transferred from the formulation cartridge to the injection tool.

For connecting the first and second adapter arrangements to each other various mechanisms are considered. For example, the adapter arrangements are configured for coupling by way of clipping, clamping, screwing, sticking or the like. In one example, the adapter arrangements include a bayonet structure for coupling and decoupling from each other. In another example, the formulation cartridge is clipped or button with the injection tool (e.g., in the manner of a push button, deflectable coat button or the like).

Plants are exposed to many microbes, including bacteria, viruses, fungi, and nematodes. Diseases of ornamental plants, forests, and other plants caused by such plant pathogens, particularly bacterial pathogens, are a worldwide problem with enormous economic impact. The severity of the destructive process of disease depends on the aggressiveness of the phytopathogen and the response of the host.

In some embodiments, the plant injection system comprising formulation cartridges according to the disclosure for example as described in connection with FIGS. 42-47, allows for the efficient and sealed introduction of active ingredient (AI) formulations into plants. In one example, the injection tool is installed in the plant in a first step and the formulation cartridge is coupled with the injection tool and thereafter administers the AI formulation to the injection tool for delivery to the plant interior. The adapter arrangements described herein minimize leakage or escape of the AI formulation from the closed plant injection system of the formulation cartridge and the injection tool. In situations with active ingredient formulations indicated for internal use only, are toxic for animals, or affect the environment in an undesired manner the adapter arrangements enclose the delivery of the AI formulation from the cartridge to the tool for distribution in the interior of the plant. Additionally, example plant injection system comprising the formulation cartridge allows for safe and convenient storage and delivery of one or more doses or boluses of the an active ingredient formulation or combinations of different active ingredient formulations (e.g., with the replacement of formulation cartridges having varied formulations). Further, example plant injection systems comprising the formulation cartridge allow for a convenient long term treatment of the plant by a comparably low skilled user. As such, an efficient and accurate delivery of the liquid active ingredient formulation into the plant may be achieved.

In use, the injection tool can be set or advanced into the plant independent of the formulation cartridge and thus the active ingredient formulation. This allows for providing a safe process not risking any leakage or other disposal of the active ingredient formulation out of the system. Further, the plant injection system allows for a convenient long term treatment of the plant by a comparably low skilled user, which may result in an efficient and accurate delivery of the liquid active ingredient formulation into the plant.

With regard to the injection tool, any injection tool consistent with this disclosure may be used with the formulation cartridge. However in some embodiments, for example when the injection tool is inserted for long-term use, the injection tool is configured to be secured into the plant such that the insert portion is not readily linearly extractable out of the plant.

With regard to the formulation cartridge, the active ingredient (AI) formulation is optionally pressurized, in one example, in a formulation reservoir of the cartridge. Pressurizing the formulation allows for convenient delivery of the formulation from the cartridge and to the tool installed in the plant once the formulation reservoir is opened via coupling of the adapter arrangements. In one example, the AI formulation is immediately delivered upon opening of the formulation reservoir, for instance through coupling of the tool and cartridge adapters. The formulation immediately flows into the tool according to the maintained driving pressure or force. Optionally, the driving pressure or force is maintained (including gradual abatement) during operation of the plant injection system as the driving mechanism (e.g., a bias membrane or the like) is gradually operated as the formulation is taken up by the plant.

In one example, the cartridge is configured with a bias membrane, for example an elastic bias membrane, which defines an upper boundary of the formulation reservoir within the cartridge. The bias membrane (e.g., elastic, pliable, compliant or semi-compliant) deflects and by virtue of stretching or a pressurized driving fluid pressurizes the active ingredient formulation. Such membrane can form the boundary of the chamber or at least a portion thereof. It can also be arranged inside the chamber as additional element. By selecting an appropriate material having a suitable elasticity, and/or optionally providing a quantity of compressed air or gas to the evacuated side of the chamber (on the opposite side of the membrane as the formulation reservoir) to further deflect the membrane, pressure is applied to the liquid active ingredient formulation.

In another example, the adapter arrangement of the formulation cartridge comprises a self-sealing port and the complementary adapter arrangement of the injection tool has a piercing member configured to open the self-sealing port, for instance through penetration of the self-sealing port when the cartridge adaptor and injector adaptor are coupled, resulting in fluid communication between the fluid reservoir and injector tool. The self-sealing port closes with removal of the injector adaptor, which may minimize leaking of the AI formulation.

The seal port is optionally configured in one or more suitable manners to facilitate reversible opening of the port on introduction and then removal of a piercing member. In one example, the self-sealing port includes a septum that is piercable by the piercing member. The self-sealing port may be equipped with a duckbill valve. A duckbill valve may facilitate efficiently and tightly accessing the interior of the formulation reservoir by means of the piercing member, may provide leak tightness after removing the piercing member, and may be multiply accessed without losing its leak tightness. The complementary piercing member may be a spike, fitting, nipple, needle or the like, configured to pierce the duckbill valve, and for accessing the dose of active ingredient formulation in the formulation reservoir.

In another example, the formulation cartridge includes an input port configured to fill the formulation reservoir with a quantity such as a dose of the active ingredient formulation. The input port facilitates enables re-filling the formulation reservoir and consequently reuse of the formulation cartridge. Accordingly, in some embodiment, a formula cartridge is a multiple-use cartridge. In other embodiments, the formulation cartridge is a one-use product that is disposed after use.

In another example, the formulation cartridge has a reservoir casing enclosing the formulation reservoir. The reservoir casing is constructed with robust materials, in one example to protect the interior including, for instance, the bias membrane, AI formulation (to prevent leaking) or the like. In another example, the reservoir casing is filled with a pressurized medium, such as a gas, in an opposed portion of the casing relative to the formulation reservoir. For instance, the pressurized medium is provided on the opposed side of the bias membrane to apply pressure through the bias membrane to the formulation in the formulation reservoir. Alternatively, the pressurized medium cooperates with an elastic (elastically deformable) bias membrane to provide additional pressure to the formulation for delivery.

The formulation cartridge can deliver similar active ingredients as other fluid delivery devices used in plant injection systems in accordance with this disclosure including an insecticide, a fungicide, a nutrient, a growth promoter or a combination thereof.

Figure 42:
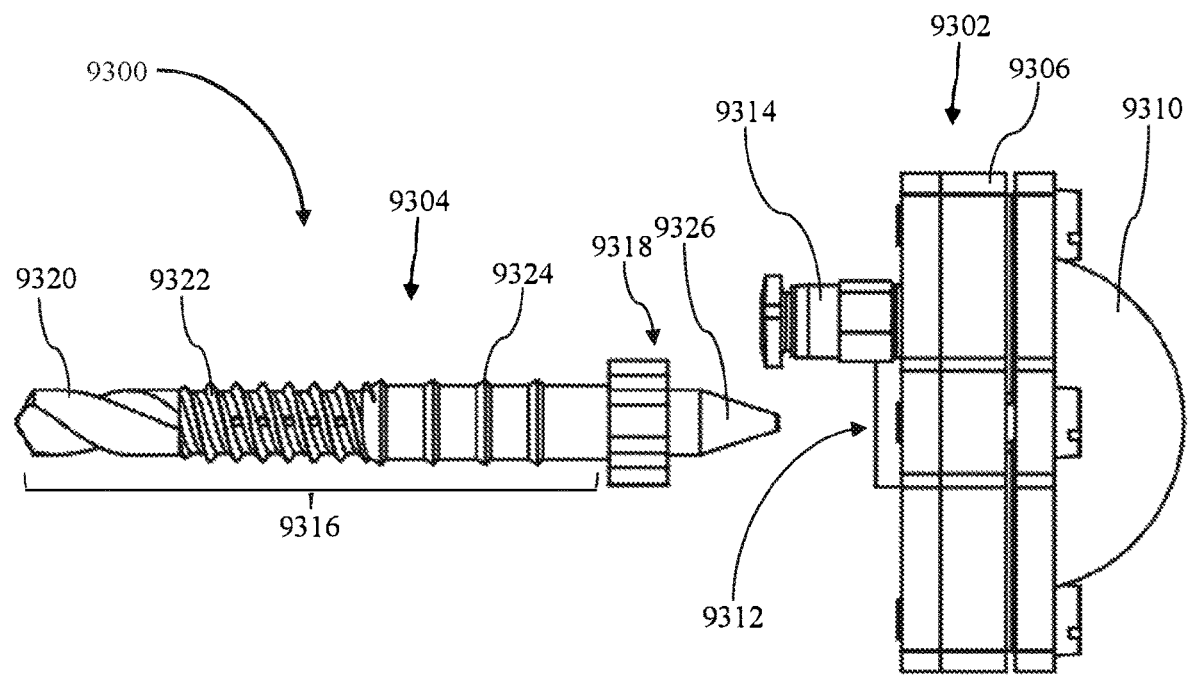
FIG. 42 is an exploded side view of an embodiment of a plant injection system including an injection tool and another embodiment of a fluid delivery device.
Figure 43:
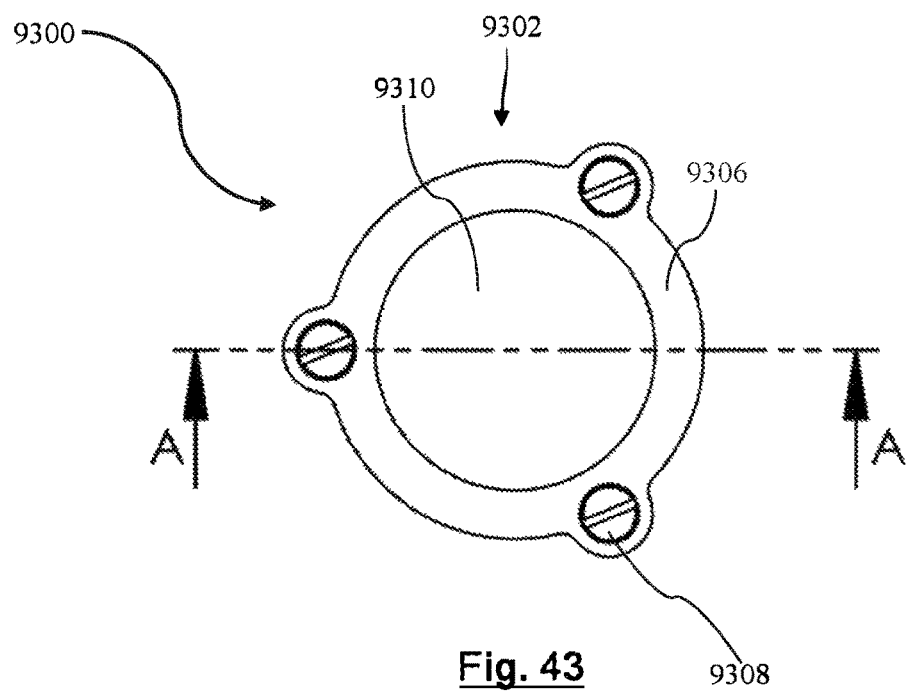
FIG. 43 is a top view of the plant injection system of FIG. 42.

Referring now to figures, FIG. 42 and FIG. 43 show an embodiment of a plant injection system 9300 or plant injection kit according to the disclosure. The plant injection system 9300 comprises a formulation cartridge 9302 and an injection tool 9304. The formulation cartridge 9302 has a cartridge body 9306. In the example shown, the cartridge body 9306 includes an assembly of plates that are fixed to each other with fasteners 9308, such as screws or bolts. In FIG. 42 at a right-hand end, the formulation cartridge 9302 has a reservoir casing 9310, and at a left-hand side a cartridge adapter 9312 and an input port 9314.

In FIG. 42, the injection tool 9304 has a left-hand front end and a right-hand back end. The injection tool includes a distribution shaft 9316 extending between the front end and the back end having a distal front section (proximate the left-hand front end), an intermediate section and a back section (proximate the right-hand backend). A tool adapter 9318 is located between the back section and the back end. The front section of the distribution shaft 9316 is equipped with penetrating element 9320 configured to penetrate a plant, for instance during installation of the injection tool 9304. In another example, the penetrating element includes one or more cutting elements, such as cutting edges, self-tapping threading or the like. In the example shown in FIG. 42, the penetrating element 9320 includes a cutting edge to cut the plant during rotation of the injection tool 9304 into the plant (e.g., in the manner of a screw). Accordingly, in the example shown, the injection tool 9304 including the penetrating element 9320 is a self-cutting tool generating a hole in the plant.

The intermediate section of the distribution shaft 9316 has one or more anchors 9322 including, but not limited to, threading, beads, knurling, barbs, teeth, cleats or the like. The anchor 9322 projects radially from the distribution shaft 9316. When installed in the plant the anchor 9322 enters the plant tissue and fixes the injection tool 9304 to the plant. The anchor 9322, in one example threading, optionally has a lower pitch than the pitch of the cutting element 9320. By means of the anchor 9322, the injection tool 9304 is configured to be secured into the plant such that the distribution shaft 9316 is not readily linearly extractable from the plant when the distribution shaft 9316 is installed.

The back section of the distribution shaft 9316 is provided with one or more axially spaced closure beads 9324 (e.g., circumferential bulges, ridges, rings or the like). The closure beads 9324 seal the injection tool 9304 within the orifice of the plant (e.g., formed in one example with the penetrating element 9320). The tool adapter 9318 has a reservoir fitting 9326 (e.g., a spike, needle, fitting, nipple, port, boss or the like). When installed in the plant, the distribution shaft 9316 is introduced into the plant such that at least a distal portion of the tool adapter 9318 (e.g., a head portion) thereof, abuts the plant.

Figure 44:
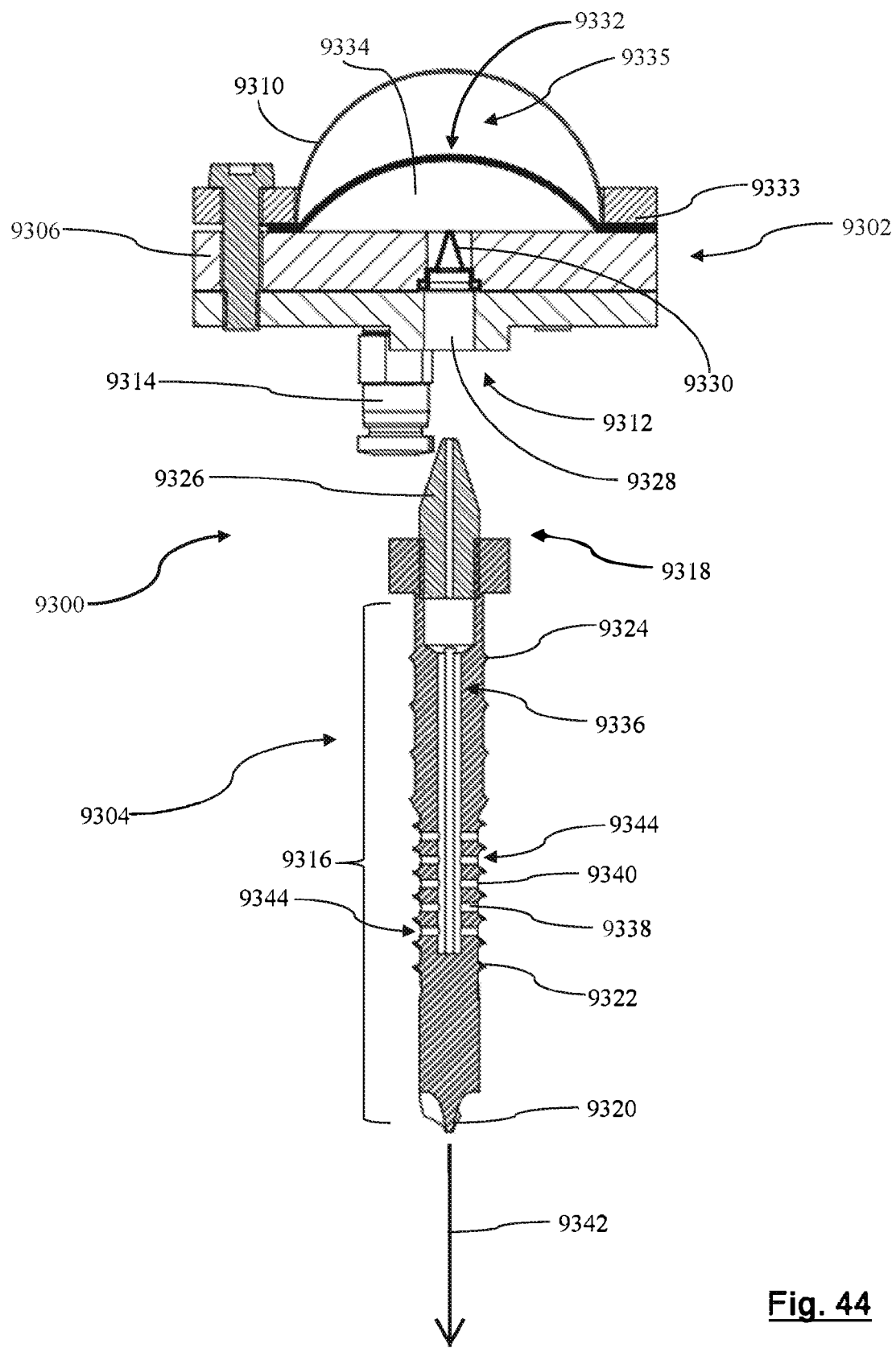
FIG. 44 is an exploded cross sectional view of the plant injection system of FIG. 42 in a decoupled configuration, for instance as a kit.
Figure 45:
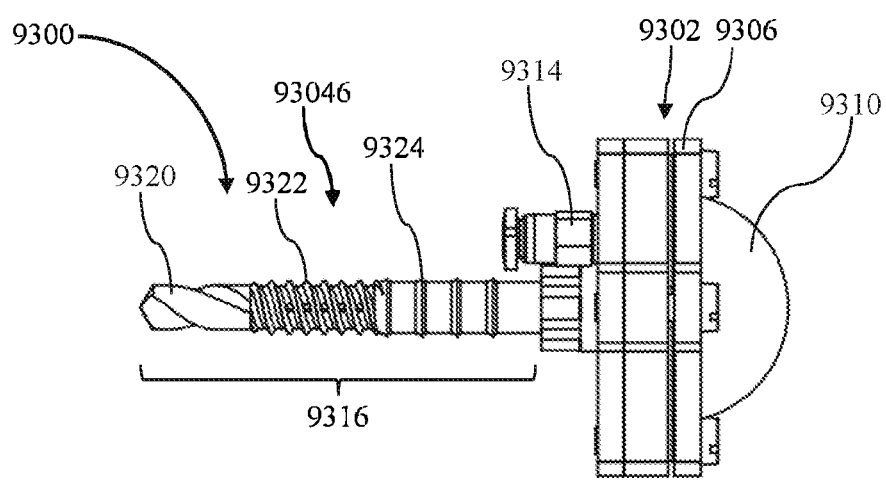
FIG. 45 is a side view of the plant injection system of FIG. 42 in an assembled configuration.
Figure 46:
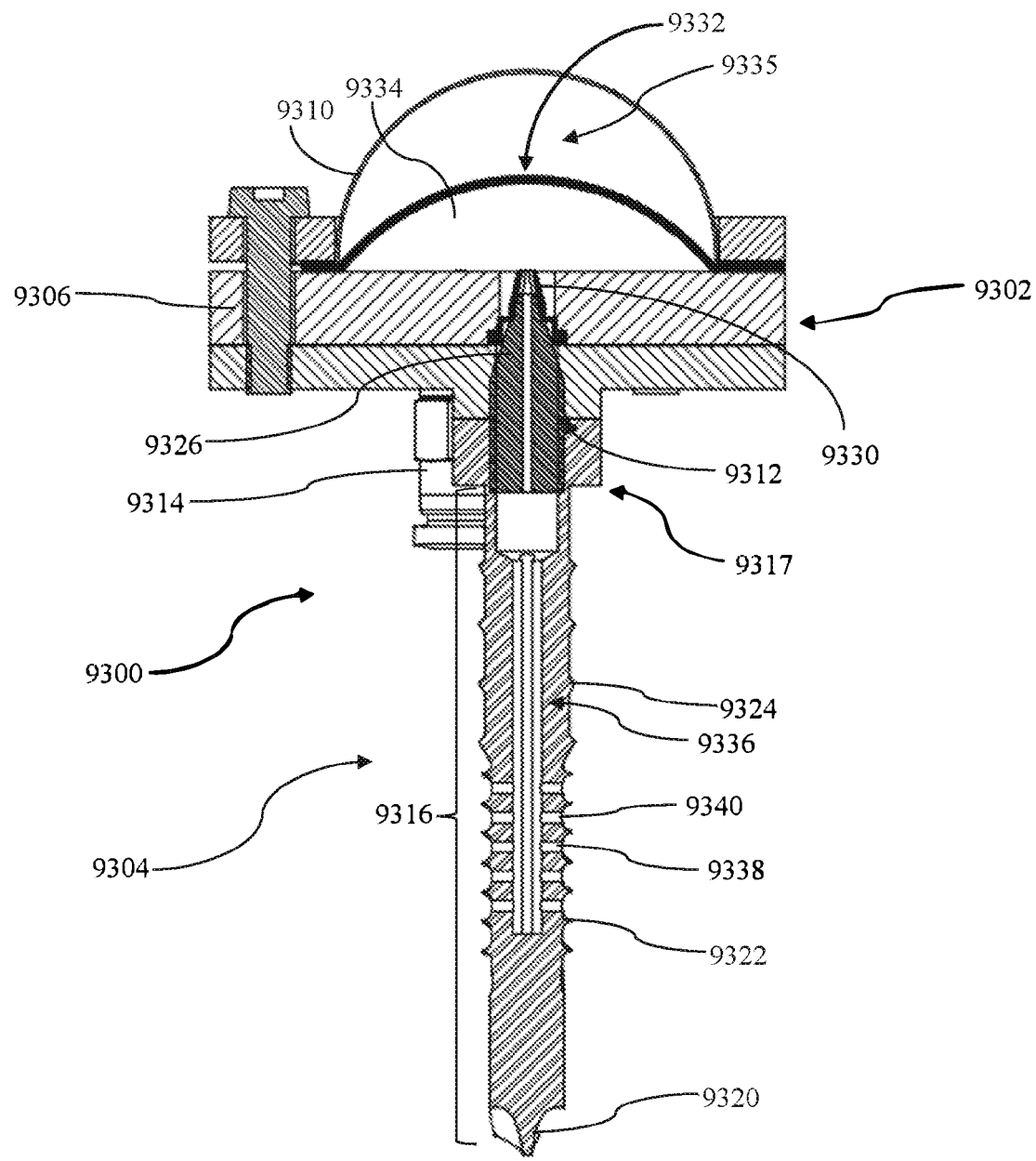
FIG. 46 is a cross sectional view of the plant injection system or kit of FIG. 42 in the assembled configuration.

In FIG. 44 the plant injection system 9300 is shown in a cross-sectional view. Referring first to the formulation cartridge 9302, the cartridge adapter 9312 includes a tool socket 9328 equipped with a self-sealing port 9330, for example a duckbill valve forming the self-sealing port 9330. A bias membrane (e.g. an elastic membrane) 9332 is configured within reservoir casing 9310 to create a formulation reservoir 9334 between membrane 9332 and cartridge adapter 9312. The formulation reservoir 9334 is filled with a dose of the AI fluid, which deflects the bias membrane 9332 toward reservoir casing 9310. In one example, formulation reservoir is loaded with AI fluid through input port 9314, deforming the bias membrane 9332. Deformation of the bias membrane 9332 (e.g. elastic deformation of an elastic bias membrane) holds the formulation at an elevated pressure for later delivery through the injection tool 9304. In some examples, a membrane clamp 9333 extends around the bias membrane 9332 and couples the bias membrane 9332 with the body 9306.

In another example, the reservoir casing 9310 is sized and shaped to provide a casing cavity 9335 on an opposed side of bias membrane 9332 relative to formulation reservoir 9334. Casing cavity 9335 is optionally filled with a pressurized medium (e.g., a driving fluid), such as a gas. The pressurized medium transmits force through the bias membrane 9332 to the formulation in the reservoir 9334. The transmitted force pressurizes the AI fluid for later delivery through the injection tool 9304. In one example, the bias membrane 9332 is a semi-compliant or non-compliant (not elastically deformable) but pliable membrane, and the pressurized medium provides the force (pressure) for delivery of the formulation. Optionally, with a bias membrane 9332 that is elastically deformable the pressurized medium cooperates with the bias membrane 9332 to enhance the force applied to the formulation for delivery. In any of these alternative configurations force is provided by the bias membrane 9332 (e.g., according to one or more of elastic deformation, pressurized medium or the like) to the formulation to bias the formulation toward the seal port 9330.

The injection tool 9304 includes a delivery channel 9336 extending from the reservoir fitting 9326 of the tool adapter 9318 toward the penetrating element 9320. The delivery channel 9336 includes one or more passages that deliver the formulation from the formulation cartridge 9302 to one or more distribution ports 9340 of the injection tool 9304. As shown in FIG. 44, the delivery channel 9336 extends into the distribution shaft 9316 of the injection tool 9304. The distribution channels 9338 extend from the delivery channel 9336 to the one or more distribution ports 9340. As shown in FIG. 44, the distribution ports 9340 (and the associated distribution channels 9338) are directed away from a penetrating axis 9342 of the penetrating element 9320. For instance, the distribution ports 9340 extend transversely relative to the penetrating element 9320. The transverse direction includes orientation of the ports in a swept back configuration such as at an angle of 90 degrees or more relative to the penetrating axis 9342 or the like. Further, the distribution ports 9340 are sheltered (e.g., concealed, isolated, shielded or the like) from plant material by the penetrating profile of the penetrating element 9320. In one example, the penetrating profile corresponds to the footprint or cross section of the penetrating element 9320 in an orthogonal orientation relative to the penetrating axis 9342. As shown in FIG. 44, the distribution ports 9340 are sheltered from plant tissue, material or the like during penetration of the plant by the leading penetrating element 9320 and its penetrating profile. Further, the transverse orientation of the distribution ports 9340 minimizes the infiltration of plant tissue, material or the like during installation of the injection tool 9304. For instance, it is believed that oncoming plant tissue that is otherwise received in an axial syringe-type orifice passes over and is not received with the transversely oriented distribution ports 9340 because of their orientation and misalignment relative to the penetrating axis 9342.

In another example, each of the distribution ports 9340 is optionally positioned between edges of anchor 9322 configured to retain injection tool 9304 within the plant. Anchor 9322 provides one or more features such as threading, cleats, barbs, ridges, knurling or the like configured to engage with plant tissue and hold the penetrating element 9320 at an installed location within the plant. As shown in FIG. 44, the anchor 9322 provides a contoured surface having one or more distribution reservoirs 9344 between the contour features (e.g., between ridges, barbs or the like). The distribution ports 9340 optionally open into the distribution reservoirs 9344 between features of the anchor 9322. Accordingly, formulations delivered from the distribution ports 9340 are held within the distribution reservoirs 9344 and reside adjacent to proximate plant tissue to facilitate uptake into the tissue. In one example the distribution reservoirs 9344 exposed a larger volume or greater surface area of AI formulation to the plant tissues in comparison to the distribution ports 9340 directed into the reservoirs 9344. It is believed that the enhanced exposure facilitates the uptake of the AI formulation into the plant.

As can be seen in FIGS. 45 and 46, the formulation cartridge 9302 is coupled to the injection tool 9304 by advancing reservoir fitting 9326 of tool adapter 9318 into tool socket 9328 of cartridge adapter 9312. In one example, cartridge adapter 9312 includes a complementary profile to tool adapter 9318 to facilitate reliable inter-fitting therebetween. For instance, cartridge adapter 9312 includes tool socket 9328 having a complementary profile to reservoir fitting 9326 of tool adapter 9318. Optionally, the corresponding profiles of the adapters are varied in complementary manners to ensure specified formulation cartridges 2 are used with corresponding injection tools 3, for example to insure the application of specified formulations to appropriate plants.

In an example tool socket 9328 of cartridge adapter 9312 includes a seal port 9330, and the seal port 9330 optionally includes a duckbill valve. Seal port 9330 is at least partially penetrated by reservoir fitting 9326 to open seal port 9330 resulting in fluid communication between formulation reservoir 9334 and injection tool 9304. With seal port 9330 opened, the active ingredient formulation is biased by bias membrane 9332 into delivery channel 9336 of injection tool 9304 toward distribution ports 9340 and into the plant. Upon decoupling of formulation cartridge 9302 from injection tool 9304 (e.g., for exchange of cartridges), seal port 9330 automatically closes formulation cartridge 9302, which may minimize (e.g., eliminate or reduce) leaking of the formulation from formulation reservoir 9334 to the exterior environment. For example, the deflectable bill of a duckbill valve (one example of the seal port 9330) automatically assumes a closed configuration with removal of reservoir fitting 9326. Alternatively, other unidirectional valves are employed as the seal port 9330 including, but not limited to, check valves, elastic septums or the like.

After the AI fluid is delivered from cartridge 9302 through injection tool 9304, cartridge 9302 is optionally decoupled from injection tool 9304. Seal port 9330 (such as a duckbill valve) seals formulation reservoir 9334. A replacement cartridge 9302 including the same or a different formulation may be coupled to the injection tool 9304 through inter-fitting of cartridge adapter 9312 of replacement formulation cartridge 9302 with tool adapter 9318 of injection tool 9304.

In another example, formulation reservoir 9334 is optionally refilled while coupled to or decoupled from injection tool 9304. A filling device, such as a refilling reservoir, is coupled with input port 9314 shown in FIGS. 44 and 46. The replacement AI formulation is delivered through port 9314 and into formulation reservoir 9334. Input port 9314 isolates the AI formulation from the exterior environment surrounding the formulation cartridge 9302. Optionally, input port 9314 includes a self-sealing valve such as a unidirectional valve, check valve, duckbill valve or the like to minimize the escape of input formulation upon completion of refilling and decoupling of the filling device.

Filling of reservoir 9334 deflects bias membrane 9332 into the configuration shown in FIG. 44 (e.g., with membrane 9332 having the arcuate shape shown). In an example including an elastic membrane, the elastic deformation of bias membrane 9332 applies a delivery pressure to the formulation. Optionally, filling of formulation reservoir 9334 compresses a driving fluid within the casing cavity 9335 separated from reservoir 9334 by the bias membrane 9332. The compressed driving fluid exerts a corresponding counterpressure to bias membrane 9332 that is in turn applied to the formulation in reservoir 9334.

FIG. 47 is a cross-sectional view of another example of a formulation cartridge. The formulation cartridge 9400 includes at least some features in common with the formulation cartridge 9302 described herein. For instance, the formulation cartridge 9302 includes a formulation reservoir 9334 separated from a casing cavity 9335 by a bias membrane 9332. The bias membrane 9332 is pliable, and in one example is elastic. In another example, the pliable bias membrane 9332 is non-compliant or semi-compliant (e.g., is not elastically deformable while retaining pliability).

Formulation cartridge 9400 further includes cartridge adapter 9312. Cartridge adapter 9312 optionally includes seal port 9330 configured to open formulation reservoir 9334 with coupling to a tool adapter, such as tool adapter 9318 shown in FIG. 44. Seal port 9330 is configured to close reservoir 9334 with decoupling from tool adapter 9318. For instance, cartridge adapter 9312 includes seal port 9330 such as a duckbill valve, check valve, elastic septum or the like configured to close with decoupling of tool adapter 9318.

Formulation cartridge 7, as shown in FIG. 47, further includes a driving fluid port 9402. Driving fluid port 9402 is coupled to formulation cartridge 7, for instance along reservoir casing 9310. Driving fluid port 9402 extends into casing cavity 9335 and facilitates the introduction of a pressurized medium or driving fluid into cavity 9335 to apply pressure across bias membrane 9332. Driving fluid port 9402 includes a unidirectional valve 9404 (e.g., check valve) or similar feature (e.g., a butyl rubber or silicone septum) to minimize leaking of the driving fluid.

A driving fluid, such as air, nitrogen, a noble gas, compressible fluid, or the like, is delivered to casing cavity 9335 through the driving fluid port 9402. In one example, the driving fluid fills casing cavity 9335 and moves bias membrane 9332 into the space otherwise occupied with the formulation. For instance, bias membrane 9332 lays across cartridge body 9306 of cartridge 9400 within formulation reservoir 9334 (as shown with the flat broken line in FIG. 47). In one example, the active ingredient formulation is delivered to formulation reservoir 9334 through input port 9314. Filling of formulation reservoir 9334 moves the bias membrane 9332 into the (solid line) configuration shown in FIG. 47. Casing cavity 9335 thereby shrinks and the driving fluid is compressed and pressurized. The compressed driving fluid applies a pressure (e.g., a delivery pressure) to bias membrane 9332, and membrane 9332 applies the pressure to the formulation within formulation reservoir 9334. While formulation reservoir 9334 is open, for instance upon coupling with tool adapter 9318, the delivery pressure generated in casing cavity 9335 by the driving fluid drives bias membrane 9332 into formulation reservoir 9334 resulting in flow of formulation into injection tool 9304. Optionally, the formulation is present in formulation reservoir 9334 upon filling of the casing cavity 9335 with the driving fluid. Accordingly, the driving fluid is immediately pressurized upon introduction to the casing cavity 9335 because the formulation reservoir 9334 partially fills the reservoir casing 9310.

Figure 47:
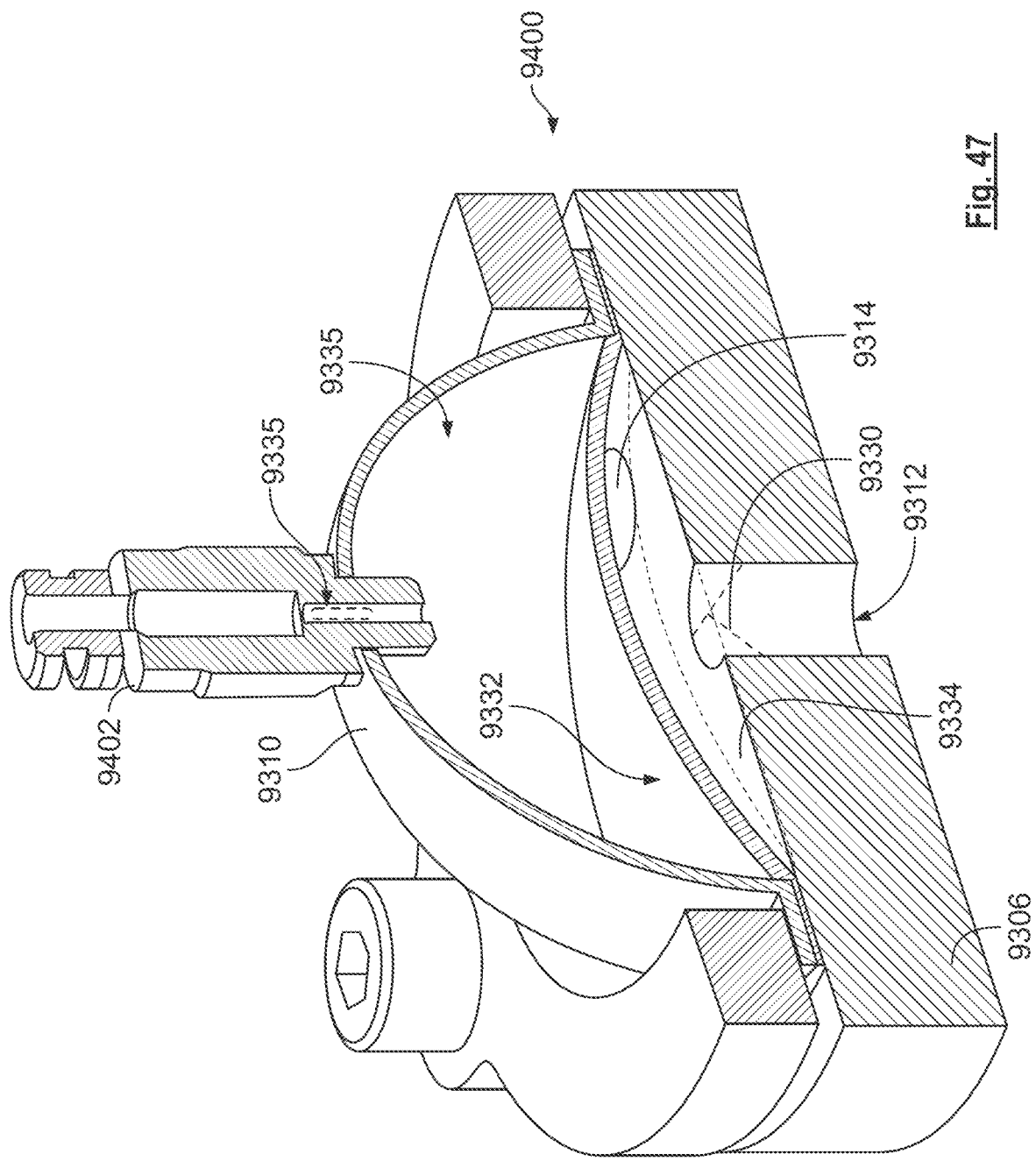
FIG. 47 is a perspective sectional view of another example of a fluid delivery device including one example of a driving fluid port.

In another example, bias membrane 9332 is elastic and is elastically deformed when in the arcuate configuration shown in FIG. 47 (and in FIG. 44). The driving fluid within casing cavity 9335 cooperates with the plastically deformed bias membrane 9332 to apply an enhanced delivery pressure to the formulation.

A number of injector tools, delivery devices and formulation reservoirs, such as formulation cartridges usable with injector tools comprising the formulation cartridge Embodiments have been described. However, a person of skill can understand from a reading of this disclosure that still other Embodiments are encompassed by this disclosure. Non-limiting examples of devices and methods within scope of this disclosure include the following Aspects:

1. A plant injection system to introduce a liquid active ingredient formulation into a plant, comprising: an injection tool to be inserted into the plant, and a formulation cartridge with a chamber comprising a dose of the liquid active ingredient formulation, wherein: the injection tool has an insert portion and a first adaptor arrangement, the insert portion of the injection tool has a discharge opening and an interior duct extending between the first adaptor arrangement and the discharge opening, the injection tool is arranged such that the first adaptor arrangement is accessible from outside the plant and the discharge opening is inside the plant when the insert portion is inserted into the plant, the formulation cartridge has a second adaptor arrangement corresponding to the first adaptor arrangement of the injection tool, and the first adaptor arrangement of the injection tool and the second adaptor arrangement of the formulation cartridge are configured to be coupled such that the interior duct of the injection tool and the chamber of the formulation cartridge are in fluid connection.

2. A plant injection system according to embodiment 1, wherein the injection tool comprises a penetrating structure configured to generate a hole into the plant to insert the insert portion of the injection tool into the plant.

3. A plant injection system according to embodiment 2, wherein the penetrating structure of the injection tool has a cutting edge configured to cut the hole into the plant.

4. A plant injection system according to of any one of the preceding embodiments, wherein the liquid active ingredient formulation is pressurized in the chamber of the formulation cartridge.

5. A plant injection system according to embodiment 4, wherein the chamber of the formulation cartridge is equipped with an elastic membrane pressurizing the liquid active ingredient formulation.

6. A plant injection system according to embodiment 5, wherein the elastic membrane is deflected such that it applies a pressure on the liquid active ingredient formulation.

7. A plant injection system according to any one of the preceding embodiments, wherein the second adaptor arrangement of the formulation cartridge comprises:
  a. a self-sealing port; and
  b. the first adaptor arrangement of the injection tool has a piercing member wherein the piercing member extends through the self-sealing port when the first adaptor arrangement of the injection tool and the second adaptor arrangement of the formulation cartridge are coupled.

9. A plant injection system according to embodiment 7, wherein the self-sealing port of the second adaptor arrangement of the formulation cartridge is equipped with a duckbill valve.

10. A plant injection system according to embodiments 7 or 8, wherein the piercing member of the first adaptor arrangement of the injection tool comprises a thorn configured to pierce the duckbill valve for accessing the dose of the liquid active ingredient formulation in the chamber.

11. A plant injection system according to any one of the preceding embodiments, wherein the formulation cartridge has an input port configured to fill the dose of active ingredient formulation into the chamber.

12. A plant injection system according to any one of the preceding embodiments, wherein the formulation cartridge has a dome forming the chamber.

13. A plant injection system according to any one of the preceding embodiments, wherein the injection tool is configured to be secured into the plant such that the insert portion is not linearly extractable out of the plant when the insert portion is inserted into the plant.

14. A formulation cartridge of the plant injection system according to any one of the preceding claims.

15. A formulation cartridge according to embodiment 14, wherein the liquid active ingredient formulation comprises an insecticide, a fungicide, a nutrient, a growth promoter or a combination thereof.

16. A plant injection kit comprising an injection tool of the plant injection system of any one embodiments 1 to 13 and at least one formulation cartridge according to the preceding claim.

17. A plant injection system comprising: a formulation cartridge configured to store and dispense an active ingredient (AI) formulation, the formulation cartridge includes: a body having a cartridge adapter; a formulation reservoir configured to store the AI formulation; and a bias membrane enclosing at least a portion of the formulation reservoir, and the bias membrane is configured to pressurize the AI formulation in the formulation reservoir; and an injection tool configured for coupling with the formulation cartridge in an assembled configuration, the injection tool includes: a tool adapter, and in the assembled configuration the tool adapter couples with the cartridge adapter and opens communication from the formulation reservoir to the injection tool; a penetrating element configured to penetrate plant tissue; a distribution shaft extending from the tool adapter toward the penetrating element the distribution shaft includes a delivery channel in communication with the tool adapter; and one or more distribution ports directed transversely relative to the distribution shaft, the one or more distribution ports in communication with the distribution shaft.

18. A plant injection system according to embodiment 17, wherein the cartridge adapter includes a tool socket and the tool adapter includes a reservoir fitting; and in the assembled configuration the reservoir fitting of the injection tool is received in the tool socket of the formulation cartridge.

19. A plant injection system according to embodiment 17, wherein the tool adapter includes at least one of a fitting, nipple, needle or spike.

20. A plant injection system according to embodiment 17, wherein in the assembled configuration the tool adapter opens a seal port interposed between the formulation reservoir and the cartridge adapter, and the seal port is resealable.

21. A plant injection system according to embodiment 20, wherein in a decoupled configuration the tool adapter is decoupled from the cartridge adapter and the seal port automatically closes the formulation reservoir.

22. A plant injection system according to embodiment 17, wherein the bias membrane includes an elastic membrane, and the formulation reservoir includes evacuated and filled configurations, and in the filled configuration the elastic membrane is plastically deformed and applies a delivery pressure to the AI formulation according to the plastic deformation.

23. A plant injection system according to embodiment 17, wherein the body includes a reservoir casing enclosing the bias membrane.

24. A plant injection system according to embodiment 23, wherein the body includes a casing cavity interposed between the reservoir casing and the bias membrane, and the casing cavity is filled with a driving fluid.

25. A plant injection system according to embodiment 24, wherein in the filled configuration the driving fluid is compressed and applies a delivery pressure across the bias membrane, and the bias membrane transmits the delivery pressure to the AI formulation.

26. A plant injection system according to embodiment 17, wherein a penetrating profile of the penetrating element is configured to shelter the one or more distribution ports of the penetrating element.

27. A plant injection system according to embodiment 17, wherein the one or more distribution ports directed transversely relative to the distribution shaft are directed 90 or more degrees relative to a penetrating axis of the of the penetrating element.

28. A plant injection system according to embodiment 17 comprising the AI formulation, and the AI formulation includes one or more of an insecticide, a fungicide, a nutrient, a growth promoter or a combination thereof.

29. A formulation cartridge configured to store and dispense an active ingredient (AI) formulation, the formulation cartridge includes: a body having a cartridge adapter configured for coupling with an injection tool; a formulation reservoir configured to store the AI formulation; and a bias membrane enclosing at least a portion of the formulation reservoir, and the bias membrane is configured to pressurize the AI formulation in the formulation reservoir; and
wherein the formulation cartridge includes a storage configuration and a delivery configuration:
in the storage configuration the formulation reservoir is closed and the AI formulation is pressurized by the bias membrane; and in the delivery configuration the formulation reservoir is open through the cartridge adapter to an injection tool, and the bias membrane delivers the AI formulation through the cartridge adapter.

30. A formulation cartridge according to embodiment 29, wherein in the delivery configuration the formulation reservoir is automatically opened with coupling of the injection tool with the cartridge adapter.

31. A formulation cartridge according to embodiment 29, wherein the cartridge adapter includes a tool socket configured to receive a reservoir fitting of the injection tool.

32. A formulation cartridge according to embodiment 29 comprising the injection tool.

33. A formulation cartridge according to embodiment 29 comprising a seal port interposed between the formulation reservoir and the cartridge adapter, and the seal port is automatically resealable.

34. A formulation cartridge according to embodiment 33, wherein the seal port includes a duckbill valve.

35. A formulation cartridge according to embodiment 29 comprising an input port in communication with the formulation reservoir.

36. A formulation cartridge according to embodiment 29, wherein the bias membrane includes an elastic membrane; in the storage configuration the elastic membrane is plastically deformed and applies a delivery pressure to the AI formulation according to the plastic deformation; and in the delivery configuration the plastically deformed elastic membrane is contracted and delivers the AI formulation through the cartridge adapter according to the plastic deformation and contraction.

37. A formulation cartridge according to embodiment 29, wherein the body includes a reservoir casing enclosing the bias membrane.

38. A formulation cartridge according to embodiment 37, wherein the body includes a casing cavity filled with a driving fluid between the reservoir casing and the bias membrane; in the storage configuration the driving fluid is compressed and applies a delivery pressure across the bias membrane; and in the delivery configuration the bias membrane transmits the delivery pressure to the AI formulation and delivers the AI formulation through the cartridge adapter according to the delivery pressure.

39. A formulation cartridge according to embodiment 29, wherein the bias membrane includes a pliable membrane.

40. A formulation cartridge according to embodiment 29, wherein a membrane clamp extends around the bias membrane and couples the bias membrane with the body.

41. A formulation cartridge according to embodiment 29, wherein the body is a composite body including: an adapter plate having the cartridge adapter; a base plate including a seal port, the base plate is stacked with the adapter plate; and a membrane clamp configured to clamp the bias membrane to the base plate.

42. A method for injection of an active ingredient (AI) formulation to a plant comprising:
installing an injection tool to a plant, the injection tool includes a penetrating element configured to penetrate plant tissue and one or more distribution ports; coupling a formulation cartridge with the injection tool, coupling the formulation cartridge includes: fitting a cartridge adapter of the formulation cartridge with a tool adapter associated with the injection tool; and opening a formulation reservoir of the formulation cartridge with fitting of the cartridge adapter with the tool adapter, wherein the open formulation reservoir communicates the AI formulation to the one or more distribution ports of the injection tool.

43. A method according to embodiment 42, wherein coupling the formulation cartridge with the injection tool includes isolating the AI formulation from an exterior environment relative to the formulation cartridge while communicating the AI formulation to the one or more distribution ports.

44. A method according to embodiment 42 comprising delivering the AI formulation from the formulation reservoir to the one or more distribution ports with a bias membrane of the formulation cartridge.

45. A method according to embodiment 44, wherein delivering the AI formulation includes delivering the AI formulation at a delivery pressure corresponding to plastic deformation of the bias membrane.

46. A method according to embodiment 44, wherein delivering the AI formulation includes delivering the AI formulation at a delivery pressure corresponding to compression of a driving fluid along the bias membrane.

47. A method according to embodiment 42 comprising filling the formulation reservoir with the AI formulation through a unidirectional input port of the formulation cartridge.

48. A method according to embodiment 42, wherein opening the formulation reservoir includes opening a seal port, and the seal port is automatically resealable with decoupling of the formulation cartridge from the injection tool.

49. A method according to embodiment 42 comprising delivering the AI formulation to the plant through the one or more distribution ports, and the one or more distribution ports are sheltered from the plant during penetration by a penetrating profile of the penetrating element.

50. Embodiment 50 may include or use, or may optionally be combined with any portion or combination of any portions of any one or more of embodiments 1 through 49, for instance to include or use, subject matter that may include means for performing any one or more of the functions of Embodiments 1 through 49, or a machine-readable medium including instructions that, when performed by a machine, cause the machine to perform any one or more of the functions of Embodiments 1 through 49.

Chassis

The present disclosure also provides chassis for integrating two or more components of the plant injection system. In some embodiments, the chassis houses one or more injection tools and has a clamp design (for example, a clamp, caliper, pincer or clothespin design) having a gripping position and a non-gripping position, which may facilitate installation of the injection tool. For instance, the injection tools are provided on opposed arms that are movable toward (and optionally away from) each other. In some embodiments the clamp-style chassis can help retain the installed injection tools in place through the clamping action (e.g. biasing force) of the chassis. The clamp-style chassis designs described herein may include a bias element which biases the clamp to the gripping position. The clamp-style designs may alternatively or additionally include one or more elements to facilitate manipulation of the gripping surfaces away from each other, for instance to overcome a bias provided by the bias element of the clamp. In one example, the elements for manipulation allow for pre-tensioning of the injection clamp before mounting to the post portion of the plant (e.g. to adjust the applied force used for penetration with the injection tools). In an example design including opposed arms, a joint interconnects the arms and optionally includes the element. A gripping end of the arms includes the gripping surfaces and one or more injections tools, while the actuating end of the arms is used for manipulation (to install or release the clamp).

Injection tools suitable for use with the clamp-style chassis include those with a penetrating distribution body having a wedge body profile. For example, injection tools 9-25, 28-33 and 34-36 may be adapted for use with clamp-style chassis. In some embodiments, the clamp-style chassis is configured to extend around a post portion of the plant such as a stem, limb, branch, root or the like. The injection tool is configured to advance into the post portion of the plant through operation of the clamp. More specifically, the clamp-style chassis applies a bias to the one or more injection tools to advance penetration of the plant with the injection tools.

In further embodiments, the chassis has a spring-clamp clothespin style design. In yet further embodiments, the chassis, whether a clamp or more specifically a spring-clamp clothespin style design, comprises opposing gripping arms each having a front gripping end and a back actuating end, wherein the gripping arms are biased together in a gripping position in which the front gripping ends are pushed toward each other and the back actuating ends are spread apart from each other. The chassis is placed in the non-gripping position by applying pressure on the back actuating ends against the biasing force causing the front gripping ends to spread apart from each other and the back actuating ends to be moved toward each other.

In some embodiments, the clamp or spring-clamp clothespin style chassis houses one or more injection tools and defines an internal channel system which when connected to the plant injection system places the one or more injection tools in fluid communication with a fluid delivery system of a plant injection system. In further embodiments, the opposed gripping arms have opposed gripping surfaces on the gripping end, and the one or more injection tools may be housed on one or both gripping surfaces of the gripping arms. In yet further embodiments, the opposed gripping surfaces each define a recess in the front gripping end resulting in the chassis having a jaw profile when viewed from the side. The recess may be sized and shaped according to the expected circumference of the target plant.

In some embodiments, the clamp or spring-clamp clothespin style chassis is configured such that: i) in the non-gripping position, the gripping ends spread apart sufficiently to provide clearance space between the one or more injection tools and the post portion of the plant and the gripping surface (if no injection tool is positioned on the gripping surface) and the post portion of the plant such that the gripping ends of the chassis can receive the post portion of the target plant; and, ii) in the gripping position, the biasing force of the chassis at least partially advances the injection tool into the post portion of the target plant. Consequently, during installation of the plant injection system, the one or more injection tools are mounted on the plant by applying pressure on the actuating end of the chassis, placing opposed gripping surfaces (now spread apart by virtue of the applied pressure on the actuating end) on either side of a post portion of a plant, and relieving pressure from the actuating end permitting the biasing force of the chassis to move the gripping ends toward each other, causing the gripping ends to clamp down on the post portion of the plant and apply a driving force to advance the injection tool into the plant. In some embodiments, the chassis may include additional elements for optionally providing additional driving force to drive the injection tool into the plant such as a thumbscrew or jack. In one example, the biasing force of the chassis and/or the additional force supplied by additional elements continues to apply force after installation to maintain the clamp and the associated one or more injection tools in the installed configuration. Alternatively, or in addition, an installer can manually apply additional force to the chassis to advance the injection tool into the plant. As the one or more injection tools penetrate the plant the gripping surfaces, for example the arcuate recessed gripping surfaces in the case of a chassis having a jaw profile, or optional flanges associated with the chassis, couple along the exterior of the plant and arrest further penetration thereby leaving the injection tools at a specified depth in the post portion of the plant, for instance corresponding to a dimension of the injection tools, such as length, position of the jaw profiles, gripping surfaces or flanges relative the tool penetrating elements. Accordingly, in some embodiments, the injection tool is chosen not to exceed a desired length, for example, the injection tool has a length that does not exceed the expected depth of sapwood in the target plant.

Example clamp-style chassis described herein facilitate the rapid installation of one or more injection tools to a specified location of the plant (e.g., a specified depth corresponding to the location of plant vasculature). Accordingly, in some embodiments, novice users readily and accurately install the injection tools without over or under-penetrating the plant tissue. Additionally, in some embodiments, the clamp-style chassis retain the injection tools in place through the clamping action of the chassis for ongoing delivery of AI formulations through the installed injection tools. Time consuming and laborious penetrations of plants, installation of pegs, and delivering formulations through pegs (with syringes or the like) may thereby be minimized. Further, when decoupling of the injection tool from the plant is specified, in some embodiments, the clamp is simply actuated in an opposed manner relative to the bias provided by the chassis to withdraw the one or more injection tools from the plant.

Various exemplary embodiments of chassis of described in further details below.

a) Clothespin

Figure 48:
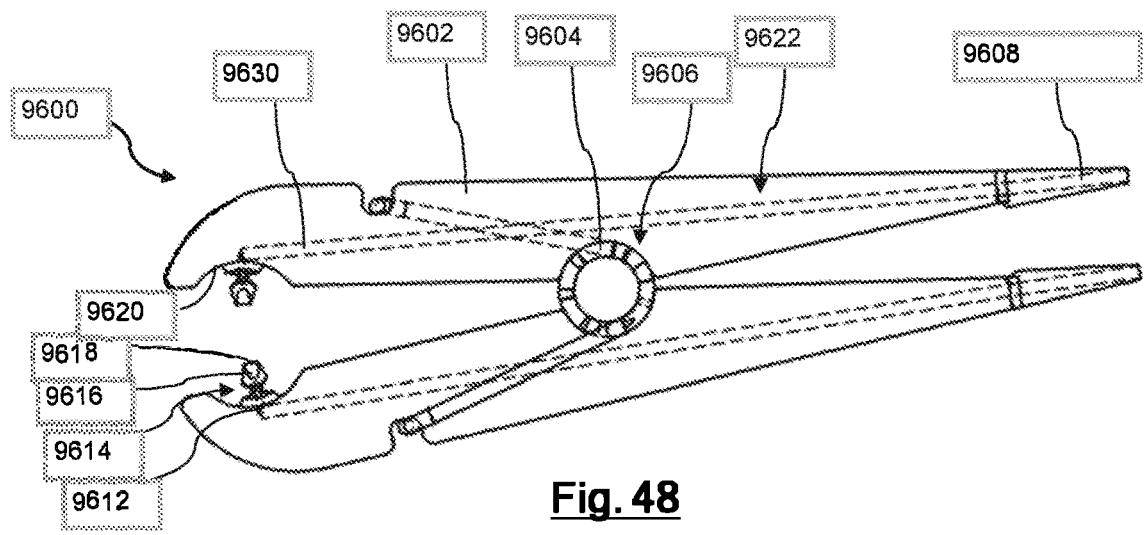
FIG. 48 is a side view of an embodiment of an injection clamp according to the disclosure.
Figure 49:
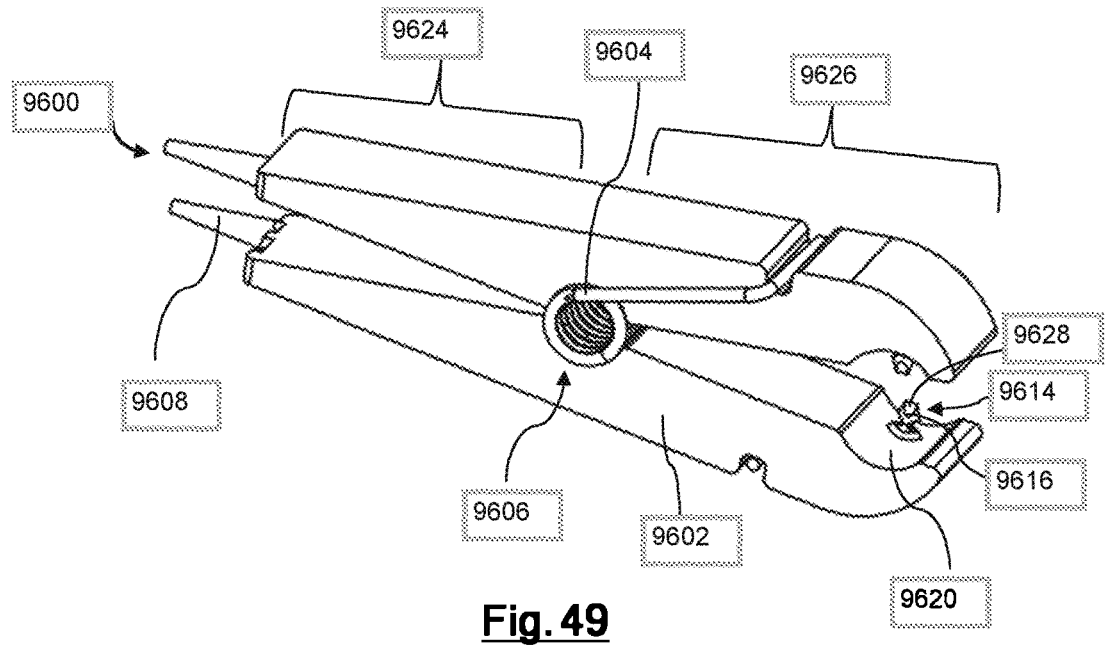
FIG. 49 is a perspective view of the injection clamp of FIG. 48.
Figure 52A:
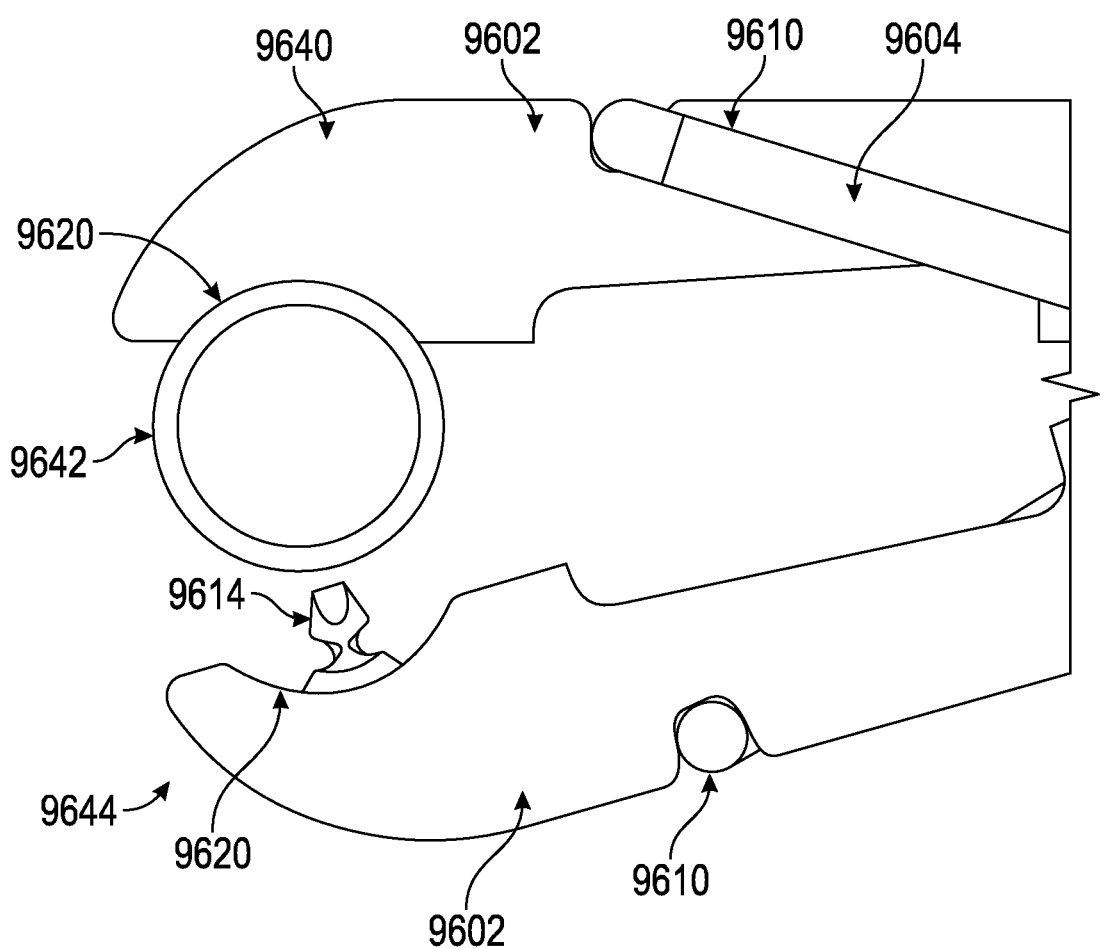
FIG. 52A is a first schematic view of the injection clamp of FIG. 48 in a coupled configuration.
Figure 52B:
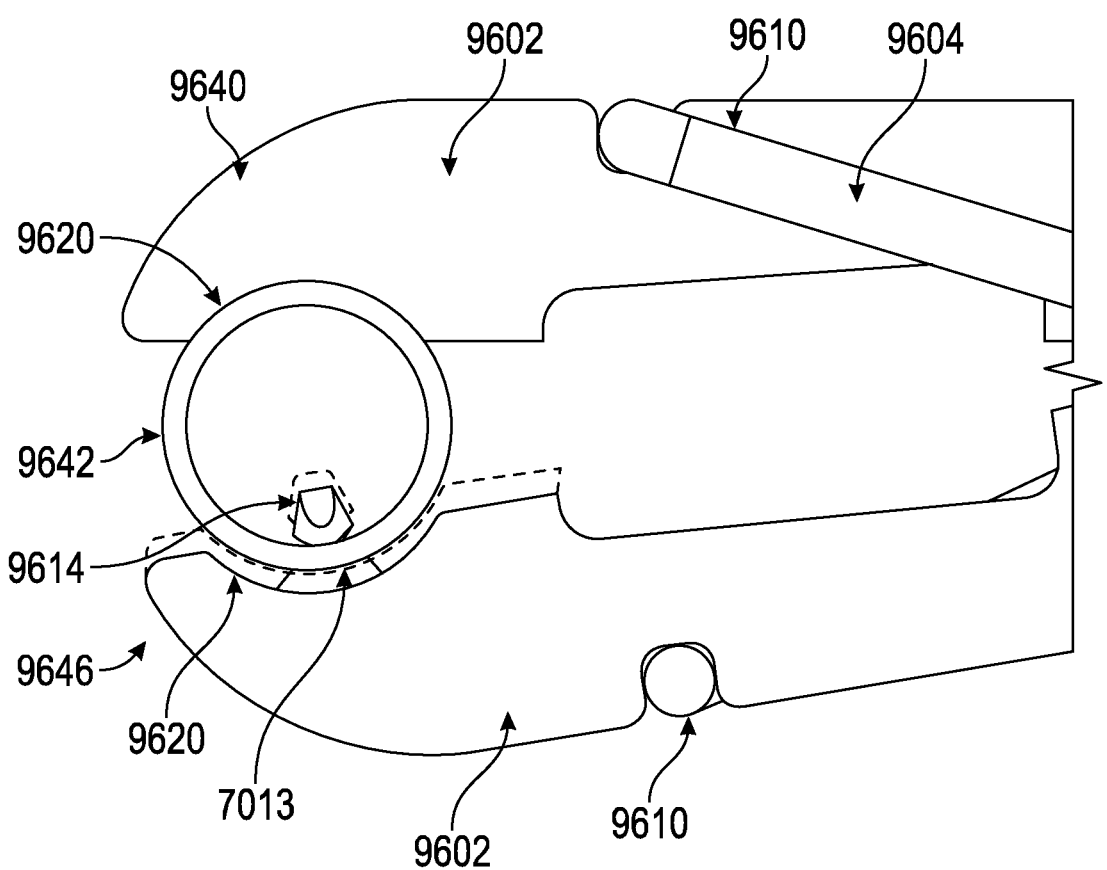
FIG. 52B is a second schematic view of the injection clamp of FIG. 52A in an installed configuration.

Referring now to the figures, FIGS. 48 and 49 show one example of a clamp-style chassis 9600 according to the disclosure, which has a gripping position shown in FIG. 52B and a non-gripping position shown in FIG. 52A. The chassis 9600 includes two opposed gripping arms 9602 interconnected at a joint 9606 in a manner that permits relative motion between the gripping arms 9602 between the gripping position and non-gripping position. The gripping arms 9602 each have a gripping surface 9620 and are separated into a front gripping end 9626 and a back actuating end 9624 by joint 9606. The gripping end 9626 of the gripping arms 9602 are configured to grip a post portion of a plant, for instance as opposed clamping elements. In the specific example, each front gripping end 9626 defines a recess such that the gripping surface 9620 has a recessed shape. In some embodiments, the recess is shaped to correspond to the shape of a plant post portion. For example, when the post portion is a stem of the plant, the recess includes a complementary profile having a similar radius and contour (e.g. in the manner of a cylinder) to the stem post portion. In some embodiments, the recess is concave and consequently chassis 9600 has a jaw profile when viewed from the side. Recessed gripping surfaces 9620 are also referred to herein as jaw profiles, whether or not concave. In some embodiments, the gripping surfaces 9620 are configured to be complementary to a corresponding post portion of a plant to which the chassis will be mounted. Each of the gripping surface 9620 is optionally contoured as a segment of a cylinder wall corresponding to a cross-sectional profile through a post portion of the plant.

Joint 9606 may be fitted with a biasing element 9604, which biases the gripping arms 9602 together in a gripping position in which the front gripping ends 9626 are pushed toward each other and the back actuating ends 9624 are spread apart from each other. The bias element 9604 may be, among other things, a torsion spring or leaf spring. In some embodiments, portions of the bias element 9604 are seated in notches in the gripping arms 9602.

The chassis 9600 further includes at least one injection tool 9614 located at the gripping surface 9620 portion of the gripping arms 9602. In the example shown in FIGS. 48 and 49, an injection tool 9614 is included in each of the gripping surfaces 9620 directly (substantially directly) opposed to each other. In another example, one of the gripping surfaces 9620 includes one or more injection tools 9614 while the opposed gripping surface 9620 does not include injection tools. In yet another example, one or more of the gripping surfaces 9620 each include one or more injection tools 9614. In a further example, one of the gripping surfaces 9620 includes a functional injection tool 9614, while the other gripping surface includes an opposed non-functional injection tool (e.g. does not include a fluid pathway or the fluid pathway is not connected or not operationally connected to the plant injection system), or post such as a wedge-shaped post. In other examples injection tools 9614 are arranged along one or more of the gripping end 9626 of the gripping arms 9602.

Injection tools 9614 suitable for use with the clamp-style chassis include those with a penetrating distribution body having a wedge body profile. For example, injection tools 9-25, 28-33 and 34-36 may be adapted for use with clamp-style chassis. Each of the referenced injection tools include a penetrating element 9628, which facilitates installation of the injection tools 9614 with operation of the injection clamp, for instance with force provided by the bias element 9604, manual operation by the user or the like.

Figure 50:
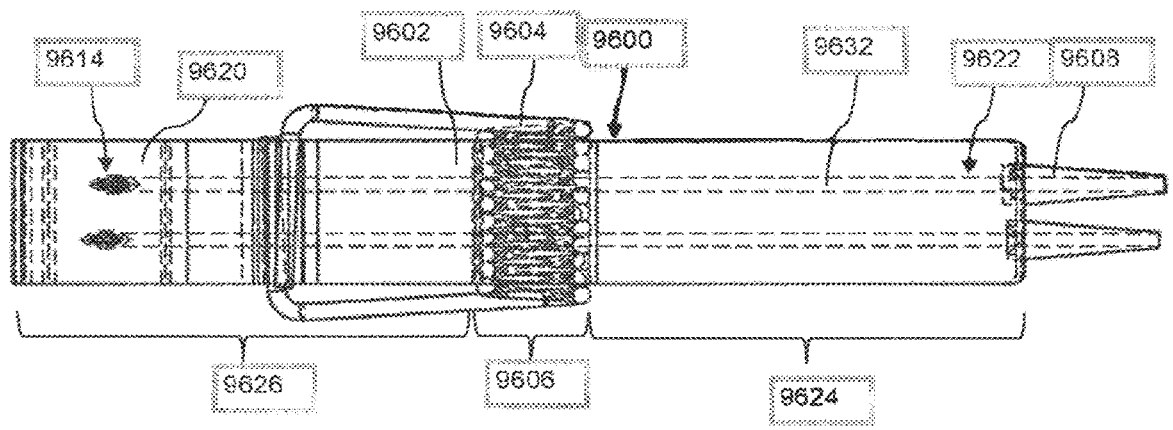
FIG. 50 is a top view of the injection clamp of FIG. 48.

Referring now to FIG. 50, the chassis 9600 optionally includes one or more delivery channels 9622. In the example shown, the delivery channel 9622 includes component channels 9632, and each of the component channels 9632 extends along one of the arms 9602, for instance within the respective arm 9602 interior. In another example, the delivery channels are external to the arms 9602 and couple with the injection tools 9614, for instance proximate to the injection tools 9614. At the actuating end 9624 of the arms 9602, the component channels 9632 extend from plug-like input fitting 9608 including, but not limited to, cleats, bayonet fittings, threaded fittings or the like. The component channels 9632 extend to a channel outlet 9612 associated with the respective injection tools 9614 (see FIG. 1). Each of the injection tools 9614 includes one or more distribution ports in an example tool body 9616 (shown in more detail in FIGS. 23-25) configured to distribute an active ingredient (AI) formulation to the plant. Optionally, as previously described in connection with various embodiments of injection tools according to this disclosure, the distribution ports are sheltered to minimize obstruction of the ports, for instance otherwise caused during installation. For example, the distribution ports in one example are directed backward (swept back) in relation to a penetration direction of the tool body 9616.

In use, the actuating ends 9624 of arms 9602 are optionally used for manipulation of the chassis 9600. For example, the actuating ends 9624 are arranged such that they can be held in the hand of the user and pressed together to move the gripping surfaces 9620 away from one another. In an example including the bias element 9604, the arms 9602 are manually pivoted and pressure applied to actuating ends 9624 by movement of a user's hand overcome the bias of the bias element 9604 to move the gripping surfaces 9620 away from each other, moving the chassis 9600 into the non-gripping position such that gripping surfaces 9620 can be positioning around a portion of the plant in preparation for installation.

With gripping surfaces 9620 opened, the user moves the chassis 9600 to position a portion of the plant (e.g., a post portion) between the gripping ends 9626 of the gripping arms 9602 including the gripping surfaces 9620. The actuating ends 9624 are released (including relaxing the grip of the hand) and the bias element 9604 moves the gripping surfaces 9620 toward the plant. For instance, the bias element 9604 rotates the arms 9602 and the gripping surfaces 9620 into clamping engagement along the post portion of the plant. The bias element 9604 engages the injection tools 9614 with the plant, and in some examples drives the injection tools 9614 into the plant for installation. In another example, the bias element 9604 engages the injection tools and supplemental force, for instance manually applied (e.g., at the proximal portions 9624 of the arms 9602) or applied with another bias element (jack, thumbscrew, leaf spring or the like), penetrates the injection tools 9614 into the plant. In still other examples, one or more of the bias element 9604, manual operation and a different bias element (as described herein) cooperate to penetrate the one or more injection tools 9614 into the plant for installation. Installation of the penetrating elements 9628 of the one or more injection tools 9614 includes cutting of the plant post portion and optionally includes spreading the plant tissue apart with the tool body 9616. Clamping of the chassis 9600 with the plant thereby installs the one or more injection tools 9614 with the plant.

Figure 51:
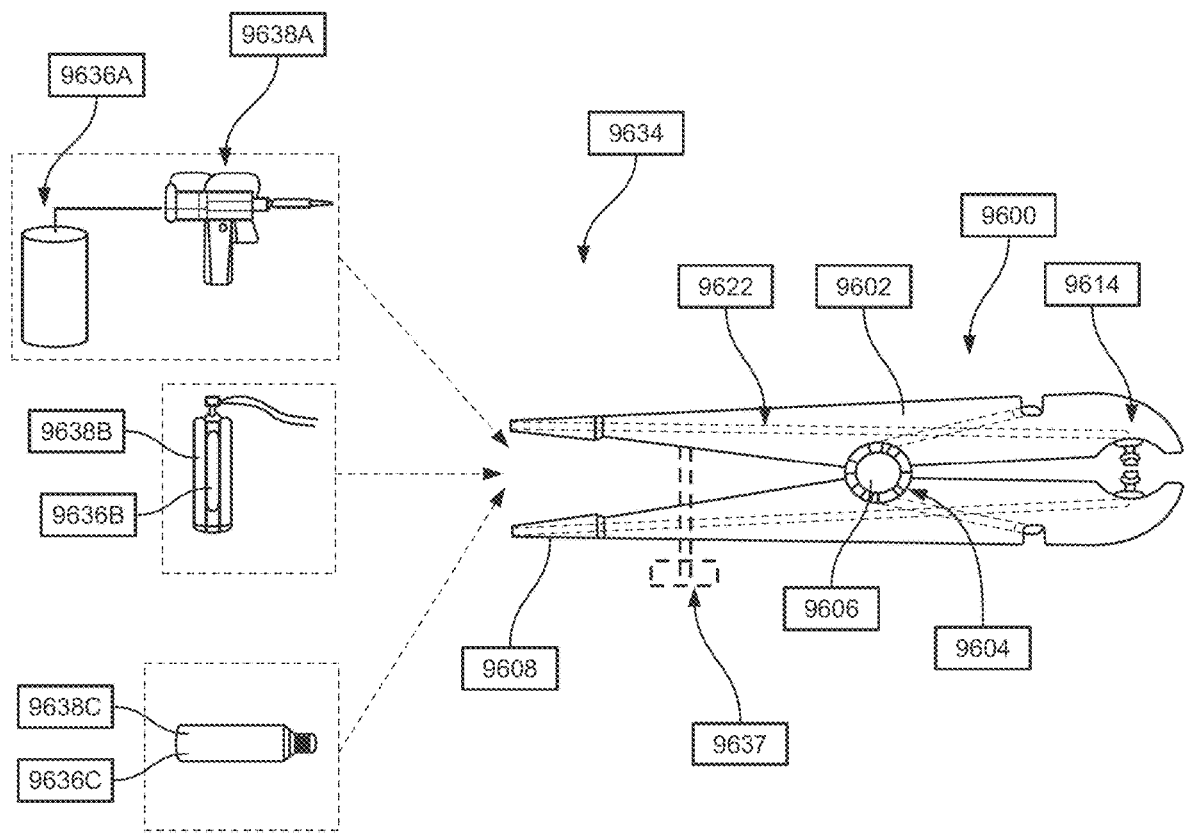
FIG. 51 is a schematic view of a plant injection system according to the disclosure including the injection clamp of FIG. 48.

In FIG. 51 an embodiment of an injection system 9634 according to the disclosure is shown. The injection system 9634 includes an example chassis 9600 and a delivery system which may comprise one or more of a formulation reservoir 9636A-C, delivery device 9638A-C or both. The various delivery devices have previously been described. One or more of the formulation reservoirs 9636A-C and the delivery devices 9638A-C are fluidly coupled with the chassis 9600 for delivery of an AI formulation from the reservoirs 9636A-C to the injection tools 9614. In one example, the fluid coupling includes one or more of tubing, conduit or the like. In another example, the fluid coupling includes a direct or indirect coupling between the chassis 9600 and the formulation reservoirs 9636A-C and delivery devices 9638A-C. For instance, one or more of the formulation reservoirs 9636A-C, delivery devices 9638A-C and chassis 9600 are provided as a consolidated assembly (e.g., with the reservoir or delivery device physically coupled with the injection clamp).

Referring again to FIG. 51, another example of a bias element 9637 is shown. As previously discussed, penetration of a plant with the one or more injection tools 9614 is in some examples accomplished with additional bias supplied manually or with another example of a bias element 9637. In the example shown in FIG. 51, the bias element 9637 is optionally provided as a supplement bias element to the bias element 9604. In another example, the bias element 9637 is provided as a single bias element to the chassis 9600. In operation, the bias element 9637 applies force between the arms 9602 of the example chassis 9600. The applied force drives the gripping end 9626 of the gripping arms 9602 and consequently the gripping surfaces 9620 together and toward the intervening plant. Operation of the bias element 9637 drives the one or more injection tools 9614 into the plant, for instance according mechanical advantage provided by the bias element 9637 and optionally by its location along the arms 9602 spaced from the joint 9606. The bias element 9637 includes, but is not limited to, a thumbscrew, jack, piston and cylinder, leaf spring or the like that provides a driving force to the chassis 9600 to install the injection tools 9614.

FIGS. 52A and 52B show an injection clamp 9640 (also referred to as chassis or clamp-style chassis) in a coupled (non-gripping) configuration 9644 and an installed (gripping) configuration 9646, respectively. Referring first to FIG. 52A, the injection clamp 9640 is shown in this example with one injection tool 9614. In another example, the injection clamp 9640 includes one or more injection tools 9614, for instance injection tools 9614 on opposed (or the same) gripping surfaces 9620. The gripping surfaces 9620 are positioned around the plant 9642, and the injection tool 9614 is in close proximity to the perimeter of the plant 9642. A bias element, such as element 9604, shown in FIGS. 48 and 49 applies a bias to the arms 9602 and accordingly to the associated gripping surfaces 9620 thereby moving the injection tool 9614 and the opposed jaw profile or gripping surface 9620 into engagement with the plant 9642.

FIG. 52B shows the injection clamp 9640 in an installed configuration 9646 with the injection tool 9614 penetrating the plant 9642 and in position to begin distribution of an AI formulation. As shown the opposed gripping surfaces 9620 are moved closer to each other, and the injection tool 9614 is driven into the plant 9642, for instance with one or more of bias from the bias element 9604, bias from the bias element 9637, or manual operation including driving apart the proximal portions 9624 of the arms 9602. In a first example shown in FIG. 52B the injection tool 9614 is driven into the plant 9642 and its penetration is arrested with the abutting face 7013 previously shown in FIGS. 23-24. The abutting face 7013 is optionally included with the injection tool 9614 (or 7001) and engages with the plant 9642 to maintain the injection tool at a corresponding installation depth (e.g., as shown in FIG. 52B).

In another example, the injection tool 9614 is without an abutting face, and instead uses the gripping surface 9620 proximate to the injection tool 9614 to control the installation depth of the injection tool 9614. As shown in FIG. 52B, additional penetration of the injection tool 9614 (shown in broken lines) is arrested with the gripping surface 9620 engaged with the plant 9642 (also shown in broken lines).

A number of injection tools such as injection clamps (having on board injection tools), chassis, delivery devices or the like have been described herein as Embodiments. However, a person of skill can understand from a reading of this disclosure that still other Embodiments are encompassed by this disclosure. Non-limiting examples of devices and methods within scope of this disclosure include the following Aspects:

Aspect 1 includes a plant injection clamp comprising: a first arm extending between first proximal and distal portions; a second arm extending between second proximal and distal portions; a bias element coupled between the first and second arms, the bias element configured to move one of the first or second arms relative to the other of the second first arm; and wherein one or more of the first or second arms includes a jaw configured to penetrating a plant and administer an active ingredient (AI) formulation, the jaw includes: a jaw profile configured for engagement with the plant; and an injection tool coupled with the jaw profile, the injection tool includes a penetrating element configured to penetrate the plant and one or more distribution ports configured to administer the AI formulation to the plant.

Aspect 2 can include, or can optionally be combined with the subject matter of Aspect 1, to optionally include wherein the first and second arms are rotatably coupled at a joint.

Aspect 3 can include, or can optionally be combined with the subject matter of one or any combination of Aspects 1 or 2 to optionally include wherein the pivot joint includes the bias element.

Aspect 4 can include, or can optionally be combined with the subject matter of one or any combination of Aspects 1-3 to optionally include wherein the each of the first and second arms include jaw profiles, and the first and second arms are movable between coupled and installed configurations: in the coupled configuration the jaw profiles of the first and second arms are proximate to the plant; and in the installed configuration the jaw profiles of the first and second arms are coupled along the plant and the injection tool along at least one of the jaw profiles is penetrated through the plant.

Aspect 5 can include, or can optionally be combined with the subject matter of one or any combination of Aspects 1-4 to optionally include wherein the bias element includes one or more of a torsion spring, leaf spring, jack or thumbscrew.

Aspect 6 can include, or can optionally be combined with the subject matter of Aspects 1-5 to optionally include wherein the bias element extends between the first and second proximal portions of the first and second arms.

Aspect 7 can include, or can optionally be combined with the subject matter of Aspects 1-6 to optionally include wherein each of the first and second arms includes respective jaws each having jaw profiles and injection tools.

Aspect 8 can include, or can optionally be combined with the subject matter of Aspects 1-7 to optionally include wherein the first arm includes the jaw, and the second arm includes a second jaw profile.

Aspect 9 can include, or can optionally be combined with the subject matter of Aspects 1-8 to optionally include wherein the jaw profile is a plant complementary profile.

Aspect 10 can include, or can optionally be combined with the subject matter of Aspects 1-9 to optionally include a delivery channel in communication with the one or more distribution ports of the injection tool.

Aspect 11 can include, or can optionally be combined with the subject matter of Aspects 1-10 to optionally include wherein the delivery channel extends from an input fitting through one or more of the first or second arms to a channel outlet proximate to the injection tool.

Aspect 12 can include, or can optionally be combined with the subject matter of Aspects 1-11 to optionally include a plant injection system comprising: an active ingredient (AI) reservoir configured to store an AI formulation; a delivery device associated with the AI reservoir; and a plant injection clamp having one or more injection tools in communication with the AI reservoir, the plant injection clamp includes: one or more jaw profiles configured to engage a plant; the one or more injection tools coupled along the one or more jaw profiles; and a biasing element coupled with the one or more jaw profiles, wherein the biasing element is configured to direct the at least one injection tool into the plant.

Aspect 13 can include, or can optionally be combined with the subject matter of Aspects 1-12 to optionally include wherein the plant injection clamp includes first and second arms, and the first and second arms are rotatably coupled.

Aspect 14 can include, or can optionally be combined with the subject matter of Aspects 1-13 to optionally include wherein the biasing element includes one or more of a torsion spring, leaf spring, jack or thumbscrew coupled with one or more of the first or second arms and configured to move at least one of the first or second arms relative to the other of the second or first arm.

Aspect 15 can include, or can optionally be combined with the subject matter of Aspects 1-14 to optionally include wherein each of the first and second arms includes respective jaw profiles and one or more of the respective jaw profiles includes the one or more injection tools.

Aspect 16 can include, or can optionally be combined with the subject matter of Aspects 1-15 to optionally include wherein each of the first and second arms includes respective jaw profiles and each of the respective jaw profiles includes an injection tool of the one or more injection tools.

Aspect 17 can include, or can optionally be combined with the subject matter of Aspects 1-16 to optionally include wherein the one or more jaw profiles includes at least two jaw profiles opposed to each other, and each of the at least two jaw profiles have a plant complementary profile corresponding to the shape of a post portion of the plant.

Aspect 18 can include, or can optionally be combined with the subject matter of Aspects 1-17 to optionally include a delivery channel in communication with the AI reservoir and the at least one injection tool.

Aspect 19 can include, or can optionally be combined with the subject matter of Aspects 1-18 to optionally include wherein the one or more injection tools include a penetrating element and one or more distribution ports configured to administer the AI formulation to the plant.

Aspect 20 can include, or can optionally be combined with the subject matter of Aspects 1-19 to optionally include a method for using a plant injection system comprising: installing one or more injection tools of a plant injection clamp to a portion of a plant, installing the one or more injection tools includes: positioning jaw profiles proximate to the portion of the plant, one or more of the jaw profiles includes the one or more injection tools; actuating the plant injection clamp to move the jaw profiles toward the portion of the plant; and penetrating the one or more injection tools into the portion of the plant according to the actuation of the plant injection clamp.

Aspect 21 can include, or can optionally be combined with the subject matter of Aspects 1-20 to optionally include administering an active ingredient (AI) formulation to the plant through the one or more injection tools.

Aspect 22 can include, or can optionally be combined with the subject matter of Aspects 1-21 to optionally include wherein penetrating the one or more injection tools into the portion of the plant includes penetrating the one or more injection tools along a penetration axis; and administering the AI formulation includes: conveying the AI formulation to the one or more injection tools; and distributing the AI formulation through one or more distribution ports of the one or more injection tools, the one or more distribution ports transverse relative to the penetration axis.

Aspect 23 can include, or can optionally be combined with the subject matter of Aspects 1-22 to optionally include wherein the plant injection clamp includes first and second arms each having a first jaw profile and a second jaw profile, respectively, of the jaw profiles; and actuating the plant injection clamp includes biasing the first arm and first jaw profile toward the second arm and second jaw profile with a biasing element.

Aspect 24 can include, or can optionally be combined with the subject matter of Aspects 1-23 to optionally include wherein the first and second arms are rotatably coupled at a joint; and actuating the plant injection clamp with the biasing element includes biasing the first and second arms with the bias element proximate the joint.

Aspect 25 can include, or can optionally be combined with the subject matter of Aspects 1-24 to optionally include wherein the first and second arms include portions remote from the respective first and second jaw profiles; and actuating the plant injection clamp includes driving the portions of the first and second arms apart with the biasing element.

Aspect 26 can include, or can optionally be combined with the subject matter of Aspects 1-25 to optionally include wherein the plant injection clamp includes first and second arms each having a first jaw profile and a second jaw profile, respectively, of the jaw profiles; and actuating the plant injection clamp includes manually biasing the first arm and first jaw profile toward the second arm and second jaw profile.

Aspect 27 can include, or can optionally be combined with the subject matter of Aspects 1-26 to optionally include wherein installing the one or more injection tools includes: arresting penetration of the one or more injection tools beyond a specified depth based on at least one dimension of the one or more injection tools and engagement of the respective jaw profile with the portion of the plant.

b) Composite Chassis

The disclosure also provides chassis embodiments (e.g. as show in FIGS. 53-68D) that in some embodiments integrate a fluid delivery receiving system (also referred to as a support framework) (e.g. 9802 in FIG. 53), an injection tool (e.g. 9806 in FIG. 53), and delivery interface (e.g. 9824 in FIG. 53) extending between the delivery receiving system and the injection tool and placing the injection tool and its distribution ports in fluid communication with AI fluid when a fluid delivery system is installed in the fluid receiving system and activated. For ease of reference this chassis style is referred to as a "composite chassis" or "system body."

Figure 53:
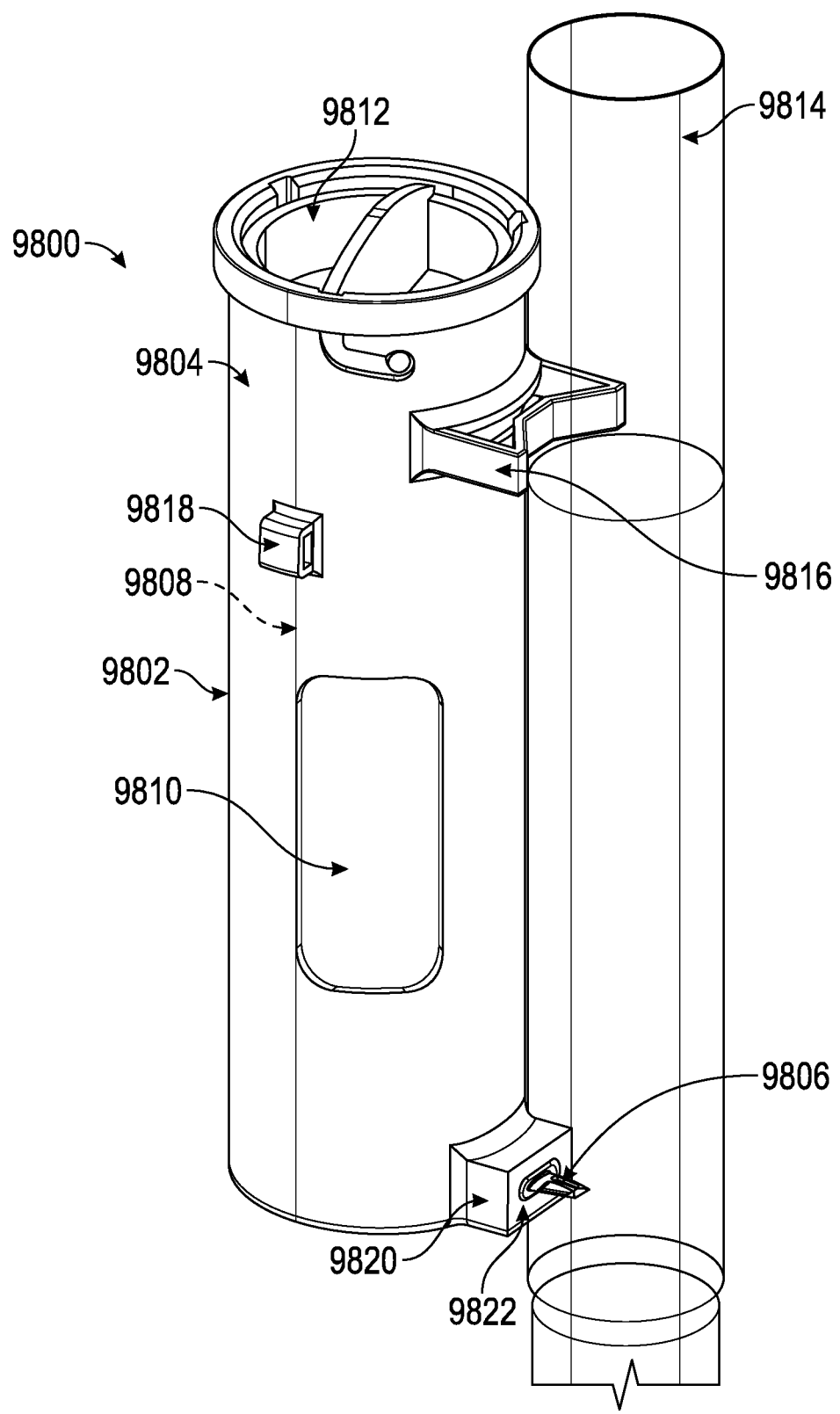
FIG. 53 is a perspective view of one example of a composite plant injection system coupled with a plant.
Figure 59:
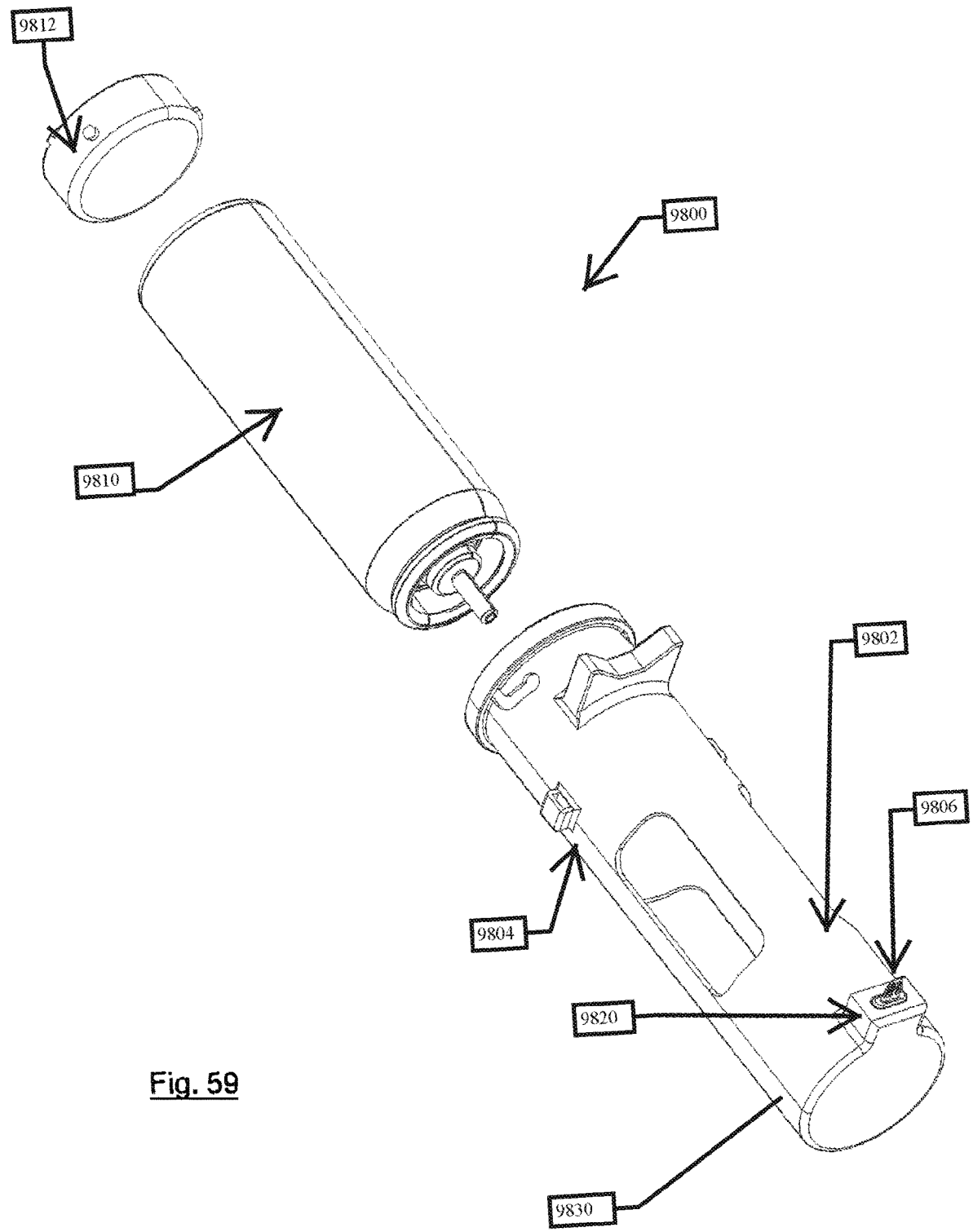
FIG. 59 is an exploded view of another example of a composite plant injection system including a formulation cartridge.
Figure 60C:
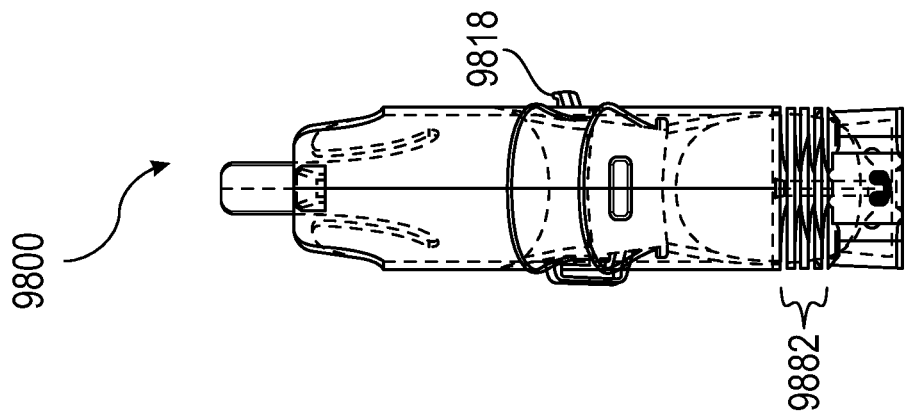
FIGS. 60B-C are front view of the composite plant injection system in FIG. 60A.
Figure 60B:
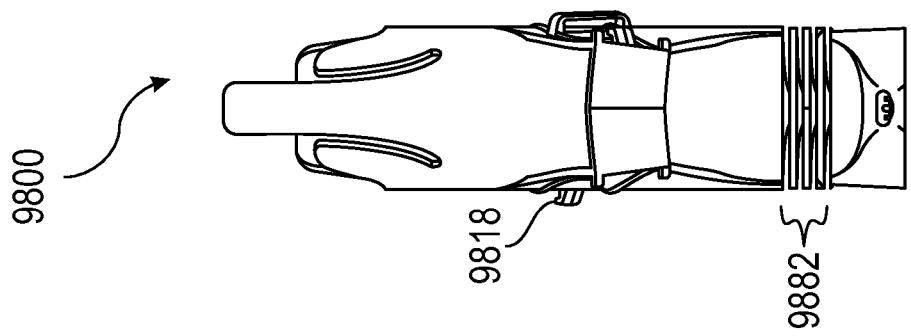
Figure 60A:
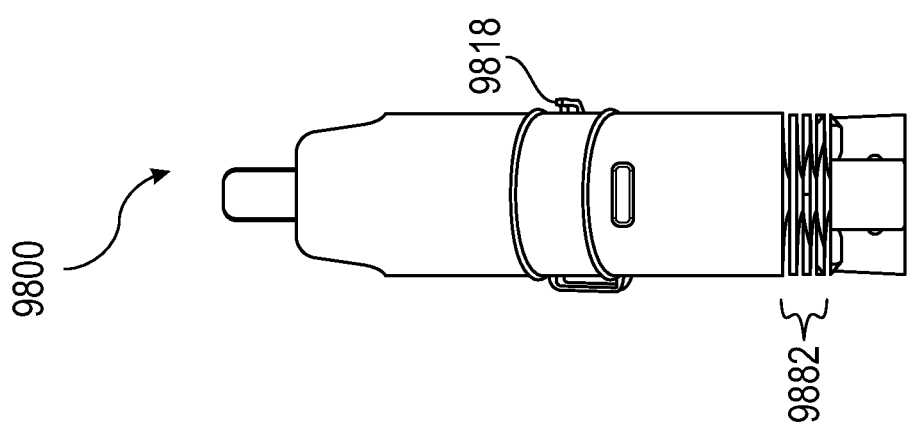
FIG. 60A is a rear view of another example of a composite plant injection system.
Figure 62A:
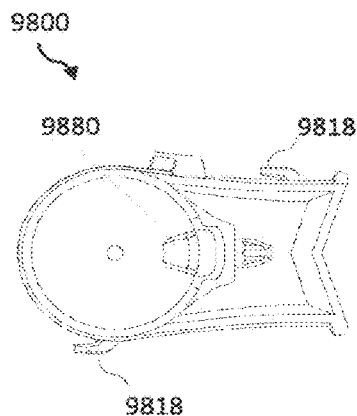
FIGS. 62A-C are top views of the composite plant injection system in FIG. 60A.
Figure 62B:
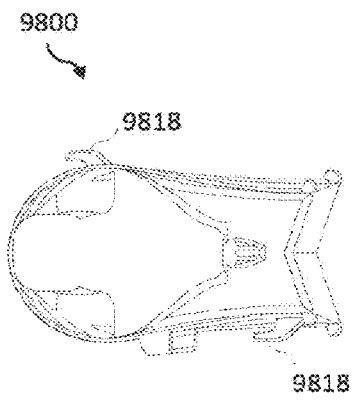
Figure 62C:
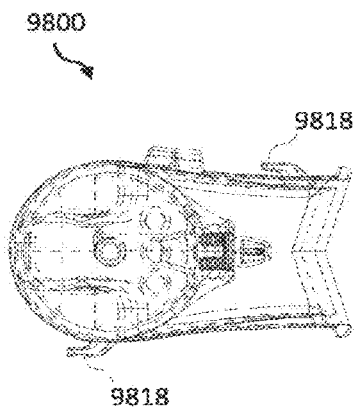

An example of a fluid delivery system suitable for use with the composite chassis is a source of pressurized fluid, such as a cartridge, for example similar to delivery device 9810 in FIGS. 53, 59 and 64B. The corresponding fluid receiving system in some embodiments is a cartridge magazine (also referred to as the fluid delivery receiving system 9802) fitted with a mechanism for activating the cartridge (opening the cartridge) to release the AI fluid. Injection tools suitable for use with the chassis include those with a penetrating distribution body having a wedge body profile. For example, injection tools shown in FIGS. 9-25, 28-33 and 34-36 may be adapted for use with the composite chassis. The system body includes a delivery interface extending between the cartridge magazine and the injection tool. The delivery interface fluidly interconnects the cartridge magazine with the one or more distribution ports of the injection tool.

Figure 63A:
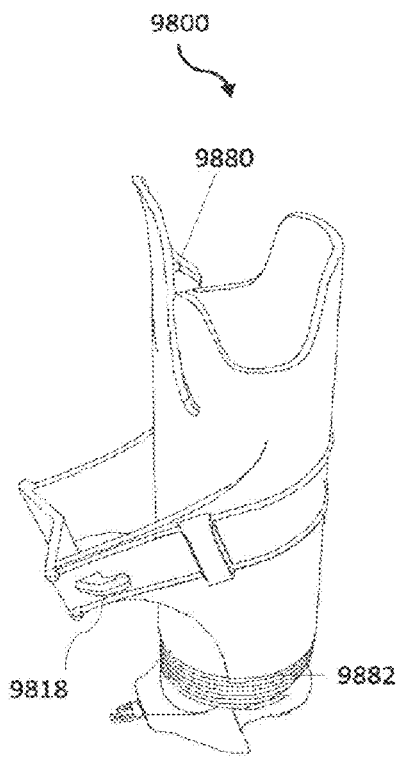
FIGS. 63A-G are various perspective views of the composite plant injection system in FIG. 60A.
Figure 63B:
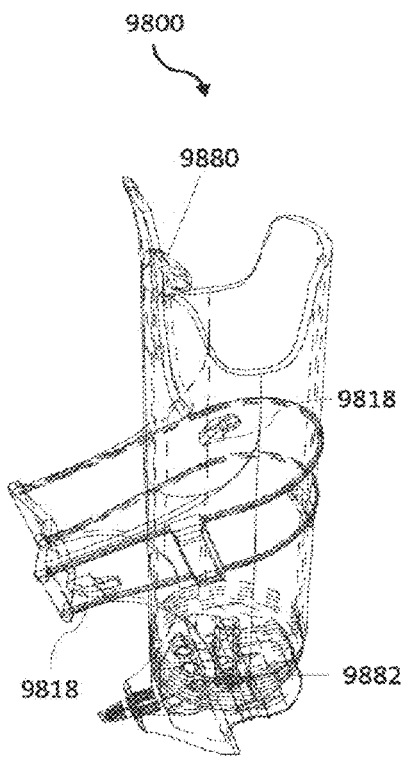
Figure 63C:
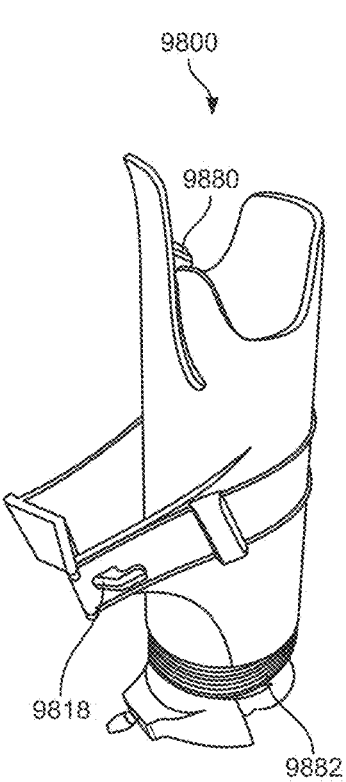
Figure 63D:
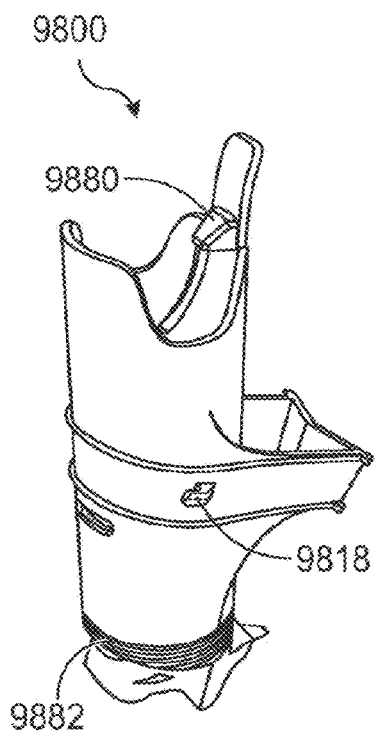
Figure 63E:
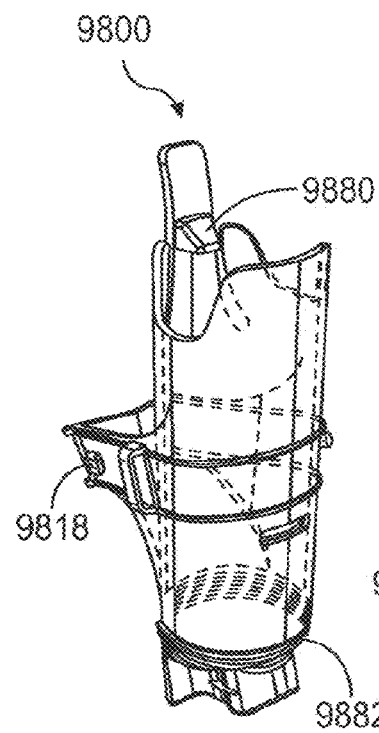
Figure 63F:
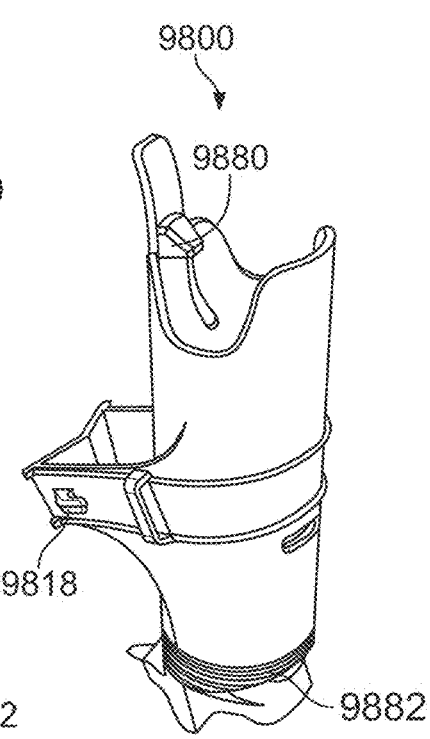
Figure 63G:
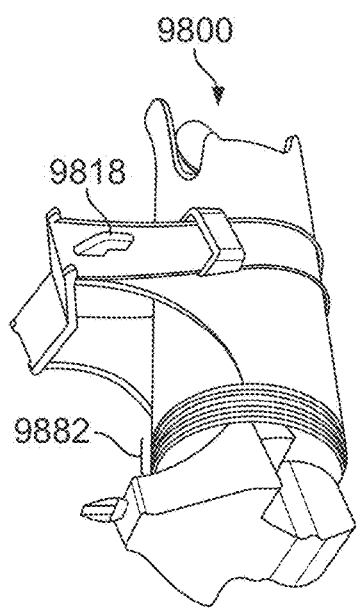
Figure 63H:
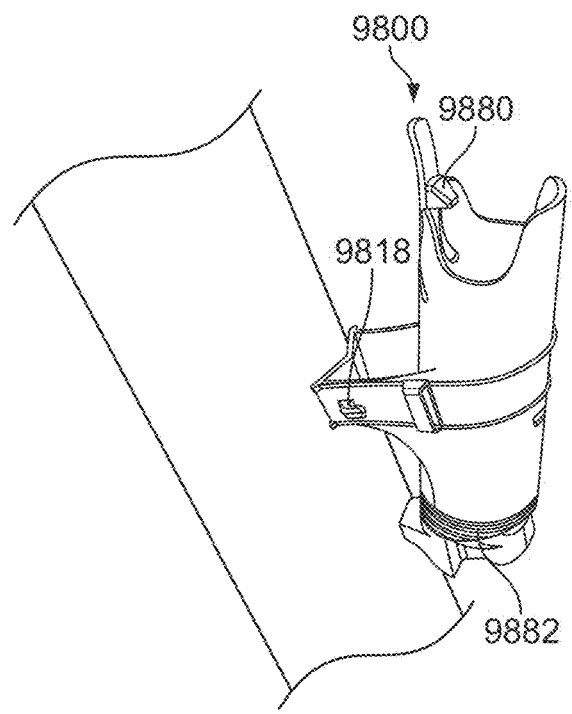
FIG. 63H is a perspective view of the composite plant injection system in FIG. 60A in an installed configuration.

Thus, in embodiments, the composite chassis stores active ingredient (AI) formulations and delivers the formulations to an injection tool provided on board with the remainder of the system. The chassis is, in one example as shown in FIG. 53, installed as a consolidated assembly proximate to the plant (e.g., coupled along a stem, trunk or the like) with the injection tool penetrated into the plant active vascular tissue. In other examples, such as shown in FIGS. 63H and 64A and B, the chassis is also installed as a consolidated assembly but at an angle to the post portion of the plant. The system body is optionally additionally coupled to the plant, for instance with one or more installation brackets, straps, belts, fasteners or the like. The chassis includes a support frame work that retains each of the components, such as a formulation reservoir for the formulation, the injection tool, and interconnecting fluid interfaces within the frame work to facilitate installation of the system to the plant.

In use, the composite chassis is pushed into a post portion of a plant to install the injection tool into the plant. In some embodiments at least a portion of the fluid receiving system 9802 includes a flexible portion 9882, for example to mitigate damage to the tip during installation. The composite chassis can be optionally further coupled to the post portion of the plant, for example to provide additional stability and/or help maintain the installed injection tool in place. The AI formulation cartridge is placed in the cartridge magazine and in some embodiments installation of a formulation cartridge automatically activates the cartridge, opening the formulation cartridge and initiating fluid communication between the formulation to the injection tool. In other embodiments, the cartridge can be stored in the magazine and activated at a desired time, for example, by pressing down on the cartridge such as by screwing down a cap onto the magazine as is illustrated in the embodiment of FIG. 53. In other embodiments, a flange 9880 may engage the cartridge resulting in activating the cartridge and maintaining it in place. In some embodiments, the position of the flange is adjustable to accommodate different length canisters and/or to permit activation at a desired time. Thus in some embodiments, the composite plant injection system is thereby operated with minimal exposure of the formulation to an exterior environment. Instead, the AI formulation is administered in an enclosed (e.g., sealed) manner from the formulation cartridge to the injection tool within the plant. Accordingly, even formulations that are not indicated for exterior use or exposure may be usable with the composite plant injection system.

The composite plant injection system is, in one example, serviced by removing an empty formulation cartridge and coupling a replacement cartridge within the cartridge magazine. The exchange of cartridges is straightforward and rapid and can therefore provide substantially uninterrupted administration of AI fluid to the plant. Optionally, the composite plant injection system includes a delivery interface having a body access port, such as a fill port that provides additional capabilities to the system. The body access port optionally allows for in service refilling of a formulation cartridge by administration of replacement formulation through the body access port that is delivered to the formulation cartridge. In other examples, the body access port facilitates the bleeding or initialization of the system. The formulation from the formulation cartridge is delivered under pressure through the injection tool and to the body access port. Intervening fluids, such as in line air, residual formulations or the like are bled from the access port, for instance into a catching reservoir. Accordingly, in some embodiments, even refilling, replacement and initialization of the system are optionally conducted with minimal exposure to an exterior environment.

FIG. 53 is a perspective view showing one example of a composite plant injection system 9800. The system 9800 includes a chassis or system body 9802. The system body 9802 provides a structural support or frame for the components of the system including a formulation reservoir, such as a cartridge magazine 9804, and an injection element, such as the example injection tool 9806. The system body supports the components and facilitates their installation as a composite assembly to the plant. The system body 9802 is constructed with one or more materials including, but not limited to, metals, polymers, composite materials or the like. In one example, the system body 9802 provides a protective housing to the components of the system including the formulation reservoir (e.g., a cartridge), the injection tool

9806, and fluid circuitry placing the injection tool and its distribution ports in fluid communication with the AI fluid in the formulation reservoir.

Referring again to FIG. 53, the system body 9802 includes a cartridge magazine 9804. In the example shown, the cartridge magazine 9804 is a component of the system body 9802 and includes shared structure. The cartridge magazine 9804 includes a cartridge socket 9808 configured for reception of a formulation cartridge 9810. In one example, at least a portion of the formulation cartridge 9810 is visible through an observation window 9836 (see FIG. 54A) in the cartridge socket 9808. The cartridge socket 9808 receives a formulation cartridge therein and provides ports, fittings or the like configured to: activate the formulation cartridge 9810 allowing AI fluid to be released; and, deliver an AI formulation from the cartridge to the remainder of the system 9800, such as the injection tool 9806. One example of a magazine closure is shown in FIG. 53 including a magazine cap 9812. As described herein, the magazine cap 9812 optionally biases the formulation cartridge 9810 toward a cartridge seat to activate (open) the cartridge for operation of the system.

As further shown in FIG. 53, the system body 9802 includes in this example one or more features configured to couple the system 9800 with an adjacent plant 9814. For example, an installation bracket 9816, such as a cleat, feet, cradle or the like extends form the system body 9802 and has a complementary profile to the plant 9814. In one example, the installation bracket 9816 cooperates with the installed injection tool 9806 to retain the system 9800 in an upright orientation aligned with the plant 9814. Optionally, the system body 9802 includes one or more restraint anchors 9818 to further facilitate coupling with the plant 9814. For instance, a belt, strap or the like is passed through the restraint anchors 9818 to hold the system 9800 in place along the plant 9814.

One example of an injection tool 9806 is shown in FIG. 53. In this example, the composite plant injection system 9800 includes a tool hub 9820 as part of the system body 9802 that positions the injection tool 9806 in a projection location relative to the remainder of the system body. In one example, the tool hub includes a tool socket 9822 having a complementary profile to the profile of the injection tool 9806. Accordingly, one or more injection tools 110 having a corresponding profile at their bases are configured for fitting with the tool socket 9822. In other examples, the injection tool 9806 is integral to the system body 9802, for instance the injection tool 9806 is bonded with the system body 9802, formed with the body as a unitary component or the like. In some embodiments, the tool hub 9820 can be retracted into the chassis 9802, for example to protect the injection tool 9806 when not in use.

Figure 54A:
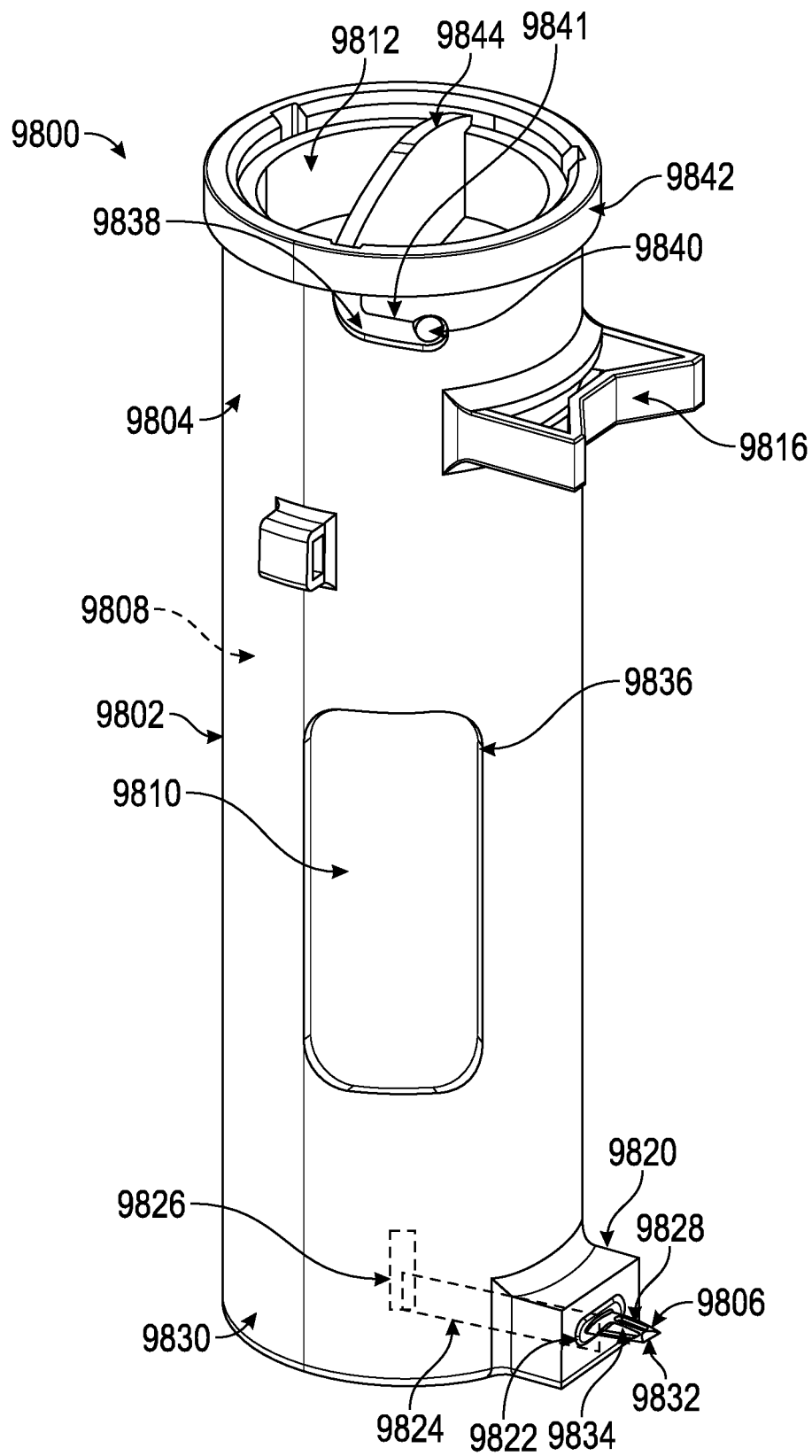
FIG. 54A is a perspective view of the composite plant injection system of FIG. 53.

FIG. 54A is a perspective view of the composite plant injection system 9800 removed from the plant 9814. One example of a delivery interface 9824 extending from the cartridge magazine 9804 to the injection tool 9806 is shown. The delivery interface 9824 includes, but is not limited to, passages, channels, tubing, reservoirs or the like that interconnect the formulation cartridge and the injection tool 9806. A cartridge seat 9826, for instance a shoulder and recess, fitting or the like in the system body 9802 (e.g., in the cartridge socket 9808) is configured to receive a corresponding portion of a formulation cartridge such as a nozzle, fitting, opening port or the like.

As further shown in FIG. 54A, the injection tool 9806 includes a tool body 9828 projecting from the tool hub 9820 proximate to a body base 9830 of the system body 9802. The tool body 9828 includes a penetrating element 9832, for instance a cutting edge, wedge or the like configured to penetrate the plant 9814. As further shown in FIG. 54A, the injection tool 9806 includes one or more distribution reservoirs 9834. As described herein the distribution reservoirs 9834 retain a quantity of the formulation in intimate engagement with the plant tissues surrounding the injection tool 9806 when installed. The delivery interface 9824 extends to the injection tool and fluidly communicates the formulation to the distribution reservoirs 9834, for instance through one or more distribution ports within the reservoirs.

One example of an observation window 9836 is shown in FIG. 54A. The formulation cartridge 9810 optionally includes one or more indicia including, but not limited to, labels, indications, bar codes, serial numbers, fill indicators or the like. The observation window 9836 permits observation of these indicia while the formulation cartridge 9810 is installed and the system 9800 is in operation.

Referring again to FIG. 54A, the composite plant injection system 9800 in this example incudes a cartridge latch 9838. As shown, the example latch 9838 includes the magazine cap 9812 and the associated portion of the system body 9802 (e.g., the portion proximate to the latch channel 9841). The magazine cap 9812 includes a cap boss 9840 received within a latch channel 9841 of the system body 9802 when the cap is positioned in a cartridge orifice 9842 of the cartridge magazine 9804. Rotation of the magazine cap 9812, for instance with manual turning of an operation lug 9844 rotates the cap boss 9840 to the seated position shown in FIG. 54A in the manner of a bayonet fitting. Optionally, the cartridge latch 9838 includes, but is not limited to, threading, a bayonet fitting, interference fit or the like configured to couple the cartridge with the system body 9802 (e.g., within the cartridge magazine 9804). In another example, operation of the cartridge latch 9838 to retain the cartridge 9810 within the system body 9802 biases the formulation cartridge 9810 toward the cartridge seat 9826. The cartridge 9810 optionally includes an operable valve, nozzle or the like, and the biasing motion opens the nozzle and allows the formulation within the cartridge 9810 to pass into the delivery interface 9824 for administration through the injection tool 9806.

Figure 54B:
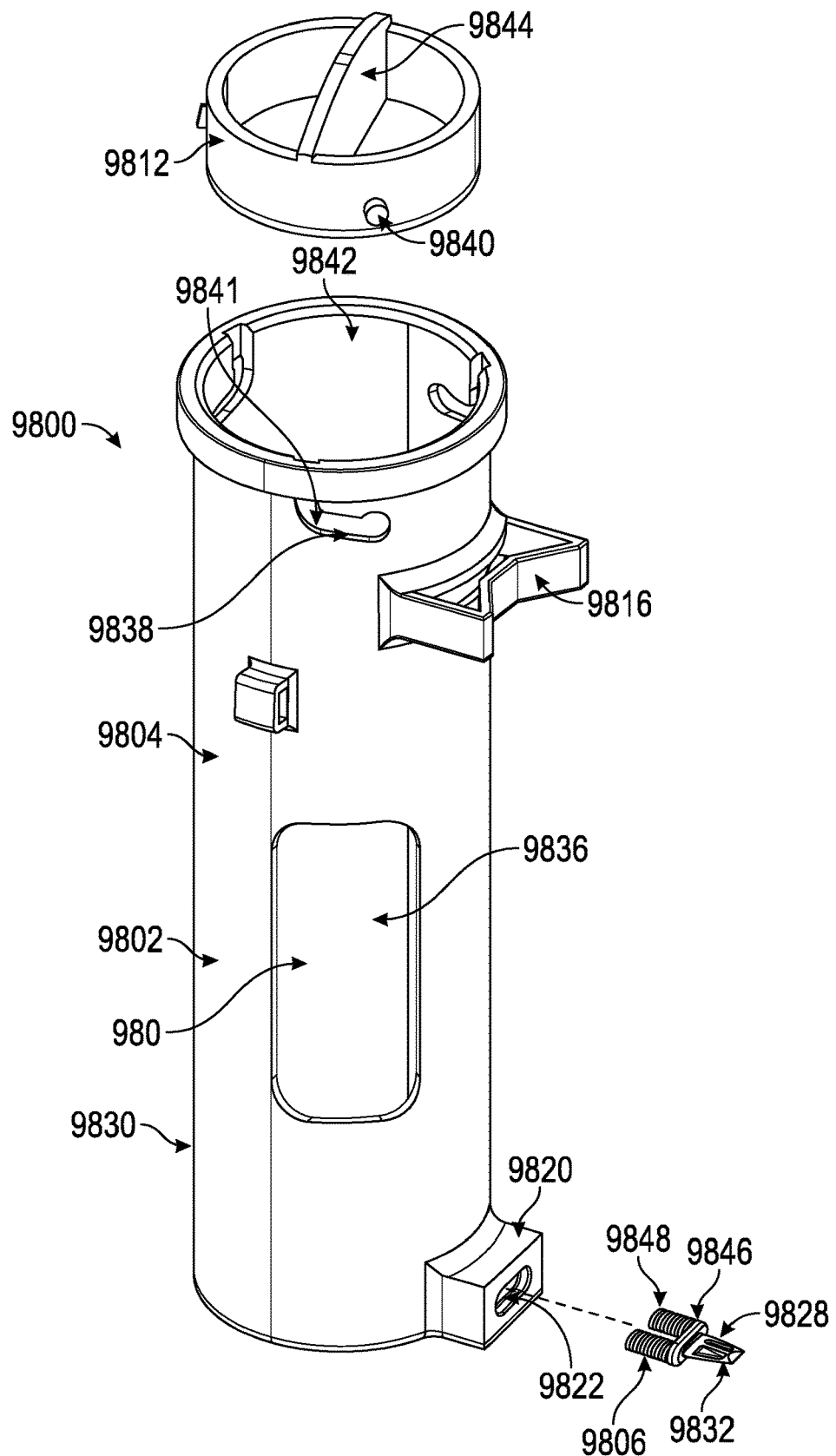
FIG. 54B is an exploded view of the composite plant injection system of FIG. 53.

Referring now to FIG. 54B, the composite plant injection system 9800 is shown in an exploded view. The magazine cap 9812 is decoupled from the system body 9802 to reveal the cartridge orifice 9842 of the cartridge magazine 9804. As further shown in FIG. 54B, an example injection tool 9806 is shown decoupled from the tool socket 9822. The tool body 9828 including the penetrating element 9832 extend from a tool base 9846. The injection tool 9806 includes one or more access ports 9848 (two in this example) provided on the tool base 9846. In other embodiments, the access port includes a single access port with corresponding modification to the fluid delivery interface. At least one of the access ports 9848 provide fluid communication from the system body 9802, for instance the delivery interface 9824, to the distribution ports of the injection tool 9806 and associated distribution reservoirs 9834 (in examples of the tool including reservoirs 9834). The features of the injection tool 9806 are further shown in a coupled configuration in the detailed perspective view provided in FIG. 55.

FIGS. 34-36 and the related description herein provide further details relating to the example injection tool 9806. Other injection tools are also suitable for use with the composite chassis 9802 including include injection tools with a penetrating distribution body having a wedge body profile. For example, injection tools illustrated in FIGS. 9-25 and 28-33 may be adapted for use with the composite chassis.

Figure 56:
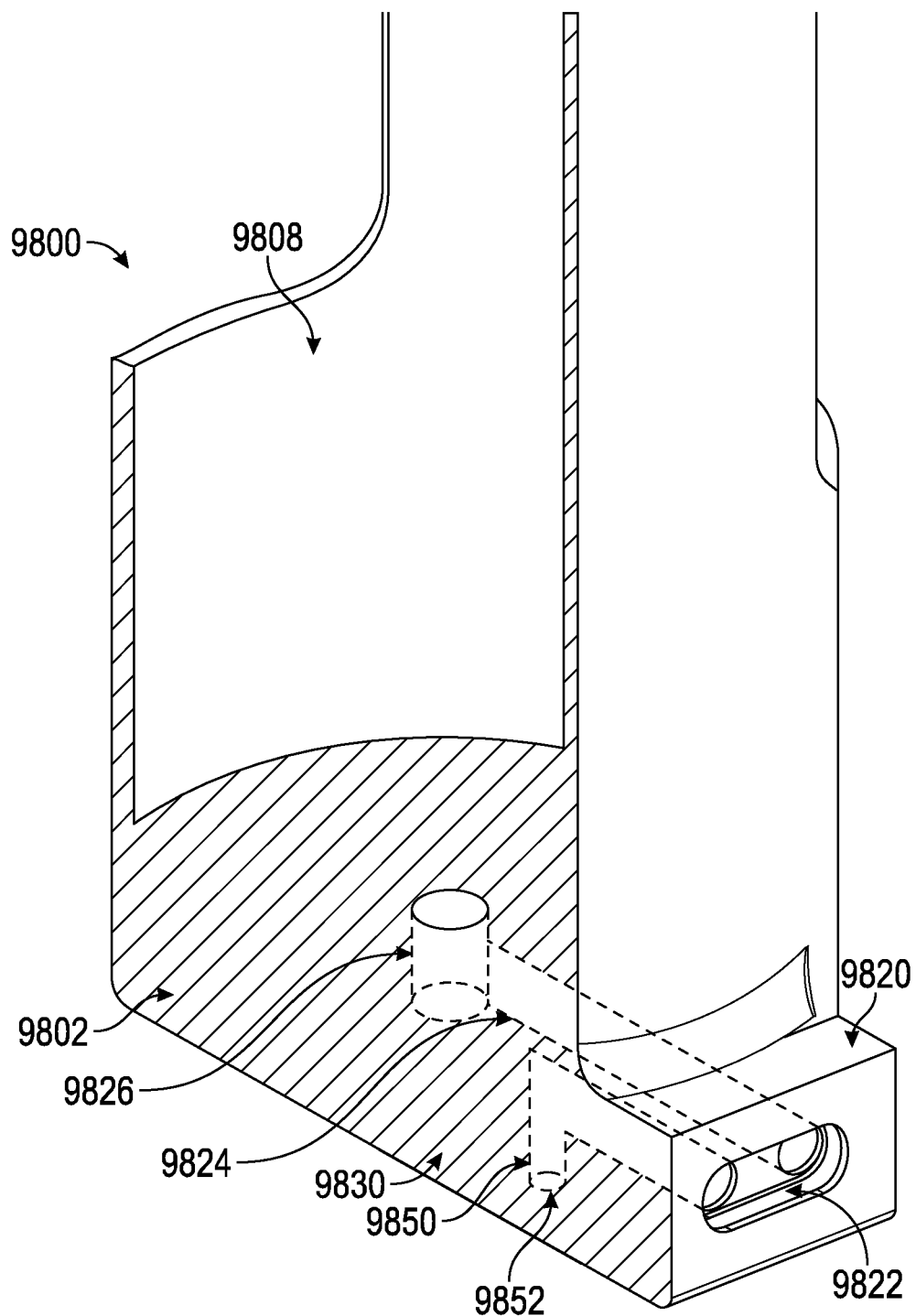
FIG. 56 is a sectional view of another example of a system body having a tool hub.

FIG. 56 is a partial sectional view of a portion of the composite plant injection system 9800. The cartridge socket 9808 and associated cartridge seat 9826 are shown. One example of the delivery interface 9824 is illustrated in broken lines and extends from the cartridge seat 9826 to the tool socket 9822. The example delivery interface 9824 interconnects the formulation cartridge 9810 installed in cartridge socket 9808 of the system body 9802 with the injection tool 9806 (e.g., installed in the tool socket 9822).

Figure 55:
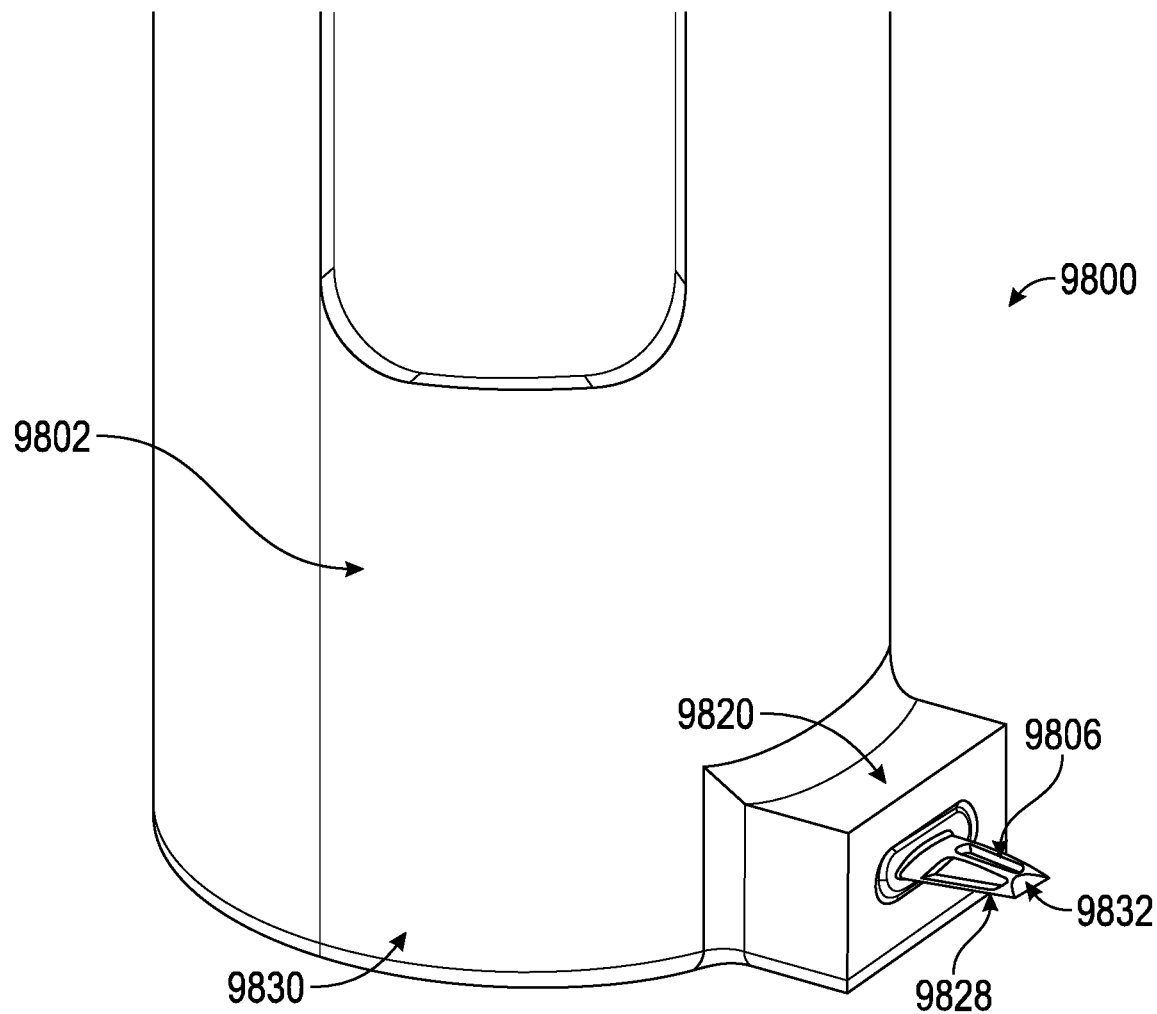
FIG. 55 is a detailed perspective view of one example of a system body having a tool hub and injection tool.

As further shown in FIG. 56, the tool hub 9820 includes a tool socket having a plurality of ports corresponding to the access ports 9848 of the injection tool 9806 shown in FIG. 55. Optionally, the ports of the tool socket 9822 are interconnected with the cartridge seat 9826 and a cartridge 9810 (when installed in the cartridge socket 220).

In another example, one of the ports of the tool socket 9822 is in fluid communication with an access port of the system body, such as the body access port 9852 shown in broken lines in FIG. 56. As previously described, in one example an injection tool 9806 including plural access ports 9848 optionally provides one or more additional functions with the composite plant injection system 9800. The body access port 9852 and the delivery interface 9850 extending between port 9852 and the tool socket 9822 facilitate these functions. For instance, the body access port 9852 and the associated delivery interface 9850 cooperate with the injection tool 9806 and the delivery interface 9824 extending to the cartridge seat 9826 during an initialization (bleeding) operation to facilitate flushing of intervening fluids such as air bubbles, residual (previous) formulations or the like. The body access port 9852 is optionally used as a drain during initialization and coupled with a reservoir, basin or the like to capture fluid used during a flush. In another example, the body access port 9852 and the delivery interface 9850 are used in combination with the delivery interface 9824 to refill a formulation reservoir, such as the formulation cartridge 9810 described herein. In this example, the formulation cartridge 9810 remains coupled with the system body 9802 and is refilled in an inline procedure. For instance, a refilling reservoir is coupled to the body 9802 at the body access port 9852 and replacement formulation is delivered through the delivery interface 9850 to the injection tool 9806 having the port manifold 300 (or similar interconnecting passage), and the formulation is delivered through the injection tool to the delivery interface 9824 and the formulation cartridge 9810 in the cartridge socket 9808. In various examples, one or more of closures, valves, unidirectional valves or the like are optionally included in one or more of the delivery interfaces 9824, 9850, body access port 9852 or the like to isolate or close various components of the system body or permit one of the operations described herein while precluding another (e.g., filling, flushing or the like).

Figure 57:
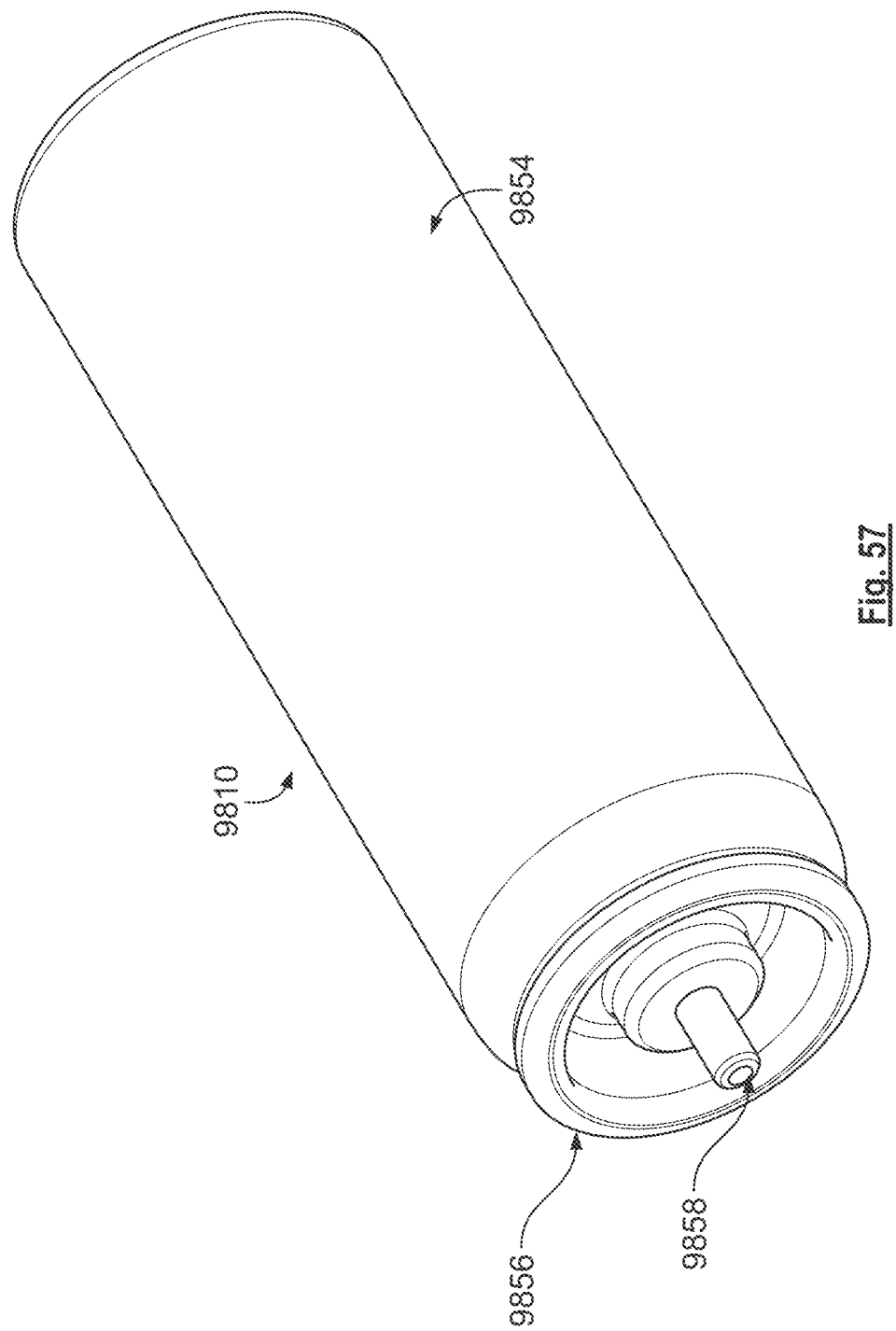
FIG. 57 is a perspective view of one example of a formulation cartridge.

FIG. 57 is a perspective view of one example of a formulation cartridge 9810. The example cartridge 9810 includes a formulation container 9854 including a formulation reservoir therein having a quantity of the AI formulation. A cartridge cap 9856 encloses the formulation container 9854. A cartridge discharge port 9858 extends from the formulation cartridge 9810, and in one example has a complementary profile to the cartridge seat 9826 (e.g., shown in FIG. 56). Optionally, the cartridge discharge port 9858 includes an opening feature configured to transition from a closed configuration to an open configuration. The opening feature includes, but is not limited to, a valve, membrane or the like that is opened prior to coupling with the system body 9802. For example, the valve is manually opened or membrane is pulled or pierced to open the formulation cartridge 9810 prior to coupling. In another example, the cartridge discharge port 9858 includes an opening feature that is opened with coupling of the formulation cartridge 9810 to the system body 9802. For instance, positioning of the cartridge 9810 within the cartridge socket 9808 automatically opens the discharge port 9858 and initiates communication of the formulation to the system 9800. Optionally, the closure of the magazine cap 9812 biases the cartridge 9810 toward the cartridge seat 9826. In one example, this movement depresses the discharge port 9858 (toward the formulation container 9854) and opens a valve or similar opening feature in the port 9858 to automatically open the port and dispense the formulation.

In some variations, formulation cartridge has a bag-on-valve mechanism.

Figure 58:
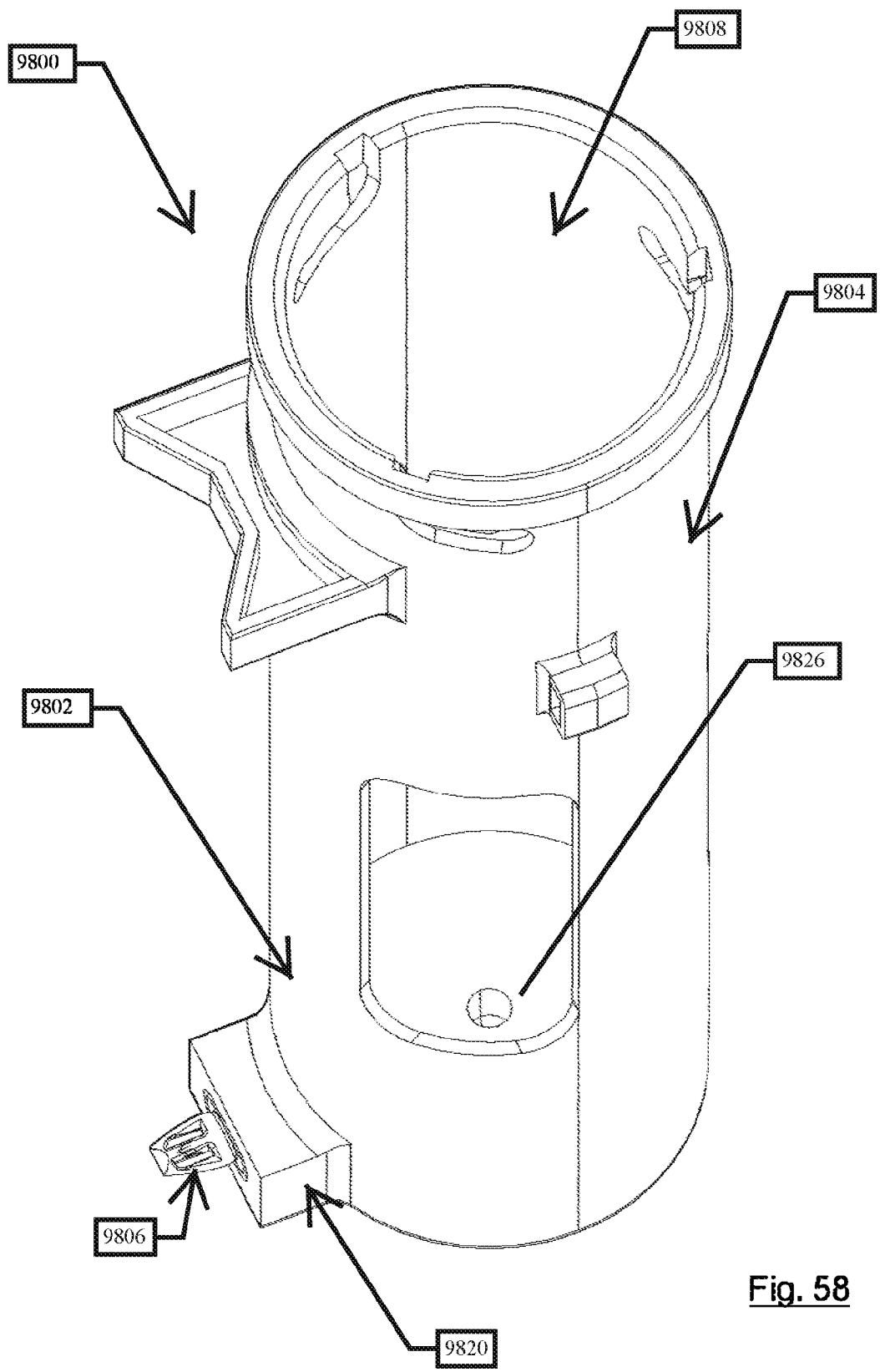
FIG. 58 is a top perspective view of the composite plant injection system of FIG. 53.

The cartridge seat 9826 is shown in the perspective view of FIG. 58. During installation of the formulation cartridge 9810 the discharge port 9858 is fed into the cartridge socket 9808 and the formulation container 9854 is slid into the socket. The cartridge socket 9808 is configured to receive the entire formulation cartridge 9810 in one example. In another example the cartridge socket 9808 (and the associated system body 9802) receive a portion of the formulation cartridge 9810 such as the cartridge discharge port 9858 and a portion of the cartridge proximate to the port 9858.

FIG. 59 is an exploded view of the composite plant injection system 9800 including the formulation cartridge 9810. The formulation cartridge 9810 is loaded into the cartridge socket of the cartridge magazine 9804 and slid toward the body base 9830. In an example including the magazine cap 9812 the cap 9812 is coupled with the system body 9802, for instance with an interior of the cartridge magazine 9804. The magazine cap 9812 is optionally fastened with the system body 9802 to secure the formulation cartridge 9810, and in one example open the cartridge 9810 for communication of the formulation to the injection tool 9806. As shown in FIG. 54B, the system body 9802 optionally includes a latch channel 9841 and the magazine cap 9812 includes a cap boss 9840. Interfitting of these features locks the formulation cartridge 9810 in place, and with a formulation cartridge including an opening discharge port 9858 opens the discharge port to permit flow of the formulation into the delivery interface 9824 and toward the injection tool 9806.

In some embodiments, the system body includes a flexible portion that helps with mitigating damage to the injection tool during installation. With reference to FIGS. 60A-C, 61A-D, 62A-C, 63A-H, 65, 66, and 67A-D (where depicted), the flexible portion is labeled as portion 9882. With reference to FIGS. 64A-B, flexible portion 9882 can bend so as to position the fluid delivery bend so as to position the fluid receiving system at an angle relative to the plant part (e.g., trunk) system at an angle relative to the plant part (e.g., trunk).

In some embodiments, the system body includes a flange that engages the cartridge, resulting in activating the cartridge and/or maintaining it in place. In some embodiments, the position of the flange is adjustable to accommodate different length canisters and/or to permit activation at a desired time. With reference to FIGS. 60A-C, 61A-D, 62A-C, 63A-H, 65, 66, and 67A-D (where depicted), the flange is labeled as element 9880.

In some embodiments, the composite plant injection system further includes one or more restraint anchors positioned on the system body to further facilitate coupling of the plant injection system with the plant. For example, a belt or strap can be passed through the restraint anchors to wrap around a plant and secure the plant injection system along the plant. With reference to FIGS. 60A-C, 61A-D, 62A-C, 63A-H, 65, 66, and 67A-D (where depicted), the restraint anchors are labeled as element 9818; and the belt or strap is labeled as element 9819.

A number of composite plant injection system Embodiments have been described. However, a person of skill can understand from a reading of this disclosure that still other Embodiments are encompassed by this disclosure. Non-limiting examples of devices and methods within scope of this disclosure include the following Aspects:

1. A composite plant injection system comprising: a system body configured to store and administer an active ingredient (AI) formulation, the system body includes: a cartridge magazine enclosing a cartridge socket configured to receive a formulation cartridge containing the AI formulation; a cartridge seat within the cartridge magazine; a tool hub including an injection tool, the injection tool extends from the system body and includes one or more distribution ports configured to administer the AI formulation to a plant interior; and a delivery interface extending between the cartridge seat and the tool hub, the delivery interface fluidly interconnects the cartridge magazine with the one or more distribution ports of the injection tool.

2. A composite plant injection system according to embodiment 1, wherein the system body includes a structural frame housing at least the cartridge magazine, the tool hub and the injection tool.

3. A composite plant injection system according to embodiment 1, wherein the cartridge magazine includes a magazine cap having locked and unlocked configurations:
   in the unlocked configuration the magazine cap is decoupled from the cartridge magazine; and
   in the locked configuration the magazine cap is engaged with the cartridge magazine and biases the formulation cartridge toward the cartridge seat.

4. A composite plant injection system according to embodiment 1 comprising the formulation cartridge, and in the locked configuration a valve of the formulation cartridge is opened according to the bias.

5. A composite plant injection system according to embodiment 1, wherein tool hub includes a tool socket having a socket profile complementary to the injection tool.

6. A composite plant injection system according to embodiment 5, wherein the injection tool includes: a tool base received in the tool socket, the tool base having a base profile complementary to the socket profile; a tool body extending from the tool base, and the tool body includes a penetrating element and the one or more distribution ports.

7. A composite plant injection system according to embodiment 1, wherein the injection tool includes a tool body having a tool profile and the one or more distribution ports are sheltered by the tool profile.

8. A composite plant injection system according to embodiment 7, wherein the injection tool includes one or more distribution reservoirs within the tool profile and the one or more distribution ports are directed into the distribution reservoirs.

9. A composite plant injection system according to embodiment 1, wherein the system body includes an installation bracket configured for coupling the system body with the plant.

10. A composite plant injection system according to embodiment 9, wherein the system body includes an installation configuration with the injection tool installed within the plant and the installation bracket coupled with the plant.

11. A composite plant injection system according to embodiment 1, wherein the system body includes second delivery interface in fluid communication with the cartridge seat.

12. A composite plant injection system according to embodiment 11, wherein the second delivery interface extends from the injection tool to a body access port, and the second delivery interface is in indirect fluid communication with the formulation cartridge through the injection tool and the delivery interface.

13. A composite plant injection system comprising: a system body configured to store and administer an active ingredient (AI) formulation, the system body includes: a cartridge magazine enclosing a cartridge socket configured to receive a formulation cartridge containing the AI formulation; an injection tool extending from the system body, the injection tool includes one or more distribution ports configured to administer the AI formulation to a plant interior; a delivery interface fluidly interconnecting the cartridge magazine with the one or more distribution ports of the injection tool; and wherein the plant injection system includes installation and delivery configurations: in the installation configuration the injection tool is installed within the plant; and in the delivery configuration the formulation cartridge is received in the cartridge socket and the AI formulation is communicated through the system body to the installed injection tool.

14. A composite plant injection system according to embodiment 13, wherein the system body includes a structural frame housing at least the cartridge magazine and the injection tool.

15. A composite plant injection system according to embodiment 13, wherein the cartridge magazine includes a magazine cap having locked and unlocked configurations:
   in the unlocked configuration the magazine cap is decoupled from the cartridge magazine; and
   in the locked configuration the magazine cap is engaged with the cartridge magazine and biases the formulation cartridge into an opened configuration.

16. A composite plant injection system according to embodiment 13, wherein the injection tool includes a tool body having a tool profile and the one or more distribution ports are sheltered by the tool profile.

17. A composite plant injection system according to embodiment 16, wherein the injection tool includes one or more distribution reservoirs within the tool profile and the one or more distribution ports are directed into the distribution reservoirs.

18. A composite plant injection system according to embodiment 13, wherein the system body includes an installation bracket configured for coupling the system body with the plant.

19. A composite plant injection system according to embodiment 13, wherein the system body includes a second delivery interface in fluid communication with the formulation cartridge.

20. A composite plant injection system according to embodiment 19, wherein the second delivery interface extends from the injection tool to a body access port, and the second delivery interface is in indirect fluid communication with the formulation cartridge through the injection tool and the delivery interface.

21. A composite plant injection system according to any one of embodiments 1 to 20, wherein the system body comprises a flexible portion, configured to angle the system upon installation on a plant.

22. A composite plant injection system according to any one of embodiments 1 to 21, wherein the system body comprises a flange, configured to engages the cartridge, thereby activating the cartridge and/or maintaining the cartridge in place within the cartridge magazine.

23. A composite plant injection system according to any one of embodiments 1 to 22, further comprising: a strap or belt connected to the system body, configured to wrap around a plant and secure the plant injection system along the plant.

24. A composite plant injection system according to embodiments 23, further comprising: one or more restraining anchors positioned on the system body, wherein the belt or strap is passed through the restraint anchors.

23. Embodiment 23 may include or use, or may optionally be combined with any portion or combination of any portions of any one or more of embodiments 1 through 22, for instance to include or use, subject matter that may include means for performing any one or more of the functions of Embodiments 1 through 2, or a machine-readable medium including instructions that, when performed by a machine, cause the machine to perform any one or more of the functions of Embodiments 1 through 2.

Uses of the Injection Systems and Parts Thereof

As mentioned above, the injection system according to the disclosure is suitable for being applied to various different plants. Thereby, the shape and dimensions of the injection tools involved advantageously are adapted to the intended application. More specifically, the injection tool can be designed for being applied to comparably large plants and specifically to trees, bushes or other woody plants. Or, it can be designed for being applied to comparably small or smaller plants. For example, injection tools suitable for woody plants may have a total length of more than 50 millimeter (mm) or in a range of between 60 mm and 200 mm. The respective penetrating distribution bodies (e.g., shaft or wedge body profiles) include lengths of 35 mm or more and in some examples are in a range of between approximately 35 mm and 160 mm, and/or a width of 30 mm or more or are in a range of between approximately 35 mm and 150 mm. In contrast, injection tools intended for comparably small plants optionally have a total length of between approximately 3 mm and 20 mm, between approximately 6 mm and 16 mm, or less than 10 mm.

In some embodiments, the disclosure is a process of modulating the phenotype of a plant or a multitude of plants, said process including the steps of (i) installing a plant injection system according to the disclosure provided herein in the plant or multitude of plants, and (ii) applying a liquid formulation of an active ingredient to modulate the phenotype of the plant.

In some embodiments, the active ingredient can be chosen from (i) pesticides, (ii) growth regulators. The active ingredient may be a biological compound or composition approved for food and feed application. In one example, the process is carried out by one or more of a) to e):

a) the active ingredient is applied/transferred to the plant in an automatically controlled scheme/method over the vegetation period (growing season),
b) the active ingredient is transferred from a deposit to the plant by a pneumatic (Takt-Schub) conveying system, which minimizes the amount of active ingredient/active ingredient formulation in the fluid lines of the system and passages and distribution ports of the injection tools,
c) a multitude of plants is supplied the active ingredient from a central deposit, while, optionally, the transference to each plant is individually controlled,
d) the active ingredient can be automatically selected from a group of deposits to achieve a different effect, such as different phenotype modulation,
e) water can be provided in between applications of one or more active ingredients.

In some variations, the plant is a tree or plants with pseudostems, such as banana plants; trees can include, for example, fruit trees, cocoa trees, coffee trees, or ornamental trees (the term "tree" is further discussed below).

In some variations, modulating the phenotype of the plant or a multitude of plants is selected from the group consisting of controlling and/or preventing plant diseases, controlling and/or preventing pest attacks, improving and/or controlling plant health, improving and/or controlling plant growth and/or the quantity and/or quality of plant produce, such as fruits.

The disclosure further relates to a multitude of plants, plant plantation, or field of plants, wherein plants are connected to a plant injection system according to the disclosure so as to provide, in one embodiment, phenotype modulation.

In some embodiments, this disclosure provides methods for enhancing or maintaining plant health, such as in olive trees. In further such embodiments, this disclosure provides methods for treating olive trees whose xylem has been invaded by, or are at risk of being invaded by, disease-causing bacteria, fungi, viruses, and/or other pathogens, for improving the strength of olive trees infected by bacteria, fungi, virus and/or other pathogens causing the disease, and for preventing diseases by preventing sufficient colonization of the tree by the disease causing pathogens such as bacteria, fungi, and viruses.

In some embodiments, this disclosure provides methods of treating olive quick decline syndrome ("OQDS"). In some embodiments, the disclosure provides methods for improving the strength of an olive tree infected by *Xylella fastidiosa*, which is a xylem-limited plant bacteria thought to cause the referenced disease. In certain embodiments, the disclosure provides methods for enhancing or maintaining the health of olive trees. In some embodiments, the disclosure provides methods for treating OQDS in olive trees. In some variations, the disclosure provides methods for improving the strength of an olive tree infected by *Xylella fastidiosa* subsp. *pauca*. In other variations, the disclosure provides methods for improving the strength of an olive tree infected by *Xylella fastidiosa* subsp. *multiplex*.

In some embodiments, improving the strength of an olive tree infected by *Xylella fastidiosa* using the systems, devices and methods herein includes reducing the bacterial concentration (titer) in the vascular system. In some variations, improving the strength of an olive tree infected by *Xylella fastidiosa* in olive trees using the systems, devices and methods herein includes reducing the bacterial concentration (titer) in the vascular system by strengthening the tree's natural defense system. In certain embodiments, the systems, devices and methods herein can provide a treatment that leads to suppression of the disease to a level where recovery of olive production occurs. In some variations, bacterial titer refers to the bacterial concentration in the vascular system of the infected tree. Bacterial titer may be measured using any suitable methods and techniques known in the art. For example, in one variation, bacterial titer is measured through quantitative PCR.

In some embodiments, recovery of olive trees infected by *Xylella fastidiosa* includes trees that show new green shoots and/or sprouts after treatment. In certain embodiments, the treatment may lead to growth of new green shoots and/or sprouts, which in turn may lead to new branches with green leaves. In some variations of the foregoing, improving the strength of an olive tree infected by *Xylella fastidiosa* using the systems, devices and methods herein results in an overall greener canopy with increased photosynthetic capacity. In certain variations, phenotypic observations may include estimating of vegetative index and photographic documentation of re-growth.

In other embodiments, improving the strength of an olive tree infected by *Xylella fastidiosa* using the systems, devices and methods herein includes at least partially or fully restoring xylem functionality of the infected olive tree. In certain embodiments of the foregoing, this may restore the tree's productive capacity and overall tree health including the metabolomic profile of the tree. In some variations, metabolomic profile of the tree may be used to measure the tree health.

In yet other embodiments, improving the strength of an olive tree infected by *Xylella fastidiosa* using the systems, devices and methods herein includes at least partially or fully restoring yield capacity. In some variations, yield over the tree lifecycle is increased as compared to untreated control trees.

In certain embodiments, the method comprises delivering a formulation comprising one or more nutrients into an olive tree. In certain embodiments the method comprises precision delivery (also referred to as "precision injection") of a formulation into the olive tree. Precision delivery refers to delivering the formulation only or substantially only into a target location in the olive tree. For example, in some embodiments, the target location is the active vasculature of the tree. In certain embodiments, the method comprises injecting a liquid formulation into and no further than the active vasculature of the tree. In some variations, the active vasculature of the tree is the xylem and/or the phloem. In one variation, the active vasculature is active xylem (such as sapstream) and phloem. In further embodiments, precision delivery involves delivering the formulation into the active vasculature of the olive tree while minimizing damage to the tree relative traditional forms of injection drilling systems. In yet other embodiments, precision delivery involves using a system that can be configured to deliver formulation into and no further than the active vasculature of a tree.

In certain embodiments, the method comprises injecting a liquid formulation comprising Dentamet® (DiAgro) into an olive tree, for example into the active vasculature of the tree using precision delivery devices and systems, such as those referenced herein. In some such embodiments, the methods comprise precise injection of a liquid formulation comprising Dentamet® into the tree. In certain embodiments, the methods comprise injecting a liquid formulation, for example precise injection of a liquid formulation, comprising Dentamet® into the tree, for example into the active vasculature of the tree prone to disease caused by *Xylella fastidiosa*. In some further embodiments, the plant is an olive tree suffering from, or at risk of suffering from, olive quick decline syndrome.

In some further embodiments, the olive tree is suffering from, or at risk of suffering from, olive quick decline syndrome. In some variations, the infected olive tree has an infection level of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, or at least 90%; or between 10% and 90%, between 20% and 80%, between 25% and 75%, between 30% and 60%, or between 40% and 50%; or about 10%, about 15%, about 20%, about 25%, about 30%, about 35%, about 40%, about 45%, about 50%, about 55%, about 60%, about 65%, about 70%, about 75%, or about 80%.

In other embodiments, the methods provided include injecting olive trees with no or low symptoms, including olive trees with less than 10%, less than 5%, less than 4%, less than 3%, less than 2%, or less than 1%, or between 0% and 5% infection level.

In certain variations of the foregoing, "infection level" of an olive tree is characterized by percent canopy loss. In one variation, the level of infection is characterized by the amount of canopy dried out and/or level of infected dried out canopy pruned away.

In certain embodiments, the olive tree is at least about 30 years old, at least about 50 years old, at least about 100 years old, at least about 150 years old, or at least about 250 years old. In other embodiments, the injection tools and injection systems described herein are used with younger trees, including in nurseries and trees that are moved from nurseries into the field. In some variations, the olive trees are less than 30 years old, less than 25 years told, less than 20 years old, less than 15 years old, less than 10 years old, less than 5 years old, or less than 1 year old.

Active Ingredients

Numerous active ingredients, which can be employed in the context of this disclosure, are generally available to an art worker. The active ingredients specified herein by their "common name" are known and described, for example, in The Pesticide Manual (18$^{th}$ edition, Ed. Dr. J A Turner (2018), which includes, among other agents, herbicides, fungicides, insecticides, acaricides, nematocides, plant growth regulators, repellants, synergists)) or can be searched in the internet (e.g., alanwood.net/pesticides). Further, the active ingredient can be selected from the following groups of compounds and compositions:

1. Fungicides
1.1 Respiration inhibitors
1.1.1 Inhibitors of complex III at Qo site, for example, azoxystrobin, coumethoxystrobin, coumoxystrobin, dimoxystrobin, enestroburin, fenaminstrobin, fenoxystrobin/flufenoxystrobin, fluoxastrobin, kresoxim-methyl, metominostrobin, orysastrobin, picoxystrobin, pyraclostrobin, pyrametostrobin, pyrao-xystrobin, trifloxystrobin, pyribencarb, triclopyricarb/chlorodincarb, famoxadone, and/or fenamidone;
1.1.2 Inhibitors of complex III at Qi site: cyazofamid and/or amisulbrom;
1.1.3 Inhibitors of complex II: flutolanil, benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam and/or thifluzamide;
1.1.4 Other respiration inhibitors (e.g. complex I, uncouplers): diflumetorim;
1.1.5 Nitrophenyl derivates: binapacryl, dinobuton, dinocap, fluazinam; ferimzone; organometal compounds: fentin-acetate, fentin chloride and/or fentin hydroxide; ametoctradin; and/or silthiofam;
1.2 Sterol biosynthesis inhibitors (SBI fungicides)
1.2.1. C14 demethylase inhibitors (DMI fungicides): triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole and/or uniconazole;

1.2.2 Imidazoles: imazalil, pefurazoate, prochloraz, triflumizol; pyrimidines, pyridines and piperazines: fenarimol, nuarimol, pyrifenox, triforine; Delta14-reductase inhibitors: aldimorph, dodemorph, dodemorph-acetate, fenpropimorph, tridemorph, fenpropidin, piperalin, spiroxamine; Inhibitors of 3-keto reductase: fenhexamid;

1.3 Nucleic acid synthesis inhibitors:

1.3.1 Phenylamides or acyl amino acid fungicides: benalaxyl, benalaxyl-M, kiral-axyl, metalaxyl, ofurace, oxadixyl; others: hymexazole, octhilinone, oxolinic acid, bupirimate and/or, 5-fluorocytosine;

1.4 Inhibitors of cell division and cytoskeleton 1.4.1 Tubulin inhibitors: benzimidazoles, thiophanates: benomyl, carbendazim, fuberidazole, thiabendazole, thiophanate-methyl; triazolopyrimidines:

1.4.2 Cell division inhibitors: diethofencarb, ethaboxam, pencycuron, fluopicolide, zoxamide, metrafenone and/or, pyriofenone;

1.5 Inhibitors of amino acid and protein synthesis 1.5.1 Methionine synthesis inhibitors (anilino-pyrimidines): cyprodinil, mepanipyrim, pyrimethanil; protein synthesis inhibitors: blasticidin-S, kasugamycin, kasugamycin hydrochloride-hydrate, mildiomycin, streptomycin, oxytetracyclin, polyoxine, validamycin A;

1.6. Signal transduction inhibitors 1.6.1 MAP/histidine kinase inhibitors: fluoroimid, iprodione, procymidone, vinclozolin, fenpiclonil, fludioxonil; G protein inhibitors: quinoxyfen;

1.7 Lipid and membrane synthesis inhibitors 1.7.1 Phospholipid biosynthesis inhibitors: edifenphos, iprobenfos, pyrazophos, isoprothiolane; lipid peroxidation: dicloran, quintozene, tecnazene, tolclofos-methyl, biphenyl, chloroneb, etridiazole; phospholipid biosynthesis and cell wall deposition: dimethomorph, flumorph, mandipropamid, pyrimorph, benthiavalicarb, iprovalicarb, valifenalate;

1.7.2 Compounds affecting cell membrane permeability and fatty acids: propamocarb, propamocarb-hydrochloridfatty acid amide 1.8 Inhibitors with Multi Site Action 1.8.1 Inorganic active substances: Bordeaux mixture, copper acetate, copper hydroxide, copper oxychloride, basic copper sulfate, sulfur; thio- and dithiocarbamates: ferbam, mancozeb, maneb, metam, metiram, propineb, thiram, zineb, ziram; organochlorine compounds (e.g. phthalimides, sulfamides, chloronitriles): anilazine, chlorothalonil, captafol, captan, folpet, dichlofluanid, dichlorophen, hexachlorobenzene, pentachlorphenole and its salts, phthalide, tolylfluanid, and others: guanidine, dodine, dodine free base, guazatine, guazatine-acetate, iminoctadine, iminoctadine-triacetate, iminoctadinetris(albesilate), dithianon;

1.9 Cell wall synthesis inhibitors 1.9.1 Inhibitors of glucan synthesis: validamycin, polyoxin B; melanin synthesis inhibitors: pyroquilon, tricyclazole, carpropamid, dicyclomet and/or fenoxanil;

1.10 Plant defence inducers 1.10.1 Acibenzolar-S-methyl, probenazole, isotianil, tiadinil, prohexadione-calcium; phosphonates: fosetyl, fosetyl-aluminum, phosphorous acid and its salts;

1.11 Unknown mode of action 1.11.1 Bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxine-copper, picarbutrazox, proquinazid, tebufloquin, tecloftalam and/or triazoxide;

1.12 Antifungal biological Control Agents: *Ampelomyces quisqualis* (e.g. AQ 10® from Intrachem Bio GmbH & Co. KG, Germany), *Aspergillus flavus* (e.g. AFLA-GUARD® from Syngenta, CH), *Aureobasidium pullulans* (e.g. BOTECTOR® from bio-ferm GmbH, Germany), *Bacillus pumilus* (e.g. NRRL Accession No. B-30087 in SONATA® and BALLAD® Plus from AgraQuest Inc., USA), *Bacillus subtilis* (e.g. isolate NRRL-Nr. B-21661 in RHAPSODY®, SERENADE® MAX and SERENADE® ASO from AgraQuest Inc., USA), *Bacillus subtilis* var. *amyloliquefaciens* FZB24 (e.g. TAEGRO® from Novozyme Biologicals, Inc., USA), *Candida oleophila* 1-82 (e.g. ASPIRE® from Ecogen Inc., USA), *Candida saitoana* (e.g. BIO-CURE® (in mixture with lysozyme) and BIOCOAT® from Micro Flo Company, USA (BASF SE) and Arysta), Chitosan (e.g. ARMOUR-ZEN from BotriZen Ltd., NZ), *Clonostachys rosea* f *catenulata*, also named *Gliocladium catenulatum* (e.g. isolate J1446: PRESTOP® from Verdera, Finland), *Coniothyrium minitans* (e.g. CONTANS® from Prophyta, Germany), *Cryphonectria parasitica* (e.g. Endothia parasitica from CNICM, France), *Cryptococcus albidus* (e.g. YIELD PLUS® from Anchor Bio-Technologies, South Africa), *Fusarium oxysporum* (e.g. BIOFOX® from S.I.A.P.A., Italy, FUSACLEAN® from Natural Plant Protection, France), *Metschnikowia fructicola* (e.g. SHEMER® from Agrogreen, Israel), *Microdochium dimerum* (e.g. ANTIBOT® from Agrauxine, France), *Phlebiopsis gigantea* (e.g. ROTSOP® from Verdera, Finland), *Pseudozyma flocculosa* (e.g. SPORODEX® from Plant Products Co. Ltd., Canada), *Pythium oligandrum* DV74 (e.g. POLYVERSUM® from Remeslo SSRO, Biopreparaty, Czech Rep.), *Reynoutria* sachlinensis (e.g. REGALIA® from Marrone Bio-Innovations, USA), *Talaromyces flavus* V117b (e.g. PROTUS® from Prophyta, Germany), *Trichoderma* asperellum SKT-1 (e.g. ECO-HOPE® from Kumiai Chemical Industry Co., Ltd., Japan), *T. atroviride* LC52 (e.g. SENTINEL® from Agrimm Technologies Ltd, NZ), *T. harzianum* T-22 (e.g. PLANTSHIELD® der Firma BioWorks Inc., USA), *T. harzianum* TH 35 (e.g. ROOT PRO® from Mycontrol Ltd., Israel), *T. harzianum* T-39 (e.g. TRICHODEX® and *TRICHODERMA* 2000® from Mycontrol Ltd., Israel and Makhteshim Ltd., Israel), *T. harzianum* and *T. viride* (e.g. TRICHOPEL from Agrimm Technologies Ltd, NZ), *T. harzianum* ICC012 and *T. viride* ICC080 (e.g. REMEDIER® WP from Isagro Ricerca, Italy), *T. polysporum* and/or *T. harzianum* (e.g. BINAB® from BINAB Bio-Innovation AB, Sweden), *T. stromaticum* (e.g. TRICOVAB® from C.E.P.L.A.C., Brazil), *T. virens* GL-21 (e.g. SOILGARD® from Certis LLC, USA), *T. viride* (e.g. TRIECO® from Ecosense Labs. (India) Pvt. Ltd., Indien, BIO-CURE® F from T. Stanes & Co. Ltd., Indien), *T. viride* TV1 (e.g. *T. viride* TV1 from Agribiotec srl, Italy), Ulocladium oudemansii HRU3 (e.g. BOTRY-ZEN® from Botry-Zen Ltd, NZ), *Beauveria bassiana* PPM 5339 (commercially available from Becker Underwood as product "BroadBand"), *Metarhizium anisopliae* FI-1045 (commercially available from Becker Underwood as product "BioCane"), *Metarhizium anisopliae* var. *acridum* FI-985 (commercially available from Becker Underwood as product "GreenGuard"), and/or *Metarhizium anisopliae* var. *acridum* IMI 330189 (commercially available from Becker Underwood as product "Green Muscle").

Active ingredients can also include protein or secondary metabolites. The term "protein or secondary metabolites" refers to any compound, substance or by-product of a fermentation of a microorganism that has pesticidal activity. The definition comprises any compound, substance or by-product of a fermentation of a microorganism that has pestocodal, including, fungicidal or insecticidal, activity. Examples of such proteins or secondary metabolites are Harpin (isolated by *Erwinia amylovora*, product known as e.g. Harp-N-Tek™, Messenger®, Employ™, ProAct™); and/or terpene constituents and mixture of terpenes, i.e. a-terpinene, p-cymene and limonene (product known as e.g. Requiem® from Bayer CropScience LP, US).

Useful proteins may also include antibodies against fungal target proteins, or other proteins with antifungal activity such as defensins and/or proteinase inhibitor. Defensins may include, for example, NaD1, PhD1A, PhD2, Tomdef2, RsAFP2, RsAFP1, RsAFP3 and RsAFP4 from radish, DmAMP1 from dahlia, MsDef1, MtDef2, CtAMP1, PsD1, HsAFP1, VaD1, VrD2, ZmESR6, AhAMP1 and AhAMP4 from *Aesculus hippocatanum*, AflAFP from alfalfa, NaD2, AX1, AX2, BSD1, EGAD1, HvAMP1, JI-2, PgD1, SD2, SoD2, WT1, p139 and p1230 from pea. Proteinase inhibitors may include proteinase inhibitor from the following classes: serine-, cysteine-, aspartic- and metallo-proteinase inhibitors and carboxypeptidases such as StPin1A (U.S. Pat. No. 7,462,695) or Bovine Trypsin Inhibitor I-P.

2. Insecticidal compound 2.1 Acetylcholine esterase inhibitors from the class of carbamates: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and/or, triazamate;

2.2 Acetylcholine esterase inhibitors from the class of organophosphates: acephate, azamethiphos, azinphosethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl 0-(methoxyaminothio-phosphoryl)salicylate, isoxathion, malathion, mecarbam, methamidophos, methidathion, mevinphos, monocrotophos, nalad, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and/or vamidothion;

2.3 GABA-gated chloride channel antagonists 2.4 Cyclodiene organochlorine compounds: endosulfan; or M-2.B fiproles (phenylpyrazoles): ethiprole, fipronil, flufiprole, pyrafluprole, or pyriprole;

2.5 Sodium channel modulators from the class of pyrethroids: acrinathrin, allethrin, d-cis-trans allethrin, d-trans allethrin, bifenthrin, bioallethrin, bioallethrin S-cylclopentenyl, bioresmethrin, cycloprothrin, cyfluthrin, betacyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, momfluorothrin, empenthrin, esfenvalerate, etofenprox, fenpropathrin, fenvalerate, flucythrinate, flumethrin, tau-fluvalinate, halfenprox, imiprothrin, meperfluthrin, metofluthrin, permethrin, phenothrin, prallethrin, profluthrin, pyrethrin (pyrethrum), resmethrin, silafluofen, tefluthrin, tetramethylfluthrin, tetramethrin, tralomethrin, transfluthrin, DDT and/or, methoxychlor;

2.6 Nicotinic acteylcholine receptor agonists from the class of neonicotinoids: acteamiprid, chlothianidin, cycloxaprid, dinotefuran, flupyradifurone, imidacloprid, nitenpyram, sulfoxaflor, thiacloprid and/or thiamethoxam;

2.7 Allosteric nicotinic acteylcholine receptor activators from the class of spinosyns: spinosad, spinetoram;

2.8 Chloride channel activators from the class of mectins: abamectin, emamectin benzoate, ivermectin, lepimectin and/or milbemectin;

2.9 Juvenile hormone mimics: hydroprene, kinoprene, methoprene, fenoxycarb and/or pyriproxyfen;

2.10 Non-specific multi-site inhibitors: methyl bromide and other alkyl halides, chloropicrin, sulfuryl fluoride, borax and/or tartar emetic;

2.11 Selective homopteran feeding blockers: pymetrozine, flonicamid and/or pyrifluquinazon;

2.12 Mite growth inhibitors: clofentezine, hexythiazox, diflovidazin and/or etoxazole;

2.13 Inhibitors of mitochondrial ATP synthase: diafenthiuron, azocyclotin, cyhexatin, fenbutatin oxide, propargite and/or tetradifon;

2.14 Uncouplers of oxidative phosphorylation: chlorfenapyr, DNOC and/or sulfluramid; M-13 nicotinic acetylcholine receptor channel blockers: bensultap, cartap hydrochloride, thiocyclam and/or thiosultap sodium;

2.15 Inhibitors of the chitin biosynthesis type 0 (benzoylurea class): bistrifluron, chlorfluazuron, diflubenzuron, flucycloxuron, flufenoxuron, hexaflumuron, lufenuron, novaluron, noviflumuron, teflubenzuron and/or, triflumuron;

2.16 Inhibitors of the chitin biosynthesis type 1: buprofezin;

2.17 Moulting disruptors: cyromazine;

2.18 Ecdyson receptor agonists: methoxyfenozide, tebufenozide, halofenozide, fufenozide and/or chromafenozide;

2.19 Octopamin receptor agonists: amitraz;

2.20 Mitochondrial complex III electron transport inhibitors: hydramethylnon, acequinocyl, flometoquin, fluacrypyrim and/or pyriminostrobin;

2.21 Mitochondrial complex I electron transport inhibitors: fenazaquin, fenpyroximate, pyrimidifen, pyridaben, tebufenpyrad, tolfenpyrad, flufenerim and/or rotenone;

2.22 Voltage-dependent sodium channel blockers: indoxacarb and/or metaflumizone
2.23 Inhibitors of the lipid synthesis, inhibitors of acetyl CoA carboxylase: spirodiclofen, spiromesifen and/or spirotetramat;
2.24 Mitochondrial complex II electron transport inhibitors: cyenopyrafen, cyflumetofen and/or pyflubumide;
2.25 Ryanodine receptor-modulators from the class of diamides: flubendiamide, chloranthraniliprole (rynaxypyr) and/or cyanthraniliprole (cyazypyr),
2.26 Others: afidopyropen,
2.27 Insecticidal biological control agents: *Bacillus firmus* (e.g. *Bacillus firmus* CNCM 1-1582, e.g. WO09126473A1 and WO09124707 A2, commercially available as "Votivo") and/or δ-endotoxins from *Bacillus thuringiensis* (Bt).
3. A plant growth regulator:
3.1 Antiauxins: clofibric acid and/or 2,3,5-tri-iodobenzoic acid;
3.2 Auxins: 4-CPA, 2,4-D, 2,4-DB, 2,4-DEP, dichlorprop, fenoprop, IAA (indole-3-acetic acid), IBA, naphthaleneacetamide, α-naphthaleneacetic acid, 1-naphthol, naphthoxyacetic acid, potassium naphthenate, sodium naphthenate and/or 2,4,5-T;
3.3 Cytokinins: 2iP, 6-benzylaminopurine (6-BA), 2,6-dimethylpyridine and/or kinetin, zeatin;
3.4 Defoliants: calcium cyanamide, dimethipin, endothal, merphos, metoxuron, pentachlorophenol, thidiazuron, tribufos and/or tributyl phosphorotrithioate;
3.5 Ethylene modulators: aviglycine, 1-methylcyclopropene (1-MCP), prohexadione (prohexadione calcium) and/or trinexapac (trinexapac-ethyl);
3.6 Ethylene releasers: ACC, etacelasil, ethephon, glyoxime; Gibberellins: gibberelline, gibberellic acid;
3.7 Growth inhibitors: abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat (mepiquat chloride, mepiquat pentaborate), piproctanyl, prohydrojasmon, propham and/or 2,3,5-tri-iodobenzoic acid;
3.8 Morphactins: chlorfluren, chlorflurenol, dichlorflurenol and/or flurenol;
3.9 Growth retardants: chlormequat (chlormequat chloride), daminozide, flurprimidol, mefluidide, paclobutrazol, tetcyclacis, uniconazole and/or metconazole;
3.10 Growth stimulators: brassinolide, forchlorfenuron and/or, hymexazol;
3.11 Unclassified plant growth regulators/classification unknown: amidochlor, benzofluor, buminafos, carvone, choline chloride, ciobutide, clofencet, cloxyfonac, cyanamide, cyclanilide, cycloheximide, cyprosulfamide, epocholeone, ethychlozate, ethylene, fenridazon, fluprimidol, fluthiacet, heptopargil, holosulf, inabenfide, karetazan, lead arsenate, methasulfocarb, pydanon, sintofen and/or, triapenthenol.

In one embodiment, the fungicidal compound is selected from the group consisting of Dimoxystrobin, Pyraclostrobin, Azoxystrobin, Trifloxystrobin, Picoxystrobin, Cyazofamid, Boscalid, Fluoxapyroxad, Fluopyram, Bixafen, Isopyrazam, Benzovindiflupyr, Penthiopyrad, Ametoctradin, Difenoconazole, Metconazole, Prothioconazole, Tebuconazole, Propiconazole, Cyproconazole, Penconazole, Myclobutanil, Tetraconazole, Hexaconazole, Metrafenone, Zoxamid, Pyrimethanil, Cyprodinil, Metalaxyl, Fludioxonil, Dimethomorph, Mandipropamid, Tricyclazole, Copper, Metiram, Chlorothalonil, Dithianon, Fluazinam, Folpet, Fosetyl-Al, Captan, Cymoxanil, Mancozeb, Kresoxim-methyl, Oryzastrobin, Epoxiconazole, Fluquinconazole, Triticonazole, Fenpropimorph and Iprodione.

In one embodiment, the plant growth regulator is selected from the group consisting of 6-benzylaminopurine (=N-6-benzyladenine), chlormequat (chlormequat chloride), choline chloride, cyclanilide, dikegulac, diflufenzopyr, dimethipin, ethephon, flumetralin, fluthiacet, forchlorfenuron, gibberellic acid, inabenfide, maleic hydrazide, mepiquat (mepiquat chloride), 1-methylcyclopropene (1-MCP), paclobutrazol, prohexadione (prohexadione calcium), prohydrojasmon, thidiazuron, triapenthenol, Tributyl phosphorotrithioate, trinexapac-ethyl and uniconazole.

In another embodiment, the active ingredient is a biological control agent such as a bio-pesticide. Compared to conventional synthetic chemical pesticides, bio-pesticides are non-toxic, safe to use, and can have high specificity. These can be used as a preventative (or curative) tool to manage diseases, nematodes and insects and other pests. Bio-pesticides allow for the reduction in the use of traditional chemical-based pesticides without affecting yields. The use of biological pesticides is compatible with the use for food and feed production and many of the biological agents are approved for consumption. This allows an all year use in food production systems like wine, banana, cocoa, coffee, and fruit plantations etc. where pest control is a major and increasing challenge. In one embodiment, the tools, systems and methods of the disclosure are employed in organic farming.

In one embodiment, the active ingredients are those which provide a systemic effect.

The active ingredient is generally formulated to be suitable for injection/transference into a plant species by a method according to the present disclosure. Examples of typical formulations include water-soluble liquids (SL), emulsifiable concentrates (EC), emulsions in water (EW), suspension concentrates (SC, SE, FS, OD), water-dispersible granules (WG) and fluids (which include one or more of a liquid, gas, gel, vapor, aerosol or the like). These and other possible types of formulation are described, for example, by Crop Life International and in Pesticide Specifications, Manual on development and use of FAO and WHO specifications for pesticides, FAO Plant Production and Protection Papers, prepared by the FAO/WHO Joint Meeting on Pesticide Specifications, 2004, ISBN: 9251048576; "Catalogue of pesticide formulation types and international coding system", Technical Monograph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005. Formulations are prepared e.g. by mixing the active ingredients with one or more suitable additives such as suitable extenders, solvents, spontaneity promoters, carriers, emulsifiers, dispersants, frost protectants, biocides, thickeners, adjuvants or the like. An adjuvant in this context is a component which enhances the biological effect of the formulation, without the component itself having a biological effect. Examples of adjuvants are agents which promote the retention, spreading, or penetration in the target plant. One embodiment of the disclosure comprises a long-term supply of the active ingredient to the plant over the growing season, with an auxiliary being stabilizers, such as low-temperature stabilizers, preservatives, antioxidants, light stabilizers or other agents which improve chemical and/or physical stability.

Examples for suitable auxiliaries are solvents, liquid carriers, surfactants, dispersants, emulsifiers, wetters, adjuvants, solubilizers, penetration enhancers, protective colloids, humectants, repellents, attractants, feeding stimulants, compatibilizers, bactericides, anti-freezing agents, antifoaming agents, colorants, stabilizers or nutrients, UV protectants, tackifiers and/or binders. Specific examples for each of these auxiliaries are well known to the person of ordinary skill in the art, see for example US 2015/0296801 A1.

The compositions can optionally comprise 0.1-80% stabilizers and/or nutrients and 0.1-10% UV protectants. General examples of suitable ratios for multiple formulation types referenced above are given in Agrow Reports DS243, T&F Informa, London, 2005.

When applying active ingredients, the application can be continuous over a longer period or intervals. The application could also be coupled with a disease monitoring system and be triggered "on demand."

The inventive system can be used with any number of known injection protocols such as, for example, those disclosed in PCT applications WO 2012/114197 or WO 2013/149993 which are incorporated by reference herein. The appropriate protocol will depend upon various factors including the nozzle tip, the tree species, the target (insect, nematode, disease, abiotic stress, etc.), the injection fluid components and/or viscosity, the dose volume required and the injection pressure.

Penetrants which facilitate and/or enhance the uptake and distribution of the active ingredient in the target plant can be used. Suitable penetrants in the present context include all those substances which are typically used in order to enhance the penetration of active agrochemical compounds into plants. Examples include alcohol alkoxylates, such as coconut fatty ethoxylate, isotridecyl ethoxylate, fatty acid esters, such as rapeseed or soybean oil methyl esters, fatty amine alkoxylates, such as tallowamine ethoxylate, or ammonium and/or phosphonium salts, such as ammonium sulphate or diammonium hydrogen phosphate.

The formulations can comprise between 0.5% and 90% by weight of active compound, based on the weight of the formulation.

At certain application rates, the compositions and/or formulations according to the disclosure may also have a strengthening effect in plants. "Plant-strengthening" (resistance-inducing) substances are to be understood as meaning, in the present context, those substances or combinations of substances which are capable of stimulating the defence system of plants in such a way that, when subsequently inoculated with harmful microorganisms, the treated plants display a substantial degree of resistance to these microorganisms.

Any suitable liquid formulations may be used. In certain embodiments, the liquid formulation is water soluble. In some variations, the liquid formulation comprises nutrients. In certain variations, the liquid formulation comprises micronutrients. In some variations, the liquid formulation comprises zinc, copper, manganese, boron, sulfur, calcium, or iron, or any salt thereof, or any combination of the foregoing.

In certain embodiments, the liquid formulation comprises zinc, copper, or manganese, or any salt thereof, or any combination of the foregoing. In some variations, the liquid formulation comprises zinc and copper, or any salt thereof.

In other variations, the liquid formulation comprises zinc and manganese, or any salt thereof.

In some embodiments of the foregoing, the liquid formulation further comprises citric acid. In certain variations, the citric acid is complexed with the micronutrient(s) in the formulation. In one variation, the citric acid is in the form of hydracids. In one variation, the liquid formulation comprises a mixture of copper and zinc complexed with citric acid (e.g., under the form of hydracids). In another variation, the liquid formulation comprises a mixture of zinc and manganese complexed with citric acid (e.g., under the form of hydracids). In yet other variations, the liquid formulation comprises a mixture of zinc, manganese and copper complexed with citric acid (e.g., under the form of hydracids). Examples of commercially available formulations suitable for use in the methods herein include Dentamet® (DiAgro) and Bio-D (DiAgro).

In some variations, commercially available formulations may be diluted and/or further formulated for use in the methods described herein. For example, in some embodiments, the liquid formulation comprises one part Dentamet® and four parts water. In certain variations, the liquid comprises Dentamet® diluted in water so that a balance between obtaining a sufficient amount to get activity while avoiding phytotoxicity in the plant is achieved.

Plants

In some embodiments, the injection tool of the disclosure is inserted into the stem of the plant. The term "stem" is to be understood in the broadest possible sense and includes all parts of the plant which (i) comprise a vascular system connected to the plant and (ii) have a diameter of at least 1 cm, such as at least 2 cm or 3 cm, or at least 4 cm or 5 cm. The term stem includes trunks and branches of tree, large petioles, but also "false stems" or pseudostems of plants like bananas, which consist of tightly packed sheaths. Stems can be woody or non-woody.

Plants that can benefit from application of the products and methods of the subject disclosure are selected from Tree Crops (e.g., Walnuts, Almonds, Pecans, Hazelnuts, Pistachios, etc.), *citrus* trees (*Citrus* spp. e.g., orange, lemon, grapefruit, mandarins etc.), Fruit Crops (such as pomes, stone fruits or soft fruits, for example apples, pears, plums, peaches, cherries etc.), Vine Crops (e.g., Grapes, Blueberries, Blackberries, etc.), coffee (*Coffea* spp.), coconut (*Cocos iiucifera*), pineapple (*Ananas comosus*), cocoa (*Theobroma cacao*), tea (*Camellia sinensis*), banana (Musa spp.), lauraceous plants (such as avocados (*Persea americana*), cinnamon or camphor), fig (*Ficus casica*), guava (*Psidium guajava*), mango (*Mangifera indica*), olive (*Olea europaea*), papaya (*Carica papaya*), cashew (*Anacardium occidentale*), macadamia (Macadamia *integrifolia*), almond (*Prunus amygdalus*), natural rubber tree, date tree, oil palm tree, ornamentals, forestry (e.g., pine, spruce, *eucalyptus*, poplar, conifers etc) and/or box trees.

Conifers that may be employed in practicing the embodiments are selected from pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true first such as silver fir (*Abies amabilis*) and balsam fir (*Abies balsamea*); and cedars such as Western red cedar (*Thuja plicata*) and/or Alaska yellow-cedar (*Chamaeeyparis nootkatensis*).

Palm trees that may be treated are selected from *Archontophoenix alexandrae* (king Alexander palm), *Arenga* spp. (Dwarf sugar palm), *Borassus flabellifer* (Lontar palm),

*Brahea armata* (blue hesper palm), *Brahea edulis* (Guadalupe palm), *Butia* capitate (pindo palm), *Chamaerops humilis* (European fan palm), *Carpentaria* spp (*Carpenteria* palm), *Chamaedorea elegans* (parlor palm), *C. erupens* (bamboo palm), *C. seifrizii* (reed palm), *Chrysalidocarpus lutescens* (areca palm), *Coccothrinax argentata* (silver palm), *C. crinite* (old man palm), *Cocos nucifera* (coconut palm), *Elaeis guineensis* (African oil palm), *Howea forsterana* (kentia palm), *Livistona rotundifolia* (round leaf fan palm), *Neodypsis decaryi* (triangle palm); *Normanbya normanbi* (Queensland black); *Pinanga insignis; Phoenix canariensis* (Canary Island date); *Ptychosperma macarthuri* (Macarthur palm); *Rhopalostylis* spp (shaving brush p.); *Roystonea elata* (Florida royal palm), *R. regia* Cuban (royal palm), *Sabal* spp (Cabbage/palmetto), *Syagrus romanzoffiana* (queen palm), *Trachycarpus* fortune (windmill palm), *Trythrinax acanthocoma* (spiny fiber palm), *Washingtonia filifera* (petticoat palm) and/or *W. robusta* (Washington/Mexican fan palm). One embodiment includes the prevention or cure of bud rot of palm trees caused, for example, by *Phytophthora palmivora, Thielaviopsis paradoxa* and/or bacteria. Unlike most trees, which have many points where new growth emerges, palms rely on their single terminal bud. If the terminal bud or heart becomes diseased and dies, the tree will not be able to put out any new leaf growth and will die. That is why preventative care is needed to maintain a healthy palm tree.

Diseases

One embodiment comprises a method for reducing damage of plants and/or plant parts or losses in harvested fruits or plant produce caused by phytopathogenic fungi by controlling such phytopathogenic fungi, comprising applying the tools, system, agents/formulations or methods of the disclosure to the plant. Advantageously, the disclosure is for controlling, preventing, or curing the following fungal plant diseases selected from the group:

*Botrytis cinerea* (teleomorph: *Botryotinia fuckeliana*: grey mold) on fruits and berries (e.g. strawberries), rape, vines, forestry plants; *Ceratocystis* (syn. *Ophiostoma*) spp. (rot or wilt) on broad-leaved trees and evergreens, e.g. *C. ulmi* (Dutch elm disease) on elms; *Cercospora* spp. (*Cercospora* leaf spots) on coffee; *Colletotrichum* (teleomorph: *Glomerella*) spp. (anthracnose) on soft fruits; *Cycloconium* spp., e.g. *C. oleaginum* on olive trees; *Cylindrocarpon* spp. (e.g. fruit tree canker or young vine decline, teleomorph: *Nectria* or *Neonectria* spp.) on fruit trees, vines (e.g. *C. liriodendri*, teleomorph: *Neonectria liriodendri*: Black Foot Disease) and ornamentals; *Esca* (dieback, apoplexy) on vines, caused by *Formitiporia* (syn. *Phellinus*) *punctata, F. mediterranea, Phaeomoniella chlamydospora* (earlier *Phaeoacremonium chlamydosporum*), *Phaeoacremonium aleophilum* and/or *Botryosphaeria obtuse; Elsinoe* spp. on pome fruits (*E. pyn*), soft fruits (*E. veneta*: anthracnose) and vines (*E. ampelina*: anthracnose); *Eutypa lata* (*Eutypa* canker or dieback, anamorph: *Cytosporina lata*, syn. *Libertella blepharis*) on fruit trees, vines and ornamental woods; *Fusarium* (teleomorph: *Gibberella*) spp. (wilt, root or stem rot) on various plants; *Glomerella cingulata* on vines, pome fruits and other plants; *Guignardia bidwellii* (black rot) on vines; *Gymnosporangium* spp. on rosaceous plants and junipers, e.g. *G. sabinae* (rust) on pears; *Hemileia* spp., e.g. *H. vastatrix* (coffee leaf rust) on coffee; *Isariopsis clavispora* (syn. *Cladosporium vitis*) on vines; *Monilinia* spp., e.g. *M. taxa, M. fructicola* and *M. fructigena* (bloom and twig blight, brown rot) on stone fruits and other rosaceous plants; *Mycosphaerella* spp. on bananas, soft fruits, such as e.g. *M. fijiensis* (black Sigatoka disease) on bananas; *Phialophora* spp. e.g. on vines (e.g. *P. tracheiphila* and *P. tetraspora*); *Phomopsis* spp. on vines (e.g. *P. viticola*: can and leaf spot); *Phytophthora* spp. (wilt, root, leaf, fruit and stem root) on various plants, such as broad-leaved trees (e.g. *P. ramorum*: sudden oak death); *Plasmopara* spp., e.g. *P. viticola* (grapevine downy mildew) on vines; *Podosphaera* spp. (powdery mildew) on rosaceous plants, hop, pome and soft fruits, e.g. *P. leucotricha* on apples; *Pseudopezicula tracheiphila* (red fire disease or rotbrenner', anamorph: *Phialophora*) on vines; *Ramularia* spp., e.g. *R. collo-cygni* (*Ramularia* leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e.g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on vines; *Uncinula* (syn. *Erysiphe*) necator (powdery mildew, anamorph: *Oidium tuckeri*) on vines; *Taphrina* spp., e.g. *T. deformans* (leaf curl disease) on peaches and *T. pruni* (plum pocket) on plums; *Thielaviopsis* spp. (black root rot) on pome fruits; *Venturia* spp. (scab) on apples (e.g. *V. inaequalis*) and pears; and/or *Verticillium* spp. (wilt) on various plants, such as fruits and ornamentals, vines, soft fruits.

The disclosed subject matter is employed for controlling, preventing, or curing the diseases in plants selected from:

Diseases of apple: blossom blight (*Monilinia mali*), powdery mildew (*Podosphaera leucotricha*), *Alternaria* leaf spot/*Alternaria* blotch (*Alteraaria alternata* apple pathotype), scab (*Venturia inaequalis*), bitter rot (*Colletotrichum acutatum*), anthrax (*Colletotrieiium acutatum*), decomposed disease (*Valsa ceratosperma*), and/or crown rot (*Phytophtora cactorum*);

Diseases of pear: scab (*Venturia nashicola, V. pirina*), black spot/purple blotch (*Alternaria* alternate Japanese pear pathotype). rust/frogeye (*Gymnosporangium haraeanum*), and/or phytophthora fruit rot (*Phytophtora cactorum*);

Diseases of peach: brown rot (*Monilinia fructicola*), black spot disease/scab (*Cladosporium carpophilum*), and/or phomopsis rot (*Phomopsis* sp.);

Diseases of grape: anthracnose (*Elsinoe ampelina*), powdery mildew (*Uncinula necator*), ripe rot (*Glomerella cingulata*), black rot (*Guignardia bidwelli* i), downy mildew (*Plasmopara viticola*), rust (*Phakopsora ampelopsidis*), and/or gray mold (*Botrytis cinerea*);

Diseases of Japanese persimmon: anthracnose (*Gloeosporium kaki*) and/or leaf spot (*Cercospora kaki, Mycosphaerella nawae*);

Diseases of cruciferous vegetables: *Alternaria* leaf spot (*Alternaria japonica*), white spot (*Cercosporella brassicae*), and/or downy mildew (*Peronospora parasitica*); Diseases of rapeseed: sclerotinia rot (*Sclerotinia sclerotiorum*) and/or gray leaf spot (*Alternaria brassicae*);

Diseases of rose: black spot (*Diplocarpon rosae*) and/or powdery mildew (*Sphaerotheca pannosa*);

Disease of banana: sigatoka (*Mycosphaerella fijiensis, Mycosphaerella musicola, Pseudocercospora musae*); and/or *Colletotrichum musae, Armillaria mellea, Armillaria tabescens, Pseudomonas solanacearum, Phyllachora musicola, Mycosphaerella fijiensis, Rosellinia bunodes, Pseudomas* spp., *Pestalotiopsis leprogena, Cercospora hayi, Pseudomonas solanacearum, Ceratocystis paradoxa, Verticillium theobromae, Trachysphaera fructigena, Cladosporium musae, Junghuhnia vincta, Cordana johnstonii, Cordana*

*musae, Fusarium pallidoroseum, Colletotrichum musae, Verticillium theobromae, Fusarium* spp *Acremonium* spp., *Cylindrocladium* spp., *Deightoniella torulosa, Nattrassia mangiferae, Dreschslera gigantean, Guignardia musae, Botryosphaeria ribis, Fusarium solani, Nectria haematococca, Fusarium oxysporum, Rhizoctonia* spp., *Colletotrichum musae, Uredo musae, Uromyces musae, Acrodontium simplex, Curvularia eragrostidis, Drechslera musae-sapientum, Leptosphaeria musarum, Pestalotiopsis* disseminate, *Ceratocystis paradoxa, Haplobasidion musae, Marasmiellus inoderma, Pseudomonas solanacearum, Radopholus similis, Lasiodiplodia theobromae, Fusarium pallidoroseum, Verticillium theobromae, Pestalotiopsis palmarum, Phaeoseptoria musae, Pyricularia grisea, Fusarium moniliforme, Gibberella fujikuroi, Erwinia carotovora, Erwinia chrysanthemi, Cylindrocarpon musae, Meloidogyne arenaria, Meloidogyne incognita, Meloidogyne javanica, Pratylenchus coffeae, Pratylenchus goodeyi, Pratylenchus brachyurus, Pratylenchus reniformia, Sclerotinia sclerotiorum, Nectria foliicola, Mycosphaerella musicola, Pseudocercosporamusae, Limacinula tenuis, Mycosphaerella musae, Helicotylenchus multicinctus, Helicotylenchus dihystera, Nigrospora sphaerica, Trachysphaera frutigena, Ramichloridium musae, Verticillium theobromae;*

Disease of *citrus* fruits: black spot disease (*Diaporthe citri*), scab (*Elsinoe fawcetti*), and/or fruit rot (*Penicillium digitatum, P. italicum*);

Disease of tea: net rice disease (*Exobasidium reticulatum*), disease victory (*Elsinoe leucospila*), ring leaf spot (*Pestalotiopsis* sp.), anthracnose (*Colletotrichum theaesinensis;*

Disease of plam trees: Bud Rot, Crown Rot, Red Ring, Pudricion de Cogollo, Lethal Yellowing;

Diseases of box tree: boxwood blight fungus (*Cylindrocladium buxicola* also called *Calonectria pseudonaviculata*), *Volutella buxi, Fusarium buxicola*.

The methods of the disclosure can be used to reduce damage caused by a wide range of insect pests. Target insects can be selected from the order of *Lepidoptera, Coleoptera, Diptera, Thysanoptera, Hymenoptera, Orthoptera, Acarina, Siphonaptera, Thysanura, Chilopoda, Dermaptera, Phthiraptera, Hemipteras, Homoptera, Isoptera* and/or *Aptero*. Examples of such pests include, but are not limited to, Arthropods, including, for example, *Lepidoptera* (for example, Plutellidae, Noctuidae, Pyralidae, Tortricidae, Lyonetiidae, Carposinidae, Gelechiidae, Crambidae, Arctiidae, and/or Lymantriidae), *Hemiptera* (for example, Cicadellidae, Delphacidae, Psyllidae, Aphididae, A!eyrodidas, Orthezidae, Miridae, Tingidae, Pentatomidae, and/or Lygaiedae), *Coleoptera* (for example, Scarabaeidae, Elateridae, Coccinellidae, Cerambycidae, Chrysomelidae, and/or Curculionidae), *Diptera* (for example, Muscidae, Calliphoridae, Sarcophagidae, Anthomyiidae, Tephritidae, Opomyzoidea, and/or Carnoidea), Orthoptera (for example, Acrididae, Catantopidae, and Pyrgomorphidae), Thysanoptera (for example, Thripidae, Aeolothripidae, and Merothripidae), Tylenchida (for example, Aphelenchoididae and/or Neotylechidae), Collembola (for example, Onychiurus and lsotomidae), *Acarina* (for example, Tetranychidae, Dermanyssidae, Acaridae, and/or Sarcoptidae), Stylommatophora (for example, Philomycidae and/or Bradybaenidae), Ascaridida (for example, Ascaridida and/or Anisakidae), Opisthorchiida, Strigeidida, Blattodea (for example, Blaberidae, Cryptocercidae, and/or Panesthiidae), *Thysa-* *nura* (for example, Lepismatidae, Lepidotrichidae, and/or Nicoletiidae) and/or box tree moth/box tree caterpillar (Cydalima perspectalis).

The disclosure is also useful against bacterial pathogens that attack, consume (in whole or in part), or impede the growth and/or development of plants and/or act as transmission vectors to the plant and/or other plants caused by such bacterial pathogens. The bacterial pathogens can include *Agrobacterium, Agrobacterium tumefaciens, Erwinia, Erwinia amylovora, Xanthomonas, Xanthomonas campestris, Pseudomonas, Pseudomonas syringae, Ralstonia solanacearum, Corynebacterium, Streptomyces, Streptomyces scabies, Actinobacteria, Micoplasmas, Spiroplasmas* and/or *Fitoplasmas*.

The disclosure is also useful for mitigating, controlling and/or eradicating viral pathogens that attack, consume (in whole or in part), or impede the growth and/or development of the plant and/or act as transmission vectors to the plant and/or other plants caused by such viral pathogens. Such viral pathogens can include Carlaviridae, Closteroviridae, viruses that attack *citrus* fruits, Cucumoviridae, Ilarviridae, dwarf virus attacking prunes, Luteoviridae, Nepoviridae, Potexviridae, Potyviridae, Tobamoviridae, Caulimoviridae, as well as other viruses that attack vegetation and crops.

Plant growth-regulating compounds can be used, for example, to inhibit the vegetative growth of the plants. Such inhibition of growth is of economic interest, for example, the inhibition of the growth of herbaceous and woody plants on roadsides and in the vicinity of pipelines or overhead cables, or quite generally in areas where vigorous plant growth is unwanted. Inhibition of the vegetative plant growth may also lead to enhanced yields because the nutrients and assimilates are of more benefit to flower and fruit formation than to the vegetative parts of the plants. Frequently, growth regulators can also be used to promote vegetative growth. This is of great benefit when harvesting the vegetative plant parts. However, promoting vegetative growth may also promote generative growth in that more assimilates are formed, resulting in more or larger fruits.

Use of growth regulators can control the branching of the plants. On the one hand, by breaking apical dominance, it is possible to promote the development of side shoots, which may be highly desirable particularly in the cultivation of ornamental plants, also in combination with an inhibition of growth. On the other hand, however, it is also possible to inhibit the growth of the side shoots. This effect is of particular interest, for example, in the cultivation of tobacco or in the cultivation of tomatoes. Under the influence of growth regulators, the amount of leaves on the plants can be controlled such that defoliation of the plants is achieved at a desired time. Such defoliation plays a major role in the mechanical harvesting of cotton, but is also of interest for facilitating harvesting in other crops, for example in viticulture.

Growth regulators can also be used to achieve faster or delayed ripening of the harvested material before or after harvest. This is particularly advantageous as it allows optimal adjustment to the requirements of the market. Moreover, growth regulators in some cases can improve fruit color. In addition, growth regulators can also be used to concentrate maturation within a certain period of time. This establishes the prerequisites for complete mechanical or manual harvesting in a single operation, for example in coffee.

By using growth regulators, it is additionally possible to influence the resting of seed or buds of the plants, such that plants, including pineapple or ornamental plants in nurseries, for example, germinate, sprout or flower at a time when they are normally not inclined to do so.

Further, growth regulators can induce resistance of the plants to frost, drought or high salinity of the soil. This allows the cultivation of plants in regions which are normally unsuitable.

The compositions and/or formulations according to the disclosure also exhibit a potent strengthening effect in plants. Accordingly, they can be used for mobilizing the defences of the plant against attack by undesirable microorganisms. Plant-strengthening (resistance-inducing) substances are to be understood as meaning, in the present context, those substances which are capable of stimulating the defence system of plants in such a way that the treated plants, when subsequently inoculated with undesirable microorganisms, develop a high degree of resistance to these microorganisms. The active compounds according to the disclosure are also suitable for increasing the yield of crops. In addition, they show reduced toxicity and are well tolerated by plants.

Further, in context with the present disclosure plant physiology effects comprise the following (all of which can be modulated by the compositions, methods and devices provided herein):

Abiotic stress tolerance, comprising temperature tolerance, drought tolerance and recovery after drought stress, water use efficiency (correlating to reduced water consumption), flood tolerance, ozone stress and UV tolerance, tolerance towards chemicals like heavy metals, salts, pesticides (safener) etc.

Biotic stress tolerance, comprising increased resistance fungal diseases, increased resistance against nematodes, viruses and bacteria.

Increased plant vigor, comprising plant health, plant quality, seed vigor, reduced stand failure, improved appearance, increased recovery, improved greening effect and improved photosynthetic efficiency.

In addition, the inventive treatment can reduce the mycotoxin content in the harvested material and the foods and feeds prepared therefrom.

In another embodiment of the disclosure the tools, system, compositions/formulations and methods are employed to provide to the plant nutritional elements like nitrogen, phosphorous and potassium, as well as mineral elements, including but not limited to, silicium, calcium, magnesium and manganese.

In some aspects, provided is a method for treating a plant whose xylem or phloem or both are invaded by, or are at risk of being invaded by, bacteria, fungi, virus and/or other pathogens. In some embodiments, the method improves the strength of the plant to withstand attack of bacteria. In some variations, the method strengthens an infected plant or improves plant health recovery of the infected plant.

In yet further embodiments, this disclosure provides methods of treating Pierce's disease of grape, citrus variegated chlorosis, phony peach disease, alfalfa dwarf, leaf scorch of plum, blueberry, pecan, coffee, almond and *oleander*, and olive quick declines syndrome ("OQDS"). In some embodiments, the disclosure provides methods for improving the strength of a plant infected by *Xylella fastidiosa*, which is a xylem-limited plant bacteria thought to cause the referenced disease. In certain embodiments, the disclosure provides methods for enhancing or maintaining the health of olive trees. In some embodiments, the disclosure provides methods for treating OQDS in olive trees. In some variations, the disclosure provides methods for improving the strength of an olive tree infected by *Xylella fastidiosa* subsp. *pauca*. In other variations, the disclosure provides methods for improving the strength of an olive tree infected by *Xylella fastidiosa* subsp. *multiplex*.

In other embodiments, the disclosure provides methods for improving the strength of an olive tree infected by *Xylella fastidiosa* subsp. *fastidiosa, Xylella fastidiosa* subsp. *multiplex, Xylella fastidiosa* subsp. *sandyi*, and/or *Xylella fastidiosa* subsp. *pauca*. For example, in some variations, provided are methods for improving the strength of grapevines infected by *Xylella fastidiosa* subsp. *fastidiosa*. In some variations, provided are methods for improving the strength of a *citrus* tree infected by *Xylella fastidiosa* subsp. *pauca*. In some variations, provided are methods for improving the strength of stone fruit trees infected by *Xylella fastidiosa* subsp. *multiplex*. In one variation, provided are methods for improving the strength of cherry, plum, peach and/or almond trees infected by *Xylella fastidiosa* subsp. *multiplex*.

In certain embodiments, the method comprises delivering a formulation comprising one or more nutrients into a plant. In certain embodiments the method comprises precision delivery (also referred to as "precision injection") of a formulation into the plant. Precision delivery refers to delivering the formulation only or substantially only into a target location in the plant. For example, in some embodiments, the target location is the active vasculature of the plant. In certain embodiments, the method comprises injecting a liquid formulation into and no further than the active vasculature of the plant. In some variations, the active vasculature of the plant is the xylem and/or the phloem. In one variation, the active vasculature is active xylem (such as sapstream) and phloem. In further embodiments, precision delivery involves delivering the formulation into the active vasculature of the plant while minimizing damage to the plant relative traditional forms of injection drilling systems. In yet other embodiments, precision delivery involves using a system that can be configured to deliver formulation into and no further than the active vasculature of a plant.

In some embodiments, the plant is an olive tree suffering from, or at risk of suffering from, one or more of olive quick decline syndrome, olive leaf/peacock spot, anthracnose, *Cercospora* leaf spot, olive knot/tuberculosis, and *Verticillium* wilt. In certain embodiments, provided are methods for improving the strength of an olive tree infected by *Colletotricum* spp., *Pseudocercospora cladosporioides, Xylella fastidiosa* (including, e.g., *Xylella fastidiosa* supsp. *pauca*), *Spilocea olivine/Cycloconium oleaginum, Pseudomonas savastanoi* (including, e.g., *Pseudomonas savastanoi* pv. *Savastanoi*) and *Verticlium* species (including *V. dahliae, V. albo-atrum, V. longisporum, V. nubilum, V. theobromae* and *V. tricorpus*).

In some further embodiments, the plant is a grape vine suffering from, or at risk of suffering from, pathogen infection of one or more of downy mildew, powdery mildew, *botrytis, esca*, grapevine Flavescence doree, and Pierce's disease. In certain embodiments, provided are methods for improving the strength of a grape vine infected by *Plasmopara viticola, Uncinula necator, Botrytis cinereal, Phaeoacremonium aleophilum, Phaeomoniella chlamydospora, Fomitiporia mediterranea, Candidatus Phytoplasma vitis*, and *Xylella fastidiosa* (including, e.g., *Xylella fastidiosa* supsp. *fastidiosa*).

In other further embodiments, the plant is a kiwi vine suffering from, or at risk of suffering from, bacterial canker. In certain embodiments, provided are methods for improving the strength of a kiwi vine infected by *Pseudomonas syringae* (including e.g., *Pseudomonas syringae actinidiae*) in kiwi vines.

In other further embodiments, the plant is a hazelnut tree suffering from, or at risk of suffering from, one or more of bacterial canker, *cytospora* canker, and anthracnose. In certain embodiments, provided are methods for improving the strength of hazelnut trees infected by *Pseudomonas syringae avellanae, Cytospora corycicola*, and *Labrella coryli* in hazelnut trees.

In yet other further embodiments, the plant is a stone fruit tree (including, for example, peach, nectarine, plum and cherry trees) suffering from, or at risk of suffering from, one or more of peach leaf curl, shot hole, peach canker, brown rot, powdery mildew, and fire blight (as applicable). In certain embodiments, provided are methods for improving the strength of stone fruit trees, including for example peach, nectarine, plum and cherry trees, infected by *Taphrina deformans, Clasterosporium carpophilum, Fusicoccum* (e.g., *Fusicoccum amygdali*), *Cytospora, Pseudomonas, Xanthomonas, Monilinia laxa, Monilinia fructicola, Sphaeroteca pannosa, Erwinia amylovora*, and *Xylella fastidiosa*.

In yet other further embodiments, the plant is an almond tree suffering from, or at risk of suffering from, one or more of Bacterial spot, Bacterial Canker, Almond leaf scorch, Bacterial hyperplastic canker, *Alternaria* leaf spot, almond anthracnose, powdery mildew, scab, shot hole, leaf curl, *verticillium* wilt, or leaf scorch. In certain embodiments, provided are methods for improving the strength of almond trees infected by *Xanthomonas campestris, Pseudomonas syringae, Xylella fastidiosa, Pseudomonas amygdali, Alternaria alternata, Colletotrichum acutatum, Podosphaera pannosa, Venturia carpophila, Clasterosporium carpophilum, Taphrina deformans*, and *Verticillium* spp.

In yet other further embodiments, the plant is a *citrus* tree suffering from, or at risk of suffering from, *citrus* canker, *citrus* greening and *citrus* greasy spot. In certain embodiments, provided are methods for for improving the strength of *citrus* trees infected by *Xantomonas campestris, Candidatus Liberibacter* (including, e.g., *Candidatus Liberibacter asiaticus* and *Candidatus Liberibacter africanus*), and *Mycosphaerella citri*.

In yet other further embodiments, the plant is a pome tree, or an apple or pear tree, suffering from, or at risk of suffering from, one or more of apple/pear scab, black rot, brown mottle, fire blight, European canker, apple fire blight, *Maculatura bruna*, powdery mildew, *Valsa* canker, and brown spot, as applicable. In certain embodiments, provided are methods for improving the strength of a plant infected by *Venturia* spp, *Alternaria* alternate/*piri, Stemphyllium vesicarium, Erwinia amylovora, Nectria Galligena, Stemphylium vesicarium*, and *Podosphaera leucotricha*. In one embodiment, the plant is a tree belonging to the family of Rosaceae.

In some variations, provided are methods for treating one or more of: Olive Quick Decline Syndrome, Olive leaf/Peacock spot, Olive knot/tuberculosis, and Anthracnose in olive trees; Downey mildew, Powdery mildew, and *Botrytis* in grape vines; Bacterial canker in kiwi fruit trees; Scab, Black rot, Brown mottle, Fire blight, European canker in pome trees, or apple and pear trees; *Citrus* canker and *Citrus* Greasy spot in *citrus* trees; Peach leaf curl, shot hole, Peach canker, and Powdery mildew in stone fruit trees; and Bacterial canker, *Cytospora* canker, and Anthracnose in hazelnut trees. In some variations, provided are methods for improving the strength of a plant infected by one or more of: *Xylella fastidiosa, Spilocea olivine, Pseudomonas savastanoi, Colletotricum* spp., *Plasmopara viticola, Uncinula necator, Botrytis cinerea, Pseudomonas syringae, Venturia* spp., *Alternaria alternata/piri, Stemphyllium vesicarium, Erwinia amylovora, Nectria galligena, Xantomonas campestris, Mycosphaerella citri, Taphrina deformans, Clasterosporium carpophilum, Fusicoccum, Cytospora, Sphaeroteca pannosa, Pseudomonas syringae, Cytospora corycicola, Labrella coryli*. In some variations, provided are methods for improving the strength of a plant infected by one or more of: *Xylella fastidiosa, Spilocea olivine, Pseudomonas savastanoi*, and *Colletotricum* spp. (wherein the plant is olive trees); *Plasmopara viticola, Uncinula necator*, and *Botrytis cinerea* (wherein the plant is grape vine); *Pseudomonas syringae* (wherein the plant is kiwi fruit trees); *Venturia* spp., *Alternaria alternata/piri, Stemphyllium vesicarium, Erwinia amylovora*, and *Nectria galligena* (wherein the plant is pome trees, or apple and/or pear trees); *Xantomonas campestris* and *Mycosphaerella citri* (wherein the plant is *citrus* trees); *Taphrina deformans, Clasterosporium carpophilum, Fusiococcum, Cytospora*, and *Sphaeroteca pannosa* (wherein the plant is stone fruit trees); and *Pseudomonas syringae, Cytospora corycicola, Labrella coryli* (wherein the plant is hazelnut trees). In certain variations of the foregoing, the methods comprise injecting into a plant a liquid formulation comprising zinc and copper, such as Dentamet® (DiAgro).

In certain embodiments, the method comprises injecting a liquid formulation using the devices and systems referenced herein to address physiological disorders such as Bitter Pit in apples and pears. In some variations of the foregoing, the liquid formulation comprises calcium.

In certain embodiments, provided are also methods for improving the strength of a plant infected by pathogens including *Cl. michiganensis* subsp. *michiganensis, Xanthomonas arboricola* pv. *juglandis, Xanthomonas fragariae, Ps. syringae* pv. actinidiae, *Erwinia amylovora, Ps. syringae* pv. *syringae, Erwinia tasmaniensis*, and *Erwinia billingiae*. In some variations of the foregoing, the methods comprise injecting into a plant a liquid formulation comprising zinc and copper, such as Dentamet® (DiAgro).

In some embodiments, provided are methods for improving the strength of a plant infected by pathogens, such as bacteria and/or fungi, that: (i) colonize and/or prolificate within the xylem and/or phloem of the plant; and/or (ii) colonizing via leaf surfaces of the plant, using the systems and methods described herein. In some variations, the pathogen (e.g., fungi) may grow on the leaf surface (e.g. Powdery mildew), produce "feeding organs" (e.g., haustoria) that may penetrate specifically into the plant cells to feed from the sapstream of the plant. In other variations, the pathogen (e.g., bacteria and/or fungi) may grow into the plant cells, and/or are directly exposed to the sapstream of the plant.

In certain embodiments, the methods for improving the strength of a plant infected by the pathogens described herein may include any one or more of the following: reducing bacterial titer (concentration) of the pathogen; inducing and/or triggering the plant-based defense mechanisms; xylem functional recovery; recovery of metabolomic profile to pre-infection state in the plant; growth of crops; reducing crop (e.g., fruit) drop; increasing yield and/or reestablishing productivity; inducing new sprouting to reestablish green leaf canopy; preventing and/or delaying infection and symptoms; and recovery of plant health.

In some embodiments, this disclosure also provides systems and devices for delivering liquid formulations to the interior of a plant. In some embodiments, the systems comprise an injection tool operatively connected to a fluid delivery unit, wherein the injection tool is configured for precision delivery of the liquid formulation to a target location inside the plant, for example into the active vasculature of the plant. In some embodiments, the systems are configured for precision delivery of a liquid formulation into the active vasculature of an olive tree. In some embodiments, the fluid delivery unit further comprises the formulation. In other embodiments, the system comprises an injection tool, a fluid delivery unit, and a source of source of formulation in fluid communication with the fluid delivery unit. The methods described herein generally provide one or more commercial advantages over the methods currently known in the art to treat *Xylella fastidiosa*. For example, advantages include one or more of a faster return to the production yields pre-infection, fast response (e.g., restoring plant health), lower volumes of formulation needed, less loss of formulation to the environment, less damage to the tree, response in old trees including trees older than 100 years, response in trees with significant disease symptoms (e.g., with 50% or less remaining canopy foliage and faster administration to the trees).

In some variations, methods for enhancing plant health and methods for treating diseased plants comprises enhancing the health of older trees or treating diseased older trees. In some such embodiments, the trees are olive trees at least 100 years old or more. In other variations, methods for treating diseased plants comprises treating plants suffering from, or at risk of suffering from, severe cases of a disease. In certain such variation, the plants are olive trees suffering from, or at risk of suffering from, more severe cases of *Xylella fastidiosa*, such as olive trees with 50% or less canopy foliage. In some variations, the methods (including for enhancing the health of older trees or treating diseased older trees) may further comprise removing at least a portion of the tree bark at the injection site prior to injection using the systems herein. In one variation, at least a portion of the soft wood in the tree trunk is removed at the injection site prior to injection.

EXAMPLES

The trunk injection devices have been tested regarding the use with different types of trunks, the speed of absorption, distribution of product within the plant, and the continuing usage of an injection device within a trunk. The injection devices have been tested with trunks with a diameter between 2 cm and 30 cm. The tests have been conducted with box, vine, hazelnut, walnut, maple, beach and oak. Further, trees such as date palm, *citrus* tree, and banana tree would be suitable as well.

Speed of absorption is influenced by factors such as weather, season, time of day and injection pressure. Within tests conducted under ideal conditions, an injection pressure of 2.5 bars, and 10 ml of test substance, absorption times below 2 minutes have been achieved.

Distribution within plants has been tested injecting a solution comprising 2% Brilliant Blue E 133 (CAS reg. No. 3844-45-9.) as a test substance. Trees have afterwards been felled and cut in pieces to analyze the distribution of the test substance over time within the plant. The test substance did typically distribute over 5 meters within the stem over 24 hours.

Furthermore conventional active ingredients may be applied, e.g. the commercial products Maag Perfekthion® and Maag Kendo® for box tree.

Maag Perfekthion® (40% Dimethoate Stock solution), depending on the size of the box tree, a 10 ml to 100 ml injection with a 0.1% to 0.3% dilution can be used.

The following Examples are merely illustrative and are not meant to limit any embodiments of the present disclosure in any way.

Example 1

Improving Strength, Plant Health and Recovery of Olive Trees Infected by *Xylella fastidiosa* Subsp. *Pauca*

This example is directed to improving the strength, plant health and recovery of olive trees infected by *Xylella fastidiosa* subsp. *pauca* to withstand attack of bacteria, by microinjection of a micronutrient composition into the trunk of the infected trees.

The tree trunk injection system used in this example included injection tools as generally depicted in FIGS. 20-22 and 74A-D connected to a spring-loaded fluid delivery system as depicted in FIG. 77. The spring-loaded fluid delivery system was operated at a pressure between 1.5-3 bar.

Figure 78:
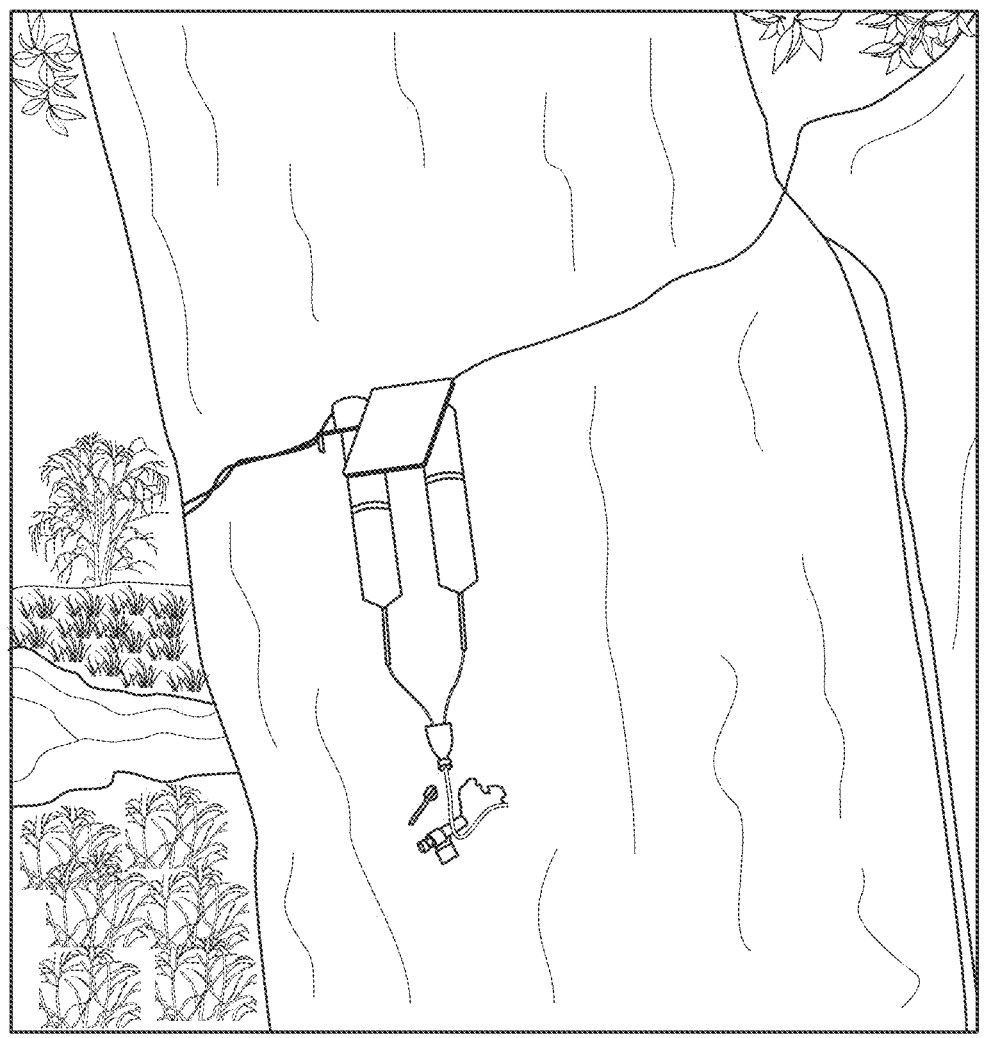
FIG. 78 depicts an exemplary setup of an injection system including the fluid delivery unit of FIG. 77 for injecting a nutrient composition to improve the strength of an olive tree infected by *Xylella*.
Figure 79A:
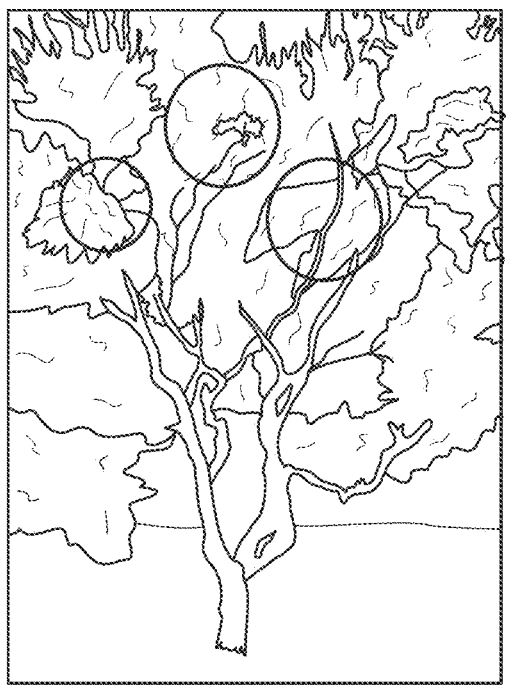
FIGS. 79A and 79B show the positive response of the olive tree labeled "203" in week referred to other drawings showing the same part. Like numbers in two or more figures represent the same or similar elements.
Figure 79B:
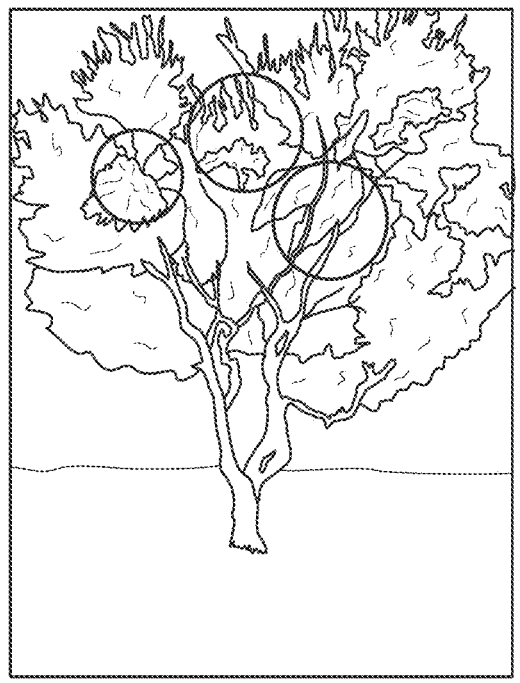
Figure 80A:
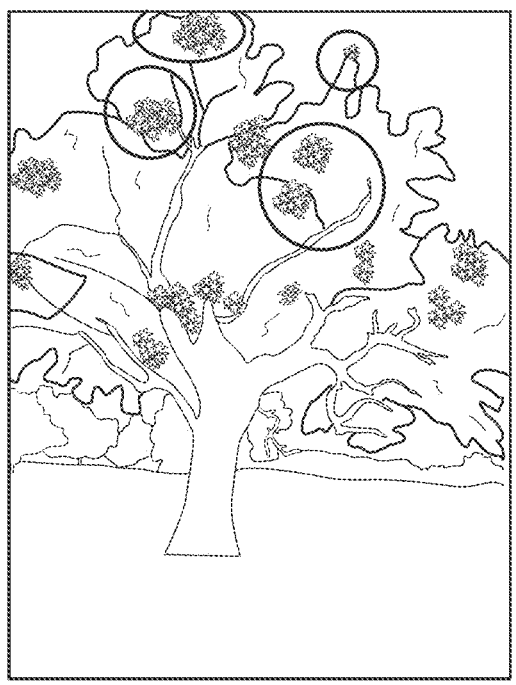
Figure 80B:
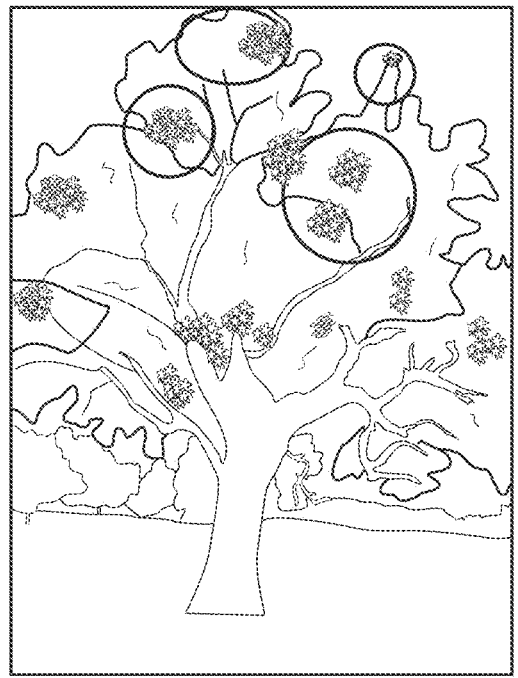
Figure 81A:
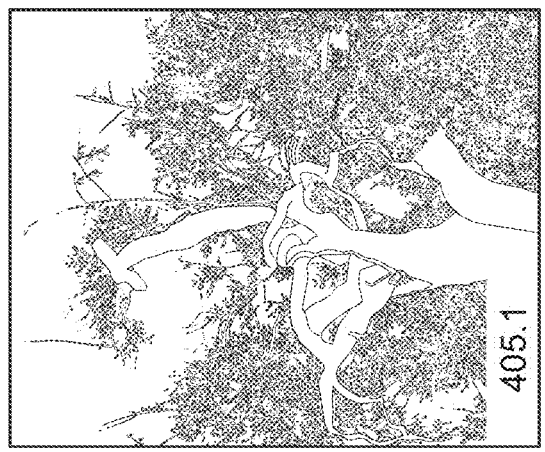
Figure 81B:
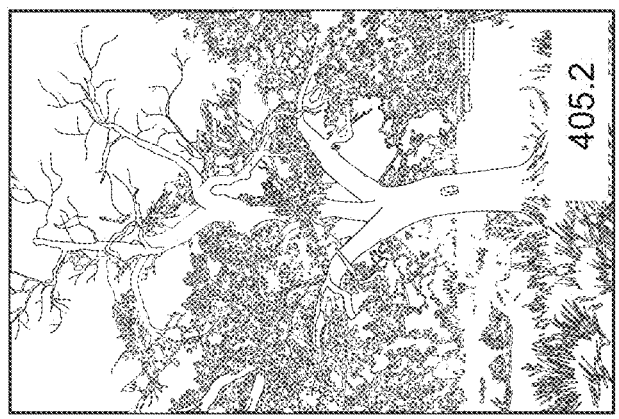
Figure 81C:
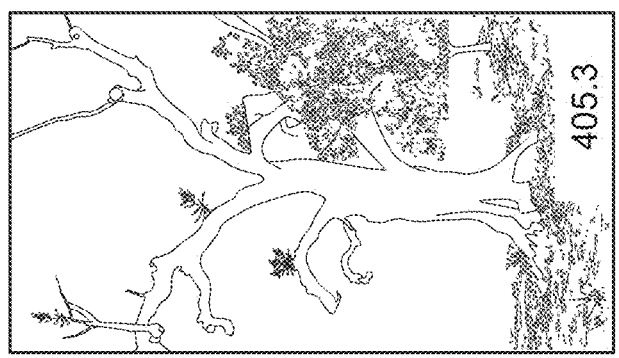
Figure 81D:

Syringes were combined (up to 4) to ensure the total maximum amount of 75 ml could be injected in one treatment. An exemplary set up of the system is shown in FIG. 78. The injection pressure started 3 bar, and was gradually reduced to 1.6 bar during the course of injection.

To investigate the use of the injection system described herein in treating *Xylella* infection in olive trees, two field trials were performed. The trials used a zinc, copper and citric acid bio-complex micronutrient composition, Dentamet® (DiAgro), which is made up of zinc (4%), copper (2%), and the hydracid form of citric acid, wherein the hydracid of citric acid complexes with zinc and copper salts.

Dentamet® with a dilution ratio of 1:4 (1 part Dentamet®, 4 parts water) was injected into 15 olive trees infected *Xylella fastidiosa* subsp. *pauca*, where the olive trees were of different ages, sizes (e.g., in trunk diameter), and infection rates (e.g., levels of severity of symptoms). The olive trees were injected through either one injection point or two injection points, at various height from the ground. Various injection volumes were also tested. Table 1 shows a first field trial with the various combinations of the parameters tested regarding composition injection, with a temperature of 26° C. and a humidity of 50%. Table 2 shows a second field trial with the various combinations of the parameters tested regarding composition injection, with a temperature of 31° C. and a humidity of 36%.

TABLE 1

First field trial of Xylella infection treatment in olive trees using Dentamet ® injection

| NR tree | Amount* | Dilution | Injection point** | Diameter | Age |
|---|---|---|---|---|---|
| 101 | 5 ml | 1:4 | 30 cm | 20 cm | 30 y |
| 102 | 15 ml | 1:4 | 30 cm | 40 cm | 70 y |
| 103 | 25 ml | 1:4 | 30 cm | 50 cm | >100 y |
| 201 | 5 ml | 1:4 | 30 cm | 25 cm | 50 y |
| 202 | 15 ml | 1:4 | 30 cm | 20 cm | 50 y |
| 203 | 25 ml | 1:4 | 30 cm | 25 cm | 50 y |
| 305 (North) | 37.5 ml | 1:4 | 1.2 m | 1 m | 200 y+ |
| 305 (South) | 37.5 ml | 1:4 | 1.2 m | | |
| 303 (North) | 12.5 ml | 1:4 | 1.2 m | 1 m | 200 y+ |
| 303 (South) | 12.5 ml | 1:4 | 1.2 m | | |

TABLE 1-continued

First field trial of Xylella infection treatment in olive trees using Dentamet ® injection

| NR tree | Amount* | Dilution | Injection point** | Diameter | Age |
|---|---|---|---|---|---|
| 304 (North) | 25 ml | 1:4 | 1.2 m | 1 m | 200 y+ |
| 304 (South) | 25 ml | 1:4 | 1.2 m | | |

*For tree 305 total injected: 75 ml, for tree 303 total injected 25 ml, tree 304 total injected 50 ml. Total injected volume per tree for tree 305, 303, 204 was evenly split over two injection points
**Injection point: x cm is height from ground

TABLE 2

Second field trial of *Xylella* infection treatment in olive trees using Dentamet ® injection

| NR | Amount* | Dilution | Injection point** | Diameter | Age | % canopy symptoms |
|---|---|---|---|---|---|---|
| 405.1 (South) | 37.5 ml | 1:4 | 1.2 m | 80 cm | 250 y | ~25% |
| 405.1 (North) | 37.5 ml | 1:4 | 1.2 m | | | |
| 405.2 (South) | 37.5 ml | 1:4 | 1.2 m | 70-80 cm | 250 y | ~40-50% |
| 405.2 (North) | 37.5 ml | 1:4 | 1.2 m | | | |
| 405.3 (South) | 37.5 ml | 1:4 | 1.2 m | 80 cm | 250 y | 75% |
| 405.3 (North) | 37.5 ml | 1:4 | 1.2 m | | | |
| 503 (North) | 25 ml | 1:4 | 1.2 m | 50 cm | 100 y+ | 50% |
| 504 (North) | 50 ml | 1:4 | 1.2 m | 70 cm | 150 y+ | ~60% |
| 505 (North) | 75 ml | 1:4 | 1.2 m | 70 cm | 150 y+ | ~75% |

*For tree 405.1 total injected: 75 ml, for tree 405.5 total injected 75 ml, tree 405.3 total injected 75 ml. Total injected volume per tree for tree 405.1, 405.2, 405.3 was evenly split over two injection points
**Injection point: x cm is height from ground Results After the treatment began, phenotypic observations were made. After 24 h post-treatment, uptake of the injection composition was complete in 12 out of 15 trees. After 1 week post-treatment, new green shoots were observed in several treated trees, which was faster than expected (3 to 7 days earlier compared to foliar spray method). This was observed to be a surprising result given that these trials took place in a non-vegetative phase. After 2 weeks post-treatment, new green shoots were observed in all 15 trees of both field trials. In the subsequent following weeks, the green shoots continued to grow and additional shoots were observed, all with no phytotoxicity or damages observed. FIGS. 79A-B and 80A-B show good recovery response from *Xylella* infection in post-treatment olive trees, with new shoot growth identified in circles.

Conclusions

This example demonstrated the use of the microinjection system of the present disclosure for injecting Dentamet® into olive trees of different ages and levels of disease symptoms for effective treatment of *Xylella* infection. Specifically, all 15 trees demonstrated phenotypic improvement, e.g., with new green shoots in places that previously were brown and without green tissue, with farmers reported up to 35% canopy recovery. The treatment was observed to work well on trees that showed high disease symptom rates, e.g., with little canopy (few leaves) left before treatment including trees with greater than 50%, 60% and 75% of canopy loss.

Additional advantageous effects of the present method and system further include: 1) faster recovery response compared to foliar spray method (e.g., new shoot growth observed after 1 week post-treatment with current method and system, as opposed to 10 to 14 days expected from foliar spray application); 2) improvement observed in heavily infected trees (with >50% of canopy without green tissue), even though these trees had been previously treated unsuccessfully by foliar sprays; 3) the present method and system uses smaller composition volumes compared to foliar spray application; 4) positive effect was observed even during a non-vegetative phase (as compared to an active vegetative phase).

Example 2

Metabolomics Analysis of Olive Trees Infected with *Xylella fastidiosa* Subsp. *Pauca*

This example is directed to monitoring the metabolomics profile of olive trees infected with *Xylella fastidiosa* subsp. *pauca* in olive trees after injection of a Dentamet® composition into the trunk of the infected trees.

The tree trunk injection system used in the this example included injection tools as generally depicted in FIGS. 20-22 and 74A-D connected to a spring-loaded fluid delivery system as depicted in FIG. 77. An exemplary set up of the system is shown in FIG. 78.

To investigate the effect of the injection system described herein on the metabolomics profile of olive trees infected with *Xylella*, a field trial was performed. Olive trees of greater than 100 years infected with *Xylella fastidiosa* subsp. *pauca* were injected with Dentamet® in July, as set forth in Table 3 below. Samples for metabolomics analysis were taken around two months after injection, in September. The olive trees in this field trial showed different infection levels and ages, as set forth in Table 3. Photographs of the infected trees injected according to the procedure in this example are provided in FIG. 81.

TABLE 3

Overview of the samples.

| Tree | Concentration Dentamet (v:v) Dentamet: Water | Vol (mL) | Age | Infection level | Variety |
|---|---|---|---|---|---|
| 405.1 | 1:4 | 75 | 250 y | 25% | Cellina (Xylella susceptible) |

TABLE 3-continued

Overview of the samples.

| Tree | Concentration Dentamet (v:v) Dentamet: Water | Vol (mL) | Age | Infection level | Variety |
|---|---|---|---|---|---|
| 405.2 | 1:4 | 75 | 250 y | 40-50% | Cellina (Xylella susceptible) |
| 405.3 | 1:4 | 75 | 250 y | 75% | Cellina (Xylella susceptible) |
| 504 | 1:4 | 50 | 150 y+ | 50% | Ogliarola (Xylella susceptible) |

The following two "metabolomic markers" in the olive trees were analyzed:

Mannitol: as a marker for photooxidative stress and has been previously found in higher concentrations in untreated Xylella infected olive trees; and Oleuropein: as a "marker" for a "healthy" olive tree. It is one of the main phenolic compounds in olive leaves. It is an antioxidant with bacteriostatic activity against *Xylella fastidiosa* and was more abundant in trees with foliar application of Dentamet compared to non-treated trees in previous experiments.

Figure 82A:
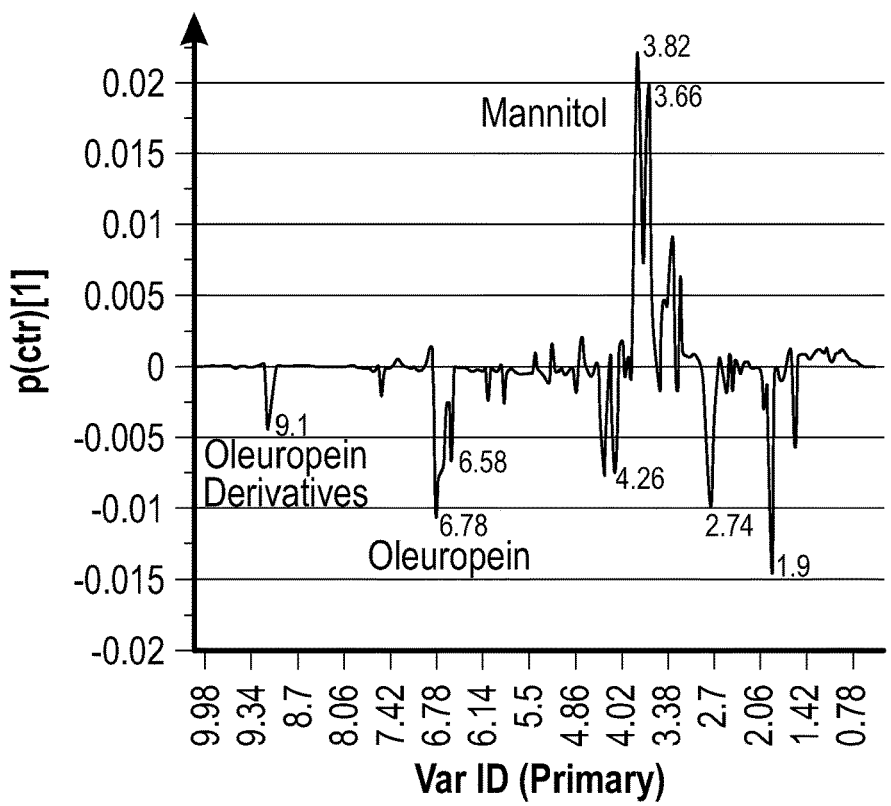
Figure 82B:
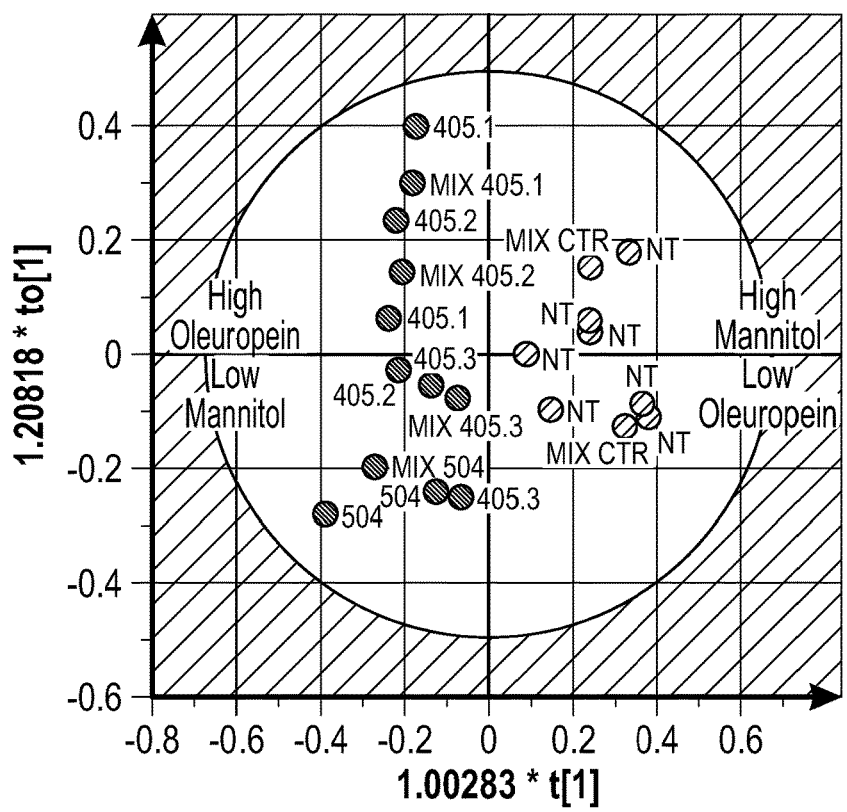

FIGS. 82A and 82B show two plots that illustrate the metabolomics profile of olive leaf material taken from the treated olive trees of this field trial.

In FIG. 82A, the S-line plot for the model allowed identification of variables which differ between groups. Variables situated far out combine high model influence with high reliability and relevant in the search for variables or biomarker that are up- or down regulated. Signals ascribable to mannitol were observed as discriminating for control (untreated) samples.

Moreover, signals corresponding to oleuropein and its derivatives, the main components in the olive leaves, showed a higher relative content in treated samples.

In FIG. 82B, the supervised OPLS-DA plot showed a clear separation of untreated (light gray) samples vs. Dentamet treated (dark gray) samples based on the mannitol respective oleuropein concentration differentials 1+1+0 give $R^2X=0.642$; $R^2Y=0.866$; $Q^2=0.786$ The supervised OPLS-DA model refine the separation between control and treated samples. The two classes could be observed as two groups, separated along the predictive t[1] component. The control group (light gray symbols) appear as a compact group, whereas treated samples (dark gray symbols) are distributed along the orthogonal t0[1] component, according to the severity index.

Figure 83:
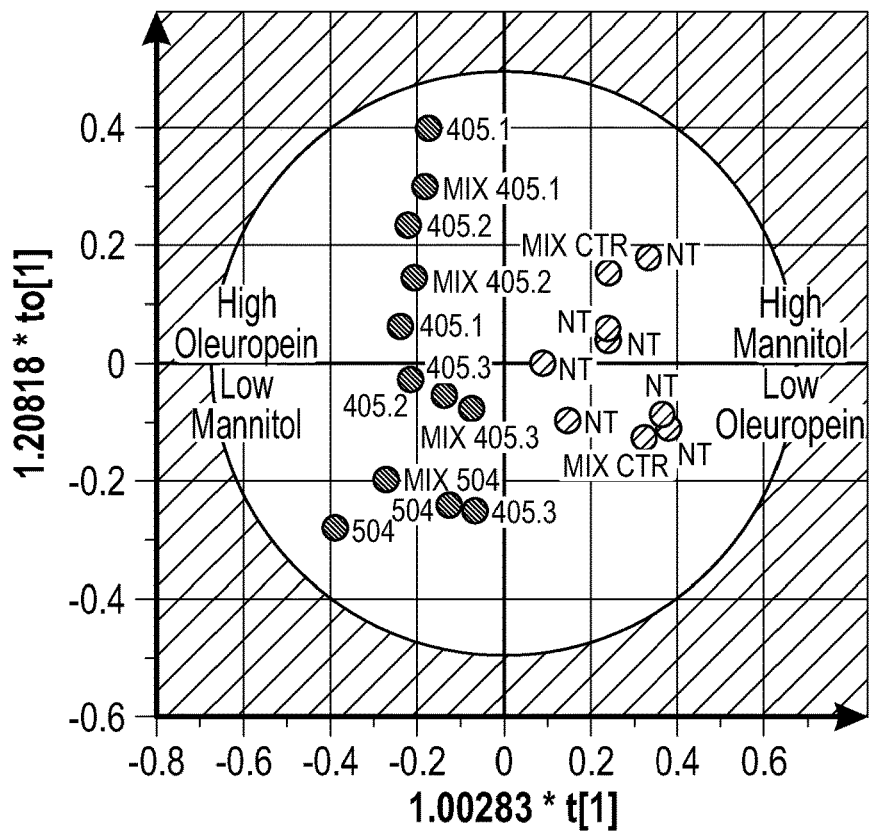

In FIG. 83, the OPLS-DA model shows a different metabolic profile between injected trees (dark gray dots) and non-injected trees (light gray dots) in Veglie. Injected trees (dark gray) were characterized by high concentrations of oleuropein and derivatives; non-injected controls (light gray) by high concentrations of mannitol.

Figure 84:
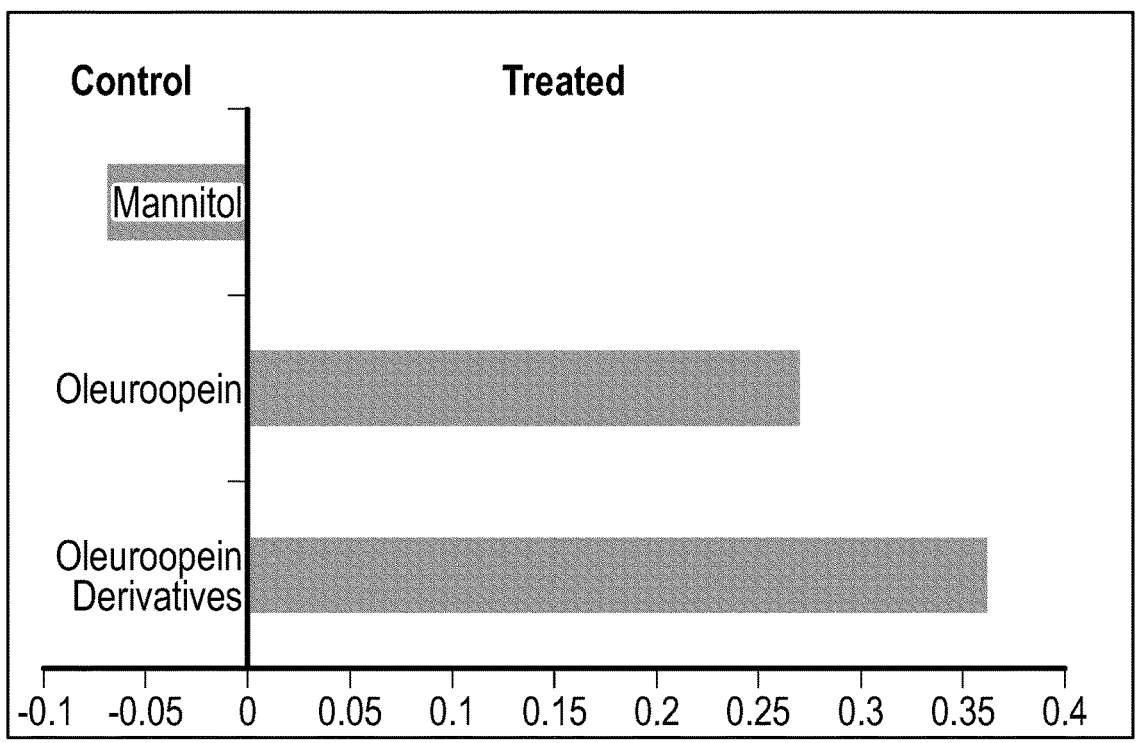

In FIG. 84, the differential metabolite content among the control and treated samples was determined by calculating the Loge fold change (FC) ratio of the normalized median intensity of the corresponding signals in the spectra of the two groups. In particular, a 0.35 and 0.25 fold increase of oleuropein and its derivatives, respectively, were observed for Dentamet treated samples via injection using the systems described herein.

Figure 85:
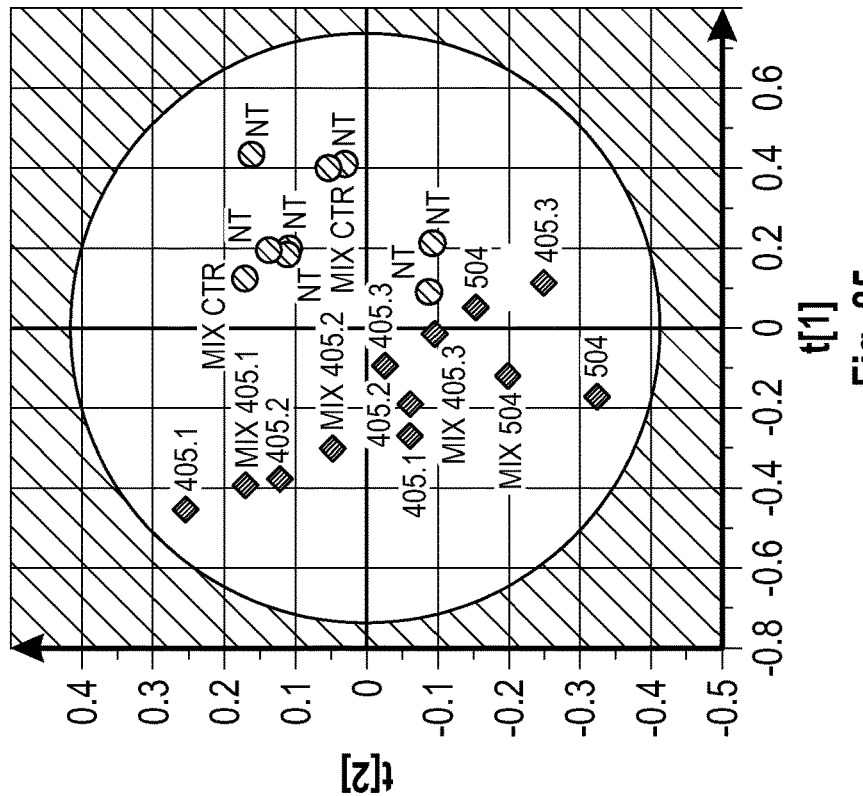
Figure 87A:
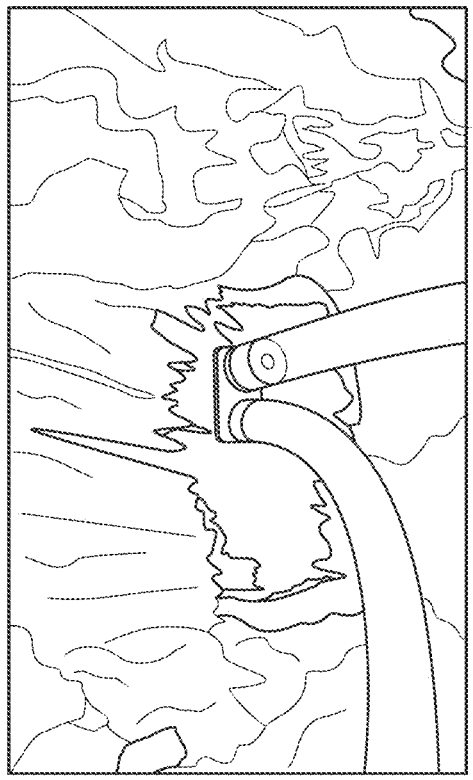
Figure 87B:
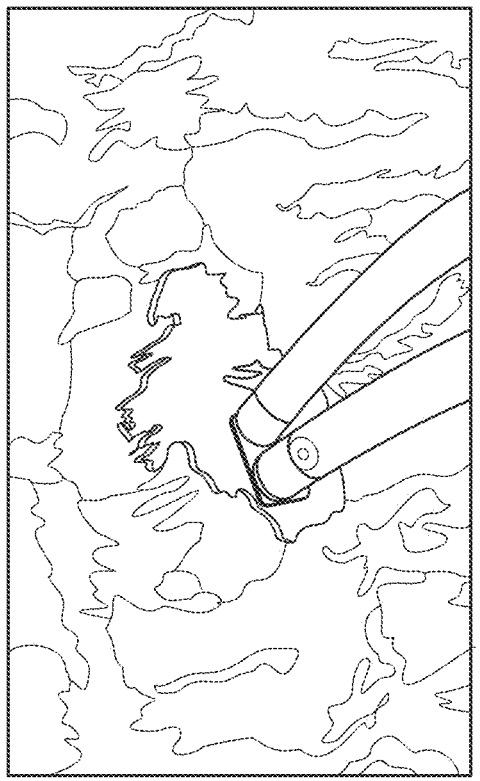
Figure 87C:
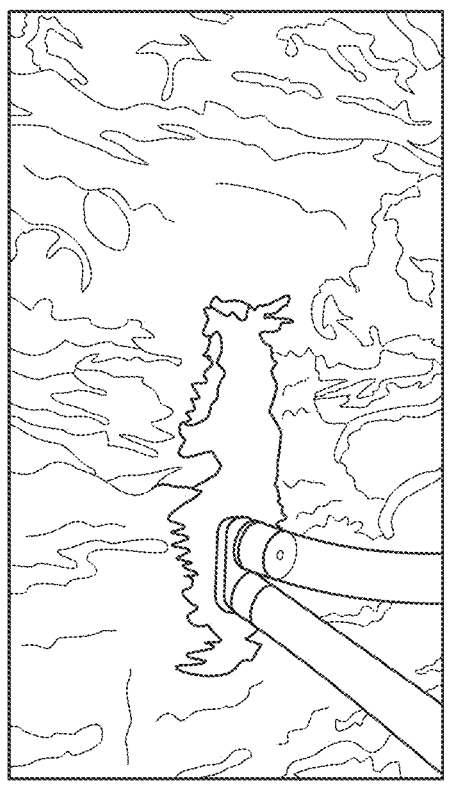
Figure 88C:
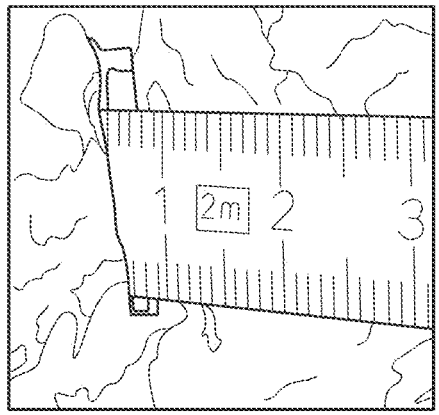
Figure 88B:
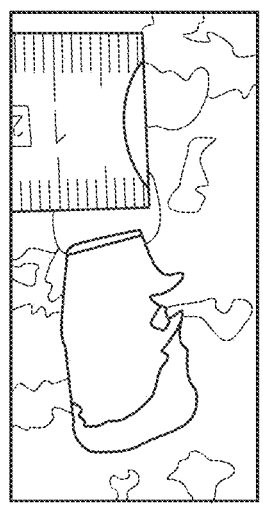
Figure 88A:
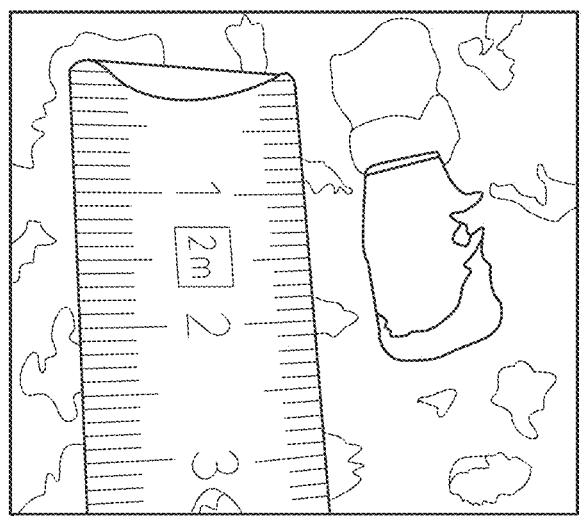

FIG. 85 shows an unsupervised PCA plot showing separation between control and treated samples. Injected trees are represented by dark gray diamonds; non-injected trees are represented by light gray dots. The four components give $R^2X=0.848$; $Q^2=0.639$.

Figure 86:
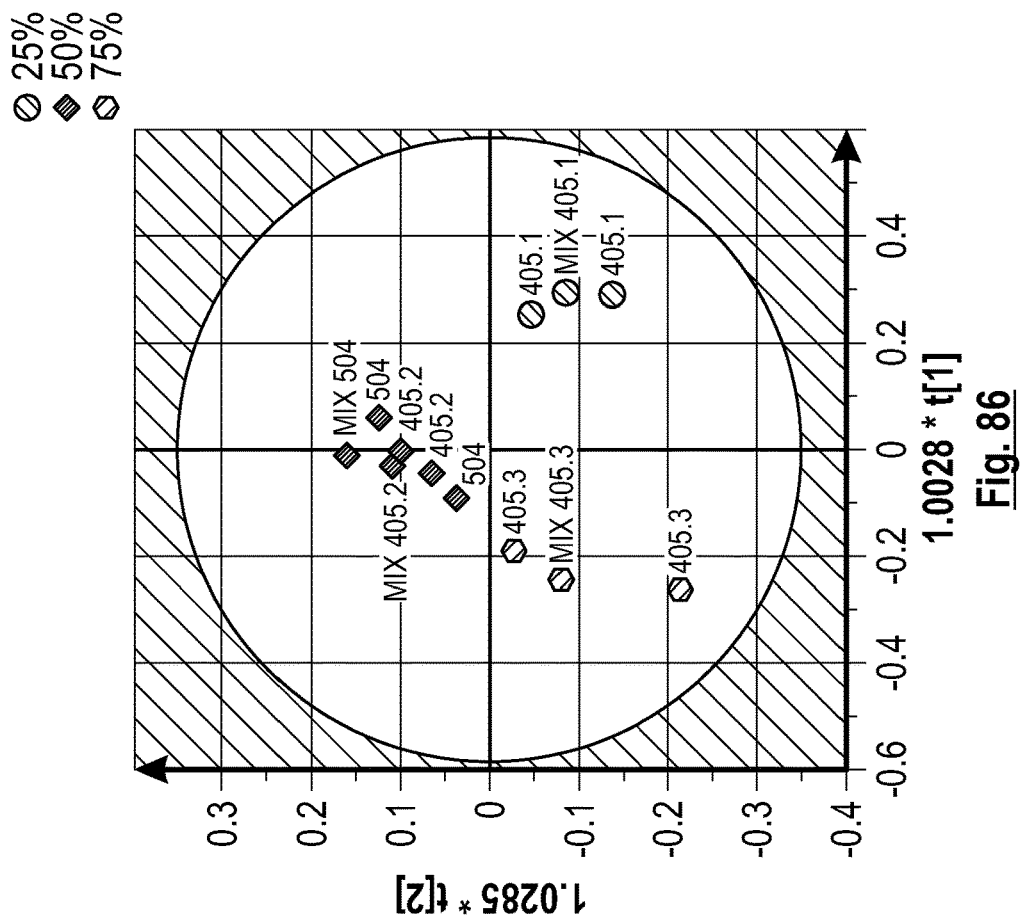

FIG. 86 provides a comparison of metabolomic profile between different groups of treated trees with low (circles), medium (diamonds) or high (hexagons) level of infection, expressed as percent canopy loss. Tree 405.3 (Cellina Cultivar), visually assessed as high severity (75% of canopy loss—hexagon), contained higher amounts of mannitol and lower amounts of oleuropein than trees 405.2 (Cellina cultivar) and 504 (Oliarola cultivar) (visually assessed as medium severity (50% of canopy loss—diamond). Tree 405.1 (Cellina cultivar), visually assessed as low severity (25% of canopy loss—dot), contained higher amounts of oleuropein and lower amounts of mannitol than trees 405.2 and 504.

Conclusions

Surprisingly, after only 1 injection of Dentamet in a sub-optimal period of the season (July, very dry and usually no vegetative growth), the metabolomic profile of the *Xylella* infected treated trees showed a lower amount of mannitol and a higher level oleuropein and its derivatives compared to untreated control trees (FIGS. 83 and 84). This indicated that the infected trees have clearly reacted positively to a single injection of Dentamet and clearly shifted towards a healthier metabolomic profile. Three foliar applications of Dentamet resulted in shifts that were less distinct compared to the single injection. Surprisingly, this includes the heavily infected trees with 50% and more of the canopy dried without leaves (samples 405.2, 405.3, 504).

This positive shift towards a healthier metabolomic profile after injection used the systems described herein seems "faster" and "more distinct" compared to foliar sprays (FIG. 85).

The comparison of metabolomic profile of the different treated trees seemed to indicate that the levels of mannitol and oleuropein are good indicators/markers of the level of infection (FIG. 86) and confirmed that the impact of the cultivar on the metabolomic profile is mainly on healthy olive trees.

In conclusion, the metabolomic analysis in this example of heavily *Xylella* infected olive trees (greater than 100 years, susceptible cultivars) injected with Dentamet® showed a surprisingly fast shift towards a healthier metabolomic profile with a single Dentamet injection/treatment. The metabolomic shift was more distinct and faster compared to foliar application of Dentamet. The shift also occurred in heavily infected trees with a low amount of remaining green leaves, further demonstrating that injection using the systems described herein directly into the xylem is highly effective and fast acting treatment against *Xylella* also under high infection pressure. Highly infected trees with low amount of remaining green canopy are in general less responsive to foliar application using Dentamet.

Example 3

Multi-Use of the Injection System

This example is directed towards evaluating repeated uses of the injection systems described herein on olive trees infected with *Xylella fastidiosa* subsp. *pauca* in olive trees, after an initial injection into the trunk of the infected trees.

To investigate the utility of the injection systems described herein for repeated injections into infected olive trees, a field trial was performed. 15 olive trees infected with *Xylella fastidiosa* subsp. *pauca* were selected for this field trial.

The tree trunk injection system used in this example included injection tools as generally depicted FIGS. 20-22 and 74A-D connected to a spring-loaded fluid delivery system as depicted in FIG. 77. An exemplary set up of the system is shown in FIG. 78.

The injection systems were installed in the selected olive trees, either directly through the bark or after removing a small portion of bark, as depicted in FIGS. 87A-C and 88A-C. Dentamet® with a dilution ratio of 1:4 (1 part Dentamet®, 4 parts water) was first injected into the selected olive trees in July. After 2 months, in September, the same tip without any additional handling was used successfully to inject the olive trees for a second time in those trees where the initial injection tip was installed (July) after removing the bark. In those trees in which the bark was not removed in July, the tip had to be re-installed. After fourth months, in November, the same tip was used to inject the trees a third time successfully.

No phytotoxicity or other negative impacts on the tree were observed as a result of multiple injections.

Conclusions

The injection systems described herein were observed to be minimally invasive, avoiding damaging the trees and vines. In addition, compared to traditional "drill a hole trunk injection" systems, the injection systems provided herein afforded precision injection that avoided the need for repeated tree wounding, which can lead to severe tree damage, even shortening the life of a tree. For example, injection wounds can expose the trunk to insect pests and decay fungi. A healthy tree will typically seal or compartmentalize these wounds, but the wounds remain as dead tissue. Repeated drilling eventually creates numerous wounds that negatively impact trees since previously used holes cannot be re-drilled and injected into. The drilling may also break through internal barriers within the tree trunk to wall off decay. Decay may then spread within the tree or from the inside out through injection wounds.

Trees weakened by pathogens have a higher risk of severe damage, reduced (speed of) recovery and potentially tree death. This is additionally worsened when multiple injections are required, accumulating the number of holes required. Thus, the injection systems provided herein are suitable to treat olive trees heavily infected by *Xylella* and other trees/vines with advanced disease symptoms.

Furthermore, the extended durability or re-usability of the injection systems facilitates easier and faster use. Only 10-20 seconds (the time required to exchange the canister containing the injectable material) are needed to re-inject a tree, compared to 10 to 15 minutes with more traditional systems based on single-use drilling, where a re-injection is not possible.

Example 4

Phenotypic Analysis of Olive Trees Infected with *Xylella fastidiosa* Subsp. *Pauca*

This example is directed towards evaluating phenotypic changes in olive trees infected with *Xylella fastidiosa* subsp. *pauca* after injection of a Dentamet® composition into the trunk of the infected trees.

To investigate the effect of the injection systems described herein on the phenotype of olive trees infected with *Xylella fastidiosa* subsp. *pauca*, a field trial was performed. 15 infected olive trees were injected with Dentamet® with a dilution ratio of 1:4 (1 part Dentamet®, 4 parts water) in the first week of July. These 15 trees and an additional 15 infected olive trees were injected in the first week of September.

Observations

Figure 89C:
Figure 89B:
Figure 89A:

Based on farmer reports and visual phenotypical analysis, most trees demonstrated phenotypic improvement. Specifically, new green shoots were observed in places that previously were brown and without green tissue. For a particular heavily infected tree (e.g., 75% canopy dried out), the farmer reported up to 35% canopy recovery. The photographs of a selected tree (tree 304) is depicted in FIGS. 89A-C.

Figure 90B:
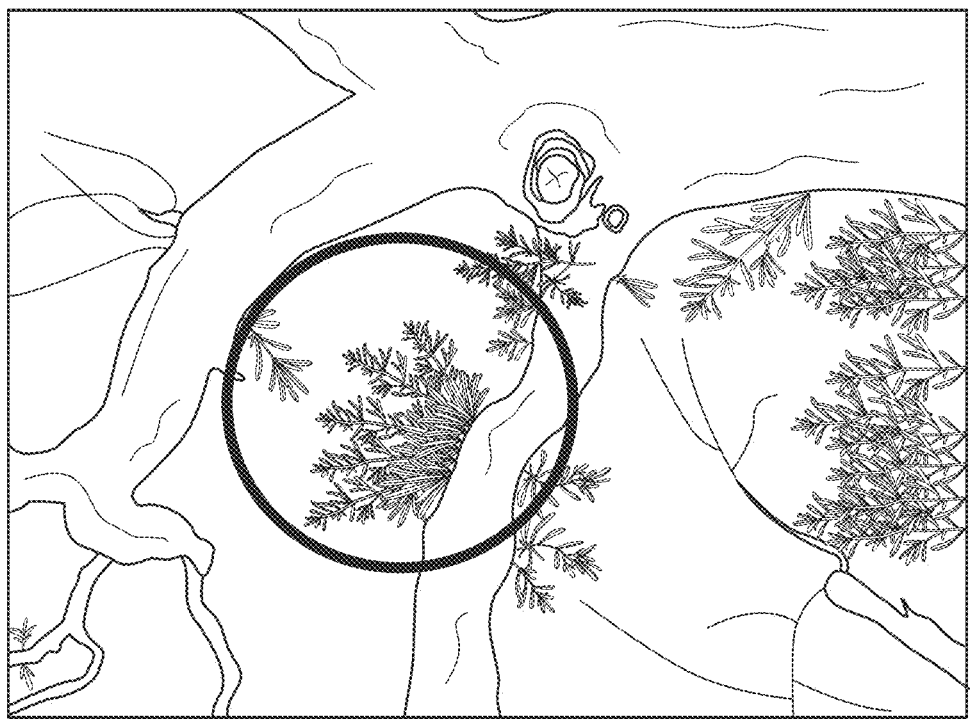
Figure 90A:
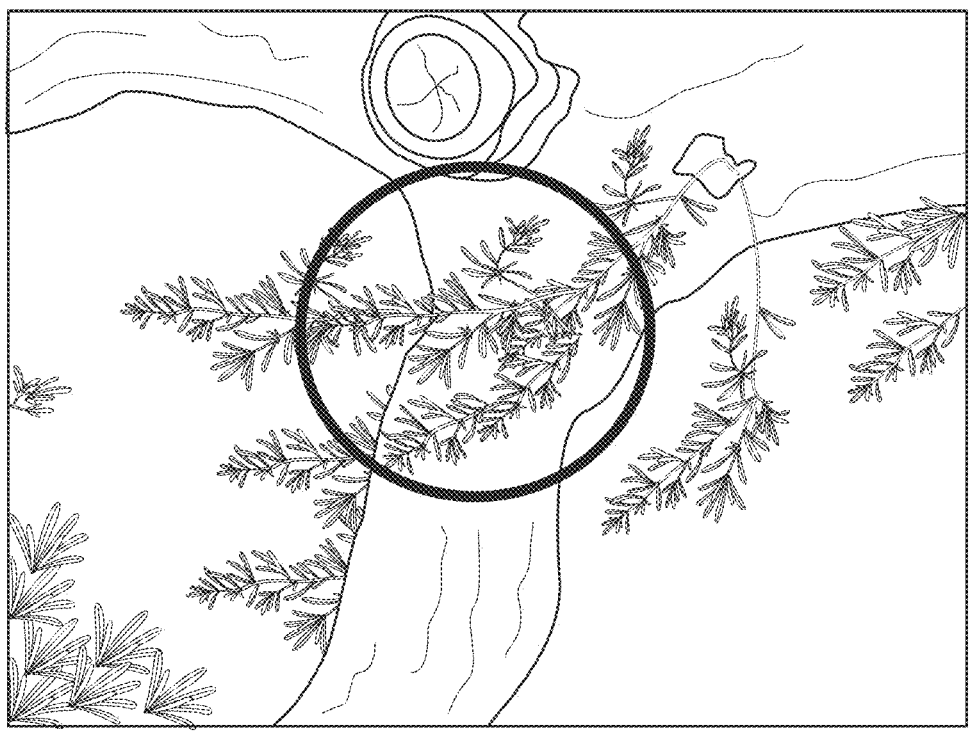
Figure 91A:
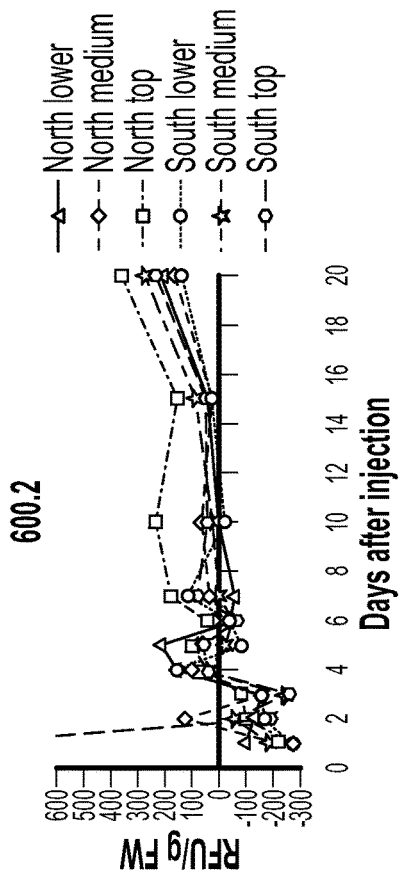
Figure 91B:
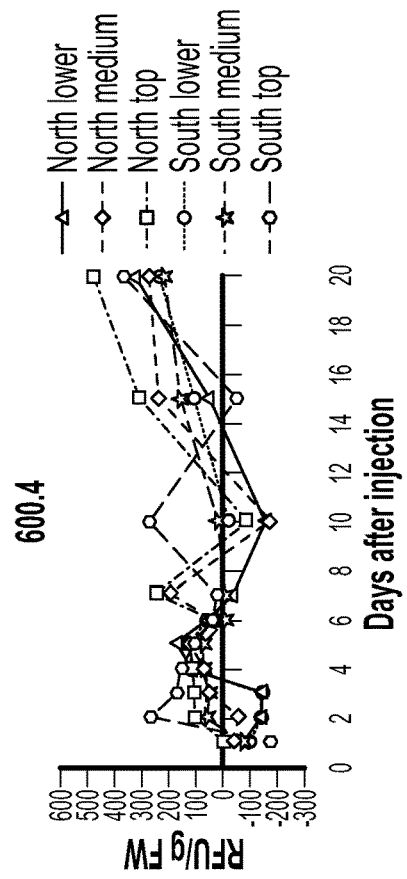
Figure 91C:
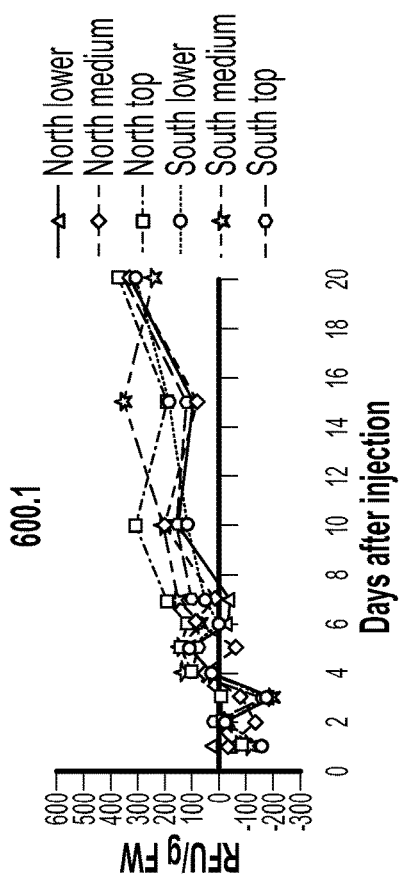
Figure 91D:
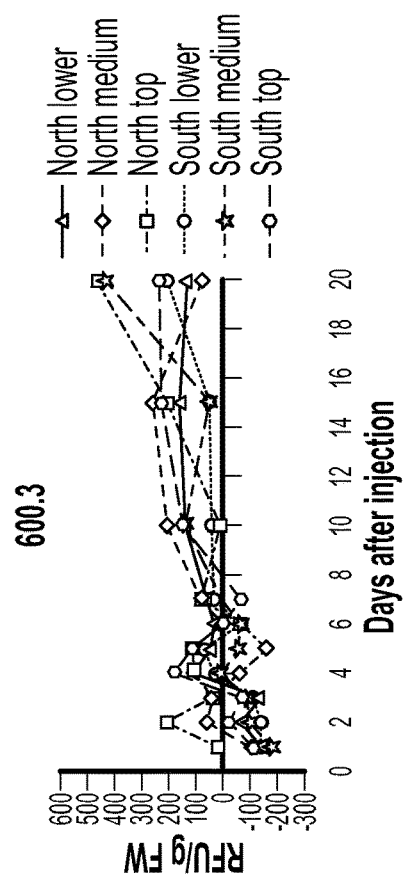
Figure 92A:
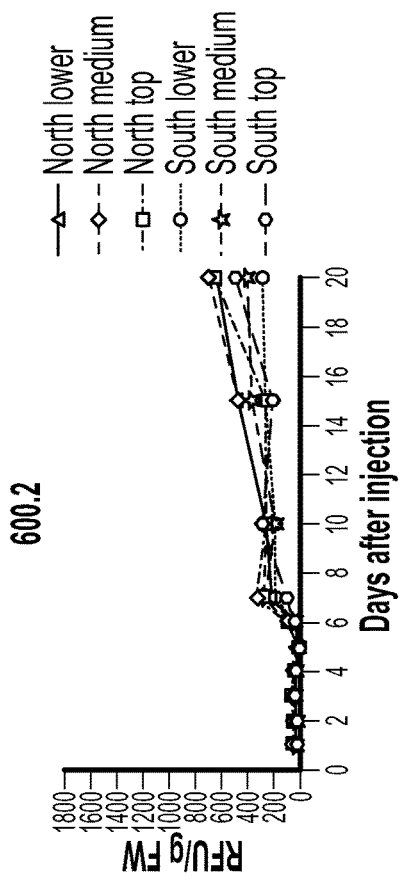
Figure 92B:
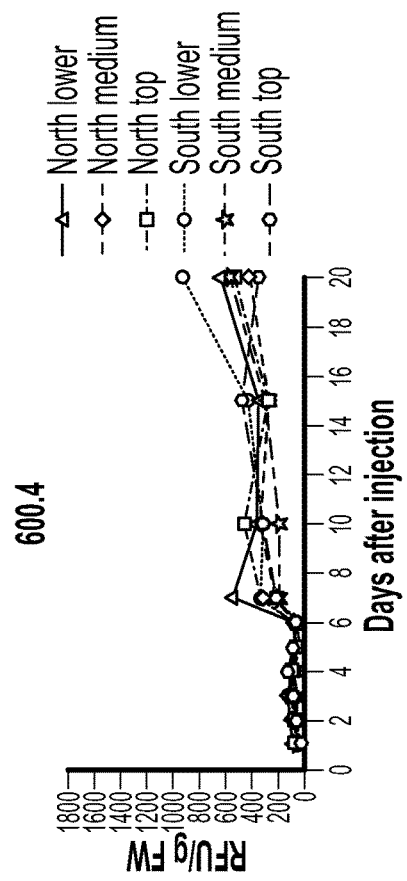
Figure 92C:
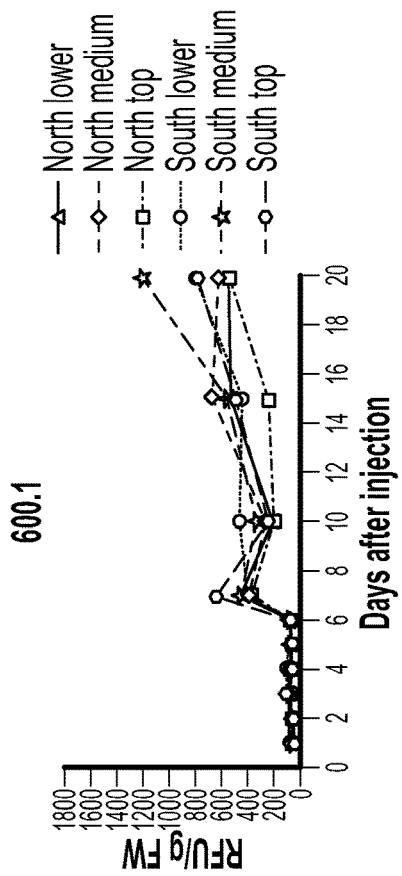
Figure 92D:
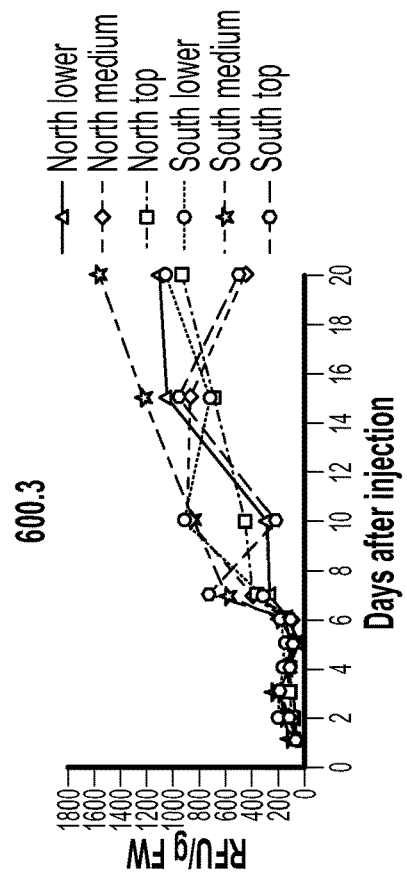
Figure 93A:
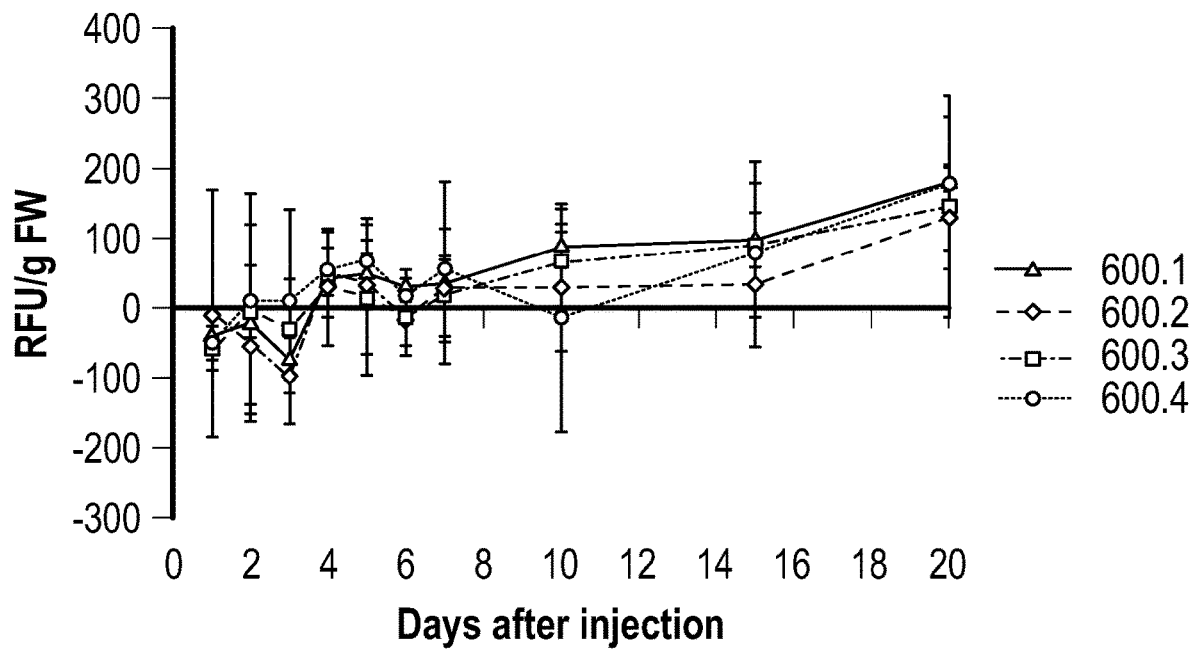
Figure 93B:
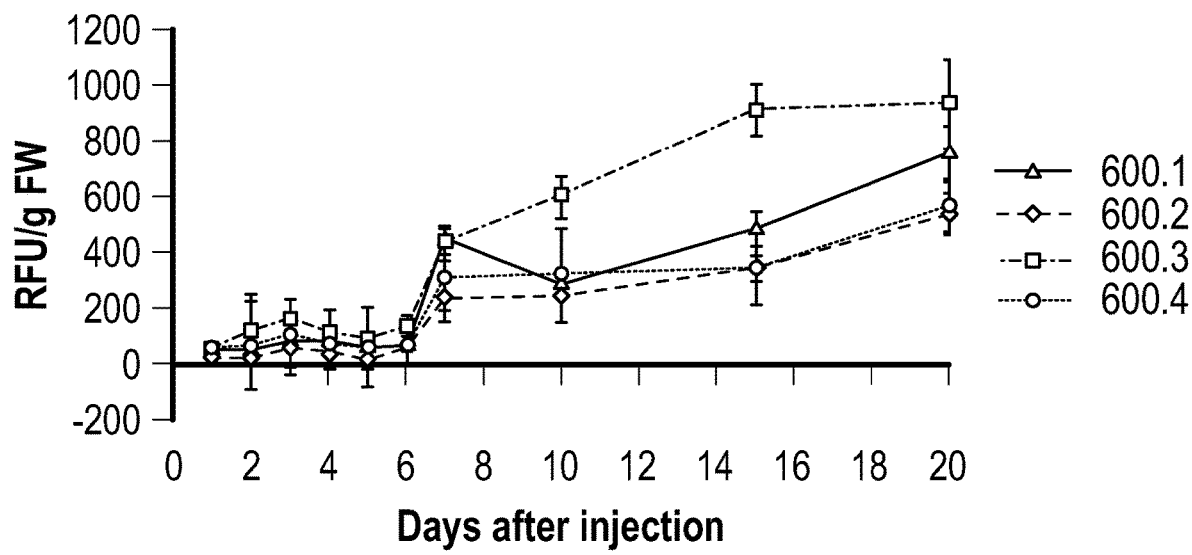

Faster re-shooting was observed compared to foliar (after 1 week, while best expectation was 10 to 14 days). See FIGS. 90A-B. Clear improvements were observed in heavily infected trees with greater than 50% of canopy loss, while these trees had been treated unsuccessfully before through foliar sprays. Smaller product volumes for tree recovery were observed as compared to foliar. Positive effect was observed during a sub-optimal stage in the season (i.e. summer July-August and September after a period of several months of drought and outside of vegetative growth phase).

Example 5

Fluorescein Analysis in Olive Trees Infected with *Xylella fastidiosa* Subsp. *Pauca*

This example is directed towards evaluating the distribution from injection using the injection systems described herein in olive trees. Specifically, olive trees set forth in Table 4 below infected with *Xylella fastidiosa* subsp. *pauca* were injected with fluorescein.

TABLE 4

| Tree | Age | Infection Level |
| --- | --- | --- |
| 600.1 | 30 years old | Low |
| 600.2 | 30 years old | High |
| 600.3 | 100 years old | Low |
| 600.4 | 100 years old | High |

Fluorescein (50 mL, 1% w/v fluorescein disodium salt) was injected through a single injection point on the south side of each tree in September.

Samples of leaves and fruits were collected from six different sectors (North or South; Low, Medium, or High) over the course of 20 days, and fluorescence intensity of the samples was measured as shown in FIGS. 91A-D, 92A-D, and 93A-B.

Fluorescein distributed evenly throughout the tree horizontally and vertically to all the sectors measured, including the north side of each tree, opposite the injection point. Moreover, distribution of fluorescein was similar in both older (e.g., 100 years old) and younger trees (e.g., 30 years old). Distribution of fluorescein was higher in olive fruits than leaves, possibly due to the late summer/early autumn timing of the experiment, wherein the trees are in reproductive (fruit development stage) stage. Fluorescein distribution was greater in trees with lower infection levels compared to trees with high infection levels, possibly due to "clogs" that can form in the xylem due to *Xylella* infection, which reduce the speed and volume of sap flow.

Surprisingly, distribution of fluorescein was observed at the end of the season (e.g., late summer), after several months of severe drought conditions. Such results demonstrated surprisingly good functionality of the injection systems herein late in the season.

Various Notes and Aspects

Aspect 1 can include subject matter such as A plant injection system comprising: an injection tool configured to penetrate a plant and distribute a liquid formulation to the plant, the injection tool includes: a base having an inlet port; a penetrating distribution body extending along a longitudinal body axis and having a body profile, the penetrating distribution body includes: a penetrating element; at least one distribution reservoir within the body profile; and one or more distribution ports in communication with the inlet port and the at least one distribution reservoir, the one or more distribution ports are spaced from the penetrating element; and wherein the injection tool includes penetrating and distribution configurations: in the penetrating configuration the penetrating element is configured to penetrate the plant along the longitudinal body axis; and in the distribution configuration the one or more distribution ports are configured to distribute the liquid formulation transversely relative to the longitudinal body axis within the at least one distribution reservoir proximate to the plant.

Aspect 2 can include, or can optionally be combined with the subject matter of Aspect 1, to optionally include wherein the one or more distribution ports are laterally spaced from the longitudinal body axis.

Aspect 3 can include, or can optionally be combined with the subject matter of one or any combination of Aspects 1 or 2 to optionally include wherein the penetration element includes a penetration profile, and the one or more distribution ports are within the penetration profile and proximal relative to the penetration profile.

Aspect 4 can include, or can optionally be combined with the subject matter of one or any combination of Aspects 1-3 to optionally include wherein the one or more distribution ports are recessed within the penetration profile.

Aspect 5 can include, or can optionally be combined with the subject matter of one or any combination of Aspects 1-4 to optionally include wherein in the penetrating configuration the penetrating element interrupts engagement of the one or more distribution ports with the plant.

Aspect 6 can include, or can optionally be combined with the subject matter of Aspects 1-5 to optionally include wherein the one or more distribution ports are recessed from an exterior of the body profile.

Aspect 7 can include, or can optionally be combined with the subject matter of Aspects 1-6 to optionally include wherein in the distribution configuration the one or more distribution ports are configured to distribute the liquid formulation toward the exterior of the body profile.

Aspect 8 can include, or can optionally be combined with the subject matter of Aspects 1-7 to optionally include wherein in the distribution configuration the one or more distribution ports are configured to distribute the liquid formulation remotely relative to the penetrating element.

Aspect 9 can include, or can optionally be combined with the subject matter of Aspects 1-8 to optionally include wherein in the distribution configuration the one or more distribution ports are configured to distribute the liquid formulation at a proximal location along the penetrating distribution body relative to the penetrating element.

Aspect 10 can include, or can optionally be combined with the subject matter of Aspects 1-9 to optionally include wherein in the distribution configuration the penetrating distribution body having the at least one distribution reservoir is configured to retain the liquid formulation along a plant tissue of the plant.

Aspect 11 can include, or can optionally be combined with the subject matter of Aspects 1-10 to optionally include a retained configuration wherein the penetrating distribution body is retained in an ongoing state in the plant with an anchor element.

Aspect 12 can include, or can optionally be combined with the subject matter of Aspects 1-11 to optionally include wherein in the distribution configuration the one or more distribution ports are configured to distribute the liquid formulation to the plant in an ongoing state.

Aspect 13 can include, or can optionally be combined with the subject matter of Aspects 1-12 to optionally include wherein the ongoing state includes a plurality of distributions of the liquid formulation from the one or more distribution ports over one or more hours.

Aspect 14 can include, or can optionally be combined with the subject matter of Aspects 1-13 to optionally include wherein the plurality of distributions includes a continuous distribution of the liquid formulation.

Aspect 15 can include, or can optionally be combined with the subject matter of Aspects 1-14 to optionally include wherein the penetrating element includes one or more of a cutting element, a wedge profile or a spike profile.

Aspect 16 can include, or can optionally be combined with the subject matter of Aspects 1-15 to optionally include a method for distribution of a liquid formulation to a plant, the method comprising: penetrating a plant with an injection tool having a penetrating distribution body extending along a longitudinal body axis, penetrating includes: piercing the plant with a penetrating element of the penetrating distribution body; isolating one or more distribution ports from the plant with the penetrating distribution body; and distributing the liquid formulation to the penetrated plant, distributing the liquid formulation includes: transmitting the liquid formulation from an inlet port of the injection tool to the one or more distribution ports; delivering the liquid formulation from the one or more distribution ports to at least one distribution reservoir in communication with the penetrated plant, the at least one distribution reservoir within a body profile of the penetrating distribution body.

Aspect 17 can include, or can optionally be combined with the subject matter of Aspects 1-16 to optionally include wherein isolating the one or more distribution ports from the plant includes isolating the one or more distribution ports from the plant with a penetration profile of the penetration element.

Aspect 18 can include, or can optionally be combined with the subject matter of Aspects 1-17 to optionally include wherein the one or more distribution ports are within the body profile of the penetrating distribution body; and isolating the one or more distribution ports from the plant includes isolating the one or more distribution ports with the body profile.

Aspect 19 can include, or can optionally be combined with the subject matter of Aspects 1-18 to optionally include wherein the one or more distribution ports are within a body profile of the penetrating distribution body; and penetrating the plant with the injection tool includes interrupting the engagement of the one or more distribution ports with the plant.

Aspect 20 can include, or can optionally be combined with the subject matter of Aspects 1-19 to optionally include wherein the penetrating element includes a cutting element; and piercing the plant with the penetrating element includes cutting the plant with the cutting element.

Aspect 21 can include, or can optionally be combined with the subject matter of Aspects 1-20 to optionally include wherein the penetrating element includes a wedge profile; and piercing the plant with the penetrating element includes cutting the plant with the wedge profile.

Aspect 22 can include, or can optionally be combined with the subject matter of Aspects 1-21 to optionally include wherein the penetrating distribution body includes a body profile, and the one or more distribution ports are recessed from the body profile; and delivering the liquid formulation from the one or more distribution ports includes transversely delivering the liquid formulation relative to a longitudinal body axis of the penetrating distribution body.

Aspect 23 can include, or can optionally be combined with the subject matter of Aspects 1-22 to optionally include retaining the liquid formulation along a plant tissue of the plant.

Aspect 24 can include, or can optionally be combined with the subject matter of Aspects 1-23 to optionally include wherein the one or more distribution ports are remote from the penetrating element; and delivering the liquid formulation from the one or more distribution ports includes delivering the liquid formulation remotely relative to the penetration element.

Aspect 25 can include, or can optionally be combined with the subject matter of Aspects 1-24 to optionally include wherein delivering the liquid formulation remotely includes delivery the liquid formulation at a proximal location along the penetrating distribution body relative to the penetrating element.

Aspect 26 can include, or can optionally be combined with the subject matter of Aspects 1-25 to optionally include retaining the penetrating distribution body in the plant with an anchor element.

Aspect 27 can include, or can optionally be combined with the subject matter of Aspects 1-26 to optionally include wherein delivering the liquid formulation from the one or more distribution ports includes ongoing delivery of the liquid formulation.

Aspect 28 can include, or can optionally be combined with the subject matter of Aspects 1-27 to optionally include wherein ongoing delivery of the liquid formulation includes ongoing delivery of the liquid formulation over one or more hours.

Aspect 29 can include, or can optionally be combined with the subject matter of Aspects 1-28 to optionally include wherein ongoing delivery of the liquid formulation includes a plurality of distributions.

Aspect 30 can include, or can optionally be combined with the subject matter of Aspects 1-29 to optionally include wherein delivering the liquid formulation includes passive delivering of the liquid formulation.

Aspect 31 can include, or can optionally be combined with the subject matter of Aspects 1-30 to optionally include wherein passive delivering of the liquid formulation includes delivering of the liquid formulation based on a hydrostatic pressure of the liquid formulation.

Aspect 32 can include, or can optionally be combined with the subject matter of Aspects 1-31 to optionally include a plant injection system comprising: an injection tool configured to penetrate a plant and distribute a liquid formulation to the plant, the injection tool includes: a base having an inlet port; a penetrating distribution body extending along a longitudinal body axis, the penetrating distribution body includes: a penetrating element; and one or more distribution ports in communication with the inlet port, the one or more distribution ports are spaced from the penetrating element; and wherein the injection tool includes penetrating and distribution configurations: in the penetrating configuration the penetrating element is configured to penetrate the plant along the longitudinal body axis; and in the distribution configuration the one or more distribution ports are configured to distribute the liquid formulation to the plant transversely relative to the longitudinal body axis.

Aspect 33 can include, or can optionally be combined with the subject matter of Aspects 1-32 to optionally include wherein the one or more distribution ports are laterally spaced from the longitudinal body axis.

Aspect 34 can include, or can optionally be combined with the subject matter of Aspects 1-33 to optionally include wherein the penetration element includes a penetration profile, and the one or more distribution ports are within the penetration profile and proximal relative to the penetration profile.

Aspect 35 can include, or can optionally be combined with the subject matter of Aspects 1-34 to optionally include wherein the one or more distribution ports are recessed within the penetration profile.

Aspect 36 can include, or can optionally be combined with the subject matter of Aspects 1-35 to optionally include wherein in the penetrating configuration the penetrating element interrupts engagement of the one or more distribution ports with the plant.

Aspect 37 can include, or can optionally be combined with the subject matter of Aspects 1-36 to optionally include wherein the penetrating distribution body includes a body profile, and the one or more distribution ports are recessed from an exterior of the body profile.

Aspect 38 can include, or can optionally be combined with the subject matter of Aspects 1-37 to optionally include wherein in the distribution configuration the one or more distribution ports are configured to distribute the liquid formulation toward the exterior of the body profile.

Aspect 39 can include, or can optionally be combined with the subject matter of Aspects 1-38 to optionally include wherein in the distribution configuration the one or more distribution ports are configured to distribute the liquid formulation remotely relative to the penetrating element.

Aspect 40 can include, or can optionally be combined with the subject matter of Aspects 1-39 to optionally include wherein in the distribution configuration the one or more distribution ports are configured to distribute the liquid formulation at a proximal location along the penetrating distribution body relative to the penetrating element.

Aspect 41 can include, or can optionally be combined with the subject matter of Aspects 1-40 to optionally include wherein the penetrating distribution includes a body profile and at least one distribution reservoir within the body profile; and in the distribution configuration the one or more distribution ports are configured to distribute the liquid formulation into the least one distribution reservoir.

Aspect 42 can include, or can optionally be combined with the subject matter of Aspects 1-41 to optionally include wherein in the distribution configuration the penetrating distribution body having the at least one distribution reservoir is configured to retain the liquid formulation along a plant tissue of the plant.

Aspect 43 can include, or can optionally be combined with the subject matter of Aspects 1-42 to optionally include a retained configuration wherein the penetrating distribution body is retained in an ongoing state in the plant with an anchor element.

Aspect 44 can include, or can optionally be combined with the subject matter of Aspects 1-43 to optionally include wherein in the distribution configuration the one or more distribution ports are configured to distribute the liquid formulation to the plant in an ongoing state.

Aspect 45 can include, or can optionally be combined with the subject matter of Aspects 1-44 to optionally include wherein the ongoing state includes a plurality of distributions of the liquid formulation from the one or more distribution ports over one or more hours.

Aspect 46 can include, or can optionally be combined with the subject matter of Aspects 1-45 to optionally include wherein the plurality of distributions includes a continuous distribution of the liquid formulation.

Aspect 47 can include, or can optionally be combined with the subject matter of Aspects 1-46 to optionally include wherein the penetrating element includes one or more of a cutting element, a wedge profile or a spike profile.

Aspect 48 can include, or can optionally be combined with the subject matter of Aspects 1-47 to optionally include a plant injection system comprising: an injection tool configured to penetrate a plant and distribute a liquid formulation to the plant, the injection tool includes: a base having an inlet port configured to receive the liquid formulation; a penetrating distribution body extending from the base along a longitudinal body axis, the penetrating distribution body having a body profile, the penetrating distribution body includes: a penetrating element proximate a distal portion of the penetrating distribution body; a distribution element along the penetrating distribution body, the distribution element includes one or more distribution ports; and wherein the one or more distribution ports open laterally along the penetrating distribution body relative to the longitudinal body axis.

Aspect 49 can include, or can optionally be combined with the subject matter of Aspects 1-48 to optionally include wherein the body profile includes a shaft profile having one or more cutting elements along the penetrating element.

Aspect 50 can include, or can optionally be combined with the subject matter of Aspects 1-49 to optionally include wherein the body profile includes a wedge profile tapering toward the distal portion.

Aspect 51 can include, or can optionally be combined with the subject matter of Aspects 1-50 to optionally include wherein the penetrating distribution body includes an anchor element configured to retain the injection tool within a penetrated plant.

Aspect 52 can include, or can optionally be combined with the subject matter of Aspects 1-51 to optionally include wherein the anchor element includes one or more of threading, flutes, cleats, or a wedge profile.

Aspect 53 can include, or can optionally be combined with the subject matter of Aspects 1-52 to optionally include wherein the penetrating distribution body includes an inlet passage extending from the inlet port to the one or more distribution ports.

Aspect 54 can include, or can optionally be combined with the subject matter of Aspects 1-53 to optionally include wherein the one or more distribution ports are recessed from an exterior of the body profile.

Aspect 55 can include, or can optionally be combined with the subject matter of Aspects 1-54 to optionally include wherein the one or more distribution ports include a plurality of distribution ports.

Aspect 56 can include, or can optionally be combined with the subject matter of Aspects 1-55 to optionally include wherein the one or more distribution ports extend away from the longitudinal body axis.

Aspect 57 can include, or can optionally be combined with the subject matter of Aspects 1-56 to optionally include wherein the one or more distribution ports extend toward the base and extend away from the distal portion of the penetrating distribution body.

Aspect 58 can include, or can optionally be combined with the subject matter of Aspects 1-57 to optionally include wherein the injection tool includes a distribution configuration having the one or more distribution ports configured to distribute the liquid formulation to the plant transversely relative to the longitudinal body axis.

Aspect 59 can include, or can optionally be combined with the subject matter of Aspects 1-58 to optionally include wherein the body profile includes at least one distribution reservoir, and the one or more distribution ports open into the at least one distribution reservoir.

Aspect 60 can include, or can optionally be combined with the subject matter of Aspects 1-59 to optionally include wherein the at least one distribution reservoir is spaced from a leading edge of the penetrating element.

Aspect 61 can include, or can optionally be combined with the subject matter of Aspects 1-60 to optionally include wherein the at least one distribution reservoir is recessed from an exterior of the body profile.

Aspect 62 can include, or can optionally be combined with the subject matter of Aspects 1-61 to optionally include a delivery device in communication with the injection tool, the delivery device includes: a container configured to store the liquid formulation; and an attachment interface in communication with the container, the attachment interface is configured for coupling with the inlet port of the injection tool.

Aspect 63 can include, or can optionally be combined with the subject matter of Aspects 1-62 to optionally include wherein the delivery device includes a dosing device interposed between the container and the attachment interface, the dosing device is configured to deliver a specified quantity of the liquid formulation to the injection tool for lateral distribution from the one or more distribution ports.

Aspect 64 can include, or can optionally be combined with the subject matter of Aspects 1-63 to optionally include a plant injection system comprising: an injection tool configured to penetrate a plant and distribute a liquid formulation to the plant, the injection tool includes: a base having an inlet port configured to receive the liquid formulation; a penetrating distribution body extending from the base along a longitudinal body axis, the penetrating distribution body having a body profile, the penetrating distribution body includes: a penetrating element proximate a distal portion of the penetrating distribution body; an anchor element along the penetrating distribution body, the anchor element is configured to retain the injection tool within the penetrated plant; a distribution element along the penetrating distribution body, the distribution element includes one or more distribution ports; and wherein the one or more distribution ports are in communication with the inlet port, and the one or more distribution ports are laterally spaced from the longitudinal body axis.

Aspect 65 can include, or can optionally be combined with the subject matter of Aspects 1-64 to optionally include wherein the body profile includes a shaft profile, and the penetrating element includes one or more cutting elements.

Aspect 66 can include, or can optionally be combined with the subject matter of Aspects 1-65 to optionally include wherein the body profile includes a wedge profile tapering toward the distal portion.

Aspect 67 can include, or can optionally be combined with the subject matter of Aspects 1-66 to optionally include wherein the anchor element includes one or more of threading, flutes, cleats or a wedge profile.

Aspect 68 can include, or can optionally be combined with the subject matter of Aspects 1-67 to optionally include wherein the penetrating distribution body includes an inlet passage extending from the inlet port to the one or more distribution ports.

Aspect 69 can include, or can optionally be combined with the subject matter of Aspects 1-68 to optionally include wherein the one or more distribution ports are recessed from an exterior of the body profile.

Aspect 70 can include, or can optionally be combined with the subject matter of Aspects 1-69 to optionally include wherein the one or more distribution ports are remotely located relative to the penetrating element.

Aspect 71 can include, or can optionally be combined with the subject matter of Aspects 1-70 to optionally include wherein the one or more distribution ports extend away from the longitudinal body axis.

Aspect 72 can include, or can optionally be combined with the subject matter of Aspects 1-71 to optionally include wherein the one or more distribution ports extend toward the base and extend away from the distal portion of the penetrating distribution body.

Aspect 73 can include, or can optionally be combined with the subject matter of Aspects 1-72 to optionally include wherein the injection tool includes a distribution configuration having the one or more distribution ports configured to distribute the liquid formulation to the plant transversely relative to the longitudinal body axis.

Aspect 74 can include, or can optionally be combined with the subject matter of Aspects 1-73 to optionally include wherein the body profile includes at least one distribution reservoir, and the one or more distribution ports open into the at least one distribution reservoir.

Aspect 75 can include, or can optionally be combined with the subject matter of Aspects 1-74 to optionally include wherein the penetrating distribution body surrounds the at least one distribution reservoir.

Aspect 76 can include, or can optionally be combined with the subject matter of Aspects 1-75 to optionally include wherein the penetrating distribution body includes one or more scalloped surfaces, and the at least one distribution reservoir extends along the one or more scalloped surfaces.

Aspect 77 can include, or can optionally be combined with the subject matter of Aspects 1-76 to optionally include wherein the penetrating distribution body includes one or more cavities, and the at least one distribution reservoir is within the one or more cavities.

Aspect 78 can include, or can optionally be combined with the subject matter of Aspects 1-77 to optionally include wherein the at least one distribution reservoir is spaced from a leading edge of the penetrating element.

Aspect 79 can include, or can optionally be combined with the subject matter of Aspects 1-78 to optionally include wherein the at least one distribution reservoir is recessed from an exterior of the body profile.

Aspect 80 can include, or can optionally be combined with the subject matter of Aspects 1-79 to optionally include a method for distribution of a liquid formulation to a plant, the method comprising: penetrating a plant with an injection tool having a penetrating distribution body extending along a longitudinal body axis, penetrating includes: piercing the plant with a penetrating element of the penetrating distribution body, wherein the penetrating element is moved along the longitudinal body axis; distributing the liquid formulation to the penetrated plant, distributing the liquid formulation includes: transmitting the liquid formulation from an inlet port of the injection tool to one or more distribution ports of the penetrating distribution body; delivering the liquid formulation from the one or more distribution ports transversely relative to the longitudinal body axis.

Aspect 81 can include, or can optionally be combined with the subject matter of Aspects 1-80 to optionally include wherein penetrating the plant with the injection tool includes isolating the one or more distribution ports from the plant with a penetration profile of the penetration element.

Aspect 82 can include, or can optionally be combined with the subject matter of Aspects 1-81 to optionally include wherein the one or more distribution ports are within a body profile of the penetrating distribution body; and penetrating the plant with the injection tool includes isolating the one or more distribution ports from the plant with the body profile.

Aspect 83 can include, or can optionally be combined with the subject matter of Aspects 1-82 to optionally include wherein the one or more distribution ports are within a body profile of the penetrating distribution body; and penetrating the plant with the injection tool includes interrupting the engagement of the one or more distribution ports with the plant.

Aspect 84 can include, or can optionally be combined with the subject matter of Aspects 1-83 to optionally include wherein the penetrating element includes a cutting element; and piercing the plant with the penetrating element includes cutting the plant with the cutting element.

Aspect 85 can include, or can optionally be combined with the subject matter of Aspects 1-84 to optionally include wherein the penetrating element includes a wedge profile; and piercing the plant with the penetrating element includes cutting the plant with the wedge profile.

Aspect 86 can include, or can optionally be combined with the subject matter of Aspects 1-85 to optionally include wherein the penetrating distribution body includes a body profile, and the one or more distribution ports are recessed from the body profile; and delivering the liquid formulation from the one or more distribution ports transversely includes delivering the liquid formulation into the body profile.

Aspect 87 can include, or can optionally be combined with the subject matter of Aspects 1-86 to optionally include wherein the penetrating distribution body includes at least one distribution reservoir; and delivering the liquid formulation from the one or more distribution ports transversely includes delivering the liquid formulation into the at least one distribution reservoir.

Aspect 88 can include, or can optionally be combined with the subject matter of Aspects 1-87 to optionally include retaining the liquid formulation along a plant tissue of the plant.

Aspect 89 can include, or can optionally be combined with the subject matter of Aspects 1-88 to optionally include wherein the one or more distribution ports are remote from the penetrating element; and delivering the liquid formulation from the one or more distribution ports includes delivering the liquid formulation remotely relative to the penetration element.

Aspect 90 can include, or can optionally be combined with the subject matter of Aspects 1-89 to optionally include wherein delivering the liquid formulation remotely includes delivery the liquid formulation at a proximal location along the penetrating distribution body relative to the penetrating element.

Aspect 91 can include, or can optionally be combined with the subject matter of Aspects 1-90 to optionally include retaining the penetrating distribution body in the plant with an anchor element.

Aspect 92 can include, or can optionally be combined with the subject matter of Aspects 1-91 to optionally include delivering the liquid formulation from the one or more distribution ports includes ongoing delivery of the liquid formulation.

Aspect 93 can include, or can optionally be combined with the subject matter of Aspects 1-92 to optionally include wherein ongoing delivery of the liquid formulation includes ongoing delivery of the liquid formulation over one or more hours.

Aspect 94 can include, or can optionally be combined with the subject matter of Aspects 1-93 to optionally include wherein ongoing delivery of the liquid formulation includes a plurality of distributions.

Aspect 95 can include, or can optionally be combined with the subject matter of Aspects 1-94 to optionally include wherein delivering the liquid formulation includes passive delivering of the liquid formulation.

Aspect 96 can include, or can optionally be combined with the subject matter of Aspects 1-95 to optionally include wherein passive delivering of the liquid formulation includes delivering of the liquid formulation based on a hydrostatic pressure of the liquid formulation.

Aspect 97 can include, or can optionally be combined with the subject matter of Aspects 1-96 to optionally include a plant injection system comprising: an injection tool configured to penetrate a plant and distribute a liquid formulation to the plant, the injection tool includes: a base having an inlet port; a penetrating distribution body extending from the base along a longitudinal body axis, the penetrating distribution body having a body profile, the penetrating distribution body includes: a penetrating element proximate a distal portion of the penetrating distribution body; a distribution element along the penetrating distribution body, the distribution element includes one or more distribution ports directed laterally relative to the longitudinal body axis, the one or more distribution ports in communication with the inlet port; and a delivery device in communication with the injection tool, the delivery device includes: a container configured to store the liquid formulation; and an attachment interface in communication with the container, the attachment interface is configured for coupling with the inlet port.

Aspect 98 can include, or can optionally be combined with the subject matter of Aspects 1-97 to optionally include wherein the delivery device includes a dosing device interposed between the container and the attachment interface, the dosing device is configured to deliver a specified quantity of the liquid formulation to the injection tool for lateral distribution from the one or more distribution ports.

Aspect 99 can include, or can optionally be combined with the subject matter of Aspects 1-98 to optionally include wherein the one or more distribution ports are recessed from an exterior surface of the body profile.

Aspect 100 can include, or can optionally be combined with the subject matter of Aspects 1-99 to optionally include wherein the body profile includes at least one distribution reservoir, and the one or more distribution ports open into the at least one distribution reservoir.

Aspect 101 can include, or can optionally be combined with the subject matter of Aspects 1-100 to optionally include wherein the at least one distribution reservoir is spaced from a leading edge of the penetrating element.

Aspect 102 can include, or can optionally be combined with the subject matter of Aspects 1-101 to optionally include wherein the at least one distribution reservoir is recessed from an exterior surface of the body profile.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

The terms "a" or "an" mean "one or more", independent of any other instances or usages of "at least one" or "one or more" unless such interpretation is nonsensical in context or unless explicitly stated otherwise.

The term "or" is used nonexclusively, such that "A or B" includes "A but not B," "B but not A," and "A and B," unless otherwise indicated.

The terms "including" and "comprising" and "having" and "involving" (and related forms such as "comprises," "includes," "has" and involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b and c.

The terms "first," "second," and "third," etc. are used merely as labels, and are not intended to impose numerical requirements or any specific order on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Where ever the phrase "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited. Therefore, for example, the phrase "wherein the lever extends vertically" means "wherein the lever extends substantially vertically" so long as a precise vertical arrangement is not necessary for the lever to perform its function.

Terms which imply connectivity between components such as "in fluid communication", "operatively connected" and the like are interpreted to mean directly or indirectly connected unless otherwise stated. Thus, for example, the phrase "wherein the multiport injection tip is operatively connected to the fluid delivery system" means that the tip is directly or indirectly operatively connected to the fluid delivery system. Similarly, the phrase "wherein the first port is in fluid communication with the second port" means that the first port is either directly or indirectly in fluid communication with the second port.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

This description and the accompanying drawings that illustrate aspects and embodiments of the present disclosure should not be taken as limiting; while the disclosure has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the disclosure. Thus, it will be understood that changes and modifications may be made by those of ordinary skill within the scope and spirit of the following claims. In particular, the present disclosure covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the disclosure or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope of the claims.

ENUMERATED EMBODIMENTS

The following enumerated embodiments are representative of some aspects of the invention.

1. A plant injection system comprising:
an injection tool configured to penetrate a plant and distribute a liquid formulation to the plant, the injection tool includes:
a base having an inlet port;
a penetrating distribution body extending along a longitudinal body axis and having a body profile, the penetrating distribution body includes:
a penetrating element;
at least one distribution reservoir within the body profile; and
one or more distribution ports in communication with the inlet port and the at least one distribution reservoir, the one or more distribution ports are spaced from the penetrating element; and
wherein the injection tool includes penetrating and distribution configurations:
in the penetrating configuration the penetrating element is configured to penetrate the plant along the longitudinal body axis; and
in the distribution configuration the one or more distribution ports are configured to distribute the liquid formulation transversely relative to the longitudinal body axis within the at least one distribution reservoir proximate to the plant.

2. The plant injection system of embodiment 1, wherein the one or more distribution ports are laterally spaced from the longitudinal body axis.

3. The plant injection system of embodiment 1, wherein the penetration element includes a penetration profile, and the one or more distribution ports are within the penetration profile and proximal relative to the penetration profile.

4. The plant injection system of embodiment 3, wherein the one or more distribution ports are recessed within the penetration profile.

5. The plant injection system of embodiment 1, wherein in the penetrating configuration the penetrating element interrupts engagement of the one or more distribution ports with the plant.

6. The plant injection system of embodiment 1, wherein the one or more distribution ports are recessed from an exterior of the body profile.

7. The plant injection system of embodiment 6, wherein in the distribution configuration the one or more distribution ports are configured to distribute the liquid formulation toward the exterior of the body profile.

8. The plant injection system of embodiment 1, wherein in the distribution configuration the one or more distribution ports are configured to distribute the liquid formulation remotely relative to the penetrating element.

9. The plant injection system of embodiment 1, wherein in the distribution configuration the one or more distribution ports are configured to distribute the liquid formulation at a proximal location along the penetrating distribution body relative to the penetrating element.

10. The plant injection system of embodiment 1, wherein in the distribution configuration the penetrating distribution body having the at least one distribution reservoir is configured to retain the liquid formulation along a plant tissue of the plant.

11. The plant injection system of embodiment 1 comprising a retained configuration wherein the penetrating distribution body is retained in an ongoing state in the plant with an anchor element.

12. The plant injection system of embodiment 1, wherein in the distribution configuration the one or more distribution ports are configured to distribute the liquid formulation to the plant in an ongoing state.

13. The plant injection system of embodiment 12, wherein the ongoing state includes a plurality of distributions of the liquid formulation from the one or more distribution ports over one or more hours.

14. The plant injection system of embodiment 13, wherein the plurality of distributions includes a continuous distribution of the liquid formulation.

15. The plant injection system of embodiment 1, wherein the penetrating element includes one or more of a cutting element, a wedge profile or a spike profile.

16. A method for distribution of a liquid formulation to a plant, the method comprising:
    penetrating a plant with an injection tool having a penetrating distribution body extending along a longitudinal body axis, penetrating includes:
        piercing the plant with a penetrating element of the penetrating distribution body;
        isolating one or more distribution ports from the plant with the penetrating distribution body; and
    distributing the liquid formulation to the penetrated plant, distributing the liquid formulation includes:
        transmitting the liquid formulation from an inlet port of the injection tool to the one or more distribution ports;
        delivering the liquid formulation from the one or more distribution ports to at least one distribution reservoir in communication with the penetrated plant, the at least one distribution reservoir within a body profile of the penetrating distribution body.

17. The method of embodiment 16, wherein isolating the one or more distribution ports from the plant includes isolating the one or more distribution ports from the plant with a penetration profile of the penetration element.

18. The method of embodiment 16, wherein the one or more distribution ports are within the body profile of the penetrating distribution body; and
    isolating the one or more distribution ports from the plant includes isolating the one or more distribution ports with the body profile.

19. The method of embodiment 16, wherein the one or more distribution ports are within a body profile of the penetrating distribution body; and
    penetrating the plant with the injection tool includes interrupting the engagement of the one or more distribution ports with the plant.

20. The method of embodiment 16, wherein the penetrating element includes a cutting element; and
    piercing the plant with the penetrating element includes cutting the plant with the cutting element.

21. The method of embodiment 16, wherein the penetrating element includes a wedge profile; and
    piercing the plant with the penetrating element includes cutting the plant with the wedge profile.

22. The method of embodiment 16, wherein the penetrating distribution body includes a body profile, and the one or more distribution ports are recessed from the body profile; and
    delivering the liquid formulation from the one or more distribution ports includes transversely delivering the liquid formulation relative to a longitudinal body axis of the penetrating distribution body.

23. The method of embodiment 16 comprising retaining the liquid formulation along a plant tissue of the plant.

24. The method of embodiment 16, wherein the one or more distribution ports are remote from the penetrating element; and
    delivering the liquid formulation from the one or more distribution ports includes delivering the liquid formulation remotely relative to the penetration element.

25. The method of embodiment 24, wherein delivering the liquid formulation remotely includes delivery the liquid formulation at a proximal location along the penetrating distribution body relative to the penetrating element.

26. The method of embodiment 16 comprising retaining the penetrating distribution body in the plant with an anchor element.

27. The method of embodiment 16, wherein delivering the liquid formulation from the one or more distribution ports includes ongoing delivery of the liquid formulation.

28. The method of embodiment 27, wherein ongoing delivery of the liquid formulation includes ongoing delivery of the liquid formulation over one or more hours.

29. The method of embodiment 27, wherein ongoing delivery of the liquid formulation includes a plurality of distributions.

30. The method of embodiment 16, wherein delivering the liquid formulation includes passive delivering of the liquid formulation.

31. The method of embodiment 30, wherein passive delivering of the liquid formulation includes delivering of the liquid formulation based on a hydrostatic pressure of the liquid formulation.

32. A plant injection system comprising:
    an injection tool configured to penetrate a plant and distribute a liquid formulation to the plant, the injection tool includes:
        a base having an inlet port;
        a penetrating distribution body extending along a longitudinal body axis, the penetrating distribution body includes:

a penetrating element; and
one or more distribution ports in communication with the inlet port, the one or more distribution ports are spaced from the penetrating element; and
wherein the injection tool includes penetrating and distribution configurations:
in the penetrating configuration the penetrating element is configured to penetrate the plant along the longitudinal body axis; and
in the distribution configuration the one or more distribution ports are configured to distribute the liquid formulation to the plant transversely relative to the longitudinal body axis.

33. The plant injection system of embodiment 32, wherein the one or more distribution ports are laterally spaced from the longitudinal body axis.

34. The plant injection system of embodiment 32, wherein the penetration element includes a penetration profile, and the one or more distribution ports are within the penetration profile and proximal relative to the penetration profile.

35. The plant injection system of embodiment 34, wherein the one or more distribution ports are recessed within the penetration profile.

36. The plant injection system of embodiment 32, wherein in the penetrating configuration the penetrating element interrupts engagement of the one or more distribution ports with the plant.

37. The plant injection system of embodiment 32, wherein the penetrating distribution body includes a body profile, and the one or more distribution ports are recessed from an exterior of the body profile.

38. The plant injection system of embodiment 37, wherein in the distribution configuration the one or more distribution ports are configured to distribute the liquid formulation toward the exterior of the body profile.

39. The plant injection system of embodiment 32, wherein in the distribution configuration the one or more distribution ports are configured to distribute the liquid formulation remotely relative to the penetrating element.

40. The plant injection system of embodiment 32, wherein in the distribution configuration the one or more distribution ports are configured to distribute the liquid formulation at a proximal location along the penetrating distribution body relative to the penetrating element.

41. The plant injection system of embodiment 32, wherein the penetrating distribution includes a body profile and at least one distribution reservoir within the body profile; and
in the distribution configuration the one or more distribution ports are configured to distribute the liquid formulation into the least one distribution reservoir.

42. The plant injection system of embodiment 41, wherein in the distribution configuration the penetrating distribution body having the at least one distribution reservoir is configured to retain the liquid formulation along a plant tissue of the plant.

43. The plant injection system of embodiment 32 comprising a retained configuration wherein the penetrating distribution body is retained in an ongoing state in the plant with an anchor element.

44. The plant injection system of embodiment 32, wherein in the distribution configuration the one or more distribution ports are configured to distribute the liquid formulation to the plant in an ongoing state.

45. The plant injection system of embodiment 44, wherein the ongoing state includes a plurality of distributions of the liquid formulation from the one or more distribution ports over one or more hours.

46. The plant injection system of embodiment 44, wherein the plurality of distributions includes a continuous distribution of the liquid formulation.

47. The plant injection system of embodiment 32, wherein the penetrating element includes one or more of a cutting element, a wedge profile or a spike profile.

48. A plant injection system comprising:
an injection tool configured to penetrate a plant and distribute a liquid formulation to the plant, the injection tool includes:
a base having an inlet port configured to receive the liquid formulation;
a penetrating distribution body extending from the base along a longitudinal body axis, the penetrating distribution body having a body profile, the penetrating distribution body includes:
a penetrating element proximate a distal portion of the penetrating distribution body;
a distribution element along the penetrating distribution body, the distribution element includes one or more distribution ports; and
wherein the one or more distribution ports open laterally along the penetrating distribution body relative to the longitudinal body axis.

49. The plant injection system of embodiment 48, wherein the body profile includes a shaft profile having one or more cutting elements along the penetrating element.

50. The plant injection system of embodiment 48, wherein the body profile includes a wedge profile tapering toward the distal portion.

51. The plant injection system of embodiment 48, wherein the penetrating distribution body includes an anchor element configured to retain the injection tool within a penetrated plant.

52. The plant injection system of embodiment 51, wherein the anchor element includes one or more of threading, flutes, cleats, or a wedge profile.

53. The plant injection system of embodiment 48, wherein the penetrating distribution body includes an inlet passage extending from the inlet port to the one or more distribution ports.

54. The plant injection system of embodiment 48, wherein the one or more distribution ports are recessed from an exterior of the body profile.

55. The plant injection system of embodiment 48, wherein the one or more distribution ports include a plurality of distribution ports.

56. The plant injection system of embodiment 48, wherein the one or more distribution ports extend away from the longitudinal body axis.

57. The plant injection system of embodiment 48, wherein the one or more distribution ports extend toward the base and extend away from the distal portion of the penetrating distribution body.

58. The plant injection system of embodiment 48, wherein the injection tool includes a distribution configuration having the one or more distribution ports configured to distribute the liquid formulation to the plant transversely relative to the longitudinal body axis.

59. The plant injection system of embodiment 48, wherein the body profile includes at least one distribution reservoir, and the one or more distribution ports open into the at least one distribution reservoir.

60. The plant injection system of embodiment 59, wherein the at least one distribution reservoir is spaced from a leading edge of the penetrating element.

61. The plant injection system of embodiment 59, wherein the at least one distribution reservoir is recessed from an exterior of the body profile.

62. The plant injection system of embodiment 48 comprising:
  a delivery device in communication with the injection tool, the delivery device includes:
    a container configured to store the liquid formulation; and
    an attachment interface in communication with the container, the attachment interface is configured for coupling with the inlet port of the injection tool.

63. The plant injection system of embodiment 62, wherein the delivery device includes a dosing device interposed between the container and the attachment interface, the dosing device is configured to deliver a specified quantity of the liquid formulation to the injection tool for lateral distribution from the one or more distribution ports.

64. A plant injection system comprising:

an injection tool configured to penetrate a plant and distribute a liquid formulation to the plant, the injection tool includes:

a base having an inlet port configured to receive the liquid formulation;

a penetrating distribution body extending from the base along a longitudinal body axis, the penetrating distribution body having a body profile, the penetrating distribution body includes:

a penetrating element proximate a distal portion of the penetrating distribution body;

an anchor element along the penetrating distribution body, the anchor element is configured to retain the injection tool within the penetrated plant;

a distribution element along the penetrating distribution body, the distribution element includes one or more distribution ports; and wherein the one or more distribution ports are in communication with the inlet port, and the one or more distribution ports are laterally spaced from the longitudinal body axis.

65. The plant injection system of embodiment 64, wherein the body profile includes a shaft profile, and the penetrating element includes one or more cutting elements.

66. The plant injection system of embodiment 64, wherein the body profile includes a wedge profile tapering toward the distal portion.

67. The plant injection system of embodiment 64, wherein the anchor element includes one or more of threading, flutes, cleats or a wedge profile.

68. The plant injection system of embodiment 64, wherein the penetrating distribution body includes an inlet passage extending from the inlet port to the one or more distribution ports.

69. The plant injection system of embodiment 64, wherein the one or more distribution ports are recessed from an exterior of the body profile.

70. The plant injection system of embodiment 64, wherein the one or more distribution ports are remotely located relative to the penetrating element.

71. The plant injection system of embodiment 64, wherein the one or more distribution ports extend away from the longitudinal body axis.

72. The plant injection system of embodiment 64, wherein the one or more distribution ports extend toward the base and extend away from the distal portion of the penetrating distribution body.

73. The plant injection system of embodiment 64, wherein the injection tool includes a distribution configuration having the one or more distribution ports configured to distribute the liquid formulation to the plant transversely relative to the longitudinal body axis.

74. The plant injection system of embodiment 64, wherein the body profile includes at least one distribution reservoir, and the one or more distribution ports open into the at least one distribution reservoir.

75. The plant injection system of embodiment 74, wherein the penetrating distribution body surrounds the at least one distribution reservoir.

76. The plant injection system of embodiment 74, wherein the penetrating distribution body includes one or more scalloped surfaces, and the at least one distribution reservoir extends along the one or more scalloped surfaces.

77. The plant injection system of embodiment 74, wherein the penetrating distribution body includes one or more cavities, and the at least one distribution reservoir is within the one or more cavities.

78. The plant injection system of embodiment 74, wherein the at least one distribution reservoir is spaced from a leading edge of the penetrating element.

79. The plant injection system of embodiment 74, wherein the at least one distribution reservoir is recessed from an exterior of the body profile.

80. A method for distribution of a liquid formulation to a plant, the method comprising:

penetrating a plant with an injection tool having a penetrating distribution body extending along a longitudinal body axis, penetrating includes:

piercing the plant with a penetrating element of the penetrating distribution body, wherein the penetrating element is moved along the longitudinal body axis;

distributing the liquid formulation to the penetrated plant, distributing the liquid formulation includes:

transmitting the liquid formulation from an inlet port of the injection tool to one or more distribution ports of the penetrating distribution body;

delivering the liquid formulation from the one or more distribution ports transversely relative to the longitudinal body axis.

81. The method of embodiment 80, wherein penetrating the plant with the injection tool includes isolating the one or more distribution ports from the plant with a penetration profile of the penetration element.

82. The method of embodiment 80, wherein the one or more distribution ports are within a body profile of the penetrating distribution body; and penetrating the plant with the injection tool includes isolating the one or more distribution ports from the plant with the body profile.

83. The method of embodiment 80, wherein the one or more distribution ports are within a body profile of the penetrating distribution body; and penetrating the plant with the injection tool includes interrupting the engagement of the one or more distribution ports with the plant.

84. The method of embodiment 80, wherein the penetrating element includes a cutting element; and piercing the plant with the penetrating element includes cutting the plant with the cutting element.

85. The method of embodiment 80, wherein the penetrating element includes a wedge profile; and piercing the plant with the penetrating element includes cutting the plant with the wedge profile.

86. The method of embodiment 80, wherein the penetrating distribution body includes a body profile, and the one or more distribution ports are recessed from the body profile; and
delivering the liquid formulation from the one or more distribution ports transversely includes delivering the liquid formulation into the body profile.

87. The method of embodiment 86, wherein the penetrating distribution body includes at least one distribution reservoir; and
delivering the liquid formulation from the one or more distribution ports transversely includes delivering the liquid formulation into the at least one distribution reservoir.

88. The method of embodiment 80 comprising retaining the liquid formulation along a plant tissue of the plant.

89. The method of embodiment 80, wherein the one or more distribution ports are remote from the penetrating element; and
delivering the liquid formulation from the one or more distribution ports includes delivering the liquid formulation remotely relative to the penetration element.

90. The method of embodiment 89, wherein delivering the liquid formulation remotely includes delivery the liquid formulation at a proximal location along the penetrating distribution body relative to the penetrating element.

91. The method of embodiment 80 comprising retaining the penetrating distribution body in the plant with an anchor element.

92. The method of embodiment 80, wherein delivering the liquid formulation from the one or more distribution ports includes ongoing delivery of the liquid formulation.

93. The method of embodiment 92, wherein ongoing delivery of the liquid formulation includes ongoing delivery of the liquid formulation over one or more hours.

94. The method of embodiment 92, wherein ongoing delivery of the liquid formulation includes a plurality of distributions.

95. The method of embodiment 80, wherein delivering the liquid formulation includes passive delivering of the liquid formulation.

96. The method of embodiment 95, wherein passive delivering of the liquid formulation includes delivering of the liquid formulation based on a hydrostatic pressure of the liquid formulation.

97. A plant injection system comprising:
an injection tool configured to penetrate a plant and distribute a liquid formulation to the plant, the injection tool includes:
a base having an inlet port;
a penetrating distribution body extending from the base along a longitudinal body axis, the penetrating distribution body having a body profile, the penetrating distribution body includes:
a penetrating element proximate a distal portion of the penetrating distribution body;
a distribution element along the penetrating distribution body, the distribution element includes one or more distribution ports directed laterally relative to the longitudinal body axis, the one or more distribution ports in communication with the inlet port; and
a delivery device in communication with the injection tool, the delivery device includes:
a container configured to store the liquid formulation; and
an attachment interface in communication with the container, the attachment interface is configured for coupling with the inlet port.

98. The plant injection system of embodiment 97, wherein the delivery device includes a dosing device interposed between the container and the attachment interface, the dosing device is configured to deliver a specified quantity of the liquid formulation to the injection tool for lateral distribution from the one or more distribution ports.

99. The plant injection system of embodiment 97, wherein the one or more distribution ports are recessed from an exterior surface of the body profile.

100. The plant injection system of embodiment 97, wherein the body profile includes at least one distribution reservoir, and the one or more distribution ports open into the at least one distribution reservoir.

101. The plant injection system of embodiment 100, wherein the at least one distribution reservoir is spaced from a leading edge of the penetrating element.

102. The plant injection system of embodiment 100, wherein the at least one distribution reservoir is recessed from an exterior surface of the body profile.

103. A composite plant injection system comprising: a system body configured to store and administer an active ingredient (AI) formulation, the system body comprising: a cartridge magazine enclosing a cartridge socket configured to receive a formulation cartridge containing the AI formulation; a cartridge seat within the cartridge magazine; a tool hub including an injection tool, the injection tool extends from the system body and includes one or more distribution ports configured to administer the AI formulation to a plant interior; and a delivery interface extending between the cartridge seat and the tool hub, the delivery interface fluidly interconnects the cartridge magazine with the one or more distribution ports of the injection tool, wherein the composite plant injection system is configured to sit at an angle when installed onto a post portion of a plant.

10.4 A composite plant injection system according to embodiment 104, wherein the system body includes a structural frame housing at least the cartridge magazine, the tool hub and the injection tool.

105. A composite plant injection system according to embodiment 104 or 105, wherein the cartridge magazine includes a lock mechanism for coupling a formulation canister with the cartridge seat to activate the formulation canister.

106. A composite plant injection system according to embodiment 105, wherein the flange is height adjustable.

107. A composite plant injection system according to any one of embodiments 104 to 106, wherein the system body comprises a flexible portion.

108. A composite plant injection system according to any one of embodiments 104 to 107, further comprising a tip setter for installing the system body onto a plant.

109. A composite plant injection system according to embodiment 108, wherein the tip-setter is a clamp-style tip-sitter sized and shaped to receive a post portion of a plant and the system body.

110. A composite plant injection system according to embodiment 109, wherein the post portion of a plant is a stem of a plant or a trunk of a plant.

111. A composite plant injection system according to any one of embodiment 108 to 110, wherein the system body defines a groove for receiving the tip-setter.

What is claimed is:

1. A multiport injection tool, comprising:
a base including a plurality of access ports;
a penetrating distribution body extending from the base, and having a wedge shaped body extending along a longitudinal body axis, wherein the wedge shaped body has a width dimension and a depth dimension both oriented transverse to the longitudinal body axis, wherein the width dimension is greater than the depth dimension, wherein the penetrating distribution body includes:
 a cutting edge along a front face of the penetrating distribution body directed distally away from the base,
 a penetrating element that extends from the cutting edge proximate to a distal portion of the penetrating distribution body to a proximal portion of the penetration distribution body, and
 a distribution element that includes distribution ports and that at least partially defines multiple distribution reservoirs separated by the distribution element, wherein the distribution reservoirs are in fluid communication with the distribution ports, wherein each of the distribution reservoirs opens to both opposite sides of the wedge shaped body, and wherein the distribution ports are in fluid communication with the access ports.

2. The tool of claim 1, further comprising an interned channel system including: a port manifold interconnecting the access ports; a port junction, within the port manifold; and a delivery channel, wherein the delivery channel extends from the port junction of the port manifold to the distribution ports in the penetrating distribution body.

3. The tool of claim 1, wherein the distribution ports open transversely relative to the longitudinal body axis into the one or more distribution reservoirs; and
 wherein the multiple distribution reservoirs are symmetric across the longitudinal body axis.

4. A plant injection system, comprising:
a multiport injection tool of claim 1, wherein the plurality of access ports includes at least a first access port and a second inlet-pert; access port:
a fluid delivery system; and
a fluid receiving system,
wherein the fluid delivery system is operatively connected to the first access port of the multiport injection tool,
wherein the fluid receiving system is in fluid communication with the second access port of the multiport injection tool.

5. The plant injection system of claim 4, wherein the fluid receiving system has:
an open position in which fluid flows through or is evacuated from the fluid receiving system, and
a closed position in which fluid is retained in the fluid receiving system.

6. The plant injection system of claim 4, wherein the fluid delivery system is configured to facilitate flow of fluid from the fluid delivery system through the internal channel system in the multiport injection tool from the first access port to a second access port, and to one or more distribution ports and consequently to the interior of a plant.

7. The plant injection system of claim 4, wherein the fluid delivery system comprises:
a system body configured to store and administer an active ingredient (AI) formulation, the system body includes:
 a cartridge magazine enclosing a cartridge socket configured to receive a formulation cartridge containing the AI formulation;
 a cartridge seat within the cartridge magazine;
 a tool hub including the injection tool; and
 a delivery interface extending between the cartridge seat and the tool hub, wherein the delivery interface fluidly interconnects the cartridge magazine with one or more distribution ports of the injection tool.

8. The plant injection system of claim 7, wherein the formulation cartridge is pressurized canister.

9. The plant injection system of claim 7, wherein the formulation cartridge includes a bag-on-valve mechanism.

10. The plant injection system of claim 7, wherein the system body includes a structural frame housing at least the cartridge magazine, the tool hub and the injection tool.

11. The plant injection system of claim 7, wherein the cartridge magazine includes a magazine cap having locked and unlocked configurations:
in the unlocked configuration the magazine cap is decoupled from the cartridge magazine; and
in the locked configuration the magazine cap is engaged with the cartridge magazine and biases the formulation cartridge toward the cartridge seat.

12. The plant injection system of claim 7, wherein the system body further includes a flexible portion configured to bend so as to position the fluid delivery system at an angle relative to the plant.

13. The plant injection system of claim 7, wherein the system body further includes a flange configured to engages the formulation cartridge, resulting in activating the formulation cartridge and/or maintaining the formulation cartridge in place.

14. The tool of claim 1, wherein the multiple distribution reservoirs are symmetric across the longitudinal body axis.

15. The tool of claim 1, wherein the penetrating element and the distribution element cooperate to define the multiple distribution reservoirs.

16. The tool of claim 1, wherein the distribution ports are symmetric across the longitudinal body axis.

* * * * *

UNITED STATES PATENT AND TRADEMARK OFFICE
CERTIFICATE OF CORRECTION

| | | |
|---|---|---|
| PATENT NO. | : 12,501,864 B2 | |
| APPLICATION NO. | : 17/796225 | |
| DATED | : December 23, 2025 | |
| INVENTOR(S) | : Urs Widmer et al. | |

It is certified that error appears in the above-identified patent and that said Letters Patent is hereby corrected as shown below:

In the Claims

Claim 4, Column 135, Line 43: replace "second inlet-pert; access port" with -- second access port: --

Signed and Sealed this
Tenth Day of February, 2026

John A. Squires
*Director of the United States Patent and Trademark Office*